United States Patent
Kodaira et al.

(10) Patent No.: US 8,593,486 B2
(45) Date of Patent: Nov. 26, 2013

(54) IMAGE INFORMATION OUTPUT METHOD

(75) Inventors: Takatoshi Kodaira, Musashino (JP); Takamoto Kodaira, Musashino (JP)

(73) Assignee: Kodaira Associates Inc., Tokyo (JP)

( * ) Notice: Subject to any disclaimer, the term of this patent is extended or adjusted under 35 U.S.C. 154(b) by 0 days.

(21) Appl. No.: 13/299,724

(22) Filed: Nov. 18, 2011

(65) Prior Publication Data

US 2012/0120069 A1   May 17, 2012

Related U.S. Application Data

(63) Continuation of application No. PCT/JP2010/058313, filed on May 17, 2010.

(30) Foreign Application Priority Data

May 18, 2009   (JP) ................................. 2009-119484

(51) Int. Cl.
    *G09G 5/00* (2006.01)
(52) U.S. Cl.
    USPC ........... 345/629; 701/532; 345/419; 382/284; 348/144
(58) Field of Classification Search
    None
    See application file for complete search history.

(56) References Cited

U.S. PATENT DOCUMENTS

| | | | | |
|---|---|---|---|---|
| 6,307,680 | B1 * | 10/2001 | Clark | 359/619 |
| 6,526,352 | B1 * | 2/2003 | Breed et al. | 701/470 |
| 7,003,153 | B1 * | 2/2006 | Kerofsky | 382/168 |
| 7,085,409 | B2 * | 8/2006 | Sawhney et al. | 382/154 |
| 7,123,260 | B2 * | 10/2006 | Brust | 345/428 |
| 2002/0076085 | A1 * | 6/2002 | Shimazu | 382/100 |
| 2004/0041914 | A1 | 3/2004 | Peters, III | |
| 2005/0270387 | A1 | 12/2005 | Watanabe et al. | |

(Continued)

FOREIGN PATENT DOCUMENTS

| | | |
|---|---|---|
| CA | 2 534 978 A1 | 3/2004 |
| JP | 10-188029 A | 7/1998 |

(Continued)

OTHER PUBLICATIONS

ACECOMBAT discloses a method and a system for a three dimensional visual data genereation and browsing system. http://www.acecombat.jp/, Apr. 11, 2010.

(Continued)

*Primary Examiner* — Xiao M. Wu
*Assistant Examiner* — Greg Raburn
(74) *Attorney, Agent, or Firm* — Novak Druce Connolly Bove + Quigg LLP

(57) ABSTRACT

Provided is a video image data generation system including a database for storing a plurality of image data photographed in various directions in various locations, correlating the directions and the locations with the stored image data, and correlating and storing a photographed sub-region when the image data is acquired, a route view point specifying device which specifies various locations and eye level directions arranged on a view point route, an image search engine which searches an image of an eye level direction specified from a location of a view point route specified by the route view point specifying device and outputs video data, wherein the image search engine searches image data stored in a database and the image data including a sub-region located in an eye level direction in each of a plurality of locations on a view point route by referencing photography direction data correlated with the sub-region.

19 Claims, 81 Drawing Sheets

(56) References Cited

U.S. PATENT DOCUMENTS

| | | | |
|---|---|---|---|
| 2006/0215038 A1* | 9/2006 | Gruber et al. | 348/218.1 |
| 2008/0082261 A1* | 4/2008 | Tengler et al. | 701/210 |
| 2008/0125962 A1* | 5/2008 | Wipplinger et al. | 701/201 |
| 2008/0285886 A1* | 11/2008 | Allen | 382/284 |
| 2009/0096884 A1* | 4/2009 | Schultz et al. | 348/222.1 |
| 2009/0115841 A1* | 5/2009 | Koyanagi et al. | 348/36 |
| 2009/0262194 A1* | 10/2009 | Wakefield et al. | 348/157 |
| 2010/0118116 A1* | 5/2010 | Tomasz et al. | 348/36 |
| 2010/0176992 A1* | 7/2010 | T'Siobbel | 342/357.25 |
| 2010/0259539 A1* | 10/2010 | Papanikolopoulos et al. | 345/420 |

FOREIGN PATENT DOCUMENTS

| | | |
|---|---|---|
| JP | 2807622 B2 | 7/1998 |
| JP | 2002-185981 A | 6/2002 |
| JP | 2002-357419 A | 12/2002 |
| JP | 2004-245741 A | 9/2004 |
| JP | 2005-538394 A | 12/2005 |
| JP | 2006-14291 A | 1/2006 |
| JP | 2006-350852 A | 12/2006 |
| JP | 2009-129182 A | 6/2009 |
| JP | 2009-217524 | 9/2009 |
| WO | 2004/021692 A2 | 3/2004 |
| WO | 2009/067717 A1 | 5/2009 |

OTHER PUBLICATIONS

Virtual Worlds, Avatars, free 3D chat, online meetings—Second Life Official Site. http://www.sacondlife.com, Apr. 27, 2010.

MEET-ME is a three dimensional image generation and entertainment system of virtual city spaces. http://www.meet-me.jp, Apr. 13, 2010.

* cited by examiner

Fig. 21
Image before blurring effect is removed 530
Image where blurring effect is removed 531

IMAGE INFORMATION OUTPUT METHOD

CROSS-REFERENCE TO RELATED APPLICATION

This application is a U.S. continuation application filed under 35 USC 111(a) claiming benefit under 35 USC 120 and 365(c) of PCT application JP2010/058313, filed on May 17, 2010, which claims priority to Japanese Patent Application No. 2009-119484, filed on May 18, 2009, the entire contents of which are incorporated herein by reference.

BACKGROUND OF THE INVENTION

1. Field of the Invention

The present invention is related to a method of generating and outputting image information. In particular, the present invention is related to a system and a method of generating video image information, wherein a three dimensional image of above ground landscape including urban areas using aerial photographs taken from the sky by an aircraft or photographs taken above ground at street level is generated, and the present invention is also related to a system and a method of generating image information wherein a video picture of three dimensional city landscapes using photographs taken from various angles above ground is generated.

2. Description of the Related Art

In the past, as a method of three dimensional video picture of city landscapes it is known to obtain three dimensional images by consecutive display in real time by producing a three dimensional model by measuring three dimensional data of city buildings using a laser profiler, applying texture of wall images of buildings, and generating images of arbitrary perspective routes and arbitrary perspective directions along these perspective routes using a three dimensional image process. Another method of obtaining three dimensional data of city buildings uses images taken from different angles with regard to the same geographical ground point, and extracts data in a height direction using a stereo image process to generate three dimensional city models. In addition, there are also methods which do not always reproduce an actual match of a city but generate three dimensional image data by constructing three dimensional models of city space.

All of these methods require time and are costly for generating three dimensional structural elements, that is, three dimensional models, of a city. Furthermore, in order to make an exact match of the building exterior walls it is necessary to map exterior wall pattern data or image data (texture mapping) and this texture mapping data, in other words, data from all directions of a three dimensional object is essential for texture mapping, and obtaining this data and texture mapping requires considerable effort and cost. Thus, although the display of three dimensional images of arbitrary city section landscape from an arbitrary aerial route and line of vision is strongly desired, the accuracy of texture mapping can not be sufficiently realized, or the renewal cycle of data becomes longer, which produces shortcomings in the freshness and accuracy of displayed images. In addition, a method for indirectly producing three dimensional data is described in Japanese Laid Open Patent 2006-350852. That is, obtaining three dimensional data of an object using a common photographic object in two panoramic images as a corresponding point by employing a triangulation method. Producing what is called a central panoramic image in Japanese Laid Open Patent 2006-350852 involves calculating corresponding points for all points which requires three dimensional data in the panoramic image and measuring three dimensional data by a triangulation method. It is necessary to (1) measure corresponding points each time or (2) register corresponding points in advance. An image recognition process is required to automatically perform the method of (1) and it is extremely difficult to automatically calculate the point which becomes the peak of a polygon as a three dimensional coordinate. In addition, (2) is a method in which a process of calculating three dimensional coordinates in advance using a usual survey by photo is calculated each time a combination of the panoramic photographs which are used changes and is merely postponing the calculation, and load at the time of display becomes much larger compared to conventional CG technology. This is no different to conventional methods in which three dimensional data of a display object is calculated and texture is mapped and a fundamentally different technology to the present invention.

While as an image generation and browsing system using three dimensional simulated vision, Japanese Laid Open Patent 2002-185981 discloses a midair entertainment system via the internet using aerial photographs and includes features such as the ability to add building data, the method consistently uses [three dimensional object data which is applied and generated with a stereo process is performed on photographic data] or [three dimensional object data] of a building which is changed by a changing means, which is a fundamentally different technology to the present invention. While there is also a method which uses processing of land surface images taken by a satellite as in Ace Combat of ACECOMBAT, in the end the purpose of this method is to bring about a sense of reality to games and does not always match actual three dimensional landscapes. In addition, city space three dimensional simulated vision which can be seen in Second Life in SECONDLIFE displays virtual cities in three dimensions which are not compatible with actual maps. While there is meet-me using COCOR of MMET-ME, which is a three dimensional image generation and entertainment system of virtual city spaces compatible with actual maps for displaying city spaces more realistically compared to Second Life, it does not match reality in terms of exterior wall landscape and detailed structure of buildings. In addition, the technology of the present invention accumulates a large amount of multi-view point and multi-directional aerial photographs taken in advance, and the conventional technology for obtaining aerial photographs uses a digital format one dimensional line sensor from an analog camera type aerial camera owing to recent rapid process in digital technology or an aerial photographic camera using two dimensional video elements.

Furthermore, it is also being applied in the aerial photographic field by utilizing the high capabilities of a general purpose digital camera. A system for creating Ortho images from oblique photographs taken using a digital camera and dedicated software is proposed in Japanese Laid Open Patent 2002-357419. In addition, while the coordinates of a geographical feature are calculated by setting ground reference points in advance and calculating the camera position and orientation by referring to these reference points in an aerial photograph of a desired survey, it is possible to equip an aircraft with GPS (Global Positioning System) and IMU (Inertial Measurement Unit) and measure the camera position and orientation at the time of taking the image (Japanese Laid Open Patent 2004-245741). A technology for photographing a survey for aerial photograph using three CCD line sensors each with different photographying directions is proposed in Japan Registered Patent No. 2807622.

BRIEF SUMMARY OF THE INVENTION

However, while the method and system of ACECOMBAT is a three dimensional visual data generation and browsing system which pursues realism using high resolution satellite imagery as a landscape material, because the object is a foreign war zone and the mage itself is not updated from the time it is created, it is different to the an actual three dimensional image of a city landscape. The system which is proposed of SECONDLIFE displays three dimensional images of city landscapes at human sight line but the entire display is a fake world generated on a computer which is different to the actual world and does not attempt to display a three dimensional city landscape which strives for realism. The method of MMET-ME adds improvements to the method of SECONDLIFE by constructing buildings corresponding to an actual city map yet as a landscape does not strive for uniformity with reality.

Japan Patent Laid Open 2004-245741 is related to obtaining aerial photographs. Two oblique images are obtained in the system proposed in Japan Patent Laid Open 2004-245741, however it is difficult to obtain a large amount of multi-directional high density images which are required by the present invention with only a single oblique image. The system which is proposed in Japan Registered Patent No. 2807622 takes images using CDD line sensors in three different directions and because these three CDD line sensors are arranged in parallel and in a straight line, the system is suitable for obtaining survey use stereo images, but the amount of data is severely lacking for obtaining original images for generating three dimensional images of city landscapes which is the object of the present invention.

It is possible to increase the number of cameras in order to take a large amount of high density ground level multi-directional images in the technology in Japan Patent Laid Open 2004-245741 and Japan Registered Patent No. 2807622. However, the dimensions and position of a photography aperture part in the floor surface of an aircraft used for aerial photography is strictly regulated as an object of airworthiness certification and therefore it is not possible to expand the aperture part or increase the number of cameras by projecting from the aperture part outside of the aircraft. Therefore, an realistic means suitable for a three dimensional generation and browsing system of a city landscape using actual images which are necessary for photographing the ground level at a high density from multiple directions has until now not been considered.

The present invention has been invented as a result of attempting to overcome the problems described above.

As one embodiment of the present invention a system is provided, the system configured to photograph in a large range a plurality of images in multi-direction at mesh points in high density and in air by aircrafts, by storing these lots of images being as a database the system being configured to fast search images which have the little disparities in the case when seen from an arbitrary direction at an arbitrary point of a city, and moreover a morphing system is provided the morphing system generating a smooth continuous video from images which has the little disparities corresponding a specified view point, sight direction, and position in the city.

Moreover, as one embodiment of the present invention, a system is provided, the system being specialized for being mounted on a vehicle for obtaining images in all directions on a road or a passage way in a city in order to generate a real video at a human eye level also on ground, by storing a lot of images obtained as a database the system being configured to fast search images which have the little disparities in the case seen from an arbitrary direction at an arbitrary point on a road in the city, and moreover a morphing system is provided the morphing system generating a smooth continuous video from images which has the little disparities corresponding a specified view point, sight direction, and position in the city.

Furthermore, a method for outputting information is provided as one embodiment of the present invention, the method comprising: photographing at each of a plurality of photographic locations a photographic region with a photographing device, obtaining a plurality of image data and storing in a memory, the photographic region at each of a plurality of photographic locations being divided into a plurality of sub-regions in a plurality of directions; correlating and storing in the memory photographic location data and photographic direction data at the time when the plurality of image data is obtained with each of the plurality of the image data when storing each of the plurality of image data in the memory; specifying a photographed sub-region when the image data is obtained by referencing the photographic location data and the photographic direction data correlated with image data stored in the memory; correlating and storing in a database the image data, the photographic location data and photographic direction data with the specified sub-region; specifying a plurality of locations arranged in order on a perspective route set above the photographic region and a direction of sight line towards the photographic region at each of the plurality of locations; referencing the photographic location data correlated with the sub-region stored in the database and reading out in order image data with searching the image data including a sub-region, the sub-region being located in the direction of sight line at each of the plurality of locations on the perspective road; and outputting the image data read out in order.

Furthermore, an image data outputting system is provided as one embodiment of the present invention the image data outputting system comprising: a database which stores a plurality of image data obtained by photographing at each of a plurality of photographic locations a photographic region with a photographing device, which is divided into a plurality of sub-regions in a plurality of directions, the database correlating and storing photographic location data and photographic direction data at the time when the plurality of image data is obtained with each of the plurality of the image data; a perspective route specifying device which specifies a plurality of locations arranged in order on a perspective route above the photographic region, and specifies a sight line direction pointing at the photographic region at each of the plurality of locations; and an image search engine which searches and output image data in order, the image search engine searching image data in a direction specified by locations on the perspective route specified by the perspective route specifying device by referencing the photographic location data correlated with the sub-region stored in the database and reading out in order image data, which is stored in the database.

As described above, according to the present invention, it is possible to generate three dimensional images for aerial arbitrary perspective routes and perspective directions for an arbitrary city location using actual images taken aerial without performing costly generation of a three dimensional numeric model of a city space and a texture application process of building surfaces. In addition, it is also possible to generate three dimensional images for arbitrary perspective routes and perspective directions at human sight line for geographic points on arbitrary city roads and passageways using actual images taken on roads and passageways. Furthermore, by not generating a three dimensional numeric model or performing a texture application process on building surfaces, it is possible to automate processes and generate and browse three dimensional images with a short period after the images are obtained.

BRIEF EXPLANATION OF THE DRAWINGS

FIG. 21 is a diagram which shows an example of process result of the blur effect removal process of the present invention.

DETAILED DESCRIPTION OF THE INVENTION

Figure 1:
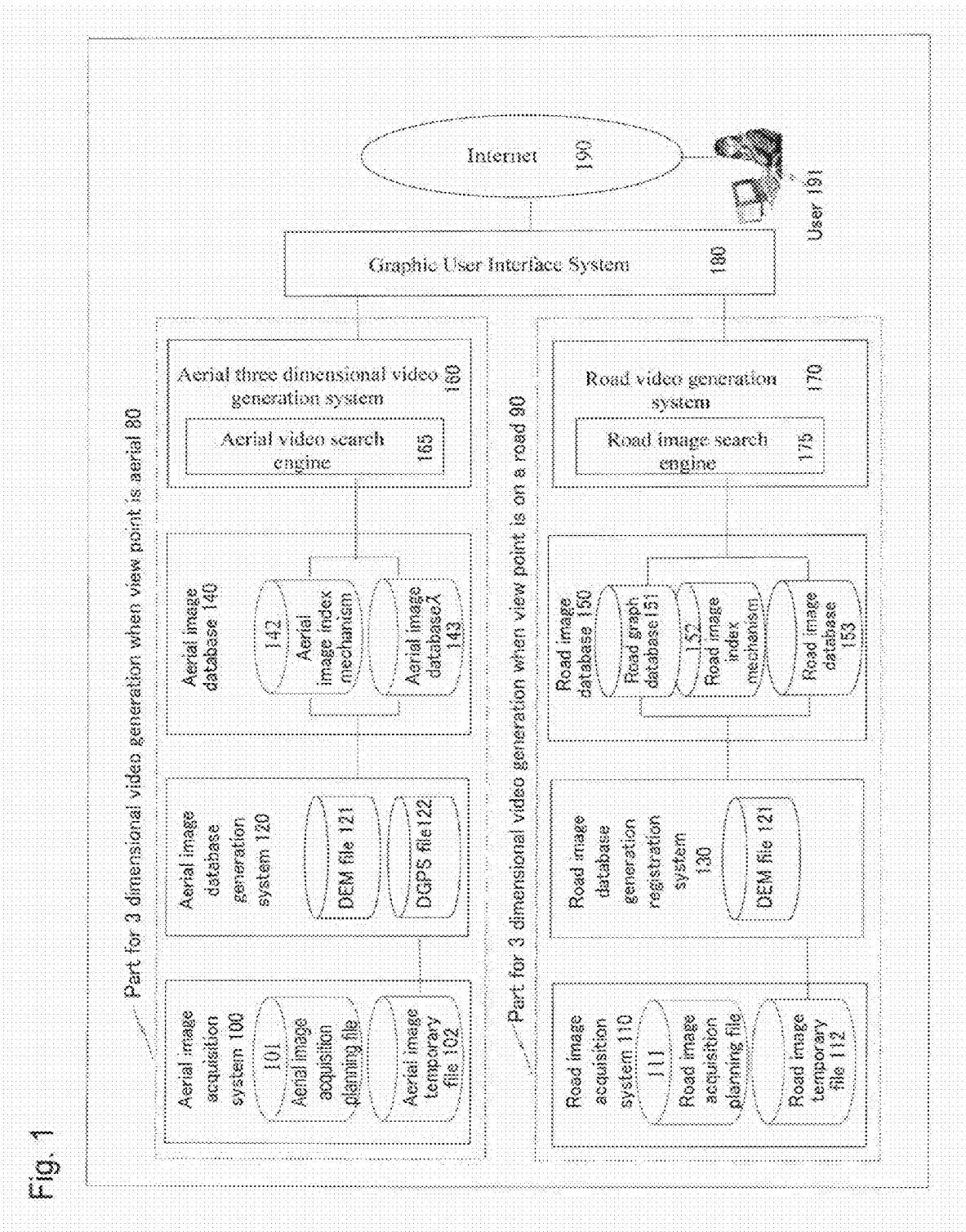
FIG. 1 is a diagram which approximately shows the entire structure of a city landscape three dimensional visual data generation and browsing system of the present invention.

The embodiments for carrying out the present invention are explained in detail below while referring to the diagrams. Furthermore, the present invention is not limited to the explanations below and may be performed with various changes and modifications without departing from the scope of the invention.

The inventors of the present invention became aware that the largest obstacle to carrying out a city landscape three dimensional visual data generation and browsing system is that there is no cheap and frequent means for obtaining three dimensional data of city buildings and constructions and furthermore there is no cheap and frequent means for acquiring images for mapping to the surfaces of these three dimensional objects or applying such images. Furthermore, in the present application, images and visual data refers to contents which display video and still images on an electronic display device including an LCD screen. In addition, while contents in the present application refers largely to landscape data, these contents are not limited to landscape data.

For that, the inventors of the present invention conceived of a method for obtaining smooth visual data, without relying on these means, by photographing the landscape of various part of a city from various directions in advance, selecting the most suitable photographed image according to the selected perspective route, a sight line direction and a destination location, and by compensating the position and optical axis direction of the camera which photographed the image by a morphing process of a difference between the selected view point and sight line, as a method for obtaining three dimensional images of an arbitrary part of a city at an arbitrary sight line from an arbitrary route.

However, photographing the landscape of various part of a city from various directions in advance is extremely difficult. In order to achieve this the inventors of the present invention knew from experience that photographs for every city geographical point for each direction in a range of from at least 2 degrees to at most 25 degrees of a semi-apex angle must be prepared when expressing a solid angle with a circular cone. Because a solid angle is expressed in steradian units and steradian is calculated by $2\pi(1-\cos\theta)$ with respect to a semi-apex angle $\theta$, a solid angle is a range from a minimum of 0.0004 to a maximum of 0.59. In order to solve this problem, the inventors has reached an idea of an arrangement method and control method of using multiple small scale digital cameras.

That is, first, forming multiple small digital cameras as a digital camera group, housing them without sticking out to the exterior of an aircraft from an aerial survey camera hole, which exists, in an prior art, on the floor of an aerial survey aircraft and thus avoiding the problems of acquiring an airworthiness certificate, and secondly, in order to efficiently take pictures from multiple directions, arranging a camera for taking pictures directly underneath at the center part of the digital camera group, and around this arranging 8 or 25 digital cameras, or more if is there is sufficient space, for taking pictures in a radial oblique direction.

Thirdly, even if photographing the ground from each direction, variation in the resolution of an image due to the angle of depression at which the ground is seen is not desirable. The following explanation is made with an angle formed in a vertical direction, which is commonly called an off-nadir angle. The inventors of the present invention have reached an idea of a digital camera group for acquiring images in a wide range without any deterioration in resolution from directly below a flying object such as an aircraft up to a region having a fairly large off-nadir angle by using a telescopic lens with a short focal length on a digital camera for taking oblique photographs with a small off-nadir angle and a telescopic lens with a long focal length on a digital camera for taking oblique photographs with a large off-nadir angle and arranging each of these radially in concentric circles.

Fourthly, by efficiently operating this digital camera group, the inventors of the present invention has reached an idea of a photographic recording system by installing a guidance navigation system comprised of a GPS device and an inertial navigation device in an aircraft in order to acquire an image for each fixed solid angle with respect to various geographical points above a wide city space, forming a precise aerial mesh shaped photographic point in the air and automatically issuing commands to the digital camera group at these photographic points.

Fifthly, the inventors of the present invention has conceived an idea of photographing at an altitude below the clouds during cloudy conditions, which is generally inappropriate for an aerial survey with the aim of decreasing cost of photographing because it is necessary to frequently photograph a large amount of images, and has reached an idea of a method for automatically compensating for image deterioration due to blurring during cloudy conditions by digital image processing.

Furthermore, the inventors of the present invention has reached an idea of a high sped image search mechanism suitable for the present system in consideration of the necessity for rapid searching for generating already taken mages with a solid angle in a range from a minimum of 0.004 to a maximum of 0.59 in steradian unit (a range from 2 degrees to 25 degrees at a semi-apex angle of a circular cone) for generating visual data for arbitrary geographic points. For example, the ground surface is sectioned into a square net shape as a photographic region using latitude and longitude or XY coordinates. One side of a square is set sufficiently small, for example, from about 50 m to 20 m. A two dimensional address is attached to each square on the net shape and managed. A net shaped square group which is included within a range of images taken of the ground surface exists in each image already taken and a vector which connects the camera position at the time of taking an image and the center of the square of the net shape can be defined. An original image vector is defined by normalizing this. However, the original image vector can be used as an index for expressing an image for a specified ground surface net.

That is, by quantizing an angle formed by a zenith vector which indicates directly above and an original image vector, a zenith index is defined. The level for quantizing this angle is 5 degrees or less. Because all directions of 360 degrees are included in each zenith index as a horizontal direction component, by dividing it into cells of units of small solid angle values, each cell is indexed using the angle which forms the original image vector and the zenith vector, and the horizontal direction component of the original image vector. It is possible to rapidly search a necessary image using this three stage indexing. An original image necessary for three dimensional visual data is prepared for each solid angle from 0.004 at minimum to 0.59 at maximum in steradian unit for an arbitrary city location. Because a view point passes through this vicinity, if a misalignment of a solid angle of an actual view point, sight line and original image vector is from 0.004 steradian at minimum to 0.59 steradian at maximum or less, it is possible to realize smooth connection by morphing process of an original image. Furthermore, in the case where the solid angle of two images to be connected is less than a certain value it is sufficient to simply switch the original image within performing a morphing process.

The present invention can realistically display a city landscape in visual data. As a result, original images of the ground used for three dimensional visual data must be obtained. The inventors of the present invention have considered that realistically expressing ground level city landscape three dimensional visual data means reproducing landscapes at human sight line, and have reached an idea of a method and a system for photographing city landscapes at various places at human sight line in advance and generating three dimensional visual data using a method similar to photographing landscapes from the air. Human sight line at ground level means a person moving along roads or passageways and moreover the location of a human eye is restricted to a ground level of 1.5-2.0 m, the degree of freedom of view point is therefore exceptionally small compared to landscapes from the air.

The inventors of the present invention have reached an idea of a digital camera group, for installing in a vehicle, which is formed by a plurality of digital cameras, which is similar to that installed in an aircraft. That is, forming a digital camera group using a camera which photographs in 8 or 12 directions in a circle in a horizontal direction and a camera which photographs in an oblique upper direction which is angle added with an angle of elevation from horizontal, arranging on the roof of a vehicle, moving the vehicle along roads determined in advance by a car navigation system, issuing photograph commands to all the cameras which form the digital camera group at intervals from 1 m to 10 m based on a detailed location measurement result using GPS and IMS, and recoding the results together with location data. In this way, a method has been reached of generating three dimensional visual data of roads and passageways of arbitrary places at an arbitrary eye sight direction at human sight line with respect to arbitrary city places after a road image database is constructed. This method is formed from a process for selecting the most suitable original image and a process for generating smooth visual data by a morphing process using the movement state of a view point and the eye sight direction and location within in a city. Furthermore, the morphing process may be omitted and the original images may simply be switched.

However, unlike from the air, where it is possible to placing a view point on a completely free space and to freely specify an eye sight direction, a place on which a view point can exist on a road or passageway is limited to a road or passageway. Furthermore, since the method related to one embodiment of the present invention is a method which generates three dimensional models related to buildings in city spaces and generates three dimensional visual data, it is necessary to select an object for mapping to a terrain and to make a model in similar way where images taken of roads and passageways in the case of aerial photographs are mapped. As a model which matches this goal, walls consising of mainly planes which do not have thickness and are placed vertically along boundary lines of roads or passageways and boundary lines of other urban areas are formed, and such walls are used as projection planes of original images while considering a city structure as an expression of a city space at human sight line.

While expressing mathematically such projection planes along roads or passageways is similar positioning to using DEM in an aerial photograph as a ground surface model, roads or passageways have a graph structure and are modeled using a graph expression. Furthermore, walls or projection planes which exist on boundary lines of roads or passageways, and furthermore roads or passageways, refract, split, interest, come together, begin and end. The inventors of the present invention have reached an idea of to express a method, which is suitable for the aim of projecting original images, of expressing mathematically roads or passageways as a graph expression. As a result, the inventors have been successful in realistically expressing arbitrary urban landscapes from a human sight line of arbitrary locations of roads or passageways using morphing from already photographed original images.

In this way, in the city landscape three dimensional visual data generation and browsing system related to the present invention, not only is it possible to arbitrary fly through the air and view arbitrary places at an arbitrary sight line but also obtain urban three dimensional visual data from arbitrary roads or passageways at an arbitrary human sight line. As a result, it has been made possible to arrange a simulated cockpit for simulated flight through the air via a graphic user interface, and freely operate and specify direction elevation and speed, and it is possible to display three dimensional visual data by switching to a simulated camera and freely changing the angle of direction, tilt angle and amount of zoom of the camera. It is possible to freely change a location by going forwards or backwards, turn left or turn right at human sight line on roads or passageways via a graphic user interface, and also express a field of view in any direction with three dimensional visual data by changing the direction of the sight line. Furthermore, a feature of the city landscape three dimensional visual data generation and browsing system of the present invention is being able to freely fall to the ground from the sky, walk along roads or passageways, lift into the sky from the ground and freely fly through the air. As a result, operability and realism are increased by introducing a landing graphic user interface which specifies a ground landing point from an aerial simulated field of view, or reversely a graphic user interface for rising up into the air from the ground.

FIG. 1 is a diagram which conceptually shows the entire structure of a browsing system in which a city landscape three dimensional visual data generation method of the present embodiment is used. The browsing system in which the city landscape three dimensional visual data generation method is divided into a section 80 for generating three dimensional visual data in the case where the view point is in the air, and a section 90 for generating three dimensional visual data in the case where the view point is on the roads. As described below, the section 80 and section 90 carry out the same technical concept: displaying is executed by a method in which images with solid angle having a steradian of 0.004 or more and 0.59 or less with respect to an arbitrary city place (below referred to as "original images") are prepared in advance as an image database, original images, which have close view points and eye sights are extracted from the image database according to time changes between a specified view point route and specified eye sight direction, and the original images are smoothly connected by performing image morphing corresponding to the view point route and the eye sight without generating a city three dimensional numerical model and without performing a texture mapping process to surfaces of buildings or the ground. Furthermore, a graphic user interface system 180 common to both section 80 and section 90 is used to provide services to user 191 via the internet 190.

Furthermore, it is not necessary to employ both the section 80 and section 90 in the system related to the present invention. Only the section 80 or only the section 90 may be employed in the system related to the present invention.

The section 80 for generating three dimensional visual data in the case where a view point is in the air is comprised of an image acquisition system for acquiring aerial photographs in the air by an aircraft (below referred to as aerial image acquisition system 100), an aerial image database generation registration system 120 for processing so that the acquired aerial images can easily be used in three dimensional visual data generation and made into a database, an aerial image database 140, and an aerial three dimensional visual data generation system 180 which generates three dimensional visual data based on a request by user 191 which makes a request via the graphic user interface 180.

The section 90 for generating three dimensional visual data in the case where a view point is in on the ground is comprised of an image acquisition system for acquiring photographs on the ground by a vehicle etc. (below referred to as a ground image acquisition system 110), an ground image database generation registration system 130 for processing so that the acquired ground images can easily be used in three dimensional visual data generation and made into a database, an road dimensional database 150 which are made into a database, and a road dimensional visual data generation system 170 which generates three dimensional visual data based on a request by user 191 which makes a request via the graphic user interface 180.

The graphical user interface system 180, which is common to both the aerial image acquisition system 100 and the road dimensional image acquisition system 110 includes also a function for switching between a field of view generation in the case where a view point is in the air and a field of view generation in the case where a view point is on the road based on a request of user 191. Below, after explaining the basic principles of three dimensional visual data generation, which is related to the present invention, each system which forms the city landscape three dimensional visual data generation and browsing system of the present invention is explained in detail.

Figure 2:
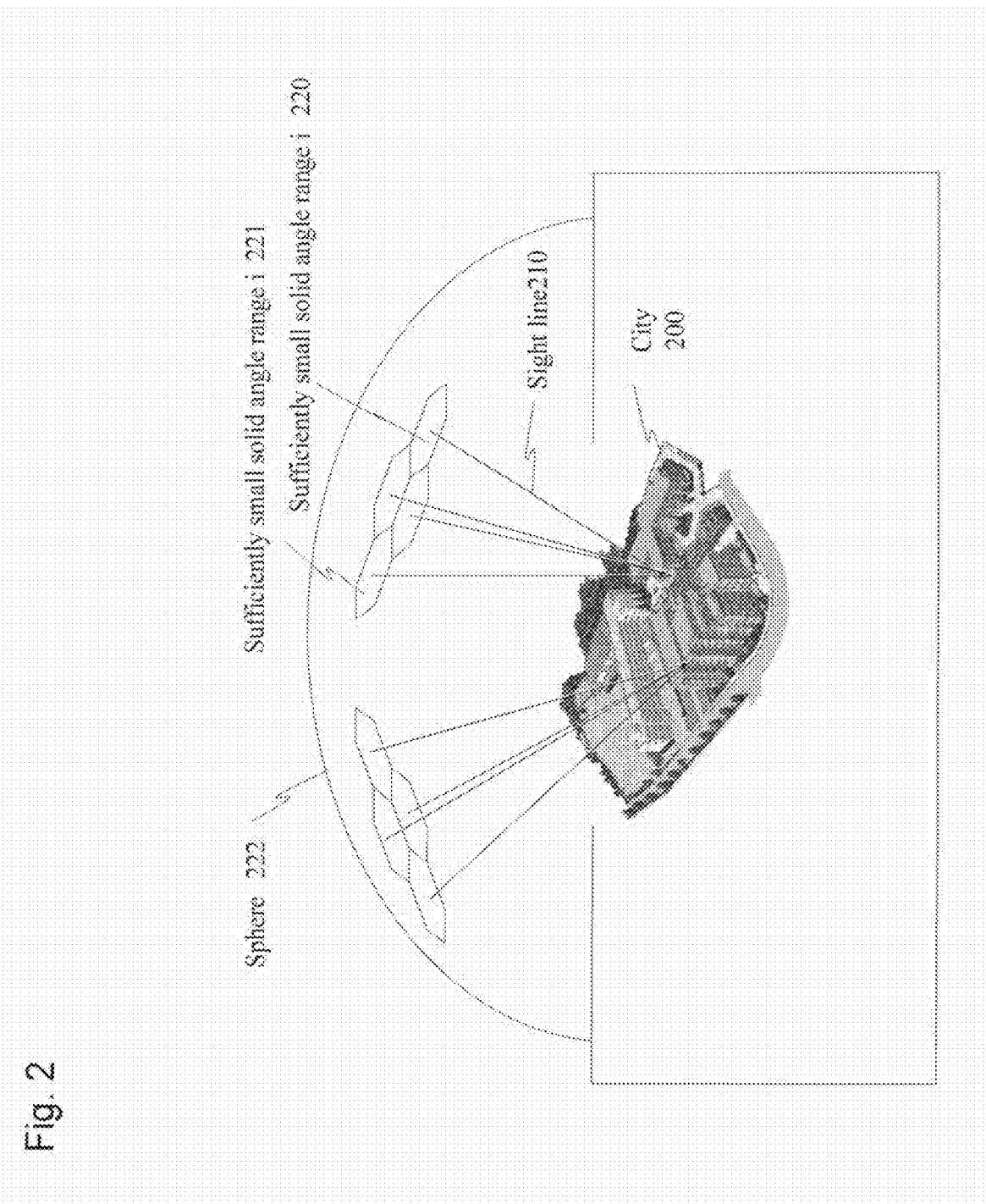
FIG. 2 is a diagram which shows an aerial image acquisition concept in the city landscape three dimensional visual data generation and browsing system shown in FIG. 1.

FIG. 2 is a diagram which shows the concept of aerial image acquisition in a city landscape three dimensional visual data generation and browsing system. The largest and common technical feature of the present invention is that firstly, it is not necessary to generated a three dimensional model of a city in city landscape three dimensional visual data generation, and secondly it is not necessary to map an exterior wall surface pattern or exterior wall surface photograph as texture to the generated three dimensional model. Instead of removing model generation and texture mapping procedure, which requires manpower and costs, it is possible to acquire in advance images from various directions for various locations in a city landscape, and to use the images by selecting and transforming images to necessity. However, this method requires taking a very large amount of images in advance, and also quickly searching for the most suitable images already taken and it has only been since the progress of digital camera and improvements in large capacity and low cost, processing and transmission capability of each type of memory in recent years that the conditions for carrying out a new method related to the present invention has come about.

In FIG. 2, an aerial sphere 222 of a city 200 is divided by circular cones or hexagonal columns with semi-apex angles from 2 degrees to 40 degrees as shown by a sufficiently small solid angle range i221 or solid angle range i220. This solid angle is calculated by $2\pi(1-\cos\theta)$ with respect to a semi-apex angle $\theta$, a sphere 222 except the vicinity of the ground surface is divided within ranges from 0.04 steradian at minimum to 0.49 at maximum, and the concept of the aerial image acquisition system for preparing images of various places on the ground surface for each solid angle is shown in the diagram.

Figure 3:
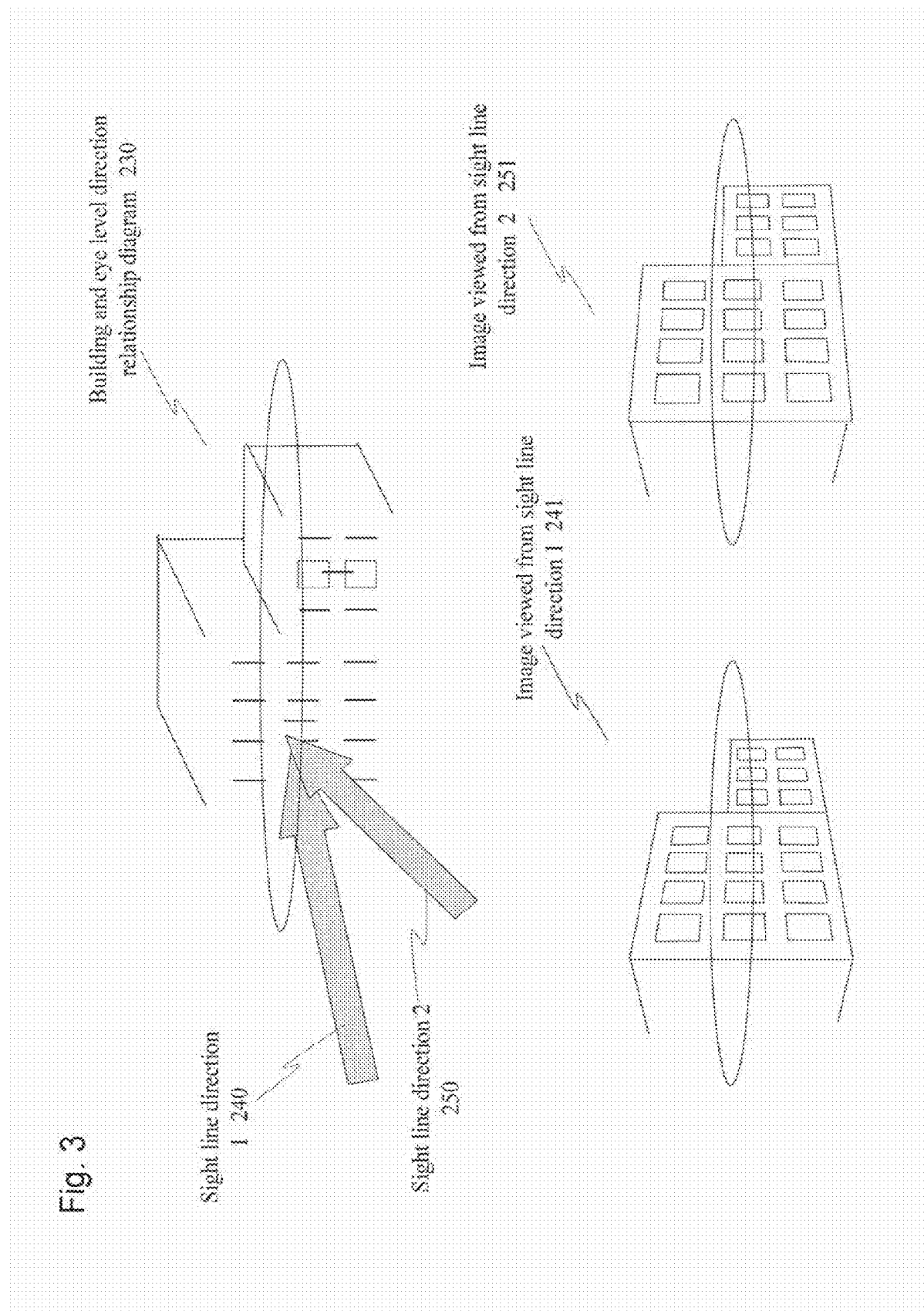
FIG. 3 is a conceptual diagram of morphing in a three dimensional image.

FIG. 3 shows a case where the same technical method as FIG. 2 is applied to three dimensional visual data generation in the case where a view point in on the ground and shows a concept of morphing images with respect to the same geographical point photographed within the adjacent sufficiently small solid angle range i221, which appears slightly different due to a disparity in FIG. 2, are compensated for by consecutive modifications with linear conversion, morphing process being for obtaining smooth three dimensional visual data. The fields of view when the building shown in the diagram 230 of the relation of the building and the sight direction is viewed from sight line direction 240 and sight line direction 250, the parallax of which is fairly small, are shown by image 241 of sight line direction 1 and image 251 of sight line 2. An angle which forms the sight line direction 1240 and sight line direction 2250 shows a solid angle of a semi-peak angle of 20 degrees. In the case where this angle is smaller than a value of 1.47 steradian or less, or in the case where the object is a planar, then it is possible to mutually approximate an image by a morphing process using linear conversion. Executing the morphing process in a compensation process of actual images with adjacent view points is one feature of the present invention. Furthermore, images can be switched without performing a morphing process and this is also a feature of the present invention.

Figure 4:
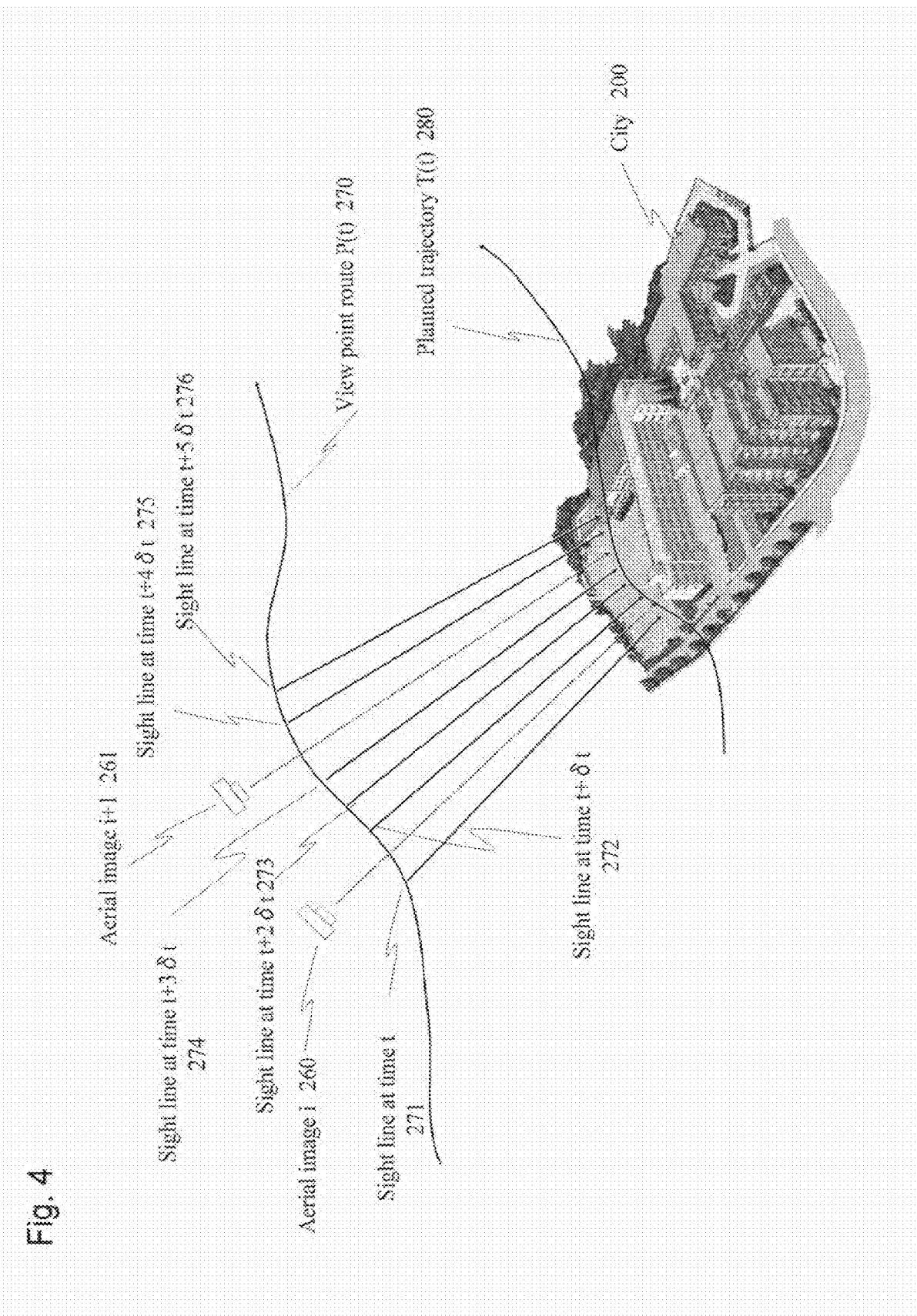
FIG. 4 is a diagram for explaining the concept of image generation by morphing using an actual image in the city landscape three dimensional visual data generation and browsing system of the present invention.

FIG. 4 is a diagram for explaining the concept of simulated field of view generation via simulated flights in the city landscape three dimensional visual data generation and browsing system of the present invention. View points along a view point route P(t) 270 move in order together with an elapse of time periods t, and during this time, the ground surface is taken in a field of view along a target trajectory T(t) 280. The target trajectory T(t) 280 is a trajectory of the ground surface taken for each δt by sight line 271 of time t, sight line 272 of time t+δt, sight line 273 of time t+2δt, sight line 274 of time t+3δt, sight line 275 of time t+4δt and sight line 276 of time t+5δt from the location on the view point route P(t) 270. In the present invention, as a method for generating city landscape three dimensional visual data with respect to the target trajectory T(t) 280 from the view point route P(t) 270, a city landscape three dimensional visual data is generated along a smooth target trajectory T(t) 280 so that an aerial image i 260 and aerial image i+1 261 which have small disparities close to sight line 271 of time t to sight line 276 of time t+5δt are searched using the aerial image database 143, a disparity due to a difference in view points between sight line 271 of time t, sight line 272 of time t+δt, and sight line 273 of time t+2δt, and the sight line of the aerial image i+1 261 is compensated by a morphing process on the aerial image i 260 using the aerial image i 260 which has the closet sight line among sight line 271 of time t, sight line 272 of time t+δt, and sight line 273 of time t+2δt, as an original image, if it is judged that a disparity due to a difference in view points is smaller for the aerial image i+1 261 than the aerial image i 260 from sight line 274 of time t+3δt, the aerial image i+1 261 is switched to the original image, and a morphing process is performed to the aerial image i+1 261 in order to compensate a disparity due to a difference in view points between sight line 274 of time t+3δt, sight line 275 of time t+4δt, and sight line 276 of time t+5δt. Furthermore, the aerial image i 260 and the aerial image i+1 261 may be simply be switched without performing the morphing process.

Figure 5:
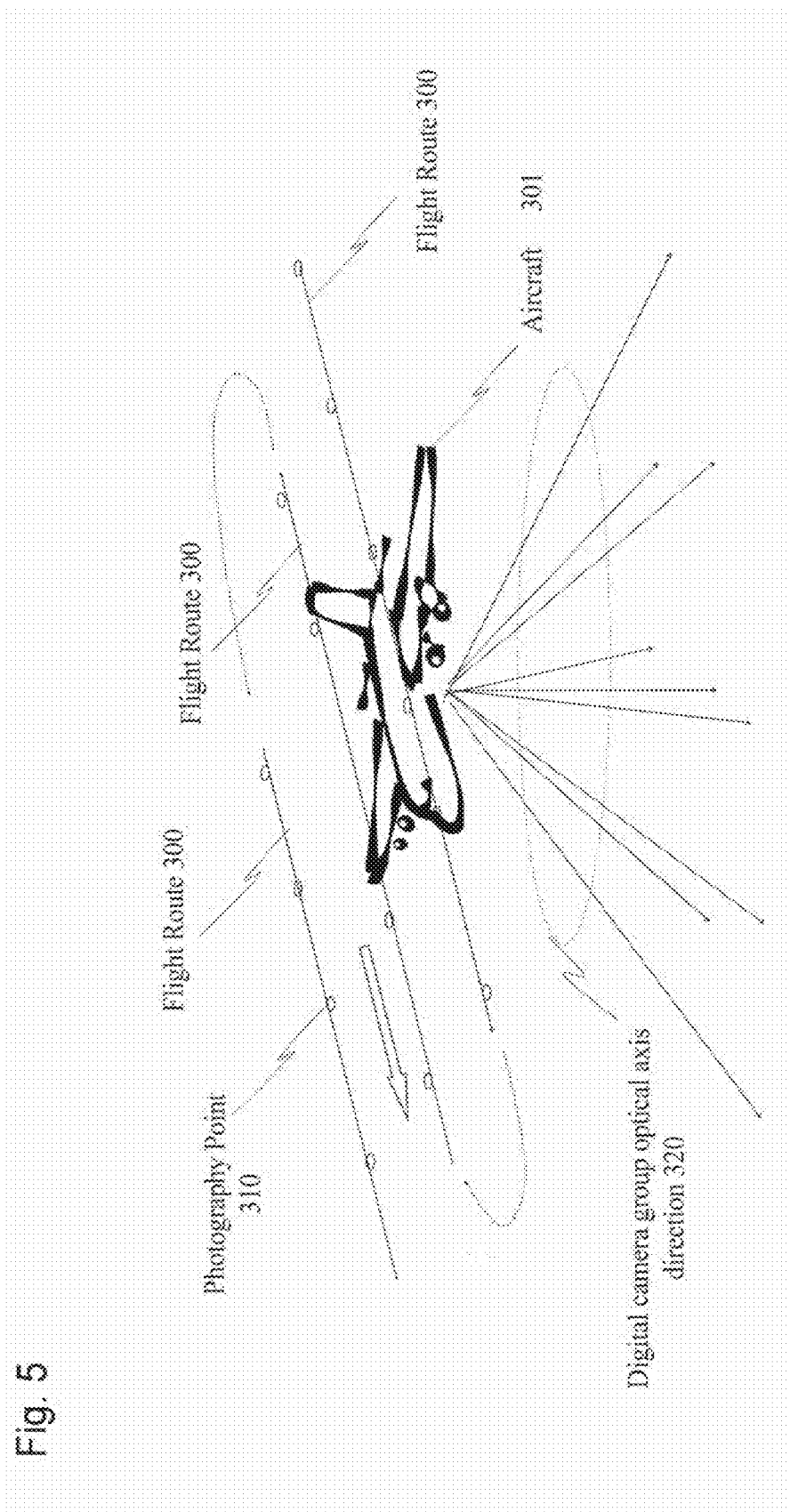
FIG. 5 is a diagram for explaining an operational example of aerial image acquisition by an aircraft in the present invention.
Figure 7:
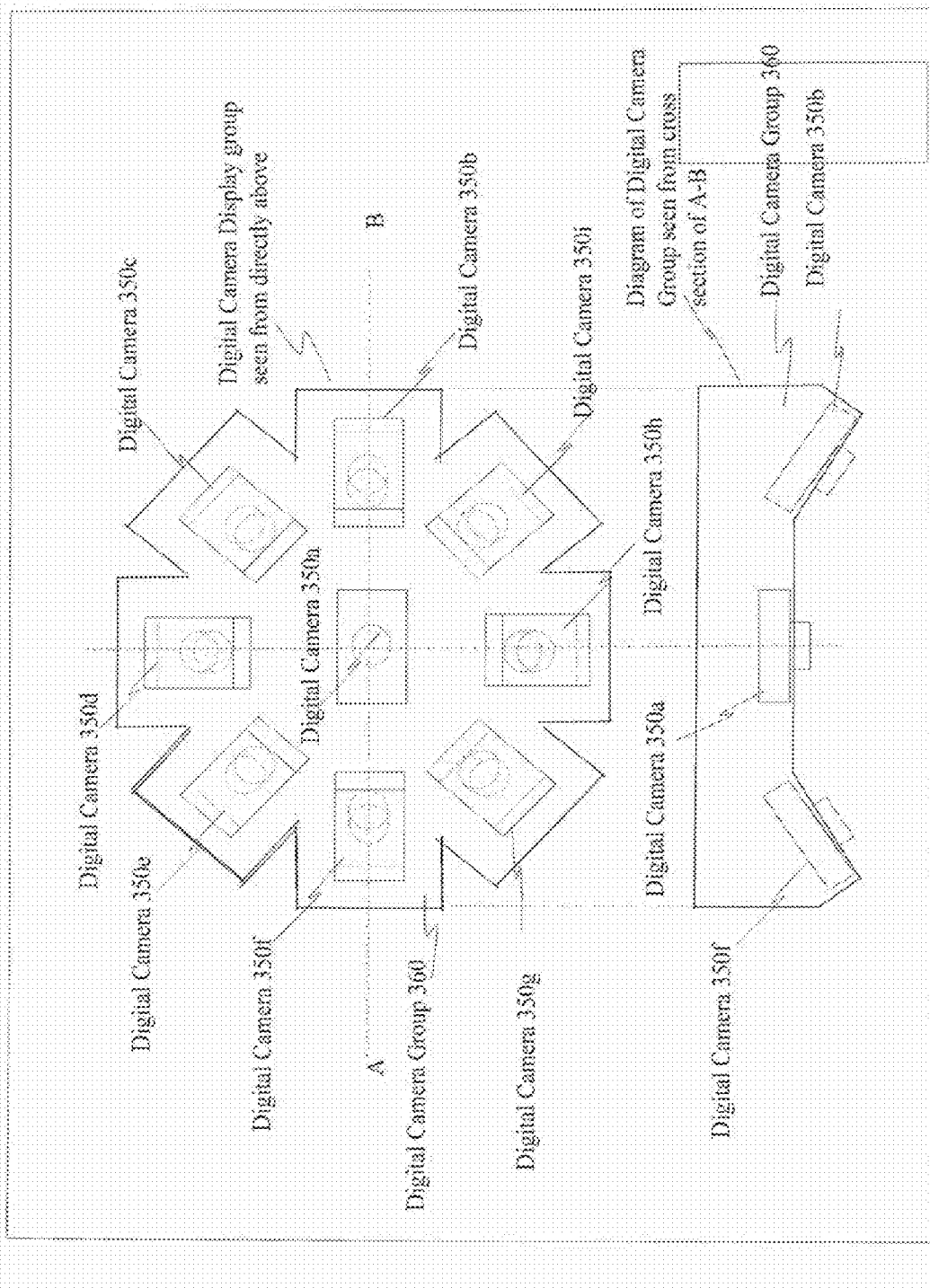
FIG. 7 is a diagram for explaining an example of a group of digital cameras installed in an aircraft of the present invention.

FIG. 5 shows an example of an aerial image acquisition method related to the present invention. A digital camera group which houses multiple digital cameras as shown in FIG. 7 is installed in an aircraft 301, and the ground surface is photographed at photographic points 310 at each fixed interval along a flight path 300. By densely setting the flight path 300 and photographic points 310 in a mesh shape and simultaneously photographing images in multiple directions as is shown in an optical axis direction 320 of a digital camera group housing a plurality of digital cameras, images for each range i 221 of the sufficiently small solid angle shown in FIG. 2 are obtained.

Figure 6:
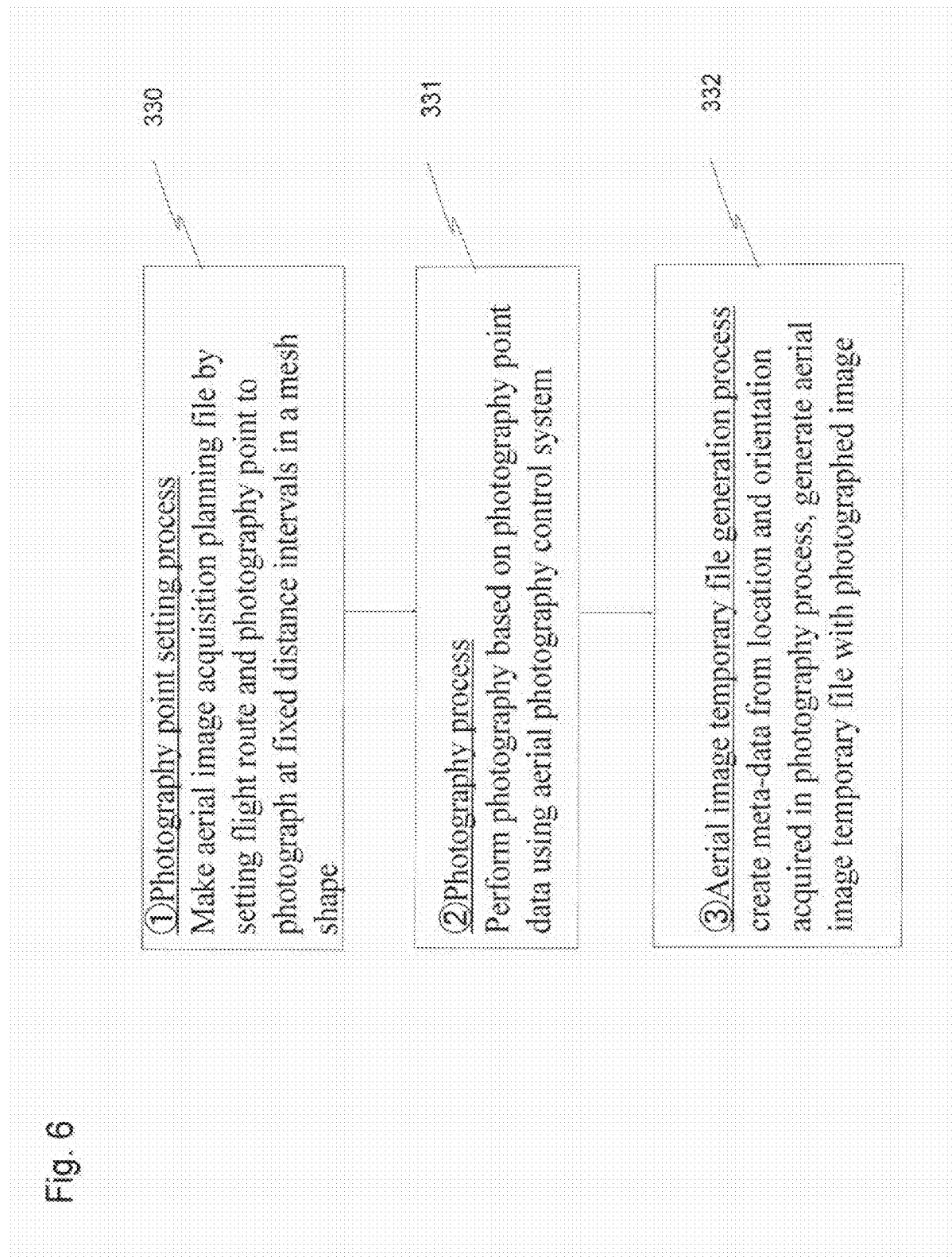
FIG. 6 is a diagram for explaining a process flow of an aerial image acquisition system of the present invention.
Figure 11:
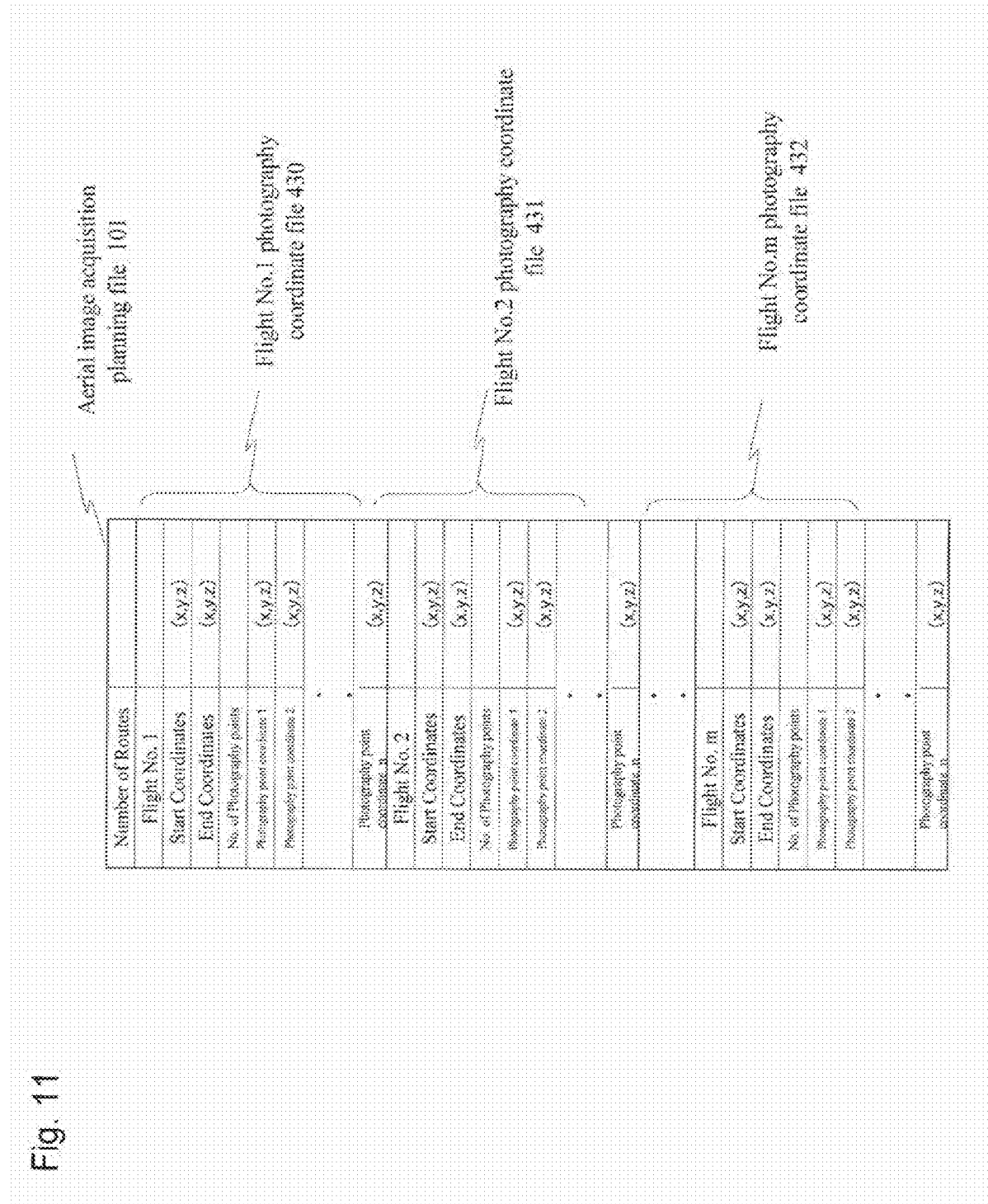
FIG. 11 is a diagram which shows an example structure of an aerial image acquisition planning file of the present invention.
Figure 15:
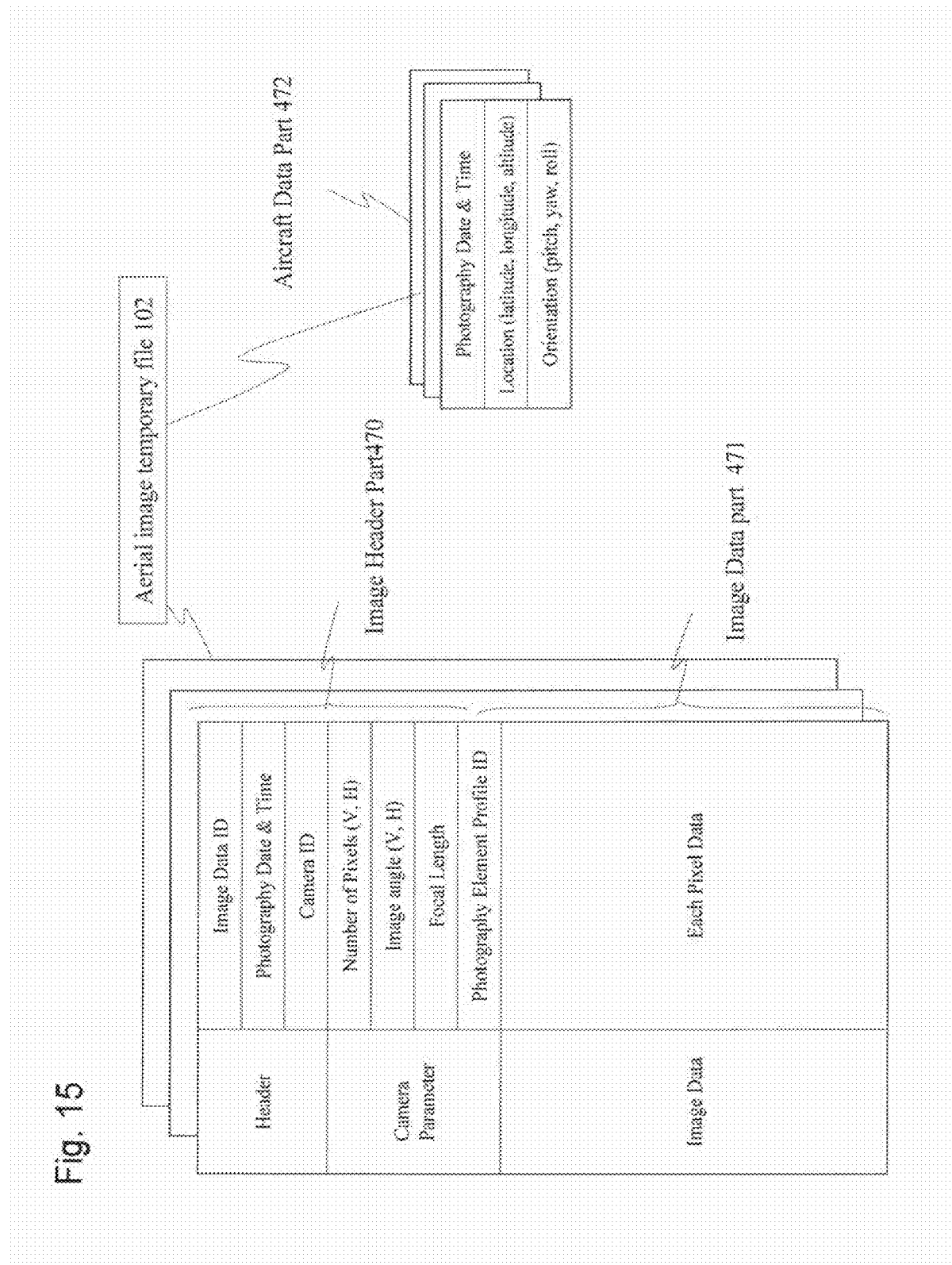
FIG. 15 is a diagram which shows the structure of a primary aerial image file of the present invention.

FIG. 6 describes a process flow of the aerial image acquisition system 100, and a detailed realization method of the aerial image acquisition system 100 is described with references up to FIG. 15. First, a flight path and photographic points are set in order to photograph aerial images in a mesh shape at fixed distance and interval using photographic point setting process 330. In this photographic plan, the flight path and photographic points are defined by for example an aerial image acquisition plan file 101 the structure of which is shown in FIG. 11. Next, in the photographic process 331, photographing is performed by an aerial photography control system 393 shown in FIG. 9 when it is judged that the aircraft 301 has reached a photographic point 310 stipulated by the aerial image acquisition plan file 101. Photographed images within the digital camera are accumulated in a primary aerial image file 102 together with meta data which includes the photographic locations and orientation data of the digital cameras acquired by the photographic process for each timing determined in advance by the aerial photography control system 393.

FIG. 7 is a diagram which shows an example structure of a digital camera group 360 which forms the aerial image acquisition system 100 of the present invention. Eight oblique direction digital cameras from 350b to 350i are arranged to form the digital camera group 360 on the periphery of a digital camera 350a in a directly down direction so that a horizontal disc direction is divided radially into equal intervals and so that an optical axis is an angle which forms a gravity direction with the aim of efficiently photographing the ground surface from various view points. In particular, it is necessary to obtain an airworthiness certificate in the case of installing a camera group in an aircraft and photographing, and it is difficult to obtain official permission to change a hole which is opened in the floor of an aircraft for aerial photography or use the cameras by projecting them outside the aircraft from the hole in the floor. As a result, a effort has been made to house the digital camera group within the aircraft floor hole using a small scale digital camera such as a Canon PowerShot for the digital camera group 360. Because a high level of photographic directional accuracy is demanded, any support structure other than the digital cameras 350a~i which form the digital camera group 360 can be used as long as it is light and rigid such as a honeycomb structure aluminum plate or carbon resin.

Figure 8:
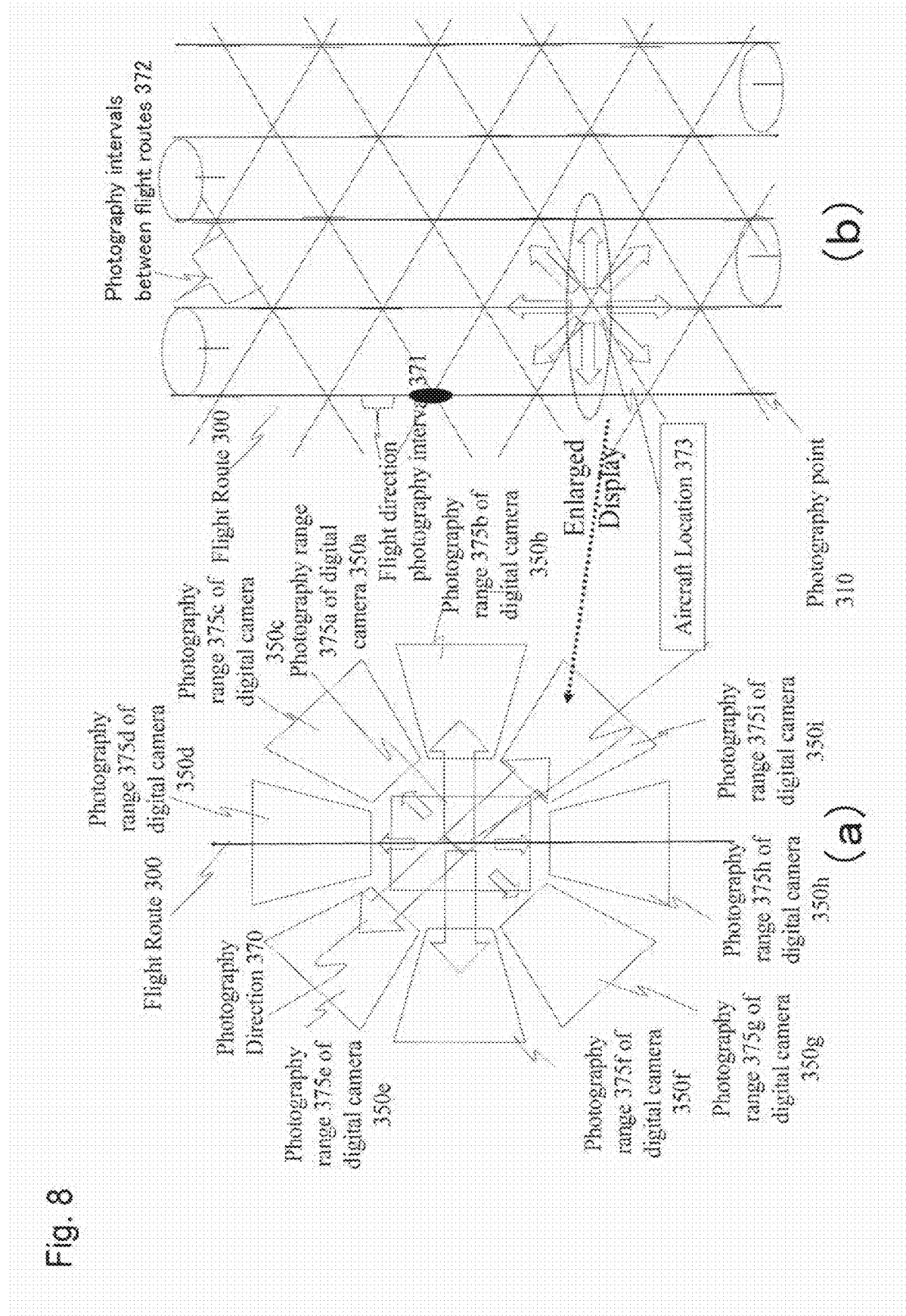
FIG. 8 is a diagram which shows a setting example of a course and photography points in the aerial image acquisition system by an aircraft of the present invention.

FIG. 8 shows an example setting of a flight path and photographic points of an aerial image acquisition system by an aircraft. FIG. 8 (b) shows an example setting of photographic points 310. Flight is made with u-turns and returnings as shown in FIG. 8 (b) with a dotted line at equal intervals in order to form a mesh of photographic point 310. During this time, photographs are taken at photographic points 310. The mutual intervals between photographic points 310 are stipulated by a flight path photographic interval 372 and a flight path photographic interval 371. When the flight altitude is set at about 800 m, the flight path photographic interval 372 and the flight path photographic interval 371 are preferably set at about 80 m or less in order to obtain at least one image within the range i 221 of the sufficiently small solid angle in FIG. 2. The range shown by the photographic range 375a~i of the digital cameras 375a~i is photographed in the case of photographing using the digital camera group 360. Furthermore, the flight altitude is not limited to 800 m. It is possible to set the flight altitude range from 200 m or more to 2500 m or less. When the flight altitude is lower than 200 m, the amount of photographed images and the amount of processing increase significantly. In addition, when the flight altitude is higher than 2500 m, it becomes difficult to obtain detailed images of the ground surface.

The range photographed by each digital camera of the photographic ranges 375a~i of the digital cameras 350a~i and mutual multiplicity change according to setting of the flight altitude, the angle which forms the vertical direction of the oblique direction digital cameras 350b~i, and the focal length of a lens. With the aim of the present invention, it is desirable to set the cameras slight mutually overlapping so that the ground surface is almost consecutively covered. Furthermore, the direction of the digital camera 350a which photographs in a directly down direction with respect to the flight path 300 is drawn with a horizontal direction of an image frame in FIG. 8(a) to a forward direction of the flight path 300. However, the direction is not limited to this, and the direction of the digital camera 350a which photographs in a directly down direction with respect to the flight path 300 may be set with a vertical direction of an image frame in FIG. 8(a) to a forward direction of the flight path 300.

Figure 9:
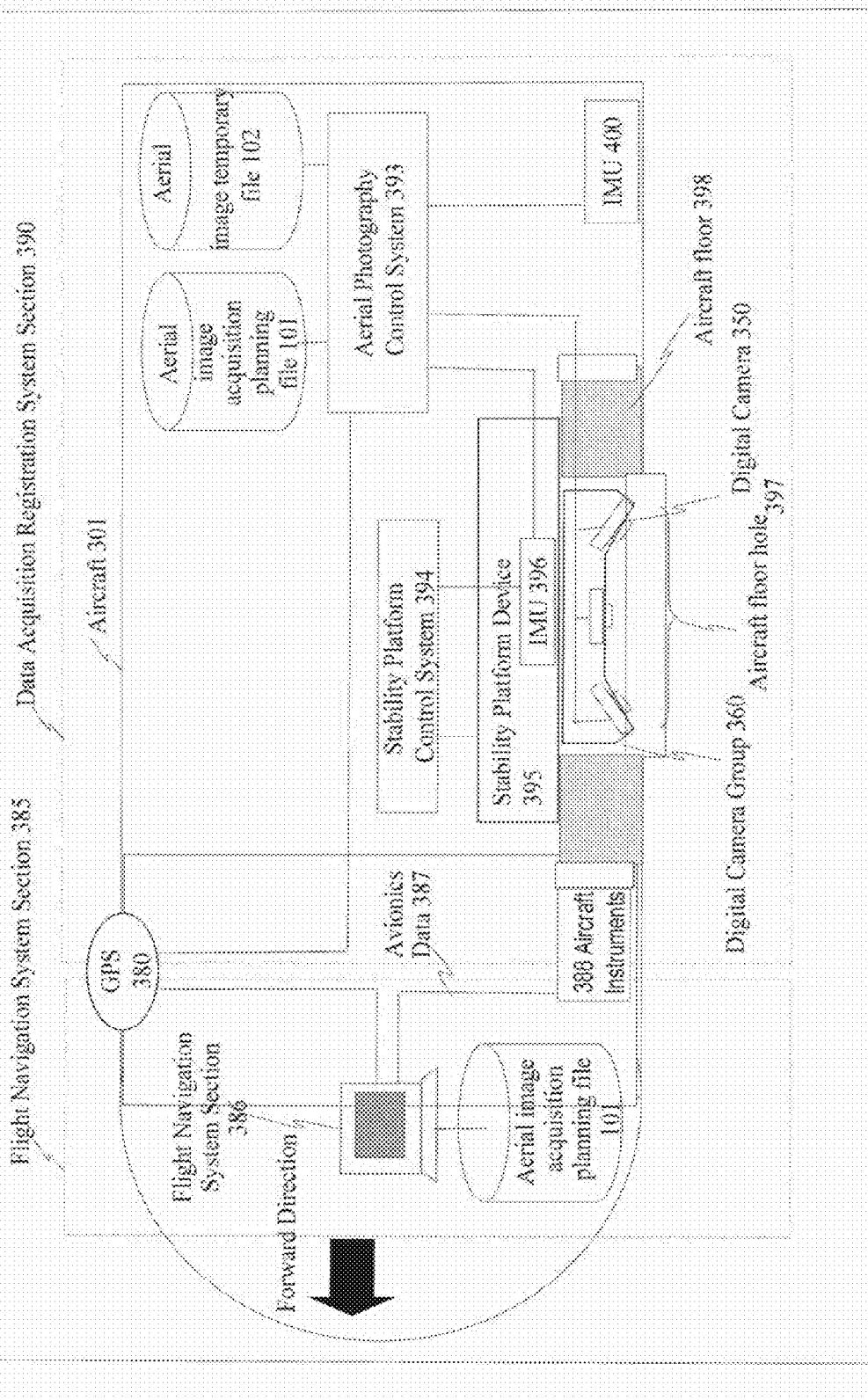
FIG. 9 is a diagram which shows a structural example of the aerial image acquisition system of the present invention.

FIG. 9 is a diagram which shows an example of structure of an aerial image acquisition system. The aerial image acquisition system is comprised with a flight navigation system section 385 and a data acquisition registration system section 390. The flight navigation system section 385 is a device for navigating the aircraft 301 to a photographic points 310 stipulated in FIG. 8(b), which is located along the flight path 300, aircraft location data is cyclically obtained by GPS 380, and avionic data 387 such as orientation, altitude and speed of the aircraft is obtained by an aircraft instrument 388. Because these signal interfaces are standardized as aircraft bus signals, there is not novelty. It is possible to calculate data related to the orientation of each digital camera from the orientation of the aircraft, relative location and pointing direction of each digital camera with respect to the aircraft.

Figure 10:
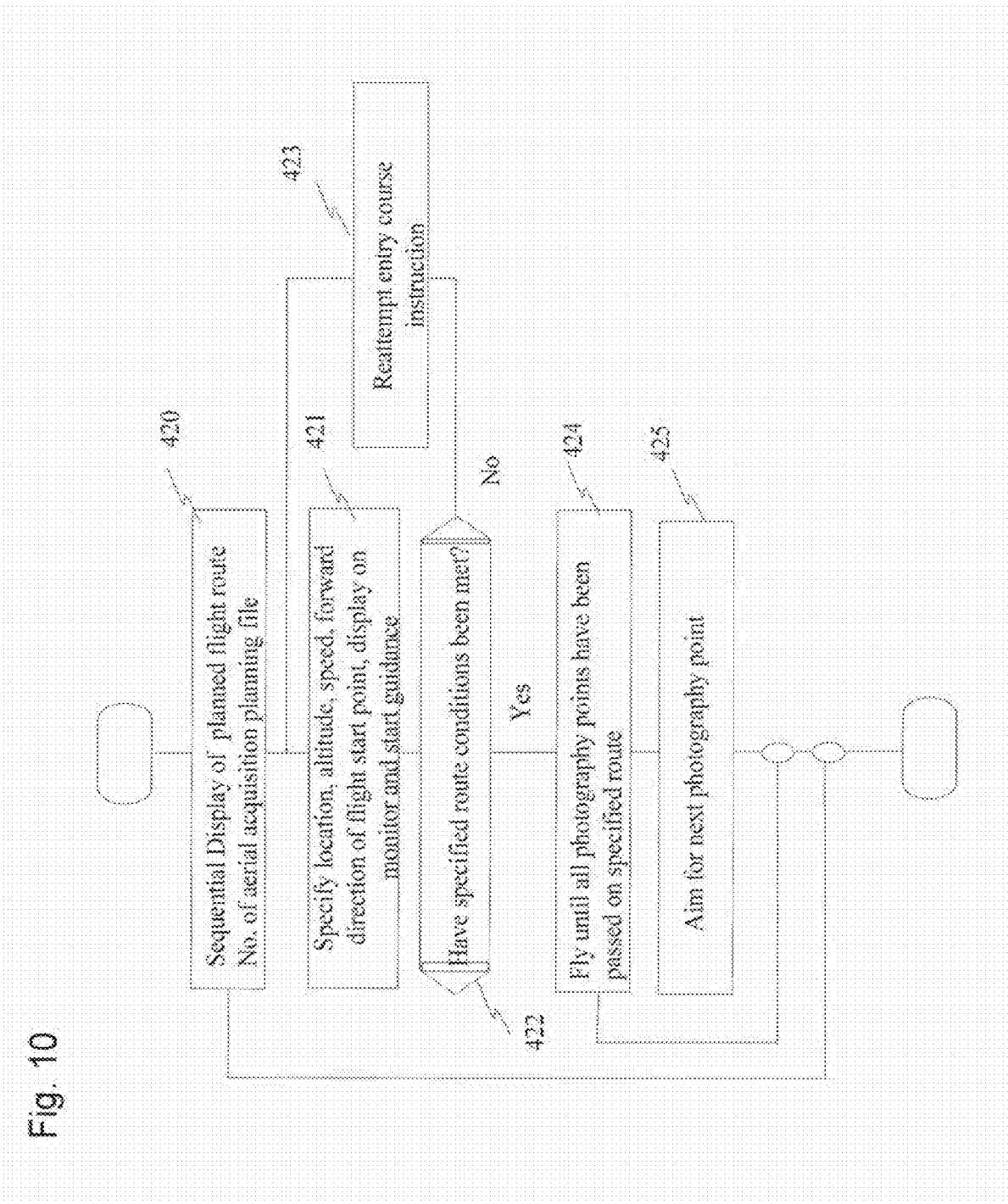
FIG. 10 is a diagram which shows a process flow of a flight navigation system part of the aerial installed image acquisition system of the preset invention.
Figure 12:
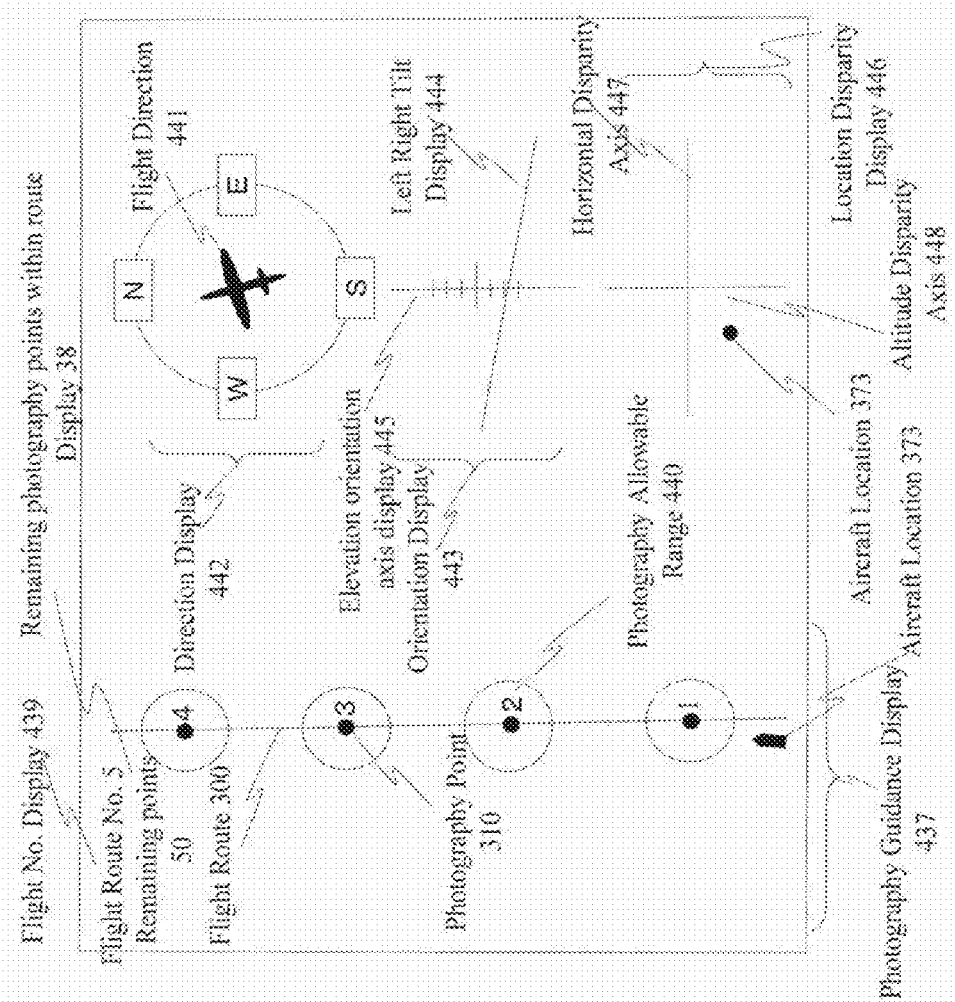
FIG. 12 is a diagram which shows an example of a display screen of a flight navigation system section of the aerial image acquisition system of the present invention.

A function of the flight navigation system section 385 is to guide the pilot by a display screen example of the flight navigation system section of the aerial image acquisition system shown in FIG. 12 by a process of the flight navigation system section of the aerial image acquisition system in FIG. 10 according to an aerial image acquisition planning file 101 in FIG. 11. While the flight navigation system itself may not have novelty, the part for efficiently guiding an aircraft to photographic points 310 in order to achieve the goal of the present invention is a part related to the present invention. First, aerial images of which part of a city which are to be acquired is determined before flying. The photographic range is determined on a map, and a flight plan is decided. The flight plan is performed by setting flight route 300 on an aerial map.

Photographic points 310 may be set at altitude range of 200 m or more to 2500 m or less or more preferably, 500 m or more to 2000 m or less from the ground in a mesh shape in order to achieve the goal of the present invention. The flight route 300 is set to be parallel based on the result of this setting. The flight path No. shown in the aerial image acquisition planning system 101 in FIG. 11 is allocated to each straight line section, photographic points 310 are allocated to each flight path so as to form an entire mesh, and the starting and finishing coordinates of each flight path and the number of photographic points and the coordinates of each photographic point are set by latitude, longitude and altitude. In this way, the aerial image acquisition planning system 101 in FIG. 11 is constructed. A graphic user interface related to the construction of the aerial image acquisition planning system 101 can be realized as a map data system.

A function of the flight navigation system section 385 is shown by a process flow of the flight navigation system section of the aerial image acquisition system described in FIG. 10. A planned flight path No. is displayed in order as in FIG. 12 until all photography is completed from the flight path registered in the aerial image acquisition planning file 101 by process block 420. Since the specified flight path No. includes a starting coordinate, the location, altitude, forward direction and speed of the flight path starting point are specified in order to start this flight path No. by process block 421 and the contents of FIG. 12 are displayed on a monitor and guidance begins. In order to perform photography, it is desirable that conditions stipulated by process block 421 satisfy a fixed error range, for example, a location error with an accuracy from 10 m to 30 m or less, or a flight direction error with an accuracy of 5 degrees of less. In the case where such conditions are not satisfied, the flight path may be performed again. When performing a flight path again, the guidance of block of 421 is performed again by block 423. In the case where the conditions of block 422 are satisfied, each photographic point from the photographic point coordinates described in the serial image acquisition planning file of the flight path No. selected by the process block 420 to the final photographic point coordinates, are guided in order by the process block 424 and the process block 425. A display screen example of the flight navigation system of the aerial image acquisition system is shown in FIG. 12.

The photographic guidance display 437 and location deviation display 446 shown in FIG. 12 are used in order to guide the aircraft 301 to the starting point of a flight path No. specified by the block 420. It is possible to know a deviation from the flight route 300 of the aircraft location 373, and any deviation is removed by operating the aircraft. Data related to the location of an aircraft is obtained by GPS 380 and altitude, forward direction, speed and pitch yaw roll as orientation data are obtained from flight instrument 388 as avionic data 387 and used in the display of FIG. 12. A flight path during flight is displayed by a flight path No. display 439, and the number of photographic points to be photographed is displayed on the photographic guidance display 437. Since a photographic point No. and a photographic allowable range 440 are displayed along the flight route 300 in the photographic guidance display 437, a pilot operates the aircraft so as to pass through the photographic allowable range 440 with respect to each photographic point. By scrolling the aircraft guidance display 437 from top to bottom according to the flight, and therefore, the relationship between the nearest photographic point, the flight route 300 to be taken and the aircraft location 373 is always displayed. The aircraft location display 373 is normally displayed on the lower left side of the screen. Furthermore, it is possible to use any of the aircraft instruments already publicly known as the direction display 442, orientation display 443 and location deviation display 446 in FIG. 12.

Next, the data acquisition registration section 30 is explained in detail referring to FIG. 9. In FIG. 9 an aircraft floor hole 397 for aerial camera devices is arranged on the lower side of the aircraft 301. It is preferred that the digital camera group 360 is set in this hole so that it does not stick out from the aircraft. In the example in FIG. 9, a structure which hangs down to the aircraft floor hole 397 is adopted using a stability platform device 395 which is described later. In this way, a stability platform control system 394 and the stability platform device 395 are oriented and the direction of the digital camera group 360 which is directly below towards the ground is fixed in a stipulated direction regardless of the orientation of the aircraft 301. Furthermore, the stability platform device 395 can be omitted if the pitch roll of the aircraft is normally maintained by operating within 5 degrees. By installing an inertial measurement unit IMU 396 on the stability platform device 395 it is possible to measure the orientation of the digital camera group 360. The upper surface of the digital camera group 360 may stick above the aircraft floor 398.

An IMU 400 which observes the orientation of the aircraft 301, an aerial photograph control system 393 which includes a program for controlling and the digital camera 350 and for photograph data processing, a primary aerial image file 102 formed by a memory device such as a large capacity disk which records various data including image data, and aerial image acquisition planning file 101 which records photography points for outputting photography commands to the digital cameras are installed in the data acquisition registration system section 390 within the aircraft. An antenna of the GPS 380 for measuring the location of the aircraft 301 is included in a place for allowing the outside of the aircraft to be viewed.

Figure 13:
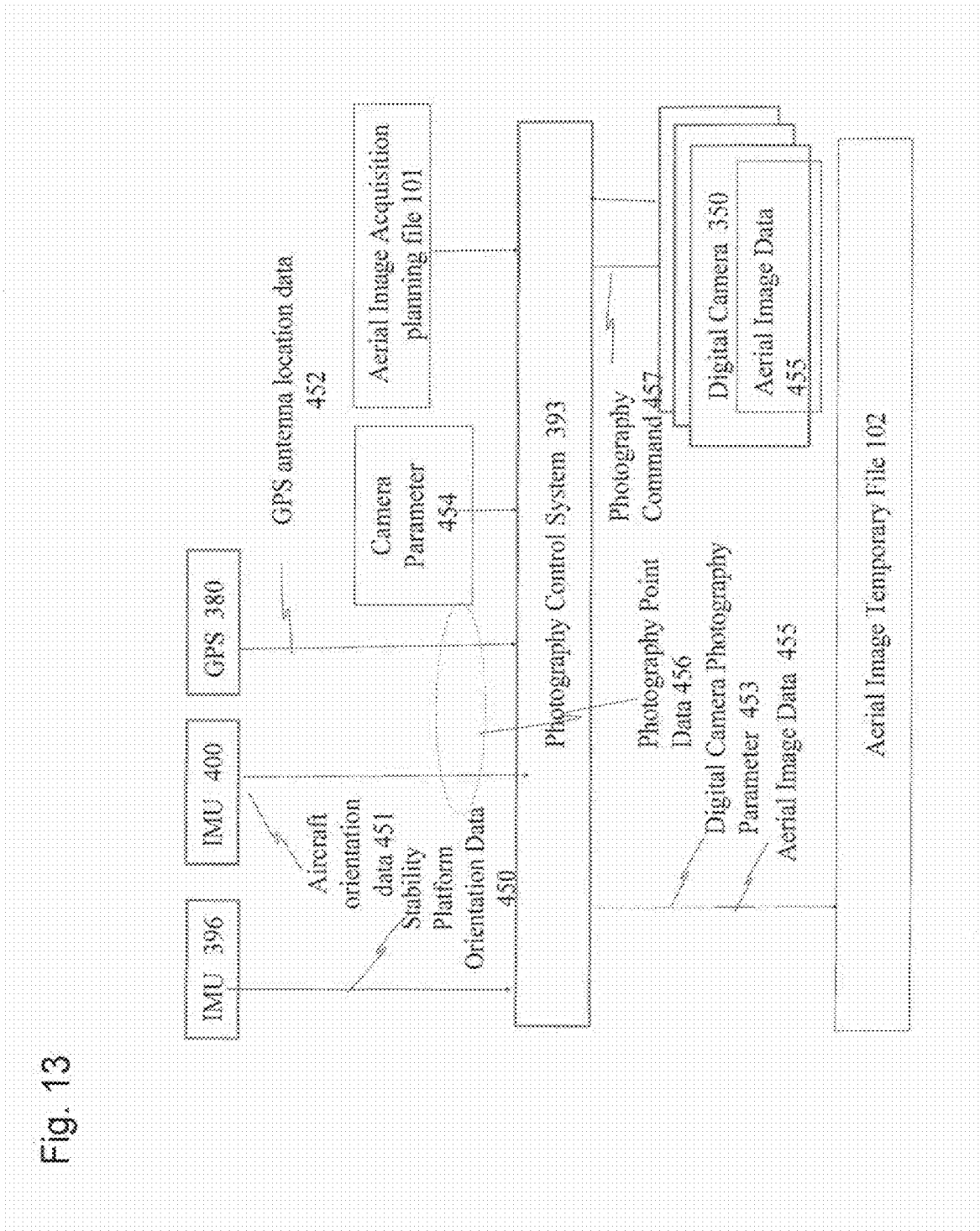
FIG. 13 is a diagram which shows a data flow of a data acquisition registration section of the aerial image acquisition system of the present invention.
Figure 14:
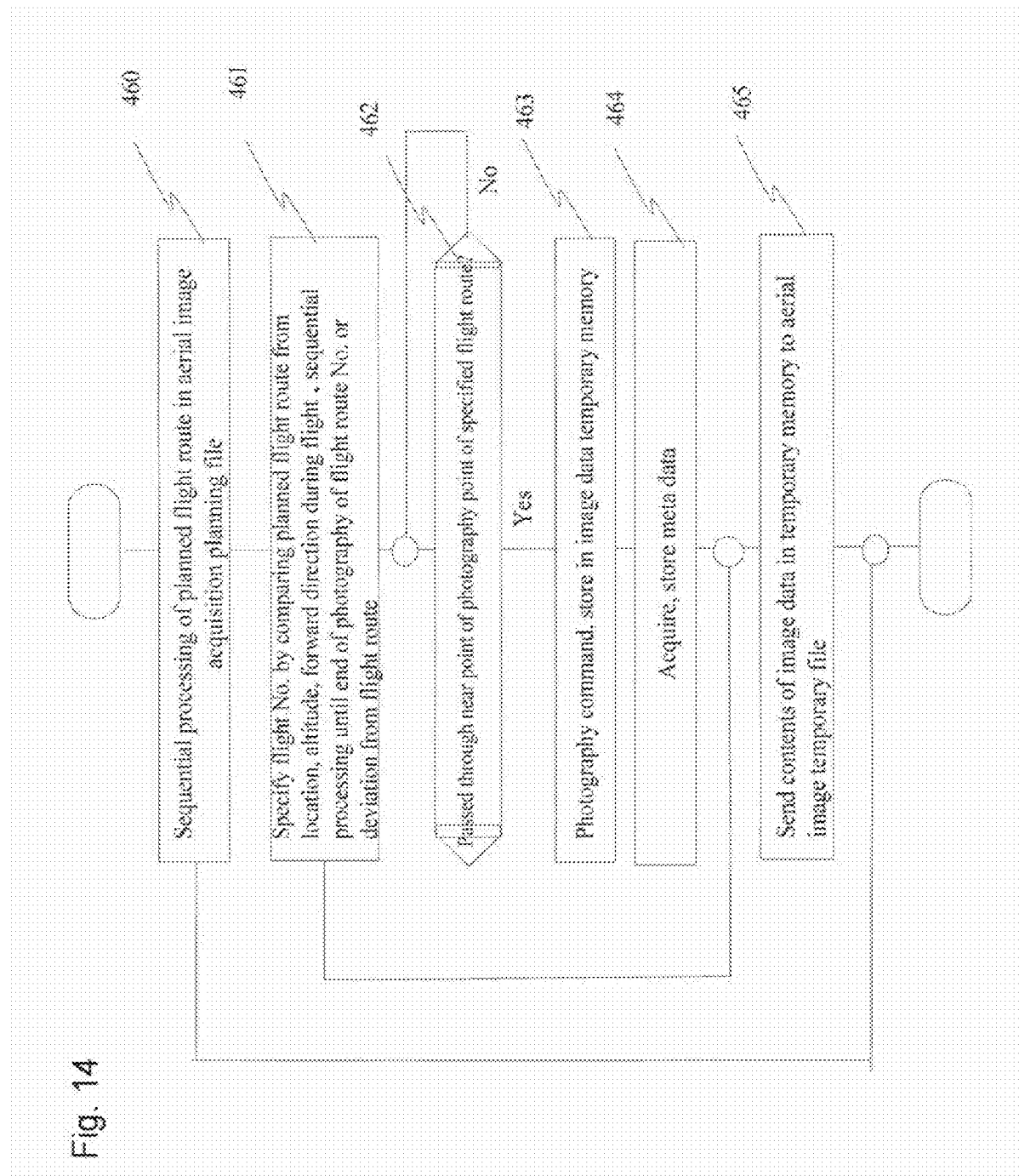
FIG. 14 is a diagram which shows a process flow of a photograph control system of the aerial image acquisition system of the present invention.

FIG. 13 shows the flow of data between devices in the data acquisition registration system section 390 in FIG. 9. FIG. 14 explains a process flow of the photography control system 393. The photography control system 393 is formed with use of a CPU. The photography control system 393 periodically imports orientation data of the stability platform device 395 from the IMU 396. When the stability platform 396 is operating normally, a fixed orientation is maintained with respect to an inertia space without relying on the orientation of the aircraft 301. The IMU 400 which is fixed to the aircraft 301 periodically imports orientation data of the aircraft 451 to the photography control system 393 and the GPS 380 periodically imports GPS antenna location data to the photography control system 393. The processes of the photography control system 393 are explained in detail in FIG. 14, and the contents of aerial image acquisition planning file 101, the obtained location data 452 of the GPS antenna and orientation data 451 of the aircraft are references in order by the process block 360 and block 461, a flight path No. is specified, a judgment is made whether the aircraft is passing through a near point of a photography point of the specified flight path by the process block 462 in order until the flight path is withdrawn or photography of this flight path No. is completed, and aircraft data section 472 within the aerial image one dimensional file shown in FIG. 15 is imported by the block 472 at the same time as when a photography command 457 is sent at the same time by the block 463 to each digital camera 350 which form he digital camera group at the nearest timing to a photographic point within the photography allowable range 440.

One digital camera 350 can hold 32 GB of internal memory at the time of the present invention. As a result, it is possible to store photographed image data 455 at least until one flight No. is completed. The aircraft 301 performs a u-turn while one flight path No. finishes and the next flight path No. begins, and because photography is not performed during this time, image data 455 within the digital camera 350 is either sent by the process block 465 to the primary aerial image file 102 formed by a memory device such as a large capacity disk device installed in an aircraft, or image data stored within the digital camera 350 is deleted by exchanging the memory.

An example of structure of the primary aerial image file 102 is described in FIG. 15, and an image header part 470 and image data part 471 are prepared for each image. A camera ID of a header part is a number for identifying each digital camera 350*a~i*, which form the digital camera group 360. The image data ID is an identification number so that images can be mutually identified, photography data and time corresponds to the aircraft data section 472, and are used for assessing the optical axis direction of each digital camera 350*a~i* in the aerial image database generation registration process 120. The image data part 471 does not perform any particular process at this stage. In addition, because camera parameters of the image header part 470 are fixed during flight, the same setting values are written.

Figure 16:
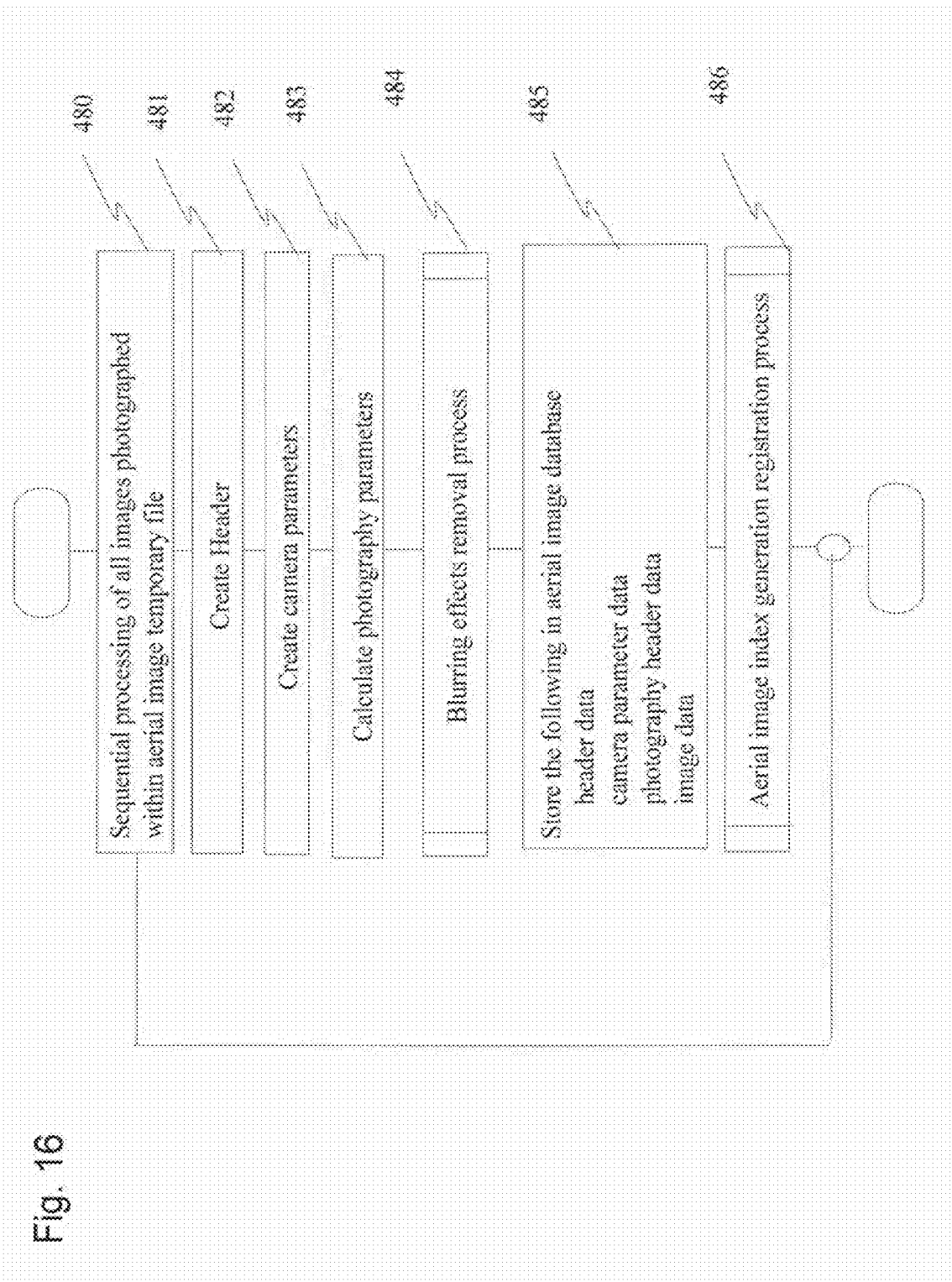
FIG. 16 is a diagram which shows a process flow of an aerial image database generation registration system of the present invention.

The aerial image database generation registration system 120 is explained in detail with reference to FIG. 16 to FIG. 26. FIG. 16 describes an entire process flow. In the process block 480, all the images are processed in order in the primary aerial image files 102 which are accumulated during one day's flight by the aerial image acquisition system 100 after the flight is completed. A header of the image header part 490 of the aerial image database is created by the process block 481. At this time, it is possible to copy the header of the image header part 470 of the primary aerial image file 102 for the created header. It is possible to copy the camera parameters of the image header part 470 of the primary aerial image file 102 usually for the process block 482 also.

A process for calculating photography parameters of the image header part 490 for each image in the process block 483 is explained in detail below. It is possible to stipulate the camera location by latitude, longitude and altitude. In the case where location measurement by a usual aircraft installed GPS 380 is by a DGPS, flight altitude is sometimes low and thus a precise location can not always be obtained as it is. Because an error is sometimes included on the case where location measurement by GPS 380 is a GPS, it is possible to obtain coordinate correction data from a nearby DGPS station which are measured at the same time as the flight time after landing and make a correction according to the photography date and time.

Figure 17:
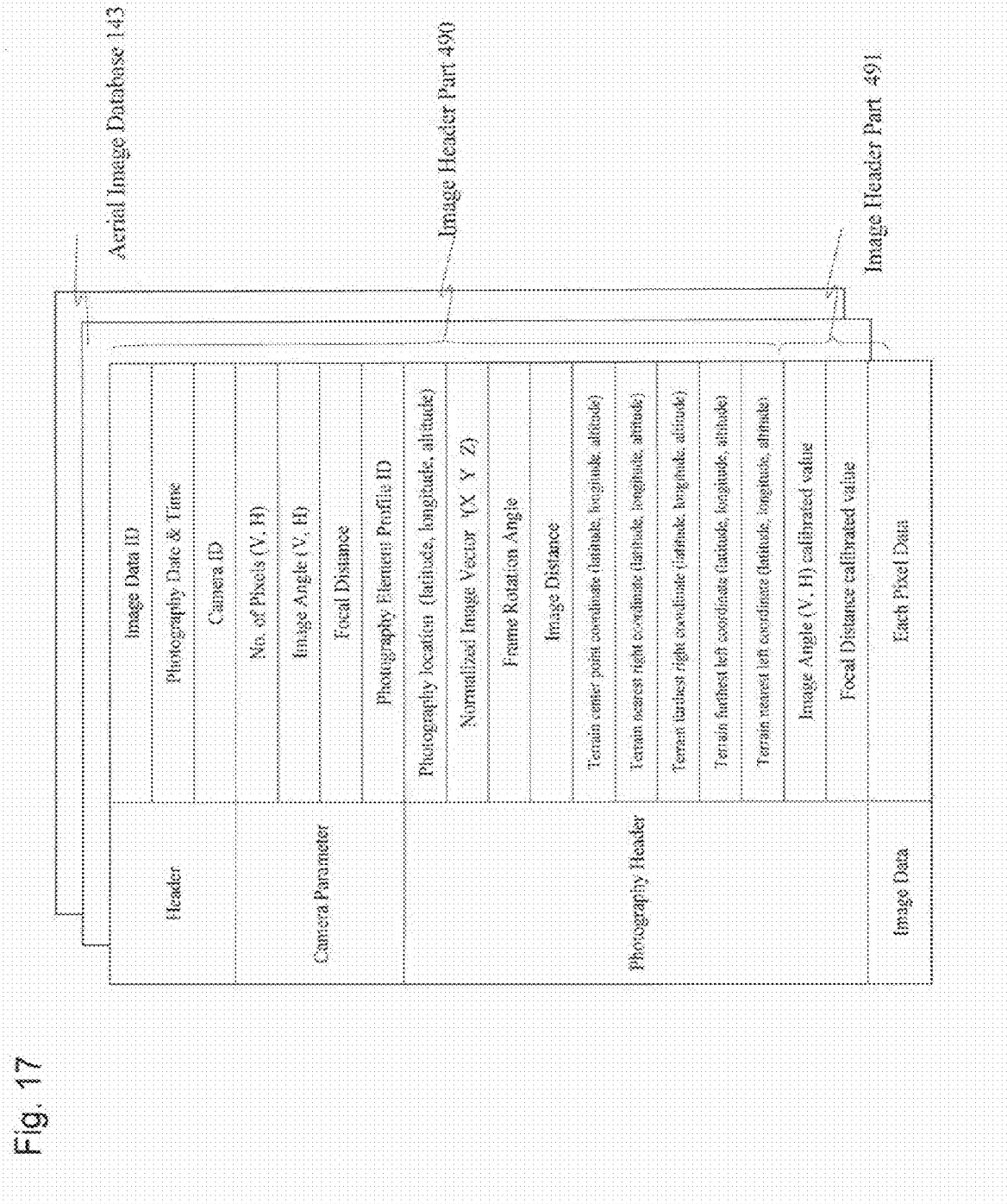
FIG. 17 is a diagram which shows the structure of an aerial image database of the present invention.

Calculation of photography parameters is performed using the linear algebra. This is explained below with reference to FIG. 23. The notation of equations with black lenticular brackets in the specification follow normal mathematical notation system, however, in the present text because there are limitations to noting symbols, the flowing principles are used. Three dimensional or two dimensional points are denoted using capital roman characters, and include three dimensional or two dimensional components. Where there are time variables, ( ) are attached afterwards, and time data is inserted. In the equations which are describe as images, vectors are described using italic capital roman characters, and described using roman characters in upper case in the present text, and in the case where classification is necessary in the present text, "(vector)" is added before the characters. Three dimensional or two dimensional points can also be expressed by vectors towards the origin. In equations which are described as images, a matrix is described in bold capital roman characters, and in the case where classification is required in the present text, "(matrix)" is added before the characters. Greek symbols are used for angles, and symbols for planes, lines etc are placed with description of planes, lines etc before them. Unit vectors in a Cartesian coordinate system which indicates a north facing horizontal direction are described by (vector) N and used as a reference axis. Coordinate conversion via pitch yaw roll of an aircraft are denoted by (matrix) A with (vector) N being the reference. In addition, the location of the aerial data part 472 in the primary aerial image file 102 is denoted by X in the Cartesian coordinate system, and a location disparity from the GPS antenna within the aircraft to the digital camera group 360 is denoted by (vector) D in a vector notation. Furthermore, an optical axis of each camera (indicated with index k=a~i) with respect to a reference axis (vector) N, and 4 corner direction vectors are expressed by the following unit vectors. The descriptions below are constants, and the focal length of a camera is determined by the attachment direction of the digital cameras 350a~i of the digital camera group 360. When Vector of direction for the center of the photographed image (normalized) $Gkc = {}^t(Gkcx, Gkcy, Gkcz)$ Vector of direction for the lower right corner of the photographed image (normalized) $Gk1 = {}^t(Gk1x, Gk1y, Gk1z)$ Vector of direction for the upper right corner of the photographed image (normalized) $Gk2 = {}^t(Gk2x, Gk2y, Gk2z)$ Vector of direction for the upper left corner of the photographed image (normalized) $Gk3 = {}^t(Gk3x, Gk3y, Gk3z)$ Vector of direction for the lower left of the photographed image (normalized) $Gk4 = {}^t(Gkc4, Gkc4, Gkc4)$ are defined, photograph location S becomes $$S = X + AD \qquad \text{[equation 1]}$$

and the photograph location (latitude, longitude, altitude) of the photograph parameters in FIG. 17 are calculated. The normalized image vectors (X, Y, Z) are calculated as AGkc by (matrix) A and (vector) Gkc.

Normalized vectors to directions of 4 corners of an image, which is adjusted with an orientation conversion (matrix) A with respect to a reference direction of the aircraft are AGk1 AGk2, AGk3, AGk4 using (matrix) A and (vector) GM to Gk4 for each camera respectively. Because terrain data of the ground surface is expressed by latitude, longitude and altitude with respect to a grid point of the ground surface, a triangle is formed by the immediately adjacent 3 sets of points and its apex coordinate is given as T1, T2, T3 with Tc being the intersection coordinates of a plane of triangle T1T2T3 and (vector) Gkc. If x is expresses an outer product and $$\overrightarrow{T_1T_c} \times \overrightarrow{T_3T_c} \geq 0$$

$$\overrightarrow{T_2T_c} \times \overrightarrow{T_1T_c} \geq 0$$

$$\overrightarrow{T_3T_c} \times \overrightarrow{T_2T_c} \geq 0 \qquad \text{[equation 2]}$$

then it can be said that Tc is within the triangle T1T2T3. That is, they intersect. Assuming an image vector (normalized) Gkc from photography location S=(x, y, z) intersects with triangle T1T2T3 at Tc, then;

$$T_c - S = RG_{kc}$$

$$T_c - T_1 = a(T_2 - T_1) + b(T_3 - T_1) \qquad \text{[equation 3]}$$

Here, a, b are arbitrary scalar constants. Here R is an image distance of the photography parameters in FIG. 17. Image distance means the distance from a photography location up to where the photography optical axis intersects terrain 580. Here, given $$T_1 = {}^t(T_{1x}, T_{1y}, T_{1z})$$

$$T_2 = {}^t(T_{2x}, T_{2y}, T_{2z})$$

$$T_3 = {}^t(T_{3x}, T_{3y}, T_{3z})$$

$$T_4 = {}^T(T_{4x}, T_{4y}, T_{4z})$$

then:

$$\begin{pmatrix} R \\ a \\ b \end{pmatrix} = \begin{pmatrix} G_{kcx} & T_{1x} - T_{2x} & T_{1x} - T_{3x} \\ G_{kcy} & T_{1y} - T_{2y} & T_{1y} - T_{3y} \\ G_{kcz} & T_{1z} - T_{2z} & T_{1z} - T_{3z} \end{pmatrix}^{-1} \begin{pmatrix} T_{1x} - x \\ T_{1y} - y \\ T_{1z} - z \end{pmatrix} \qquad \text{[equation 5]}$$

$$T_c = T_1 + a(T_2 - T_1) + b(T_3 - T_1)$$

And the terrain upper center point coordinats (latitude, longitude, altitude) of the photography parameters in FIG. 17 are calculated as Tc. However, an outer product is calculated and checked whether it is within the triangle T1T2T3.

Similarly, by calculating with respect to Gk1, Gk2, Gk3, Gk4 instead of (vector) Gkc, each of terrain upper nearest right coordinate (latitude, longitude, altitude), terrain upper furthest right coordinate (latitude, longitude, altitude), terrain upper furthest left coordinate (latitude, longitude, altitude), terrain upper nearest left coordinate (latitude, longitude, altitude) are calculated. Next, a frame rotation angle of the photograph parameters shown in FIG. 17 is calculated. When the orientation of the aircraft is in a reference direction, a horizontal line which passes through the optical axis of each digital camera frame is parallel with the horizon of the Earth, however, when a coordinate conversion due to pitch yaw roll of the aircraft is (matrix) A, a rotation angle is produced from the horizon of the Earth. A horizontal line of an image frame when the orientation of the aircraft is in a reference direction is given as follows.

$$\tfrac{1}{2}(G_{k1} + G_{k2}) - G_{kc} \qquad \text{[equation 6]}$$

When a coordinate conversion due to pitch yaw roll of the aircraft is (matrix) A, the horizontal line of the image frame is given as follows.

$$A\tfrac{1}{2}(G_{k1} + G_{k2}) - AG_{kc} \qquad \text{[equation 7]}$$

Therefore, a frame rotation angle is $$\cos^{-1}\left(\frac{A\left(\frac{1}{2}(G_{k1}+G_{k2})-G_{kc}\right)\cdot\left(\frac{1}{2}(G_{k1}+G_{k2})-G_{kc}\right)}{\left\|\frac{1}{2}(G_{k1}+G_{k2})-G_{kc}\right\|\left\|A\left(\frac{1}{2}((G_{k1}+G_{k2})-G_{kc})\right)\right\|}\right) \quad \text{[equation 8]}$$

Here, "." expresses an inner product and the part enclosed by 2 lines in a vertical direction expresses a norm.

Next, a process for removing the effects of blurring is performed by the process block 484. In the aerial three dimensional video generation system 150 related to one embodiment of the present invention, visual data from various directions of a city landscape is expressed using original images photographed from different view points. As a result, when there is a shadow due to direct sunlight on the original images, the photography data and time will become different for each original image and therefore it will be difficult to watch when integrating video. In order to avoid this, it is desirable to perform photography after setting a flight altitude in the aerial image acquisition planning file 101 to an altitude of 700 m to 800 m lower than altitude at which cumulus or stratus clouds appear. Because an aircraft can not perform photography for aerial surveys under cloudy conditions, it is possible to use surplus time of the aircraft cheaply. However, the range of visibility becomes shorter compared to clear weather due to moisture in the air.

Figure 18:
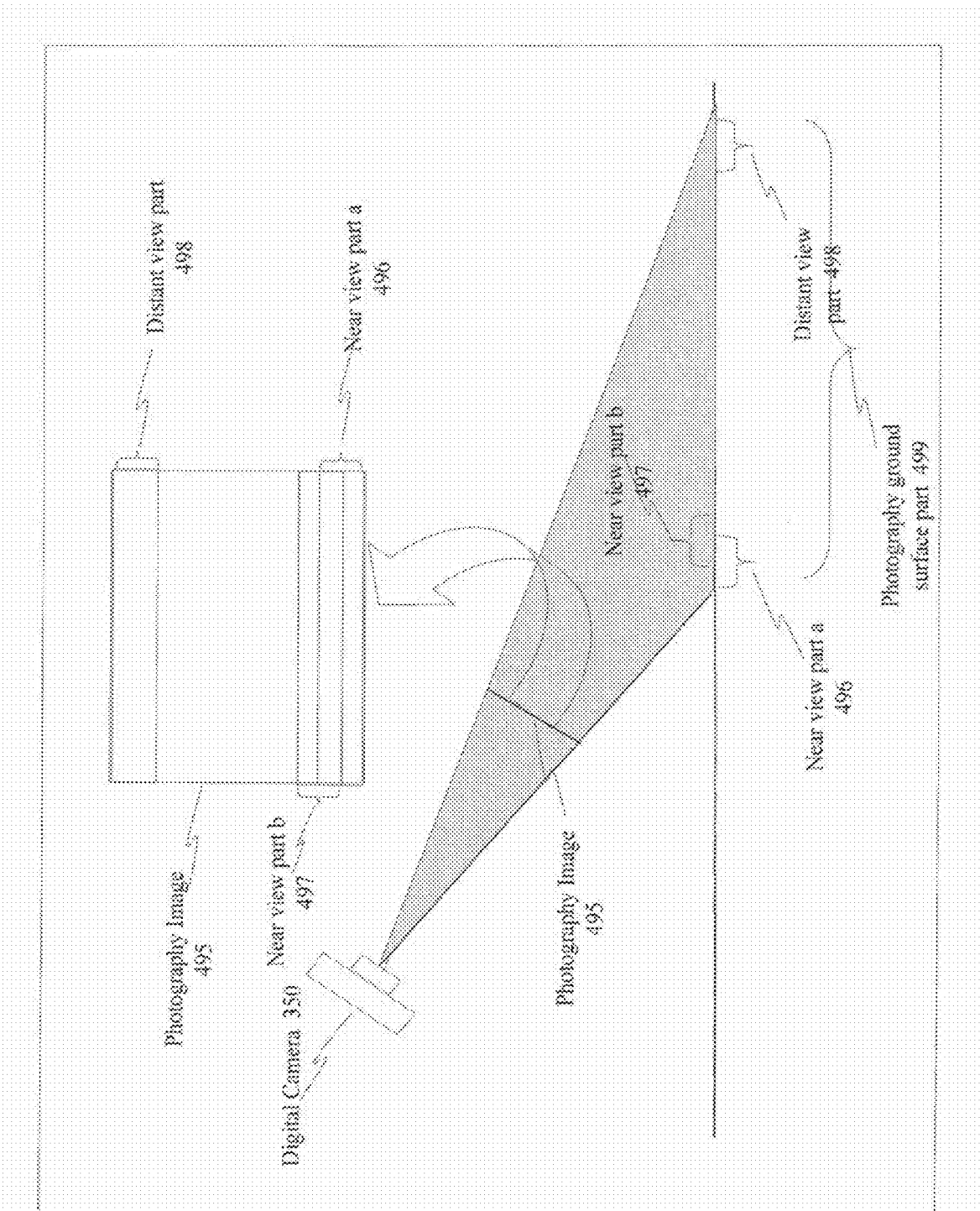
FIG. 18 is a diagram which shows the relationship between an image in a blur effect removal process and eyesight in the present invention.
Figure 19:
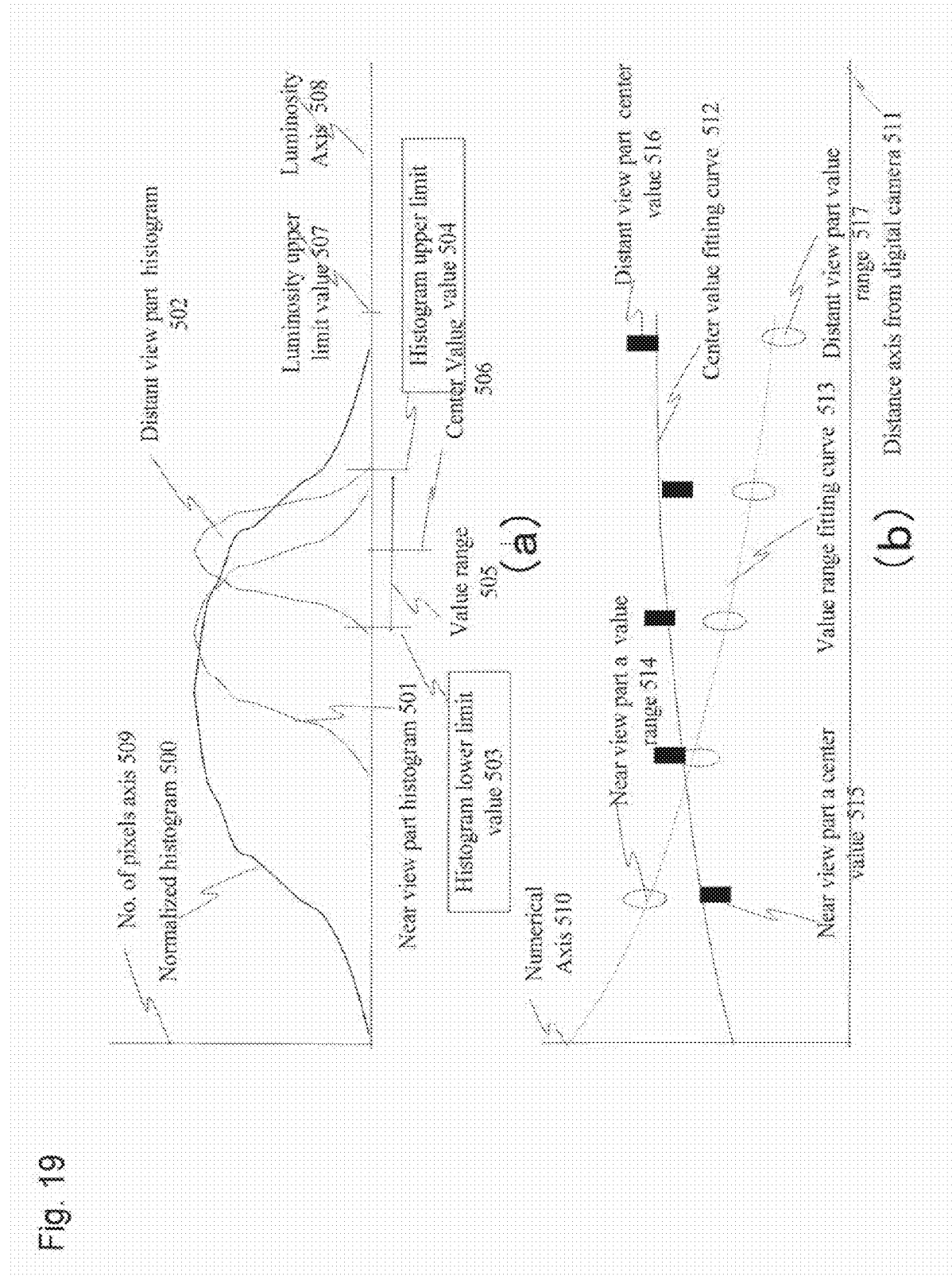
FIG. 19 is a diagram which shows an example of an image characteristic parameter graph in the blur effect removal process of the present invention.
Figure 20:
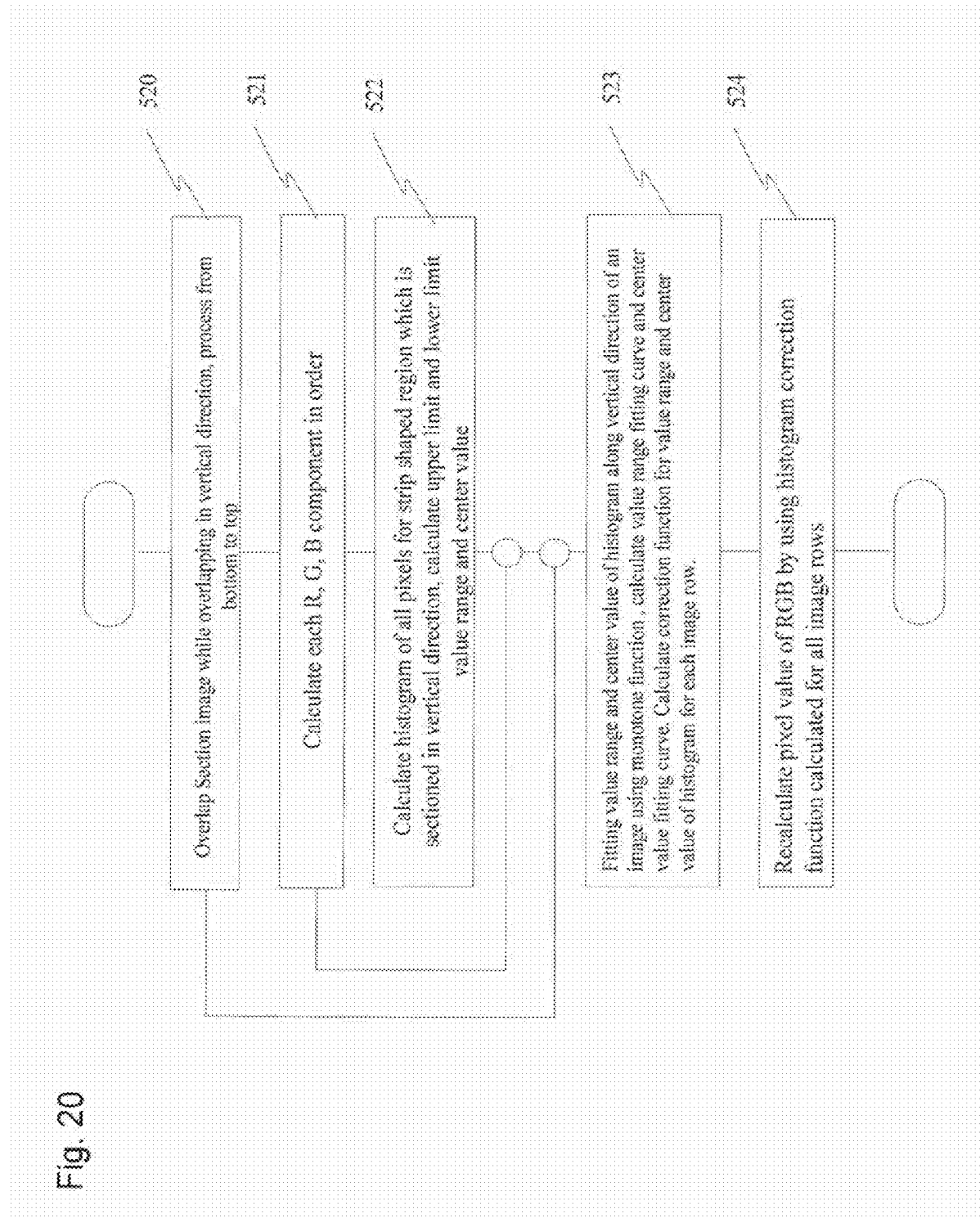
FIG. 20 is a diagram which shows a process flow of the blur effect removal process of the present invention.

Because moisture is small water droplets it causes diffuse reflection and refraction, effects are produced according to the passing distance in the air. In particular, in the case of oblique aerial photography, the effects of moisture become greater the larger the off-nadir angle. FIG. 18 shows the relationship between an image and vision in the removal process of blurring effects. The bottom end of photograph image 495 is the nearest part of the photography ground surface part 499 of the closeup part a496. The upper end part of photograph image 495 is the distant view part 498 and is located at the furthest part of the photography ground surface part 499. As a result the distance increasing when light passes through air from the closeup part a496 towards the distant view part 498, light diffusion increases due to fine water droplets, contrast decreases and becomes cloudy. As a result, as is shown in FIG. 19(*a*), in the case where a histogram of brightness of an image pixel in the case of no fine water droplets (blurring) is a normalized histogram 500 distributed from a luminosity lowest value to a luminosity highest value, a histogram 501 with respect to the closeup part is obtained, the width between the highest value and lowest value becomes more narrow, and a center value becomes whiter, that is, shifts in a high luminosity direction.

This tendency is most prominent in the distant view part histogram 502, where the range value which is the difference between the histogram highest value 504 and histogram lowest value 503 become the lowest and the center value 506 becomes the highest. By the photography image 495 in FIG. 18, a range of the histogram in the image horizontal direction is the total range and the vertical direction is a strip having a fixed width as in the closeup part a496, closeup part b497, and when a histogram of pixel luminosity is calculated heading upwards while shifting one line at a time, the characteristics shown in FIG. 19 are obtained. The density of the blurring is changing due to altitude but because there is no difference in density in a horizontal direction, a value range fitting curve 513 has a monotone decrease and a center value fitting curve 512 has a monotone increase which is similar. Because a distribution is unclear due to a high level of blurring, after calculating these using fitting from an actual measured value, each pixel value is corrected by a value range calculated from a fitting curve and a center value correction function for each row. Correction of luminosity of each pixel is calculated with:

Center value of the normalized histogram+(brightness of pixel−center value fitting value)*width of the normalized histogram/width of fitting value [equation 9]

for each horizontal line. The process explained above is the process described from process block 520 to process block 524 in FIG. 20. FIG. 21 shows a process result example of the removal process of blurring effects of the present invention and as a result of processing the blurring effect removal before image 530 the blurring effect removal after image 531 is obtained.

Next, the result calculated from process block 481 to process block 484 by process block 485 is stored in the image data part of the aerial image database 143 shown in FIG. 17. An index is produced with aim of rapidly searching the aerial image data in order to generate video using aerial image data registered by process block 485 by the last process block 486 of the process flow in the aerial image database registration system in FIG. 16. The contents of process block 486 are further explained in detail by the aerial image index generation registration process flow of the aerial image database registration system in FIG. 22. Below, this is explained according to FIG. 22. The contents of process block 540 are explained while referring to the structure of the aerial image index mechanism and term definitions in FIG. 23. Photography location (latitude, longitude, altitude) 550, normalized image vector $G={}^t(X\ Y\ Z)$ 551, frame rotation angle 553, image distance 552, terrain upper center point coordinate (latitude, longitude, altitude) 554, terrain upper nearest right coordinate (latitude, longitude, altitude) 555, terrain upper furthest right coordinate (latitude, longitude, altitude) 556, terrain upper furthest left coordinate (latitude, longitude, altitude) 557, terrain upper nearest left coordinate (latitude, longitude, altitude) 558 are already stored as photography parameters of the aerial image database 133 in FIG. 17 in an image photographed by the photography device 550, and this is shown in FIG. 23. An image photographed by the photography device 550 captures a ground surface image range 549. Because longitude latitude are defined for the ground surface, terrain 580, it is possible to form a cell with a latitude direction of 30 m and longitude direction of 25 m in the vicinity of latitude 35 degrees of the Tokyo area when meshing every second. Considering a city region of square of 65 km lengths, the number of these cells is merely 35M cells. Because 4 corner points of the ground surface image range 549 are judged by latitude longitude it is easy to calculate the ground surface cell 559 included in the ground surface image range 549

Figure 24:
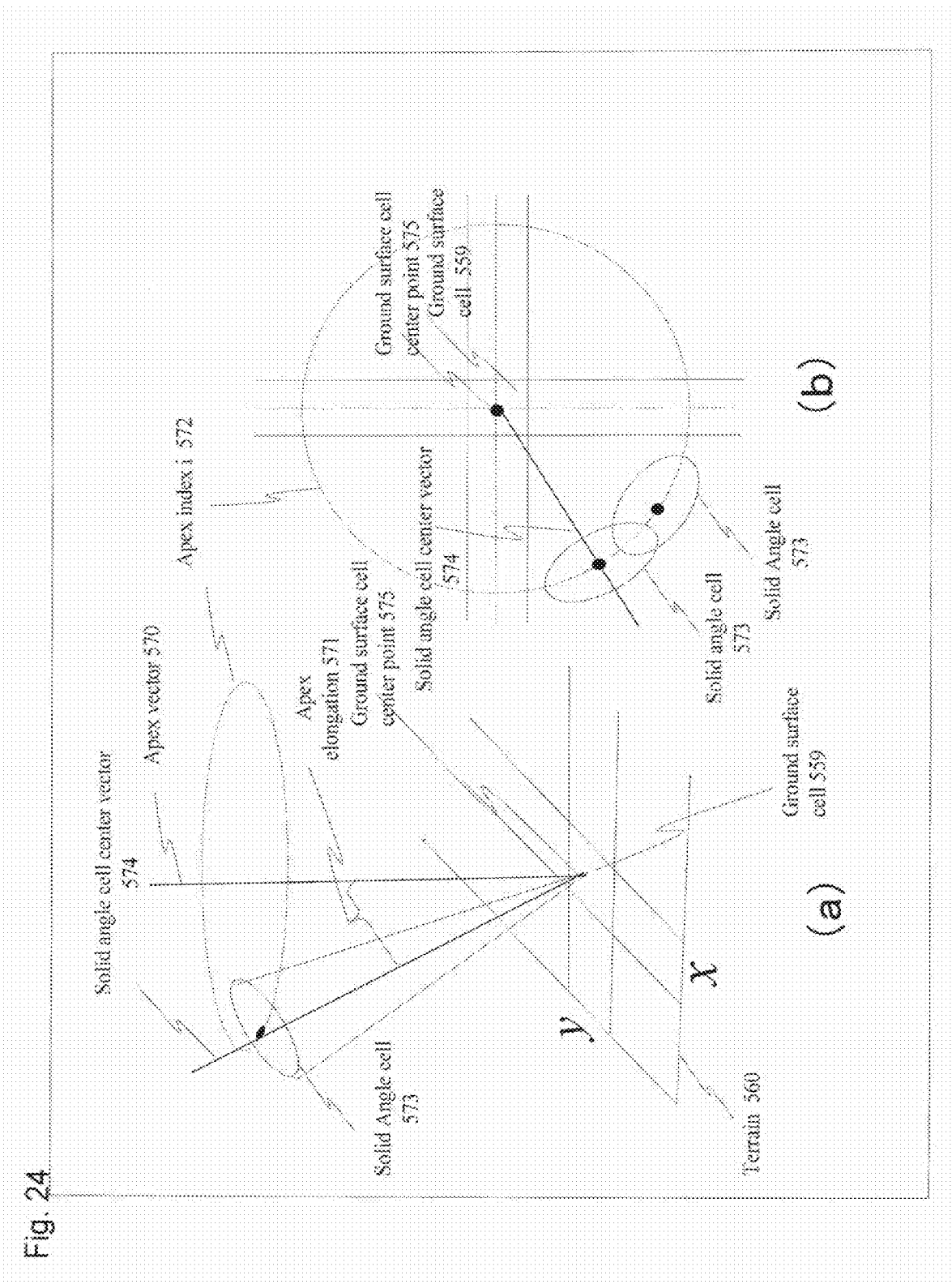
FIG. 24 is a diagram which shows the structure of an aerial image index mechanism of the present invention

It has to be possible to search an image in the range i221 of a sufficiently small solid angle for various directions of the sphere 222 shown in FIG. 2 with respect to each ground surface cell. With this goal, as is shown in FIG. 24(*a*), apex vector 570 which points upwards in a vertical direction from the center of the ground surface cell 559 is defined, the sphere is cross sectioned in concentric circles with this apex vector as a reference and apex index i572 is defined. The apex index i are defined in order i=0, 1, 2 . . . , i=0 is the apex vector, and as i becomes sequentially bigger, an angle which forms the apex vector increases by the same width, and is defined from the apex to a horizontal line in the same concentric circle. A solid angle cell center vector is defined from the ground cell 559 passing through the apex index 572. The solid angle cell center vector 574 is always defined by a fixed direction angle interval on the apex index 572.

The solid angle cell 573 in FIG. 24(*a*) corresponds to the range i 221 of the sufficiently small solid angle in FIG. 2, and becomes a basic unit of an image search from the ground surface cell 559. FIG. 24(*b*) is a circular cone having an apex angle of 20 degrees which forms the solid angle cell 573 with respect to the solid angle cell center vector 574, and is defined as a circular cone in which a vector which is a solid angle with a steradian of 0.4 fits. FIG. 24 is a diagram of the ground surface cell 559 seen from an apex direction. The solid angle cell 573 is defined by mutually overlapping with and being adjacent to the apex index i572, and fills up the entire circumference of the apex index i572. An angle which forms the solid angle cell center vector 574 which passes through the apex vector 570 and apex index i570 is called apex elongation 571 and becomes a numeric value for defining the apex index l 572.

Figure 25:
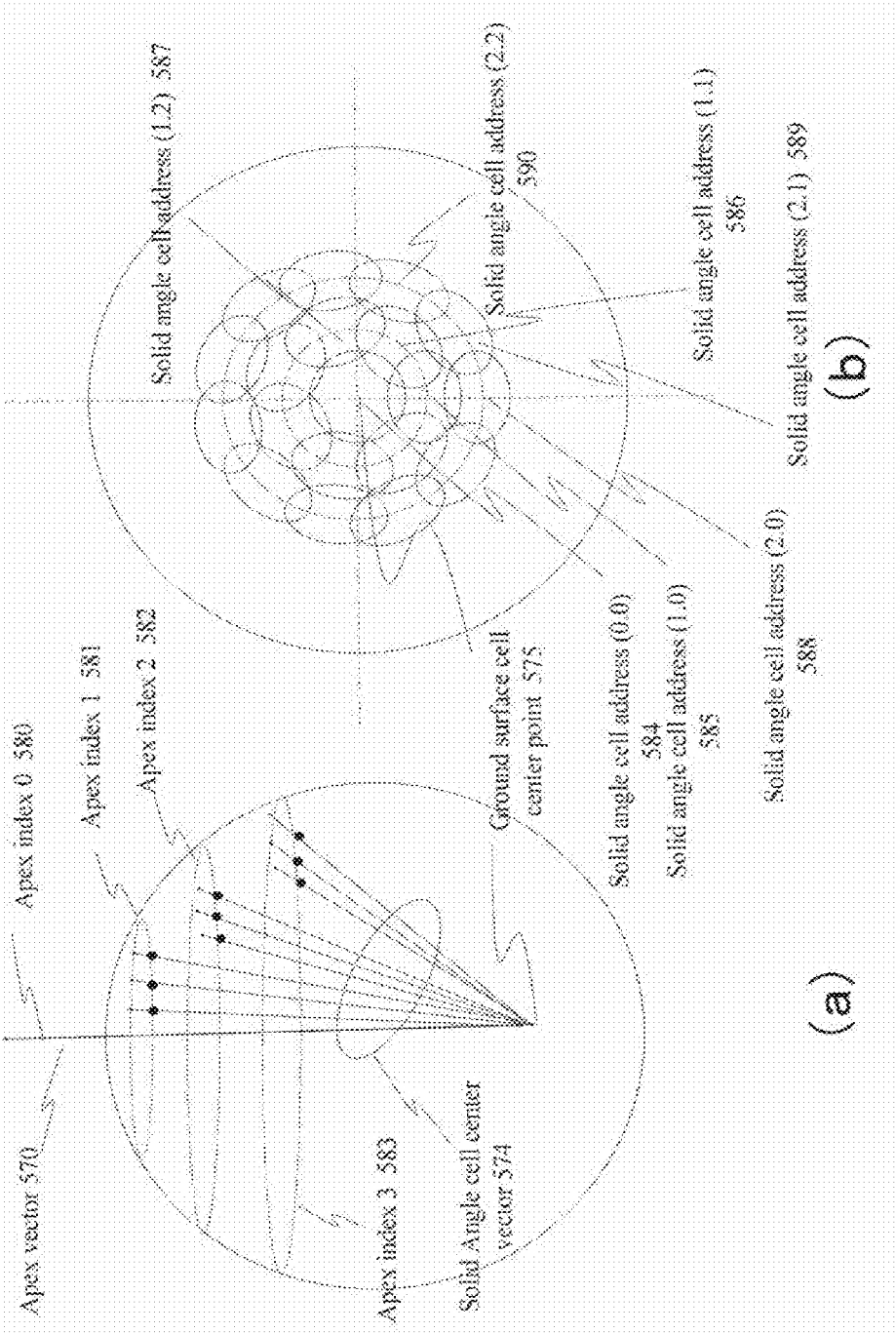
FIG. 25 is a diagram which shows the structure of an index in a three dimensional angle cell of the present invention.

FIG. 25 shows an index structure of the solid angle cell 573. FIG. 25(*b*) is a diagram looking down on the ground surface center pointer 575 from the apex direction. Defining a solid angle cell address (i, j) having a two dimensional subscript, i indicates the apex index i 572 and j indicates a solid angle cell in the direction of the $j^{th}$ concentric circle of the apex index i. A solid angle cell center vector of the solid angle cell address (0,0) 584 is the apex vector 570 and surrounding this, solid angle cell address (1,0) 585, solid angle cell address (1,1) 586, and cell solid angle address (1,2) 587 on a sphere in concentric circles are defined below up to filling the circumference of the apex index 1. Solid angle cell address (2,0) 588, solid angle cell address (2,1) 589, and solid angle address (2,2) 590 are defined up to filling the entire circumference of the apex index 2 along the apex index 2 on the exterior side of the apex index 1 581. The solid angle cell 573 mutually overlaps and the sphere is completely filled so that there are no gaps. A solid angle of a solid angle cell is set so that three dimensional video generation is smoothly performed. The number of solid angle cell addresses becomes larger as the apex index gets close to the ground. In this way, it is possible to search for an image of a photographed ground cell with respect to all ground cells by the direction on the sphere.

Figure 26:
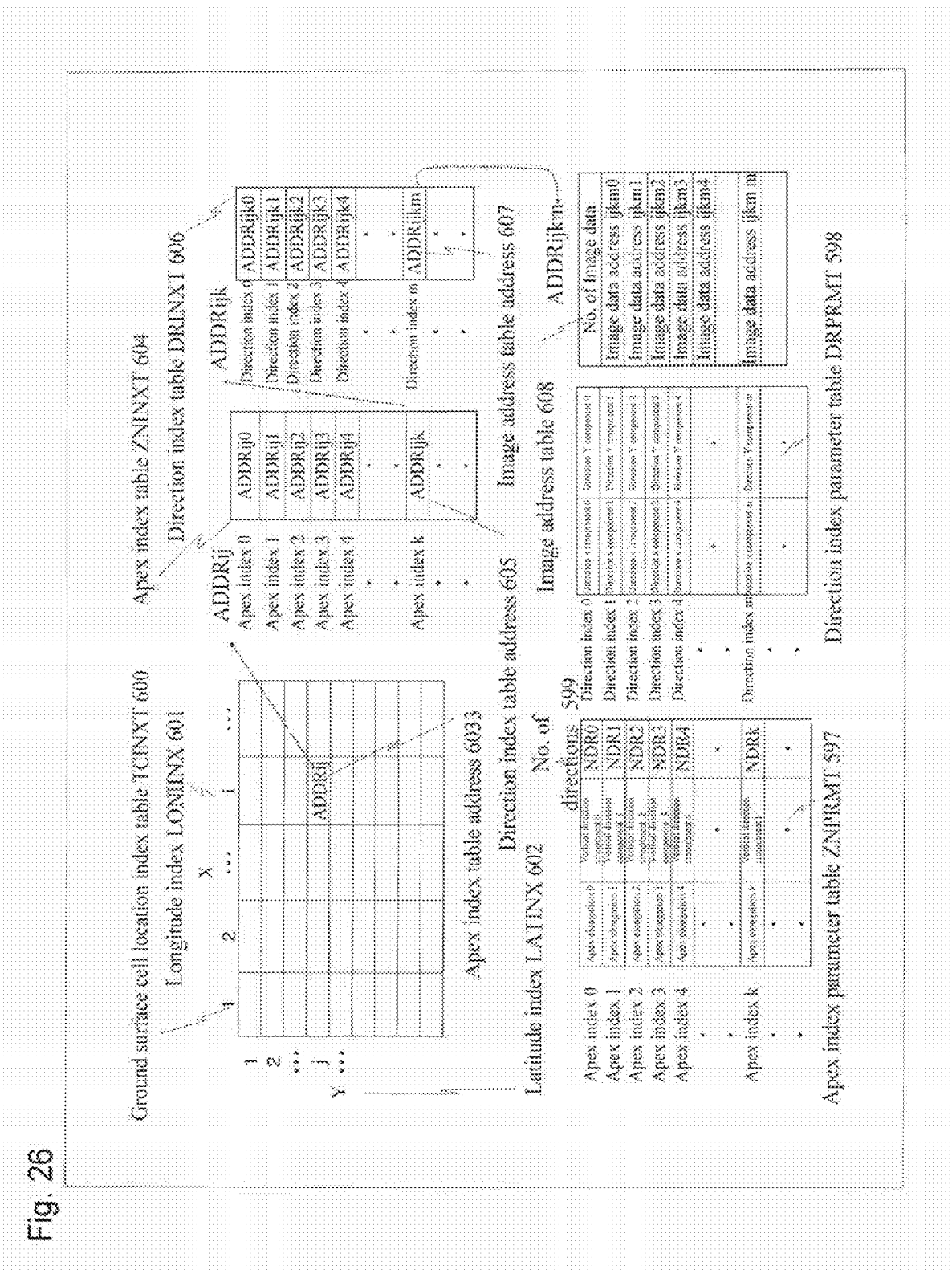
FIG. 26 is a diagram which shows a mutual relationship between the aerial image index and a related table of the present invention.

A structure of a related table of an aerial image index and mutual relationship are shown in FIG. 26. The structure of an apex index and apex cell address is the same and don't rely on a ground cell, are this structure is defined by apex index parameter table ZNPRMT597 and direction index parameter table DRPRMT598. The apex index parameter table ZNPRMT597 defines an apex elongation 571 with respect to apex index i 572 in order from an apex index 0, and a center vector 574 corresponding to the apex index i572 houses the vertical direction component in the case where it is a normalized vector as a vertical direction component. Because the number of solid angle cells included in the apex index i572 increases as it nears a horizontal line from the apex, it is stipulated as direction number NDRi corresponding to each apex index. The direction index parameter table DRPRMT598 stipulates the direction X component and direction Y component of the solid angle cell center vector for each solid angle cell address corresponding to the direction number NDRi defined corresponding to an apex index, and is normalized so together with the vertical direction component described in apex index parameter table ZNPRMT597 so that a vector norm becomes 1.

Next, the structure of an image data index table corresponding to a ground cell is explained. A ground cell location index table TCINXT600 in FIG. 26 is defined with respect to all the ground cells 559, and index table address ADDR$_{ij}$ 603 is specified corresponding to a ground cell. A subscript of ADDR$_{ij}$ indicates that a longitude index LONINX601 is i, and a latitude index LATINX602 is j corresponding to a location on the ground. Apex index table address ADDR$_{ij}$ (603) indicates an apex index table ZNINXT604 corresponding to ground cell ij. Direction index table address ADDR$_{ijk}$ (605) corresponding to a selected apex index k is defined in the apex index table ZNINXT, and the direction index table DRINXT606 is stipulated according to this. Because there is the number of direction specified by the apex index parameter table ZNPRMT597 here, if the direction index is m, then ADDR$_{ijkm}$ is specified as the address of image address table 608. An image address table selected in this way shows the number of image data included in a solid angle cell of a solid angle cell address (k, m) with respect to ground cell ij, and an image data address. In this way, when an aerial image index and mutual relationship of a related table are defined according to FIG. 26, it is possible to search an image photographed from an arbitrary direction from a ground location.

Figure 22:
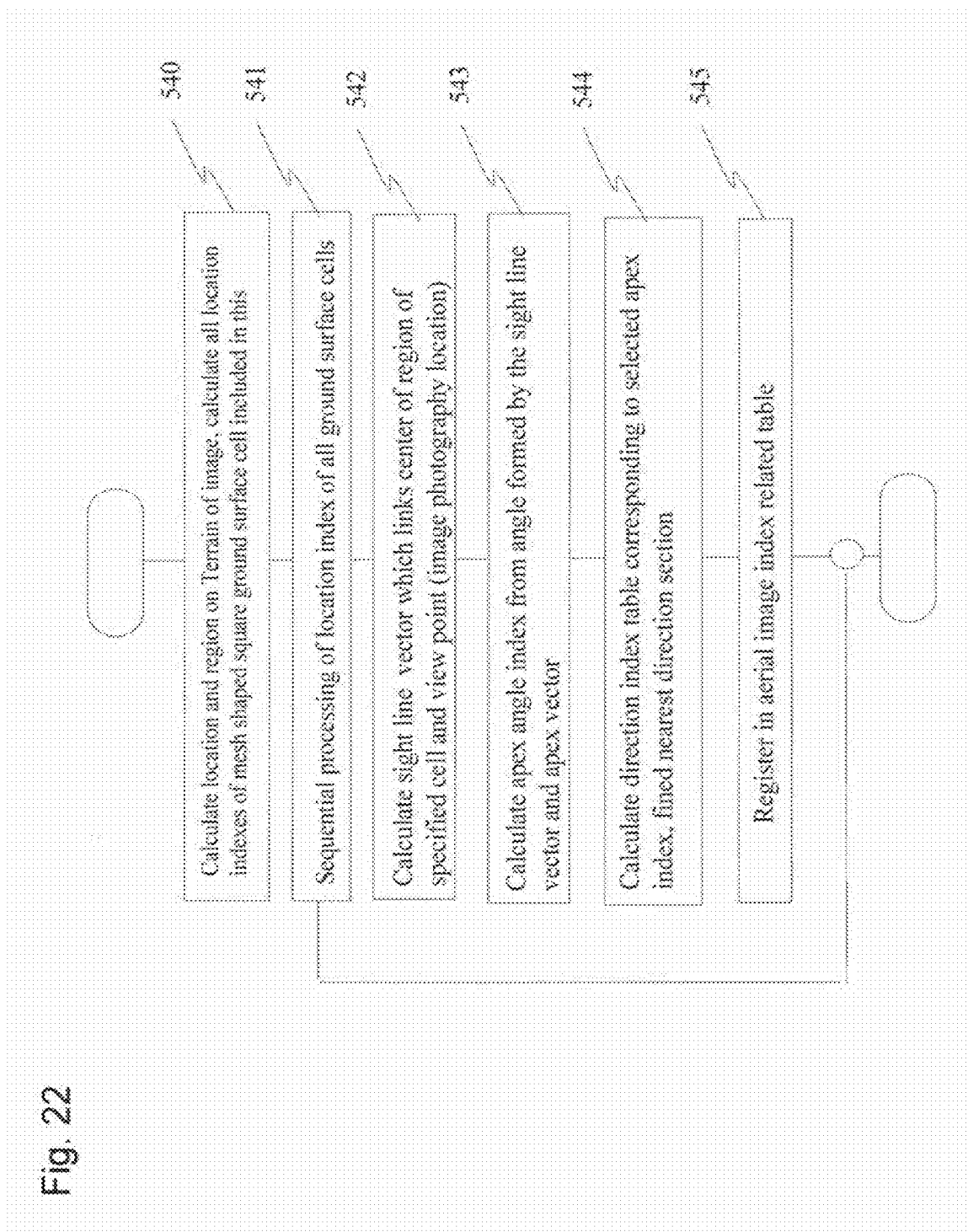
FIG. 22 is a diagram which shows a flow of an aerial image index generation registration process in the aerial image database generation registration system of the present invention.
Figure 23:
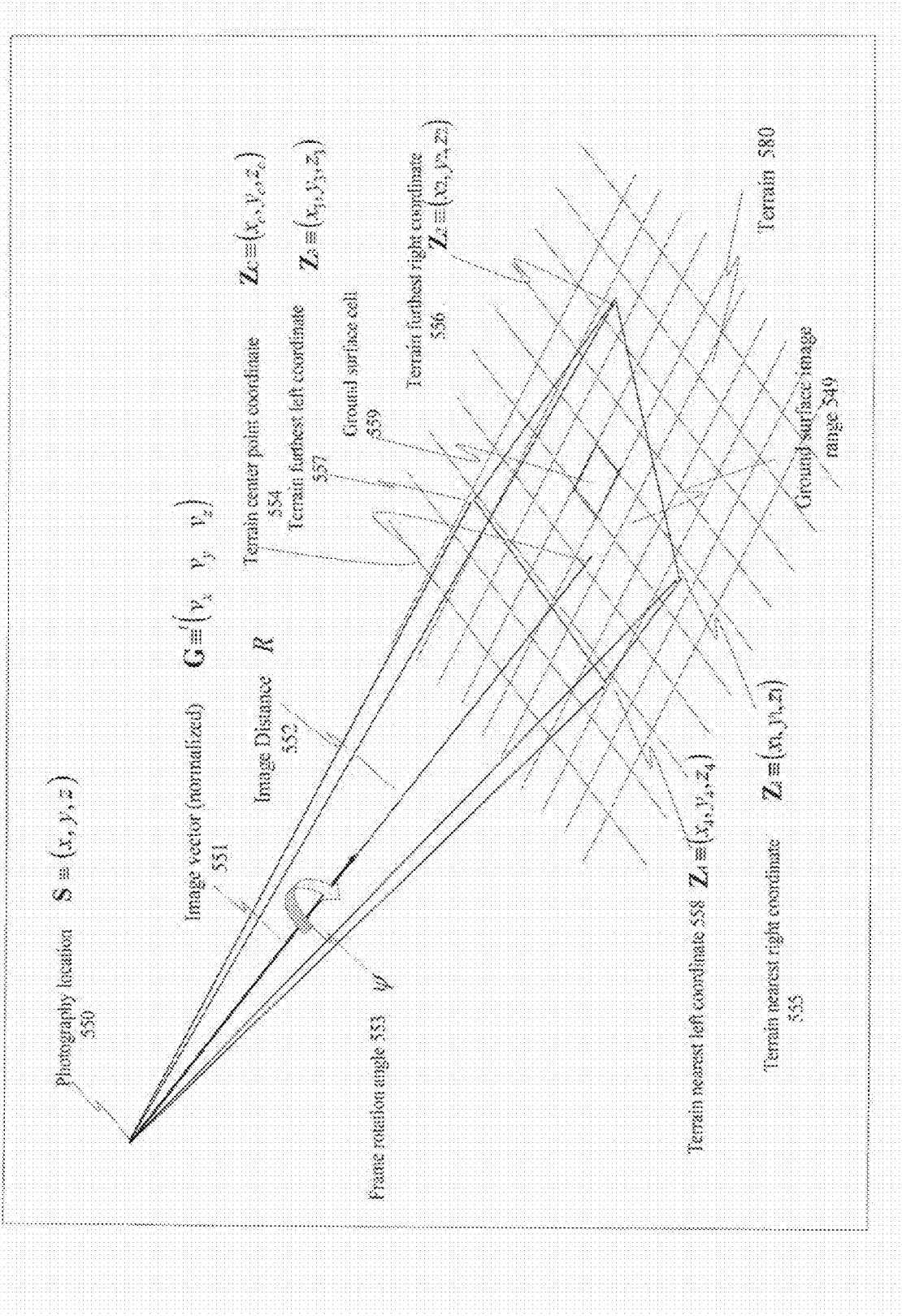
FIG. 23 is a diagram which shows the structure of an aerial image index mechanism and definition of terms of the present invention.

A flow of an aerial image index generation registration process of the aerial image database registration system shown in FIG. 22 is explained below based on the explanation of the structure of the image data index above. All the ground cells included in a ground image range 549 are calculated when there is one image as shown in FIG. 23 in the process block 540. In the process block 541, processes are performed in order on all the ground cells calculated in process block 540. In the process block 542, a vector which calculates a photography location 550 from a ground cell center coordinate is calculated. In the process blocks 542 and 544, a solid angle cell address (k, m) which includes the vector which calculates the photography location 550 from a ground cell center coordinate is calculated using an inner product calculation from the definitions of apex index parameter table ZNPRMT597 and direction index parameter table DRPRMT598. Image data of the image data table ADDR$_{ijkm}$ is increased by one by the process block 545 based on this data and added to the image database.

Figure 27:
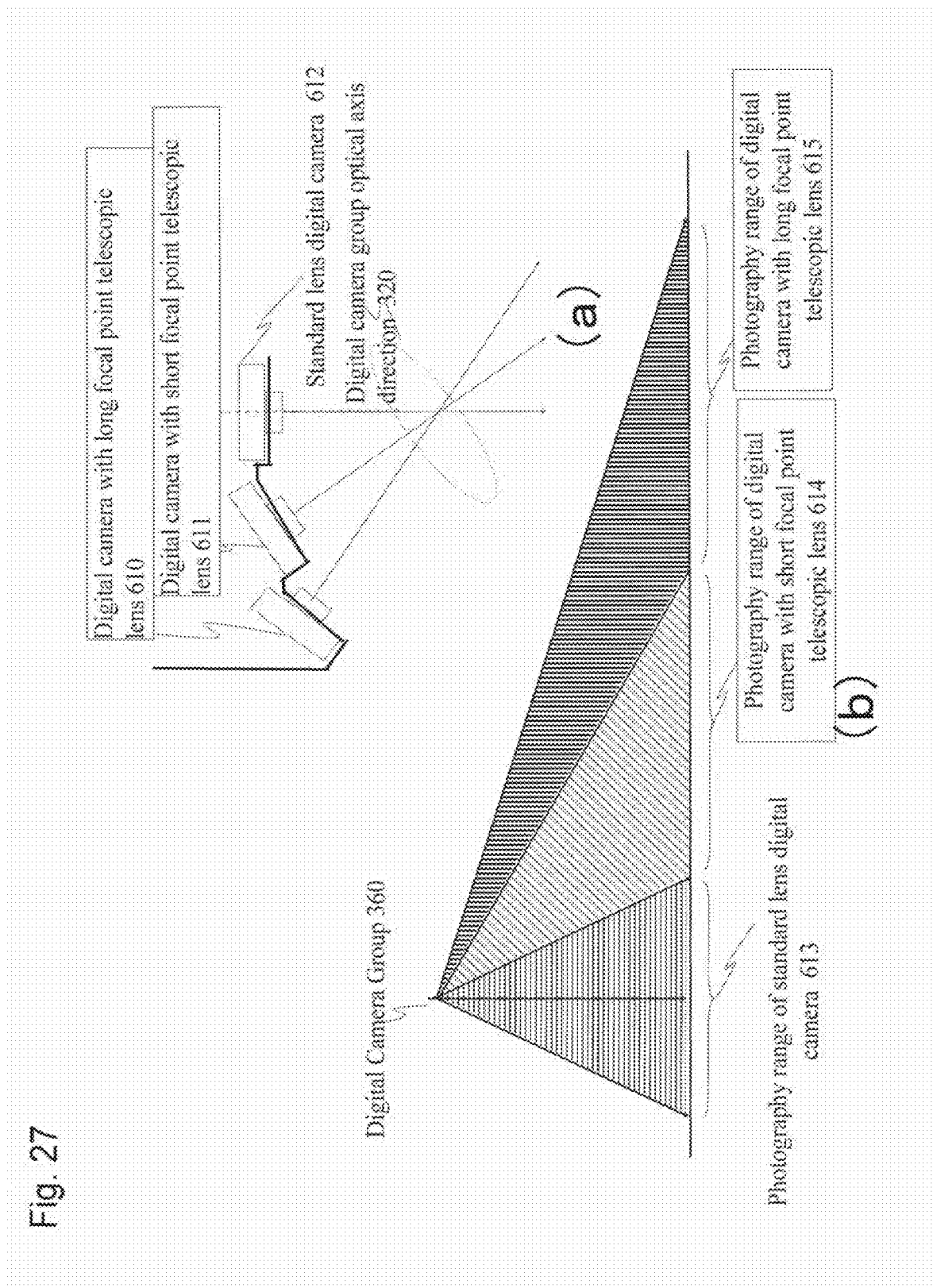
FIG. 27 is a diagram which a structural example of vision by digital cameras having three types of different focal lengths of the digital camera group of the present invention.
Figure 28:
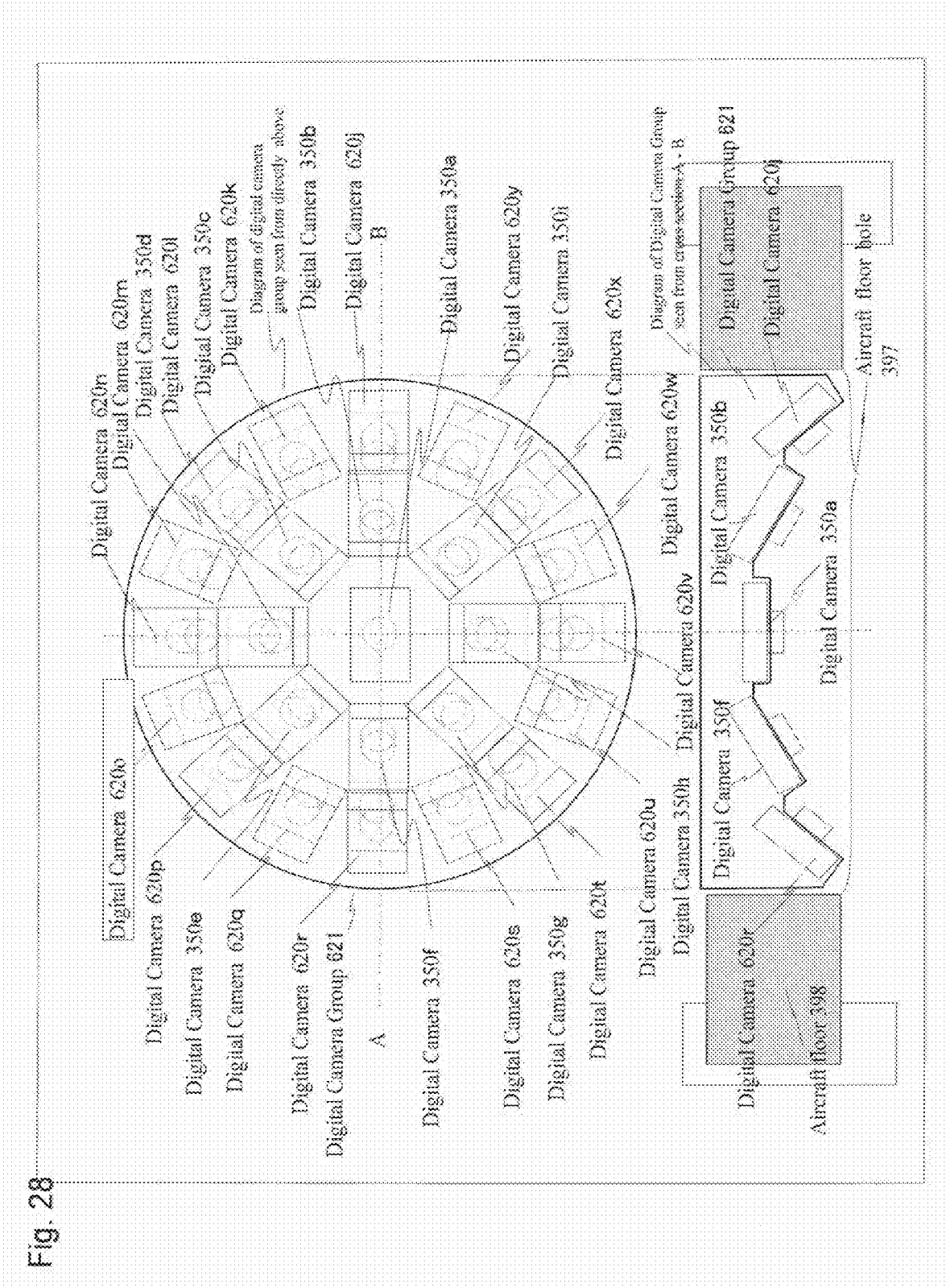
FIG. 28 is a diagram which shows a structural example of the digital camera group of the digital cameras having three types of different focal lengths in the present invention.
Figure 29:
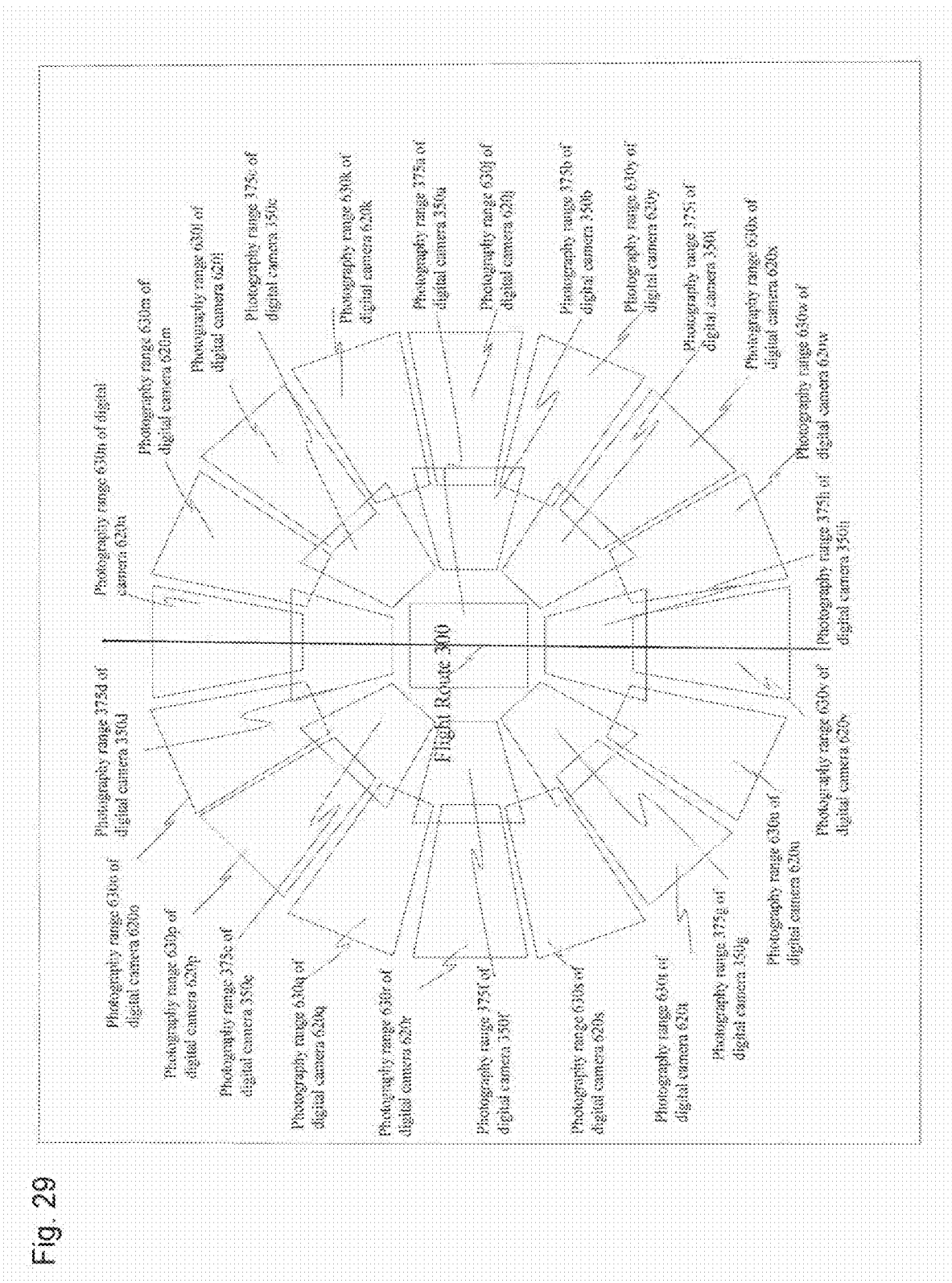
FIG. 29 shows a photographic range diagram of the digital camera group of the digital cameras having three types of different focal lengths in the present invention.

An example structure of vision by digital cameras having three different focal lengths is shown in FIG. 27. In city landscape three dimensional video generation of the present invention, because an original image which has few depression angles becomes an image with a large off-nadir angle, it inevitably becomes an image further away than an aircraft. This is because in order to generate a video image with few depression angles without reducing resolution care is necessary in order not to deteriorate resolution when photographing images with a large off-nadir angle. As a result, FIG. 27 shows an example whereby the focal length of a telescopic lens is increased as the off-nadir angle becomes larger, and at the same time as maintaining resolution, digital cameras having three types of off-nadir angle are adopted, focal length is increased as the off-nadir angle increases and ground resolution becomes uniform. Using a directly below photography digital camera 350*a* in FIG. 28, up to 8 digital cameras 350*b*~*i* are radially arranged with the same small off-nadir angle and on the exterior side up to 16 digital cameras 620*j*~*y* are radially arranged with the same large off-nadir angle. It is possible to sufficiently store already existing aerial photography cameras in an aircraft floor hole due to small size and high capabilities of recent digital cameras. A photography range example of the digital camera group formed by digital cameras having three different types of focal length is shown in FIG. 29. As a representative example, a combination of a digital camera 350a with a 35 mm film conversion focal length 50 mm which is pointed directly below, digital cameras 350b~i with a focal length of 70 mm which are pointed at an off-nadir angle of 35 degrees, and digital cameras 620j~y with a focal length of 105 mm which are pointed in an off-nadir angle of 60 degrees is possible.

Figure 30:
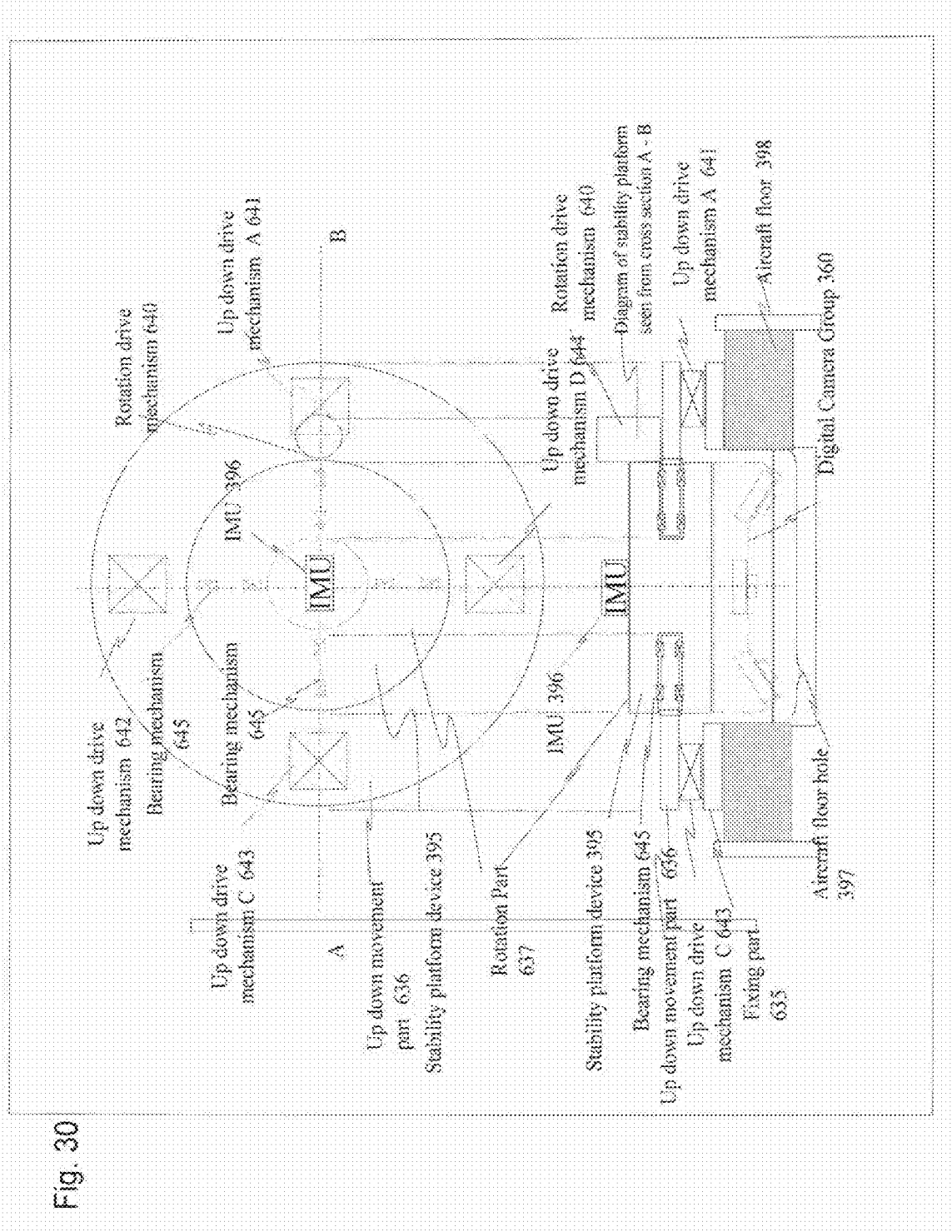
FIG. 30 is a diagram which shows a structural example of an aircraft installation stability platform of the present invention.
Figure 31:
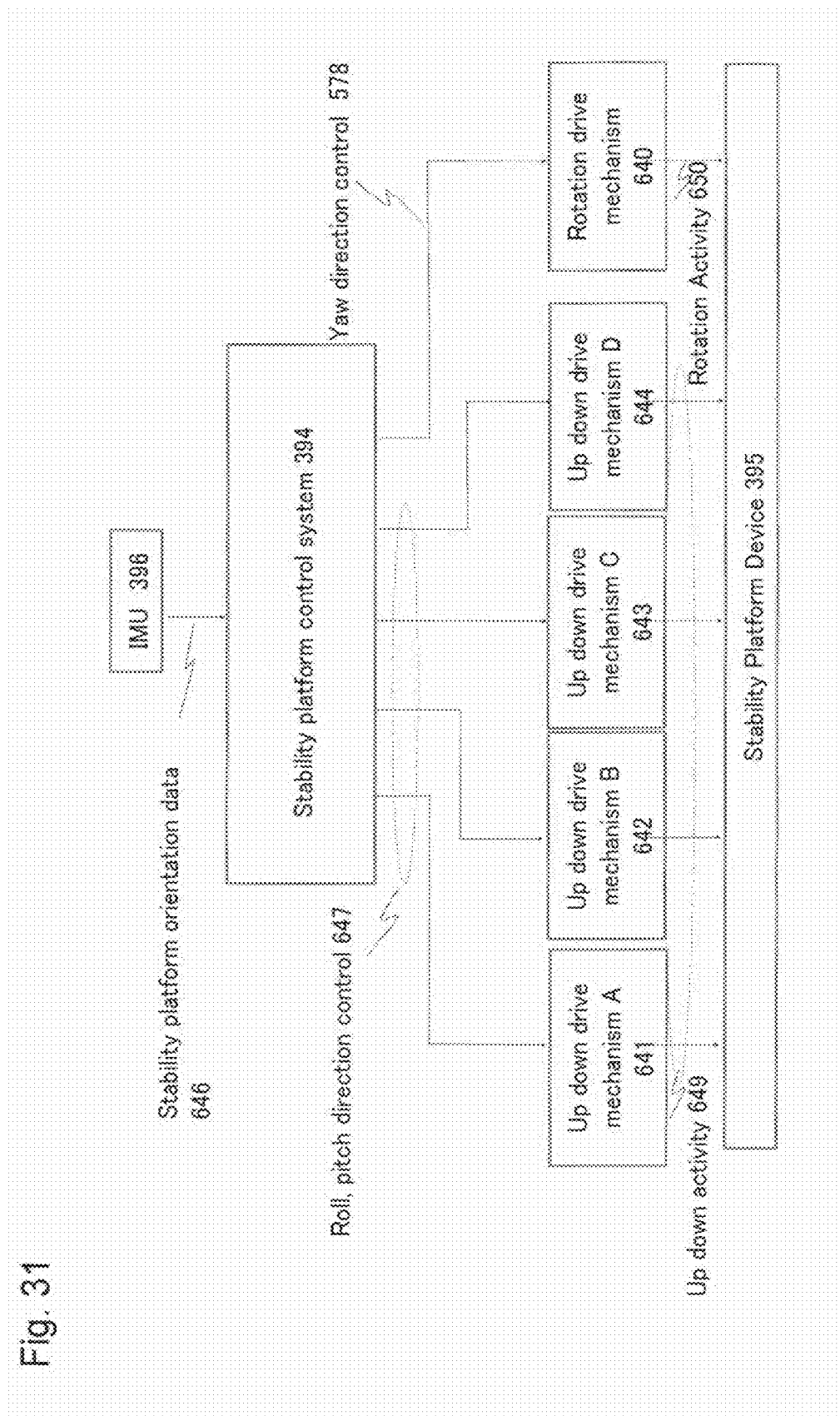
FIG. 31 is a diagram which shows a signal data flow of the stability platform of the present invention.

A simplest example of the structure of a stability platform device 395 for installing in an aircraft is shown in FIG. 30. The stability platform device 395 sits astride the aircraft floor hole, and is formed by fixing part 635, up and down moving part 636 and rotation part 637 from the bottom which are arranged so be closed off by the upper part. The rotation part 637 has a rotation table structure, an orientation detection IMU 396 is fixed to the top of it, the digital camera group 360 hangs down from the bottom part and the entire downwards field of view can be seen by the digital cameras 350a~i without projecting the cameras from the aircraft floor hole 397. The stability platform device 395 hangs down the digital camera group 360 or 621 and it is possible to similarly photograph using digital cameras 350a~i or digital cameras 620j~y. Furthermore, a joining method of the rotation part and digital camera group 360 or 621 needs to be fixed and provide rigidity. The stability platform device 395 aims to keep a fixed position with respect to disturbance of the aircraft's orientation, however, it is safe to assume a pitch and roll angle from 7 to 10 degrees at most and a yaw angle of 20 degrees at most of orientation disturbance of an aircraft. The fixing part 635 is fixed to the aircraft floor 398. The up down moving part is held via up down drive mechanisms A~D641~644. The up down drive mechanisms A~D641~644 each move up and down independently and correct for disturbance of a pitch and roll angle. The up down drive may be a hydraulic mechanism and may have a method for converting to rotation movement to up down movement via a worm gear. The rotation part 637 is installed to the up down movement part 645 by being held by a bearing mechanism. The rotation drive mechanism 640 is fixed to the up down movement part 636 and the rotation part 637 is arranged by being connected to an exterior extension part. Rotational movement may be transmitted between the rotation part 637 and the rotation drive mechanism 640, and disturbance with respect to a roll angle of the aircraft is removed by rotating the rotation part 637. A signal data flow of the stability platform device is shown in FIG. 31. A stability platform control system 394 periodically inputs a pitch angle, yaw angle and roll angle by the IMU396, a disparity from a reference value is calculated, the up down drive mechanisms A~D641~644 are controlled in order to remove disparity in a pitch angle and roll angle, and up down movement 649 is carried out. Rotation mechanism 640 is controlled and rotation movement 650 is carried out in order to remove disparity of a yaw angle.

Figure 32:
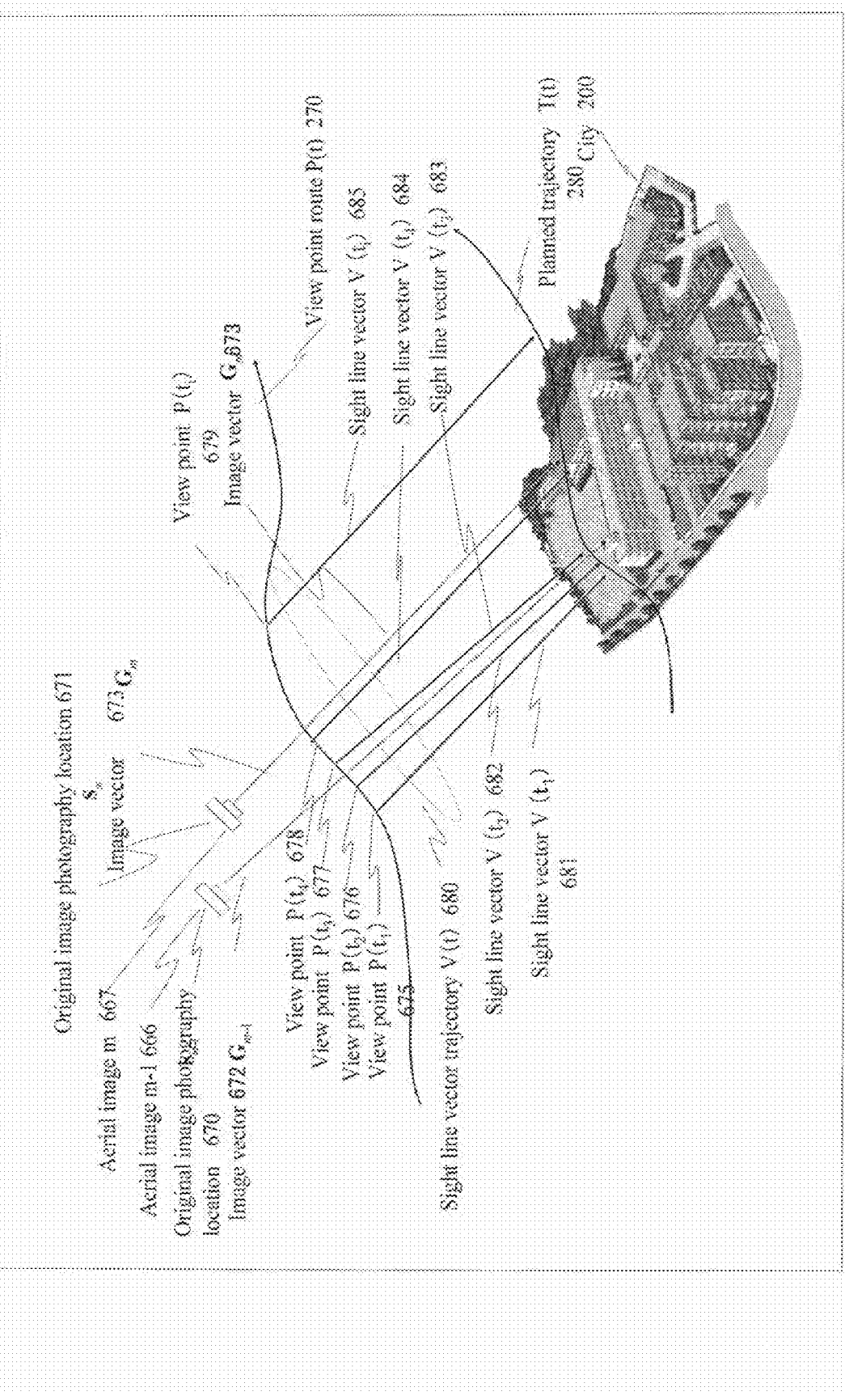
FIG. 32 is diagram for explaining variables for image generation by morphing using an actual image in the city landscape three dimensional visual data generation and browsing system of the present invention.

Next, an aerial video generation process in a city landscape three dimensional video amusement system is explained using FIG. 32 to FIG. 39. The concept and variables of aerial video image generation by morphing is explained using FIG. 32, and the entire process flow is explained based on the aerial video generation process flow of the city landscape three dimensional video amusement system in FIG. 33. In FIG. 32, view points move together with time t along a viewpoint route P(t) 270, and during this time, the ground surface is taken from a location on the view point route P(t) 270 along a target trajectory T(t) 280 by the sight line vector V(t1) to V(t4), V(t) from time t1 up to time t4, ti. In the present invention, as a method for generating city landscape three dimensional video with respect to the target trajectory T(t) 280 from the view point route P(t) 270, at times t1, t2, t3, an aerial image$_{m-1}$ 666 which has little disparity close to the sight line of view point P(t1) 675, view point P(t2) 676, is search using the aerial image database 130, between the sight line vectors V(t1) 681, V(t2) 682, V(t3) 683 of times t1, t2, t3, a difference in disparity with the image vector $G_{m-1}$ 672 is corrected by a morphing process on aerial image$_{m-1}$ 666, connected and smooth video images are generated. It is judged that a disparity due a difference in view points is smaller for the aerial image m than the aerial image$_{m-1}$ 666 from the sight line vector V(t4) at time t4, the aerial image$_m$ 667 is switched to the original image, and a city landscape three dimensional video is generated by correcting a disparity with the aerial image$_m$ 667 by a morphing process on the aerial image$_m$ 667 until the next original image following the sight line vector V (t4) at the time t4 is selected.

Figure 33:
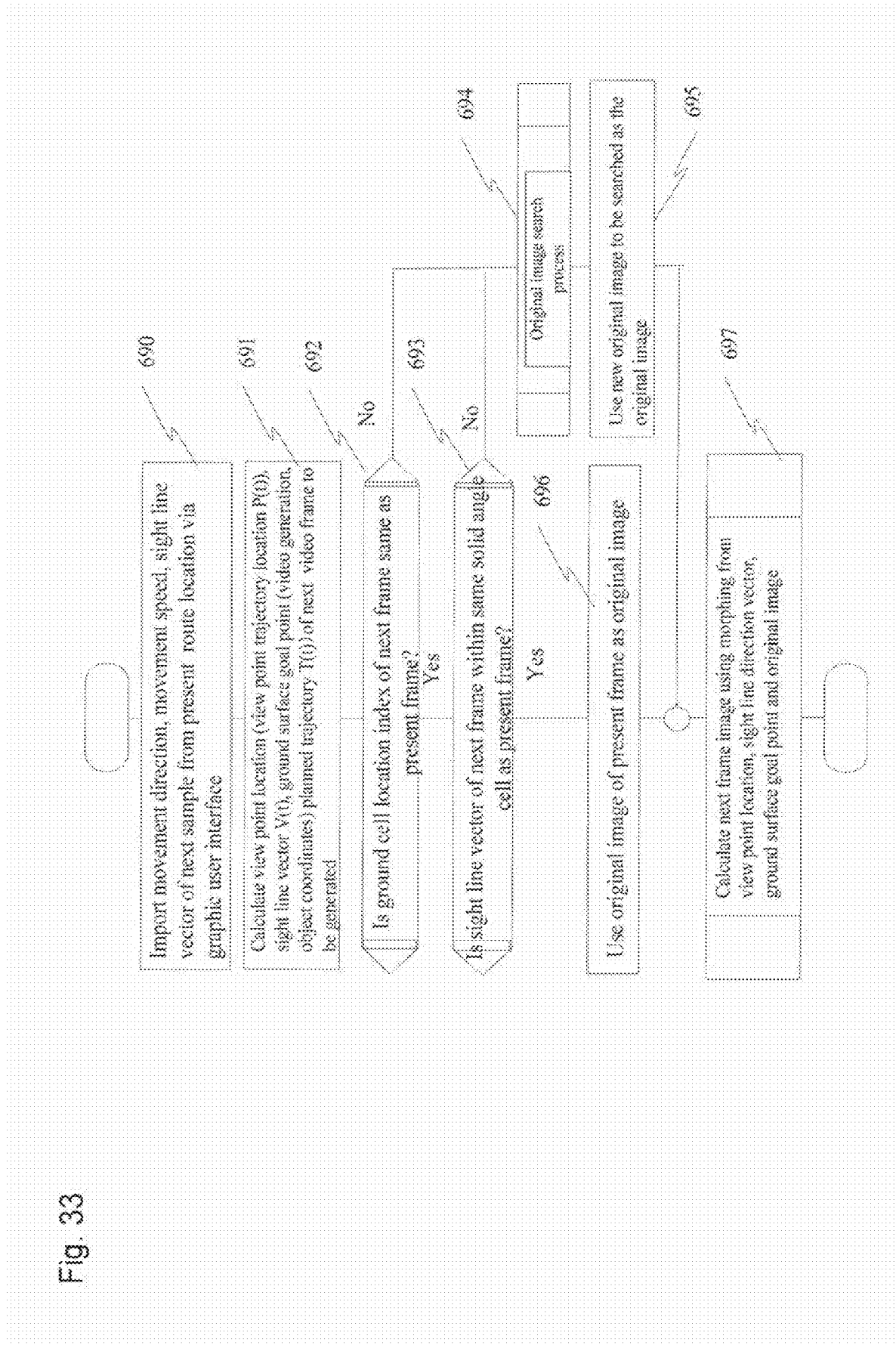
FIG. 33 is a diagram which shows an aerial image generation process flow in the city landscape three dimensional visual data generation and browsing system of the present invention.

FIG. 33 shows the above processes by a process flow, and movement direction, movement speed, location and sight line direction vector which should be calculated as the next video frame (next frame) are imported by graphic user interface 180 in process block 690. In process block 691, the view point location, sight line vector, desired point coordinates on the ground of the next frame are calculated based on this value. The process block 692 judges whether the ground index location of the next frame is the same as the present frame using the center points of the present frame and the next frame. In the case where they are not the same, it is necessary to search again the most suitable original image and move to process block 694. In the case where they are the same, in the process block 693 it is judged whether the sight line vector of the next frame is within the same solid angle cell of the present frame. Because it is judged whether direction of the sight line has changed to a certain extent from the present frame, in the case where it is judge that it is not within the same solid angle cell, it is necessary to search again the most suitable original image in the process block 694. The original image of the present continues to be used in the case where it is judged that it is within the same solid angle cell.

Figure 34:
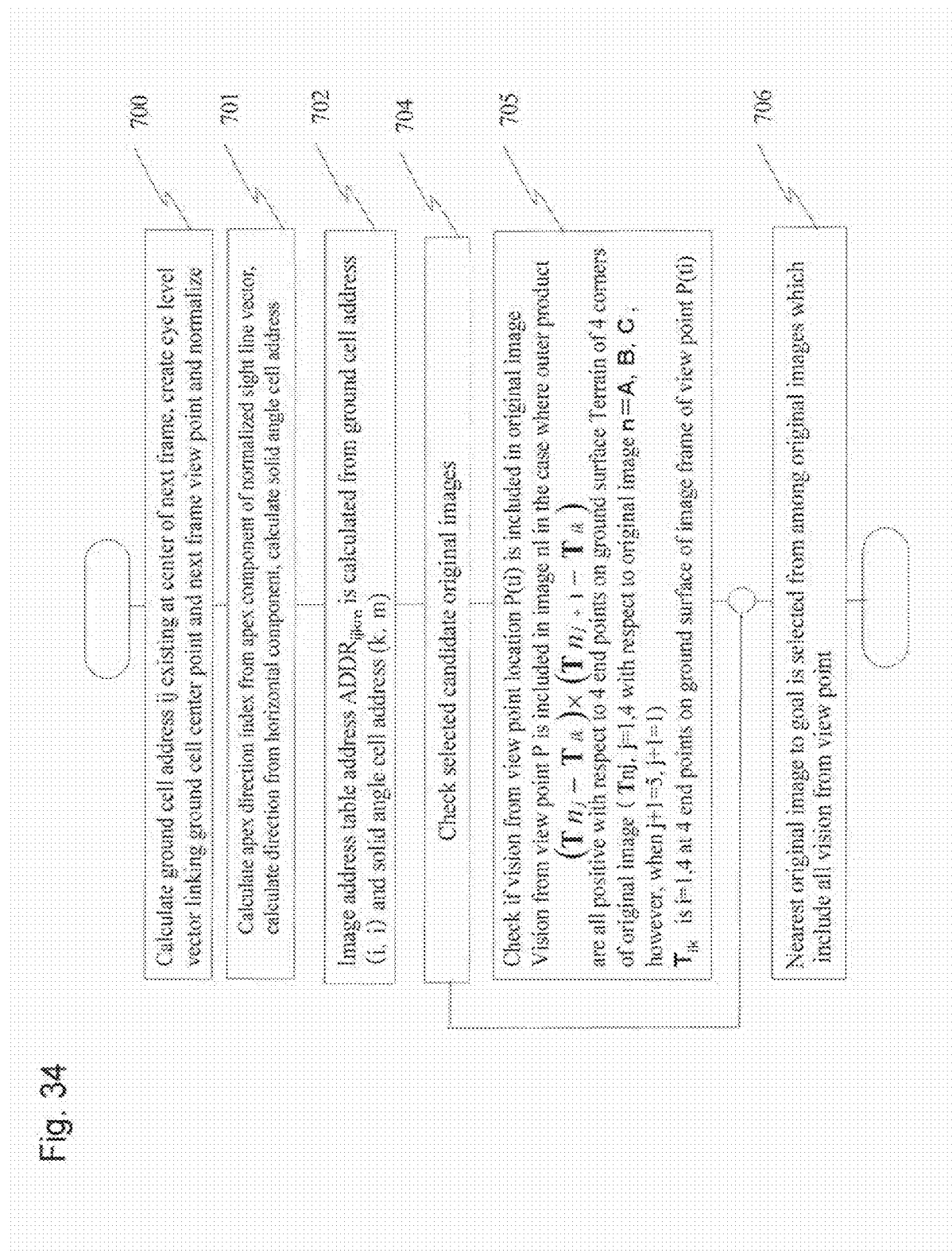
FIG. 34 is a diagram which shows an original image search process of a three dimensional visual data generation process using an actual image in the city landscape three dimensional visual data generation and browsing system of the present invention.
Figure 35:
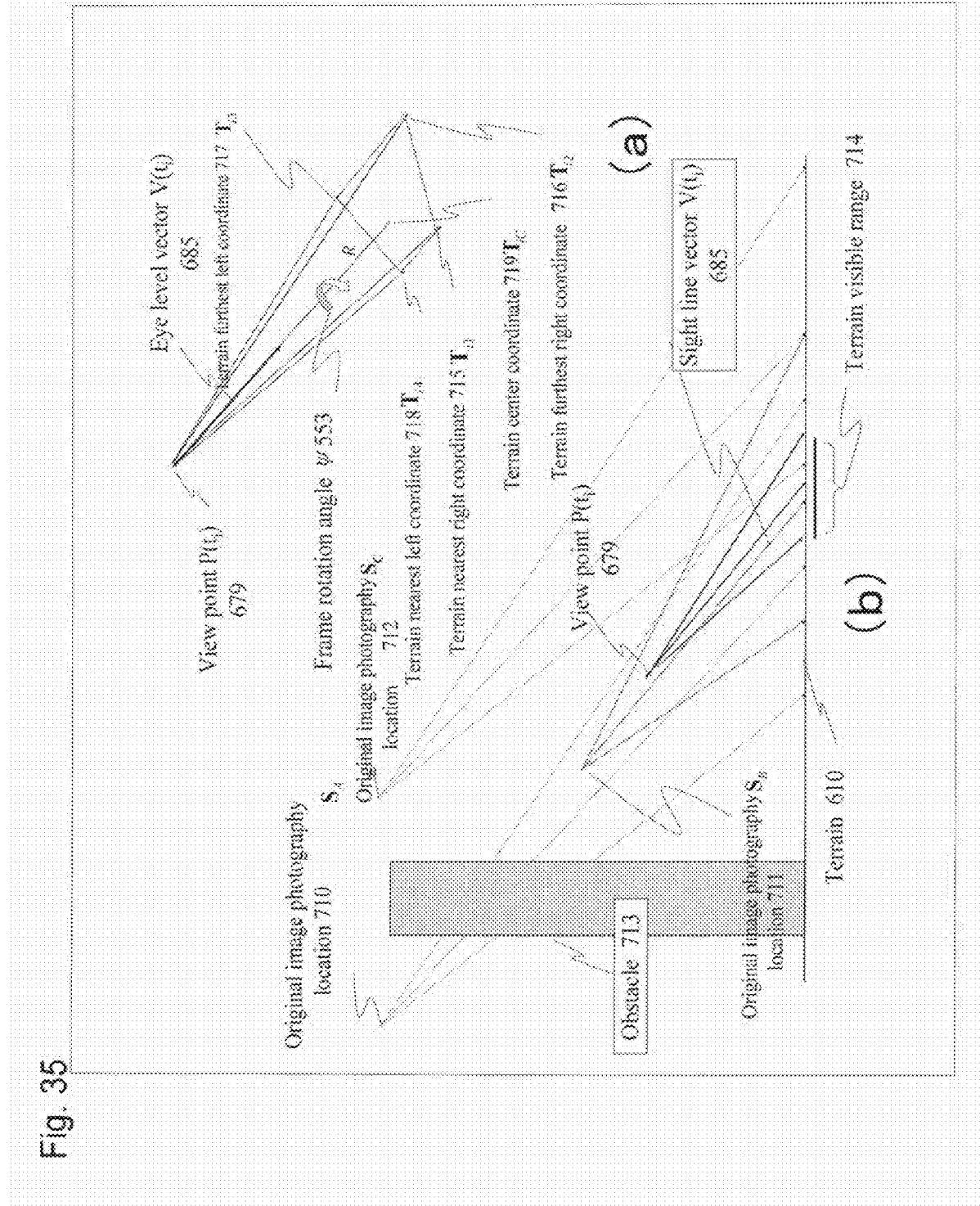
FIG. 35 is a diagram which shows an original image selection logic of a three dimensional visual data generation process of the present invention.

The process contents of the process block 694 are shown in more detail in the process flow of the original image search in the aerial video image generation of FIG. 34 and the original image selection logic diagram of the three dimensional video generation process in FIG. 35. In process block 700, the ground cell address (i, j) at the center of the next frame is calculated and a sight level vector which connects the center point and the view point of the next frame is created and normalized. From the process block 701 to 703, solid angle cell address (k, m) is calculated from this normalized sight line vector by referring to the apex index parameter table ZNPMRT597 and the direction index parameter table DRPRMT598, and the address ADDR$_{ijkm}$ of the image address table is calculated together with the ground cell address (i, i). Because an original image candidate shown by the first data of the image address table exists in the same solid angle cell address with respect to the same ground cell address, it is judged whether all original images are photographed with 4 corner points of vision from a view point P(ti) from among these in the process block 704 and process block 705. At (a) in FIG. 35, process block 705 judges whether all of four end points Ti1 715, Ti2 716, Ti3 717, Ti4 718 on the ground surface at an sight line of view point P (ti) are photographed in images from original image photography location S$_A$710, original image photography location S$_B$711, original image photography location S$_C$712, and this can easily be done by a vector outer product calculation. In the example of FIG. 35(b), only an image from original image photography location S$_A$710, original image photography location S$_B$711 is captured in all of four end points Ti1 715, Ti2 716, Ti3 717, Ti4 718 on the ground of the view pint P(ti). The shortest image of the nearest image focal length to the ground call address (i, j) is selected in the process block 706 as an original image after calculating all the original images which satisfy the conditions of process block 705. The image focal length is calculated as one data of the photography parameters of the aerial image database shown in FIG. 17, and selecting an original image with the shortest focal length is a process for removing obstacles which interrupt between the view point and goal.

Figure 36:
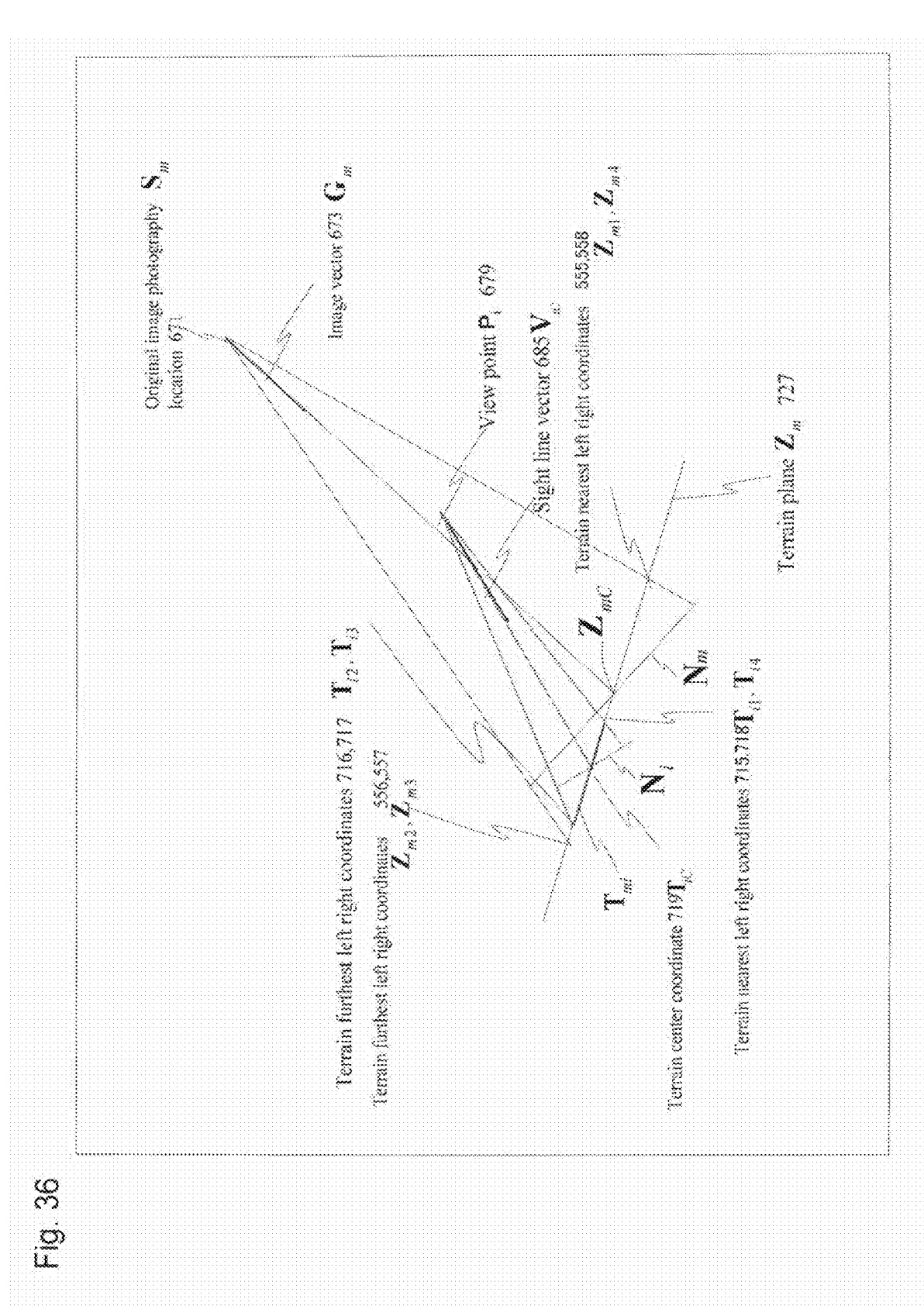
FIG. 36 is a diagram which shows the relationship between vision in a view point in the three dimensional visual data generation process and an actual image in the present invention.
Figure 37:
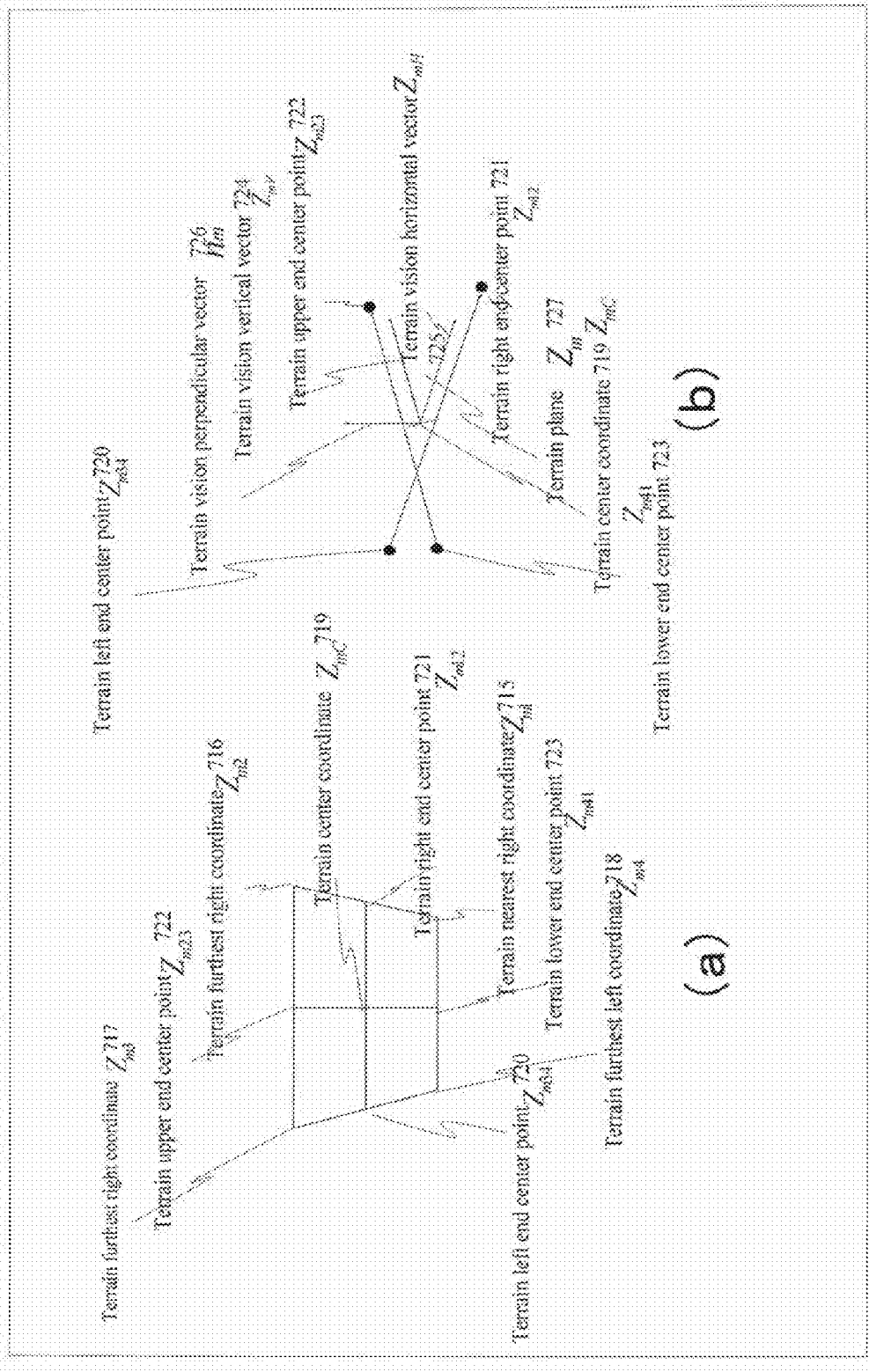
FIG. 37 is a diagram which shows the relationship between an eye vector and a terrain intersection point in the present invention.
Figure 38:
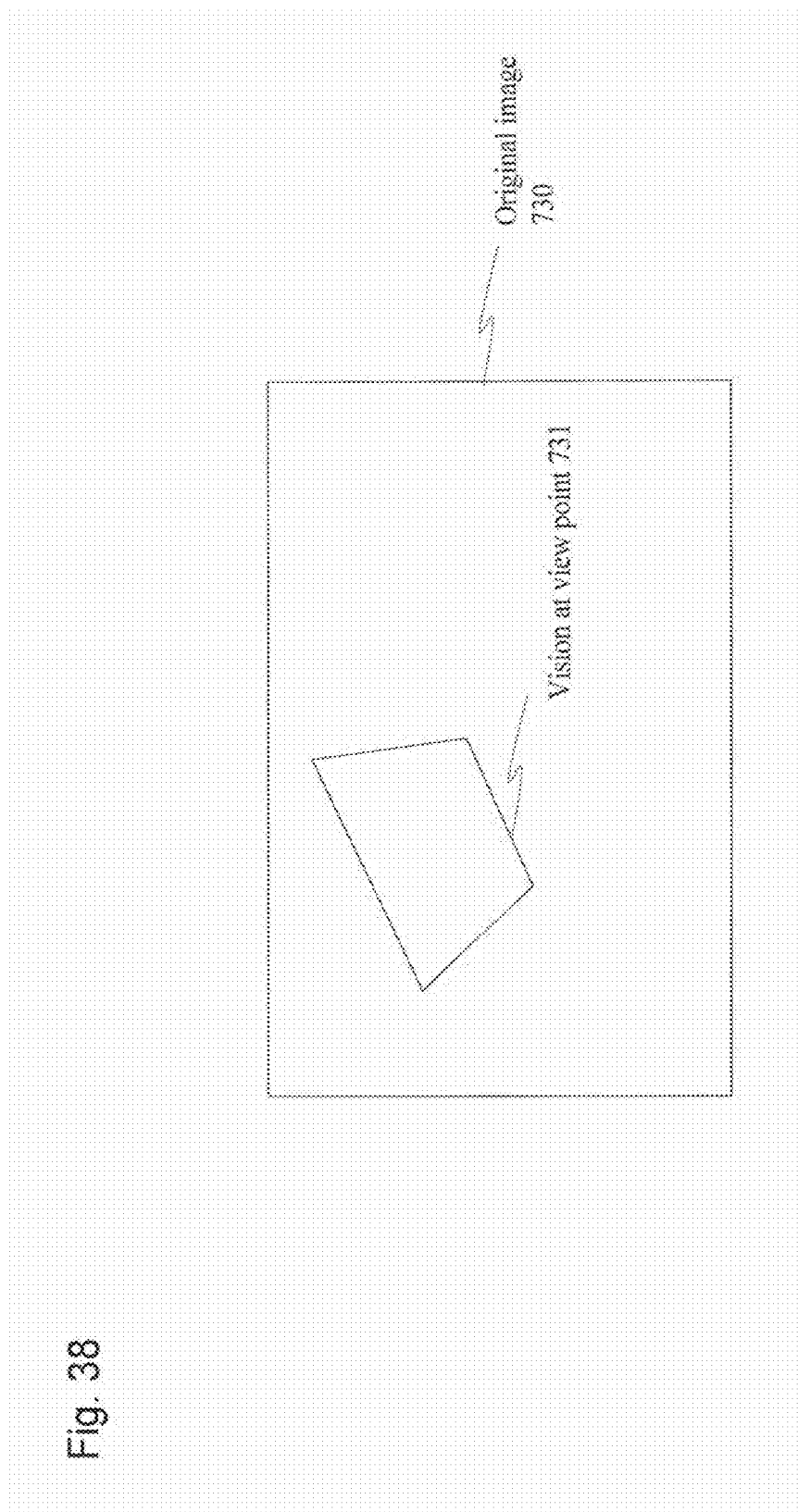
FIG. 38 is a diagram which shows the relationship between vision at a view point and an actual image in the present invention.
Figure 39:
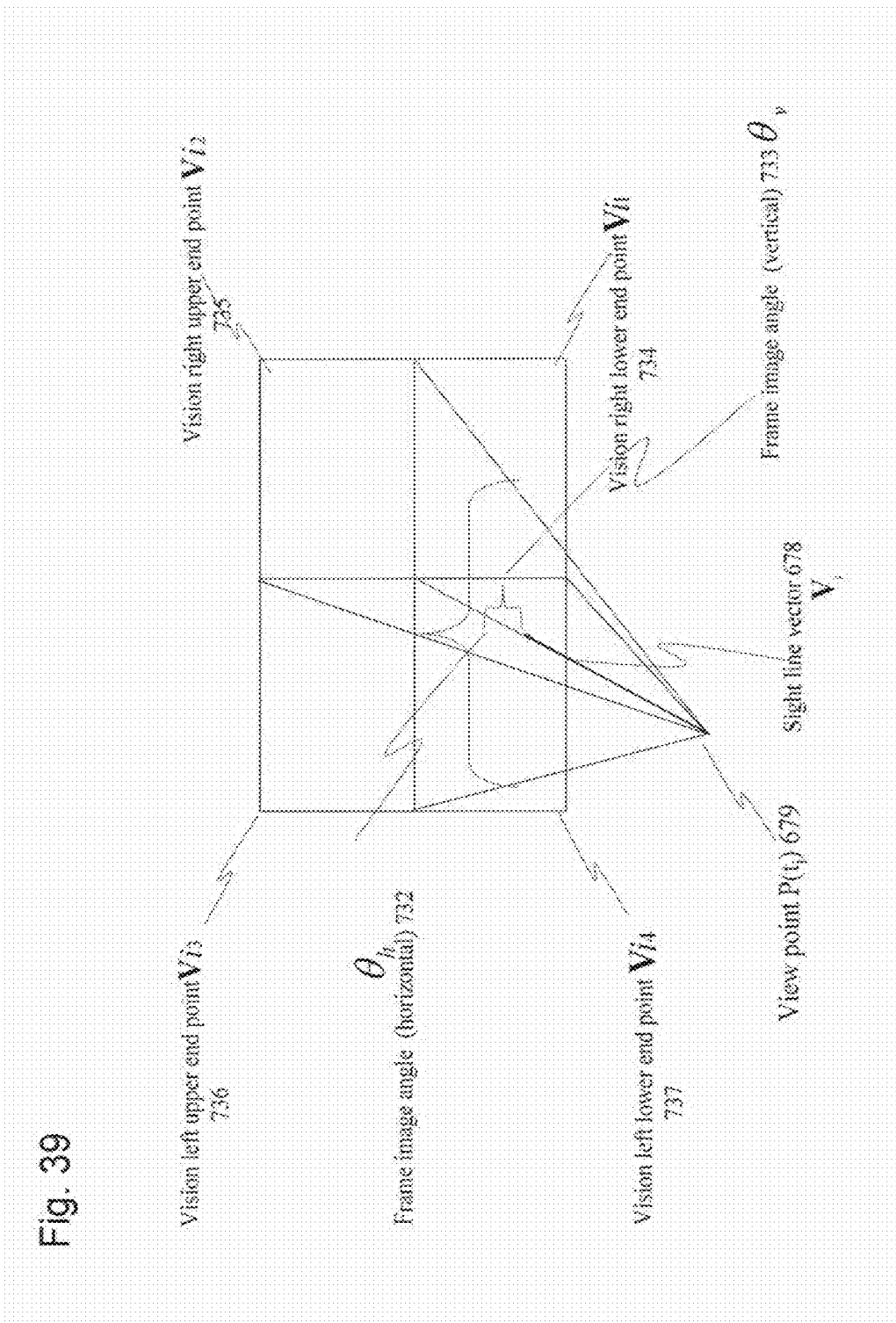
FIG. 39 is a diagram which shows vision from a view point $P(t_i)$ in the present invention.

Next, returning to FIG. 33, the contents of a morphing process in process block 697 are explained by the following text and equations while referring to FIG. 36. Furthermore, it is also possible to switch and display original images without morphing by omitting process block 697. When an original image photography location $S_m$ 671, image vector $G_m$ 673 (norm=1) and terrain (ground surface) are decided with respect to an original image$_m$, vector $G_m$ 673 and DEM intersection point $Z_{mc}$ and four corners of an image and terrain intersection point $Z_{m1}$, $Z_{m2}$, $Z_{m3}$, $Z_{m4}$ are decided. As is shown in FIG. 37, generally, because $Z_{m1}$, $Z_{m2}$, $Z_{m3}$, $Z_{m4}$ are not on the same plane, a vector which is parallel to a vector which passes through $Z_{mc}$, and passes through the center point $Z_{m23}$ of $Z_{m2}$, $Z_{m3}$ and passes through the center point $Z_{m41}$ of $Z_{m1}$ and $Z_{m4}$ is defined as $Z_{mV}$, $$Z_{mV} = \overrightarrow{Z_{m41}Z_{m23}} \quad \text{[equation 10]}$$

A vector which is parallel to a vector which passes through $Z_{mc}$, and passes through the center point $Z_{m12}$ of $Z_{m1}$ and $Z_{m2}$ and passes through the center point $Z_{m34}$ of $Z_{m3}$ and $Z_{m4}$ is defined as $Z_{mH}$.

$$Z_{mH} = \overrightarrow{Z_{m34}Z_{m12}} \quad \text{[equation 11]}$$

A surface which passes through $Z_{mc}$ and is defined by (vector) $Z_{mV}$ and (vector) $Z_{mH}$ is called a terrain plane (plane) and is expressed as $Z_m$. A perpendicular line of (plane) $Z_m$ is given as (vector) nm (norm=1). A plane perpendicular to $G_m$ which passes through $Z_{mc}$ is called (plane) $N_m$. (plane) $N_m$ is a photographed image (vision) from an original image photograph location view point $S_m$. A conversion (plane) $Z_m$--> (plane) $N_m$ exists and this is called $\phi_A$. This is a photography action of an original image$_m$. When a view point coordinate Pi and sight line vector Vi (norm=1) and terrain plane $Z_m$ (common) are decided with respect to a view point Pi, similarly, $T_{iC}$ and $T_{i1}$, $T_{i2}$, $T_{i3}$ are decided. A plane perpendicular to sight line vector Vi which passes through $T_{iC}$ is called Ni. Plane $T_{mi}$ forms one part of $Z_m$ at sight line by the view point Pi within terrain surface $Z_m$. If view point Pi and (vector) Vi and vision angle θi are decided then vision (plane) Ni of view point Pi and (plane) Tmi are uniquely decided. If original image photography location view point $S_m$ and (vector) $G_m$ and image angle θm of original image$_m$ are decided, then a map to (plane) Nm of Tmi is uniquely decided. If each pixel corresponding to θi of (plane) Ni is correlated with a pixel corresponding with θm of (plane) Nm by the correspondence of (plane) Ni->(plane) $T_{mi}$->(plane) Nm, then the morphing algorithm is complete.

Generally, an arbitrary point X on terrain plane Zm is expressed by:

$$X = aZ_{mV} + bZ_{mH} + Z_{mC} \quad \text{[equation 12]}$$

Here, when the perpendicular line conditions:

$$n_m \cdot Z_{mV} = 0$$

$$n_m \cdot Z_{mH} = 0 \quad \text{[equation 13]}$$

are substituted, $$n_m \cdot X = n_m \cdot Z_{mC} \quad \text{[equation 14]}$$

is obtained. Here, an inner product is expressed as ".". An intersection point $T_{iC}$ of a center line of vision $V_{iC}$ and terrain plane $Z_m$ is $T_{iC}$, and $$X = P_i + cV_{iC} \quad \text{[equation 15]}$$

is satisfied, replacing this with:

$$n_m \cdot (P_i + cV_{iC}) = n_m \cdot Z_{mC} \quad \text{[equation 16]}$$

we obtain:

$$c = \frac{n_m \cdot Z_{mc} - n_m \cdot P_i}{n_m \cdot V_{iC}} \quad \text{[equation 17]}$$

and the coordinates at the terrain plane $Z_m$ of the image center point of the view point Pi is calculated from:

$$X = P_i + \frac{n_m \cdot Z_{mc} - n_m \cdot P_i}{n_m \cdot V_{iC}} V_{iC} = T_{iC} \quad \text{[equation 18]}$$

Similarly, a normalized sight line vector of 4 corners of vision of view point Pi is given as Vi1, Vi2, Vi3, Vi4, and it is possible to calculate the coordinates of these and a the intersection point Ti1 of terrain plane Zm, Ti2, Ti3, terrain plane Zm of Ti4. Furthermore, a conversion of these coordinates to the plane of Nm is calculated. An arbitrary point X on terrain plane Zm is expressed by:

$$X = aZ_{mV} + bZ_{mH} + Z_{mC} \quad \text{[equation 19]}$$

and with $$n_m \cdot Z_{mV} = 0$$

$$n_m \cdot Z_{mH} = 0, \quad \text{[equation 20]}$$

which is a condition for being perpendicular, and $$X = P_i + cV_{ik} \quad \text{[equation 21]}$$

for $V_{i1}$, $V_{i2}$, $V_{i3}$, and $V_{i4}$ of normalized vectors to 4 corners, where k=1, 4 is satisfied.
From $$n_m \cdot (P_i + cV_{ik}) = n_m \cdot Z_{mC} \quad \text{[equation 22]}$$

we obtain $$c = \frac{n_m \cdot Z_{mc} - n_m \cdot P_i}{n_m \cdot V_{ik}} \quad \text{[equation 23]}$$

and by $$X = P_i + \frac{n_m \cdot Z_{mc} - n_m \cdot P_i}{n_m \cdot V_{ik}} V_{ik} = T_{ik} \quad \text{[equation 24]}$$

the coordinates at the terrain plane $Z_m$ of the four corner points of the view point Pi are calculated. By correlating these coordinates on the plane $Z_m$ with the coordinates on the plane $N_m$, it is possible to know which point on plane $Z_m$, which is the original image should be reflected on the image of the view point Pi. The center of an image of the view point $P_m$ on (plane) $Z_m$ and the coordinates of the four corner points $T_{iC}$, $T_{i1}$, $T_{i2}$, $T_{i3}$, $T_{i4}$ (together given as $T_{ik}$, k=1, 2, 3, 4, c) correspond to $Q_{iC}$, $Q_{i1}$, $Q_{i2}$, $Q_{i3}$, $Q_{i4}$ (together given as $Q_{ik}$, k=1, 2, 3, 4, c) on (plane) $N_m$. When a horizontal line of an image on (plane) $N_m$ surface is given as (vector) $N_H$, and a perpendicular line as (vector) $N_V$, an arbitrary point Y on $N_m$ is expressed as:

$$Y = Q_{ik} = aN_H + bN_V + Z_{mC} \quad \text{[equation 25]}$$

with respect to an arbitrary constant a, b. Because an image vector $G_m$ is perpendicular to (vector) $N_H$, (vector) $N_V$, we obtain:

$$G_m \cdot N_H = 0$$

$$G_m \cdot N_V = 0 \quad \text{[equation 26]}$$

and because $Q_{ik}$ and $T_{ik}$ are on the same line seen from the image photography location $S_m$ and $$Q_{ik} = d(T_{ik} - S_m) + S_m \quad \text{[equation 27]}$$

and therefore we obtain $$d(T_{ik} - S_m) + S_m = aN_H + bN_V + Z_{mC} \quad \text{[equation 28]}$$

and by taking an inner product with $G_m$ we obtain $$d = \frac{Z_{mc} \cdot G_m - S_m \cdot G_m}{(T_{ik} - S_m) \cdot G_m} \quad \text{[equation 29]}$$

and therefore we obtain $$d(T_{ik} - S_m) + S_m = aN_H + bN_V + Z_{mC} \quad \text{[equation 30]}$$

Because $T_{ik}$ is already calculated as $$T_{ik} = P_i + \frac{n_m \cdot Z_{mc} - n_m \cdot P_i}{n_m \cdot V_{ik}} V_{ik} \quad \text{[equation 31]}$$

Here, correspondence with an image of an original image$_m$ of the field of view of the view point Pi is complete.

Next, a conversion which maps (vector) $G_m$ to a axis is calculated. Here, by stipulating $$\|G_m\| = 1$$

$$G_m = (V_{Ax}, V_{Ay}, V_{Az}) \quad \text{[equation 32]}$$

with a rotation around z axis, a placement on a yz plane, and then a rotation around a y axis, a matching with the z axis is obtained. The rotation around z axis is given as:

$$\begin{pmatrix} \frac{V_{Ax}}{\sqrt{V_{Ax}^2 + V_{Ay}^2}} & \frac{V_{Ay}}{\sqrt{V_{Ax}^2 + V_{Ay}^2}} & 0 \\ -\frac{V_{Ay}}{\sqrt{V_{Ax}^2 + V_{Ay}^2}} & \frac{V_{Ax}}{\sqrt{V_{Ax}^2 + V_{Ay}^2}} & 0 \\ 0 & 0 & 1 \end{pmatrix} \quad \text{[equation 33]}$$

Next, the rotation around y axis is given as:

$$\begin{pmatrix} V_{Az} & 0 & -\sqrt{V_{Ax}^2 + V_{Ay}^2} \\ 0 & 1 & 0 \\ \sqrt{V_{Ax}^2 + V_A y^2} & 0 & V_{Az} \end{pmatrix} \quad \text{[equation 34]}$$

By combining both rotation, we obtain $$\begin{pmatrix} \frac{V_{Ax}}{\sqrt{V_Ax^2 + V_Ay^2}} & \frac{V_{Ay}}{\sqrt{V_Ax^2 + V_Ay^2}} & 0 \\ -\frac{V_{Ay}}{\sqrt{V_{Ax}^2 + V_{Ay}^2}} & \frac{V_{Ax}}{\sqrt{V_{Ax}^2 + V_{Ay}^2}} & 0 \\ 0 & 0 & 1 \end{pmatrix} \quad \text{[equation 35]}$$

$$\begin{pmatrix} V_{Az} & 0 & -\sqrt{V_{Ax}^2 + V_{Ay}^2} \\ 0 & 1 & 0 \\ \sqrt{V_{Ax}^2 + V_{Ay}^2} & 0 & V_{Az} \end{pmatrix} =$$

$$\begin{pmatrix} \frac{V_{Ax} V_{Az}}{\sqrt{V_{Ax}^2 + V_{Ay}^2}} & \frac{V_{Ax} V_{Az}}{\sqrt{V_{Ax}^2 + V_{Ay}^2}} & -\sqrt{V_{Ax}^2 + V_{Ay}^2} \\ -\frac{V_{Ay}}{\sqrt{V_{Ax}^2 + V_{Ay}^2}} & \frac{V_{Ax}}{\sqrt{V_{Ax}^2 + V_{Ay}^2}} & 0 \\ V_{Ax} & V_{Ay} & V_{Az} \end{pmatrix}$$

When a conversion is made to map $G_m$ to z axis with respect to intersection point $Q_{ik}$ (k=1, 2, 3, 4, C) of plane $N_m$, $Q_{ik}$ (k=1, 2, 3, 4, C) are mapped to a point on the xy surface. This corresponds to a location on an image of the original image, that is, morphing.

The explanation related to aerial three dimensional video generation of the city landscape three dimensional video generation amusement system of the present invention is complete. Next, the same technology applied to road three dimensional video generation of the city landscape three dimensional video generation amusement system is explained.

A three dimensional video is generated as seen from a human eye from an arbitrary place on a road or passageway, and from an arbitrary sight line direction with respect to an arbitrary city place. In the road three dimensional video generation, three dimensional videos are generated related to structure in a city space the same as aerial three dimensional video generation or three dimensional video is generated using an actual image without generating a three dimensional model. Compared to in the air, where sight line can be freely specified, the level of freedom is less on a road and while existing places are limited to 1.7 m above ground on passageways, because passageways have a different structure to terrain models by DEM, passageways can be modeled by graph expression. In the case of aerial photographs, as a terrain is used as a projection plane of images, in the method of the present invention a projection plane of an actual image photographed in advance must be set.

As a result of examining the range of possible movement of a view point and sight line of a human, it is preferred that an original image photographed on a road of a vertical plane along a boundary line of an urban area other than a passageway is mainly converted to a projection plane, and a vertical surface which is separated a fixed distance and which intersects a road with respect to a forward direction view or rear direction view is supplementarily converted to a projection plane. Because in the method of the present invention photographs of urban landscape at an arbitrary sight line from an arbitrary point on a road are taken in advance, a digital camera group which photographs in 8 or 16 directions of the entire circumference in a horizontal direction, and across 8 or 16 directions of the entire circumference in an oblique direction which is an angle of elevation from horizontal, is arranged on the roof of a vehicle, and a road image database is constructed. Furthermore, the oblique direction may be omitted by using a wide angle lens.

Video image generation is formed by a process for selecting the most suitable original image, and by a process for generating a smooth video image by morphing using a movement state of a view point, sight level direction and location within a city.

Figure 40:
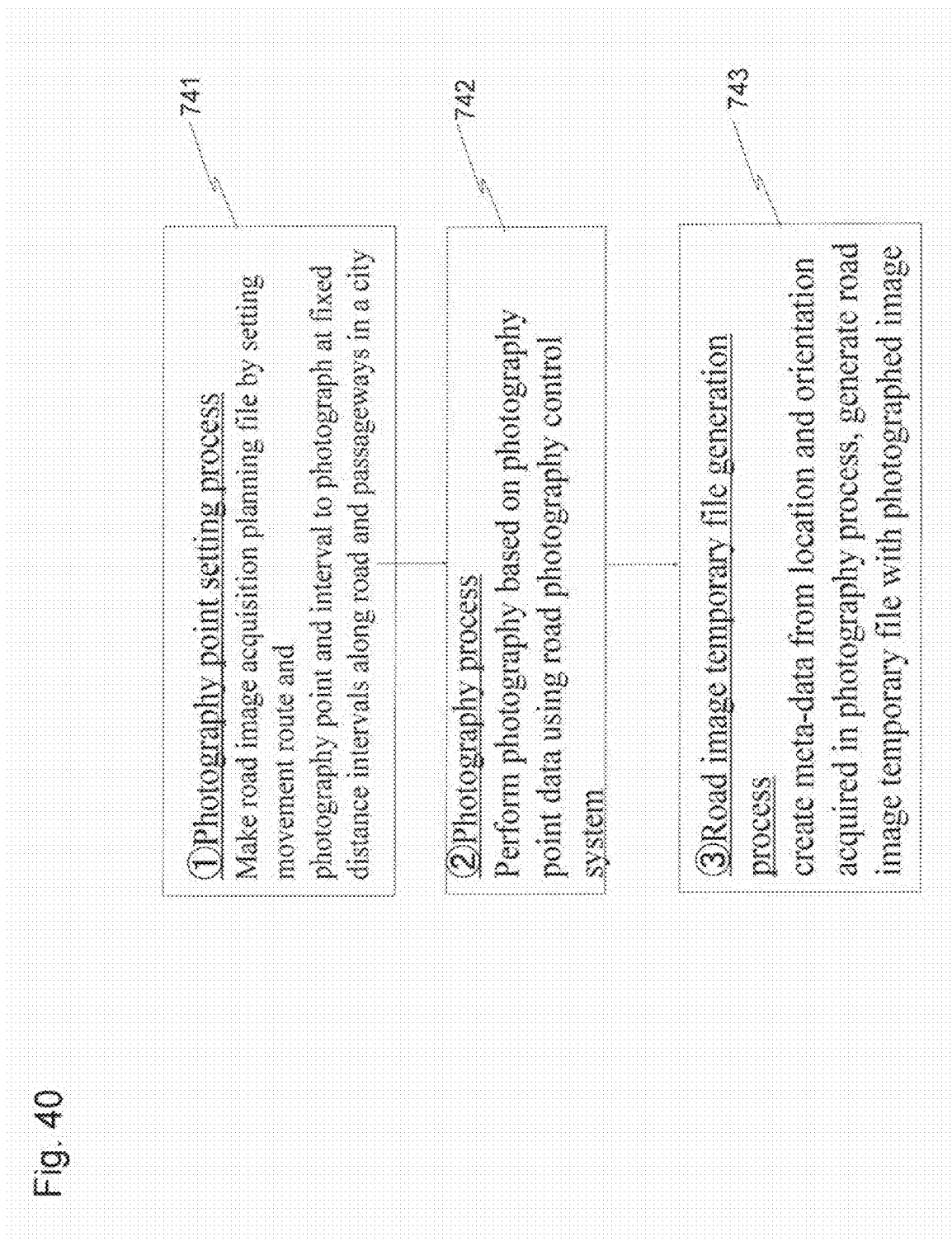
FIG. 40 is a diagram which shows a process flow of a road image acquisition system of the present invention.
Figure 55:
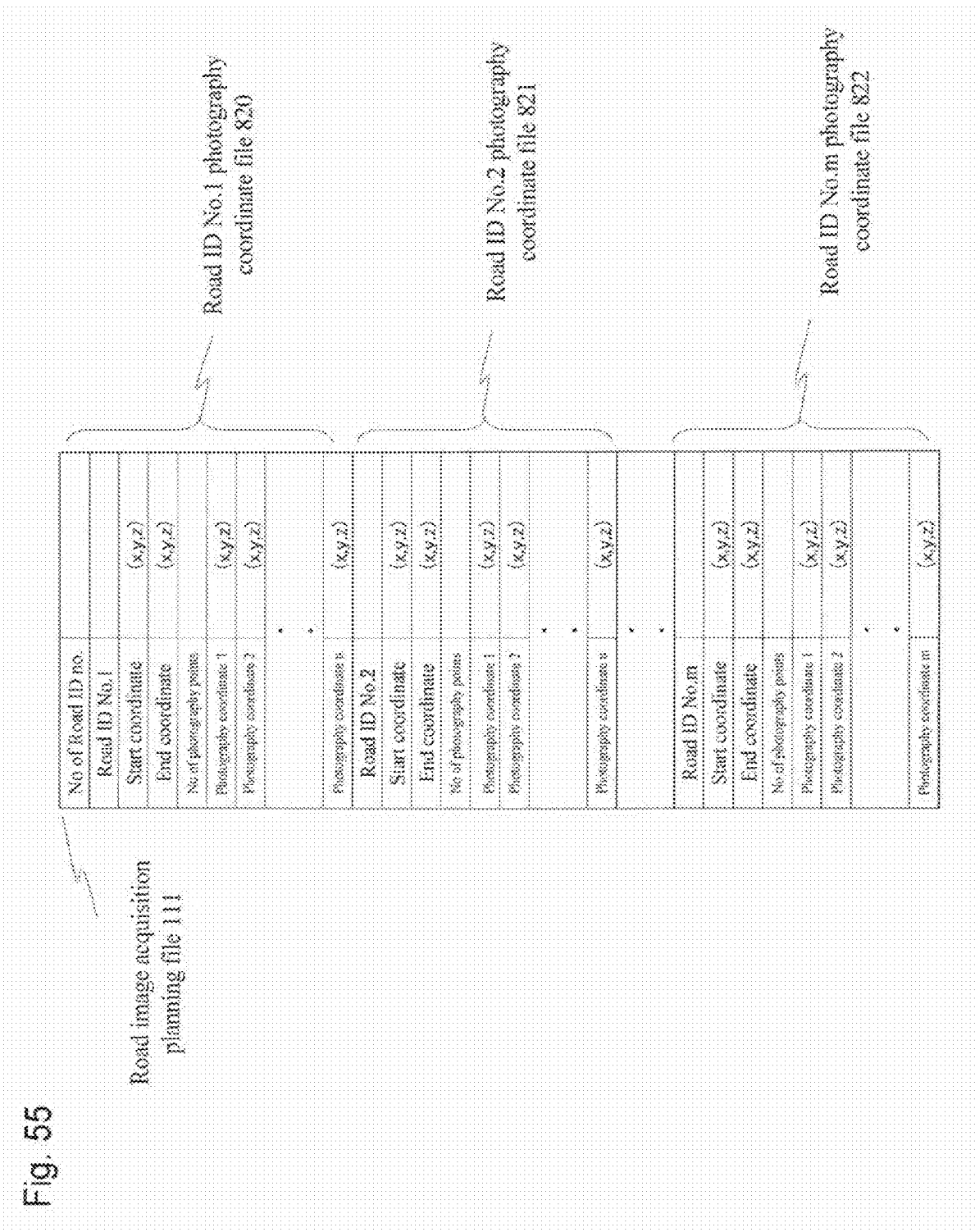
FIG. 55 is a diagram which shows a structural example of a road image acquisition planning file of the present invention.

Below, the road image acquisition system 110, the road image database generation registration system 130, the road image database 150 and the road three dimensional video generation system 170 are explained in order according to the city landscape three dimensional video amusement system structure. FIG. 40 describes a process flow of a road image acquisition system, and a detailed realization method of this road image acquisition system 110 is explained up to FIG. 59. First, in the photography point setting process 741, in order to be able to photograph at fixed distance intervals along roads and passageways within a city, movement route and photography points or intervals are set and the road image acquisition planning file 111 shown by the structure in FIG. 55 is made. In this photography plan a road ID No. and photography points on a road are defined. Because it is necessary to strictly define descriptions related to the structure of a road including a road ID No. these are described later. Next, a judgment is made in the photography process 742 whether a vehicle 803 has reached a photography point 766 shown in FIG. 42 stipulated by the road image acquisition planning file 111, and photography is performed by the road photography control system 806 shown in FIG. 53. A photographed image within a digital camera is accumulated in the primary road image file 112 together with a location and orientation data acquired in the photography process for each timing determined in advance.

Figure 41:
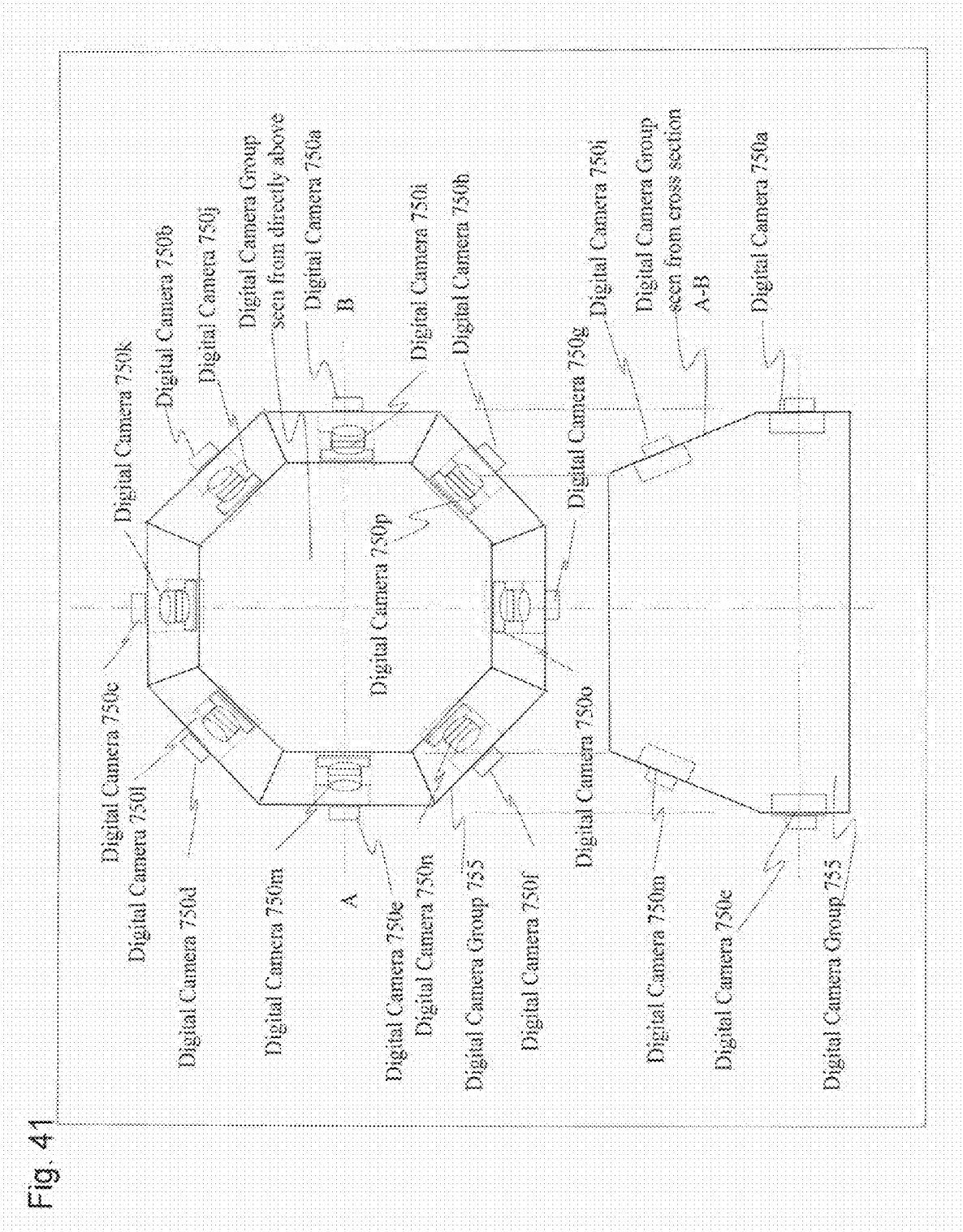
FIG. 41 is a diagram which shows a structural example of a vehicle installed digital camera group of the present invention.

FIG. 41 is a diagram which shows an example structure of a digital camera group 755, which forms the road image acquisition system 110 of the present invention. Horizontal direction digital cameras 750*a~h* are arranged radially so that the entire circumference is split into equal intervals with the aim of densely and efficiently performing photography from various view points on a road, and digital cameras 750*i~p* are arranged with the aim of photographing in an oblique direction of the digital cameras 750*a~h*, forming a digital camera group. Because a support structure other than the digital cameras 750*a~p* which form the digital group 755 requires a high level of photography accuracy, any structure can be used as long as it is light weight and provides a high level of rigidity, and can be formed by a honeycomb structure aluminum plate or carbon resin.

Figure 42:
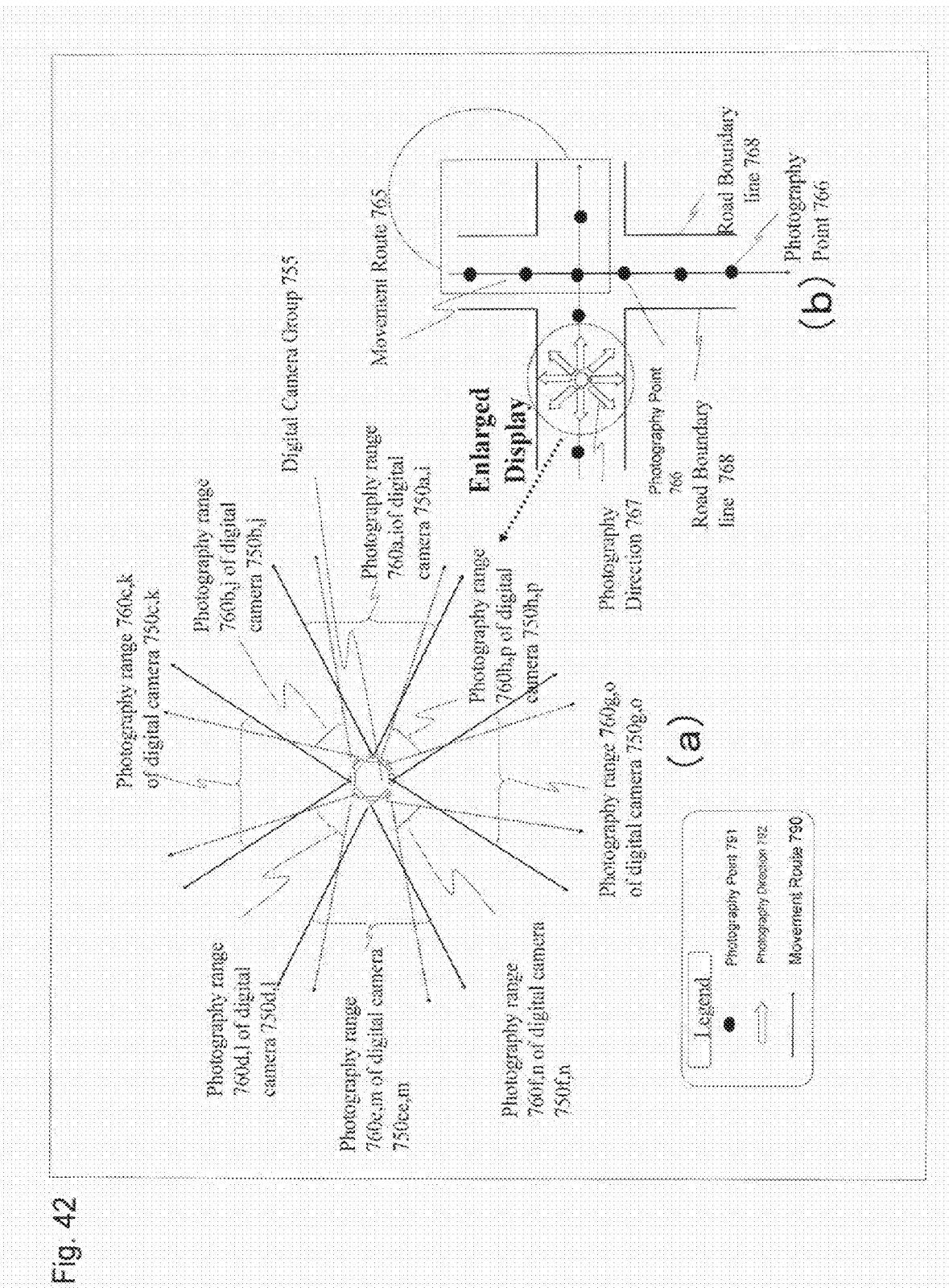
FIG. 42 is a diagram which shows a setting example and photographic ranges of routes and photographic points in the road image acquisition system.

FIG. 42 shows an example of setting of a route and photographic points of the road image acquisition system by a vehicle. FIG. 42 (*b*) shows an example of setting of photographic points 766. The road image acquisition system 765 performs photography at photography points 766 while moving along a road according to photography points 766 formed finely in a row shape on a road by the road image acquisition planning file 111. The mutual intervals between photographic points 766 are selected by three dimensional video generation system morphing so that a photographed image becomes a smooth video. In the case of photographing using the digital camera group 755, the photography range shown by the photography range 760*a~p* of the digital cameras 750*a~p* in FIG. 42(*a*) is photographed. The range photographed by each digital camera of the photography range 760*a~p* of the digital cameras 750*a~p* and level of mutual overlapping changes according to the setting of a focal length of a lens. From the goal of the present invention, it is preferred that the cameras are set so that the ground surface is almost consecutively covered while slightly overlapping each other.

Figure 43:
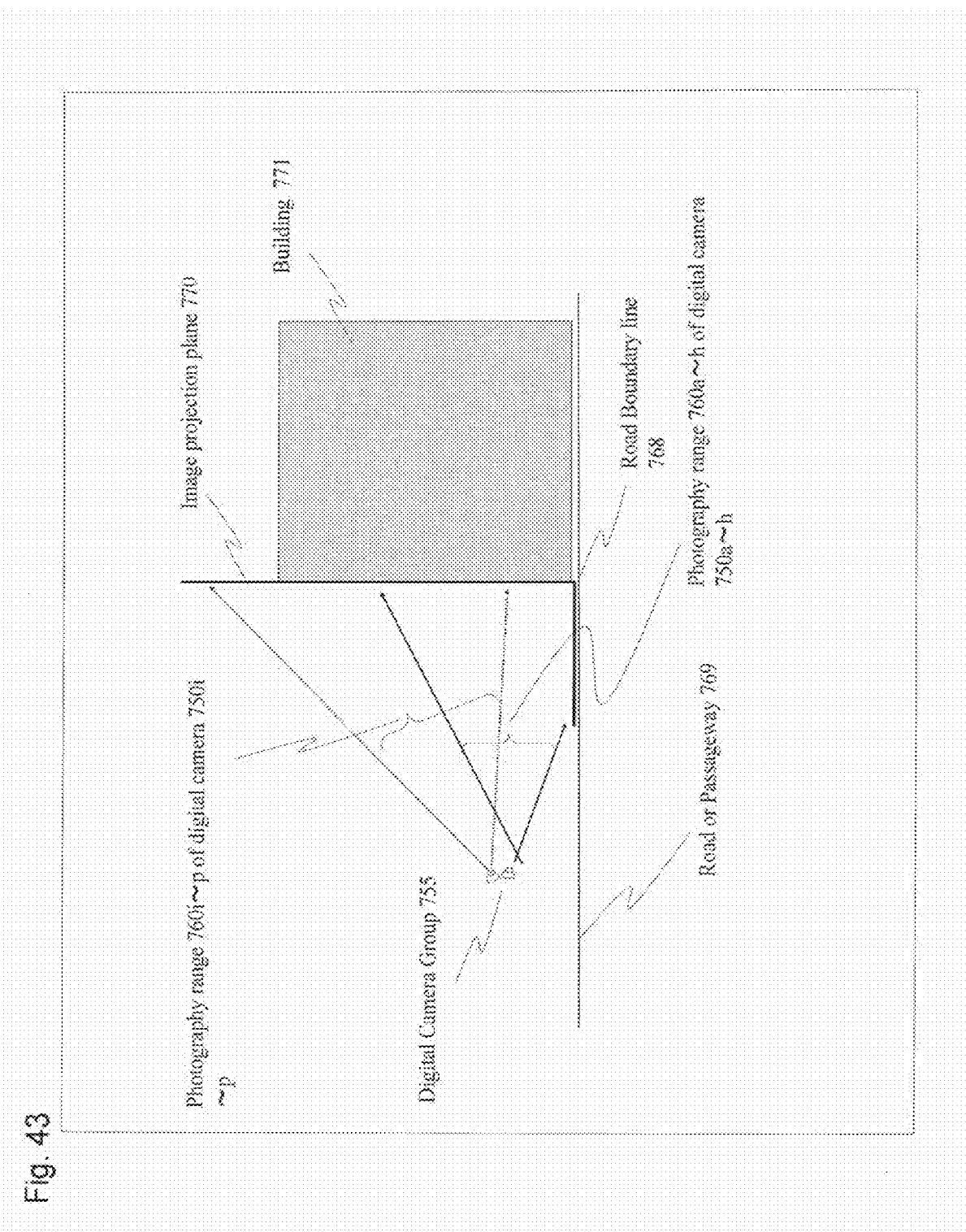
FIG. 43 is a diagram which shows the relationship between a vertical direction photographic pattern and an image projection plane in the road image acquisition system.

FIG. 43 shows the relationship between a vertical direction photography pattern and image projection plane of the road image acquisition system. While a projection plane of the image photographed in aerial three dimensional video generation is a terrain, in the road three dimensional video generation a human eye is the realization object and therefore terrain can not be used for a projection plane. In addition, because a photographed image is also data in a horizontal direction and elevation angle, a projection plane of an image photographed from the road is a surface which stands perpendicular to a boundary line between roads and buildings as is shown in FIG. 43. A boundary line between roads and buildings may approximately also be a boundary surface of a road. The definition of an image projection plane is the definition of a road and must be strictly defined and turned into a database, and this is explained later. In addition, in this method a road can be anywhere regardless of the transport capabilities of a vehicle as long as it is a road at human sight line and a below ground level road or a road within a building can be used as long as there is a passageway for people. In FIG. 43 an example is shown of a photography range and direction of the digital cameras 750*i~p* and a photography range and direction of the digital cameras 750*a~h*.

In the road three dimensional video generation system of the city landscape of the three dimensional video amusement system of the present invention, a boundary surface of a road or passageway is turned into a projection plane of an image and due to this relationship the original image of a video image must be able to be searched from any place on a road and also registered. High speed is required for searching, and the image must be able to be searched from various directions at human sight line and registered. A road database system which achieves this goal is explained in FIG. 44 to FIG. 52. The descriptions here form the technical basis of the road three dimensional video generation system.

Figure 44:
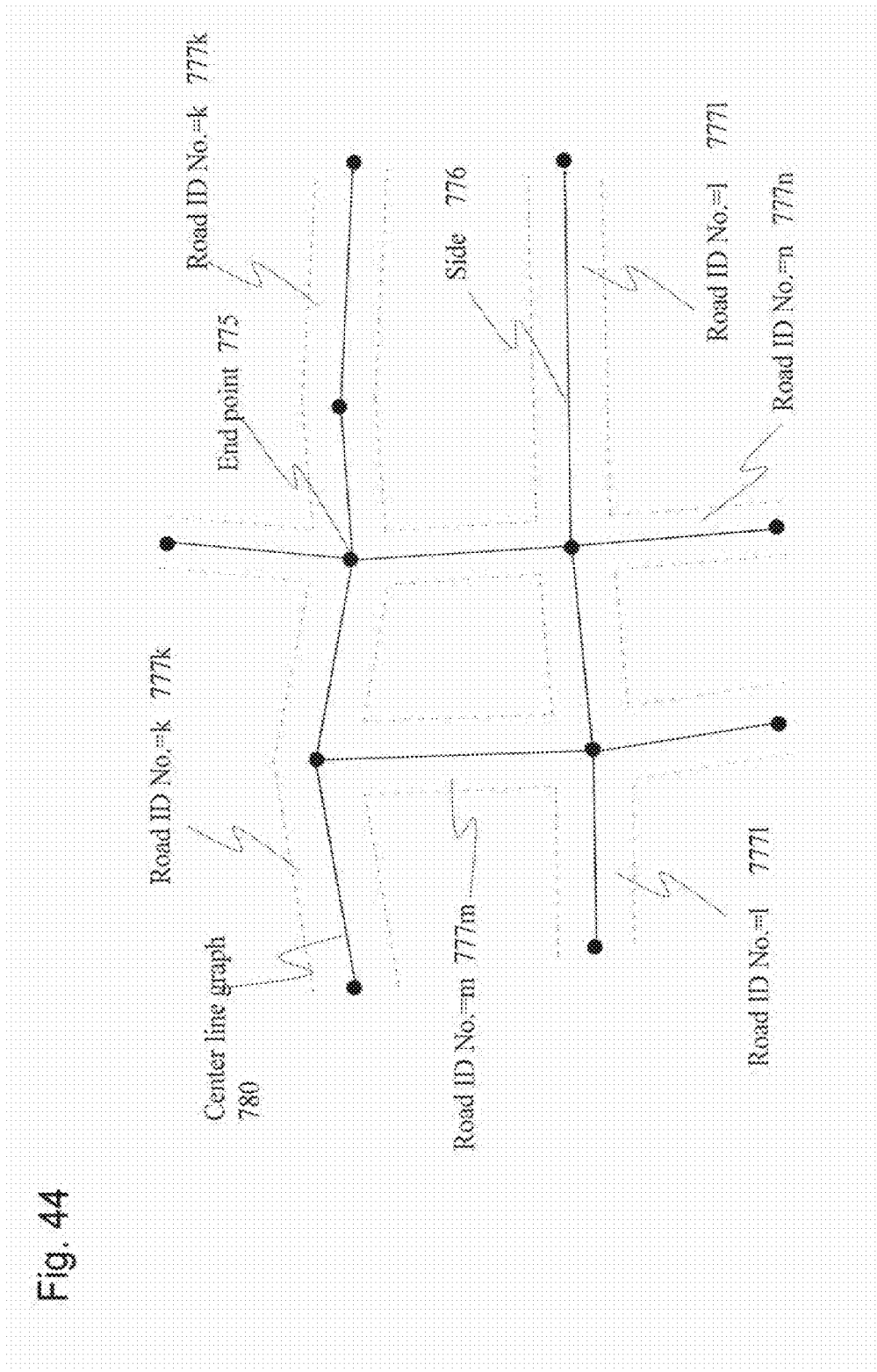
FIG. 44 is a diagram for explaining road descriptions using a graph in the present invention.
Figure 45:
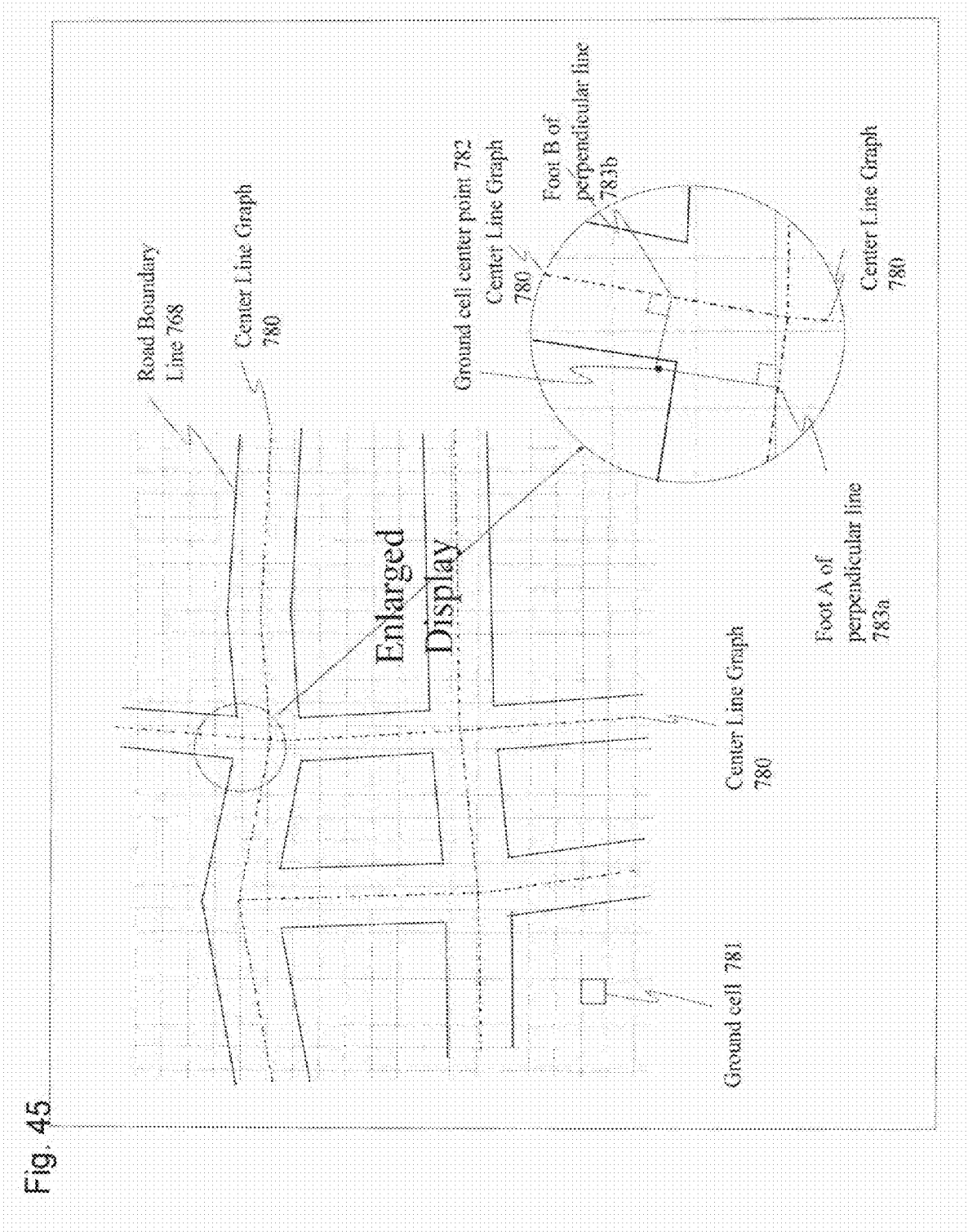
FIG. 45 is a diagram for explaining a road search method using latitude and longitude in the present invention.

FIG. 44 shows a description method of a road using a graph. A road has a width and forming a graph using the center line of roads is the basis of a road expression. A center line of a road is called a center line graph 780. It is formed by an end point and side. An end point always exists at an intersection point, a confluence point, a branch point and a veer point of a road. A road has two end points and is always defined as a group of consecutive sides and end points, and a road ID No. 777 is uniquely provided. FIG. 45 shows a method of searching for a road using latitude and longitude. When a mesh is created at a latitude and longitude of 0.1 second units for example, this becomes a mesh with a latitude direction of 2.5 m and a longitude of 3 m in the Tokyo area. When a mesh is created in this way, a road either always exists or does not exists in each mesh. This mesh is called a ground cell 781. It is possible to access a road if a road exists from an arbitrary geographical point reveled by latitude and longitude by allocating a road ID No. to the ground cell 781 when a road exists. When defined in this way, one mesh has a relationship with a plurality of road ID Nos. Drawing a perpendicular line to a center line graph from a ground cell center point 782, an ID No. of a road with the shortest distance to the foot of the line is defined as the road ID No. of a ground cell. In the example of the intersection point diagram enlarged on lower right of FIG. 45, it is possible to draw 2 perpendicular lines to the center line graph 780, and in this case, a road ID No. of the perpendicular line foot B783*b* is selected which has a shorter perpendicular line compared to the perpendicular line foot A783*a*.

Figure 46:
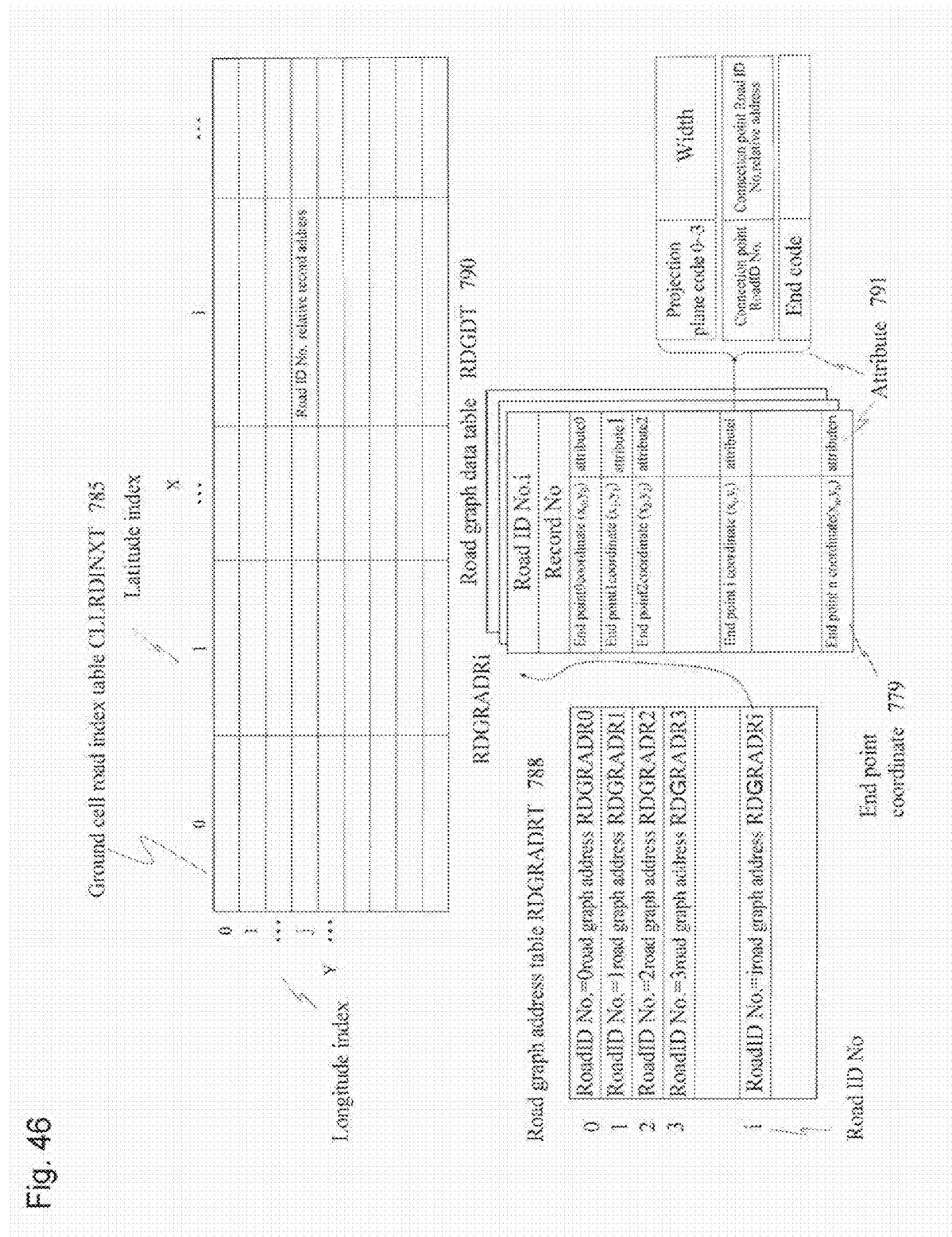
FIG. 46 is a diagram for explaining the structure of a road graph database of the present invention.
Figure 47:
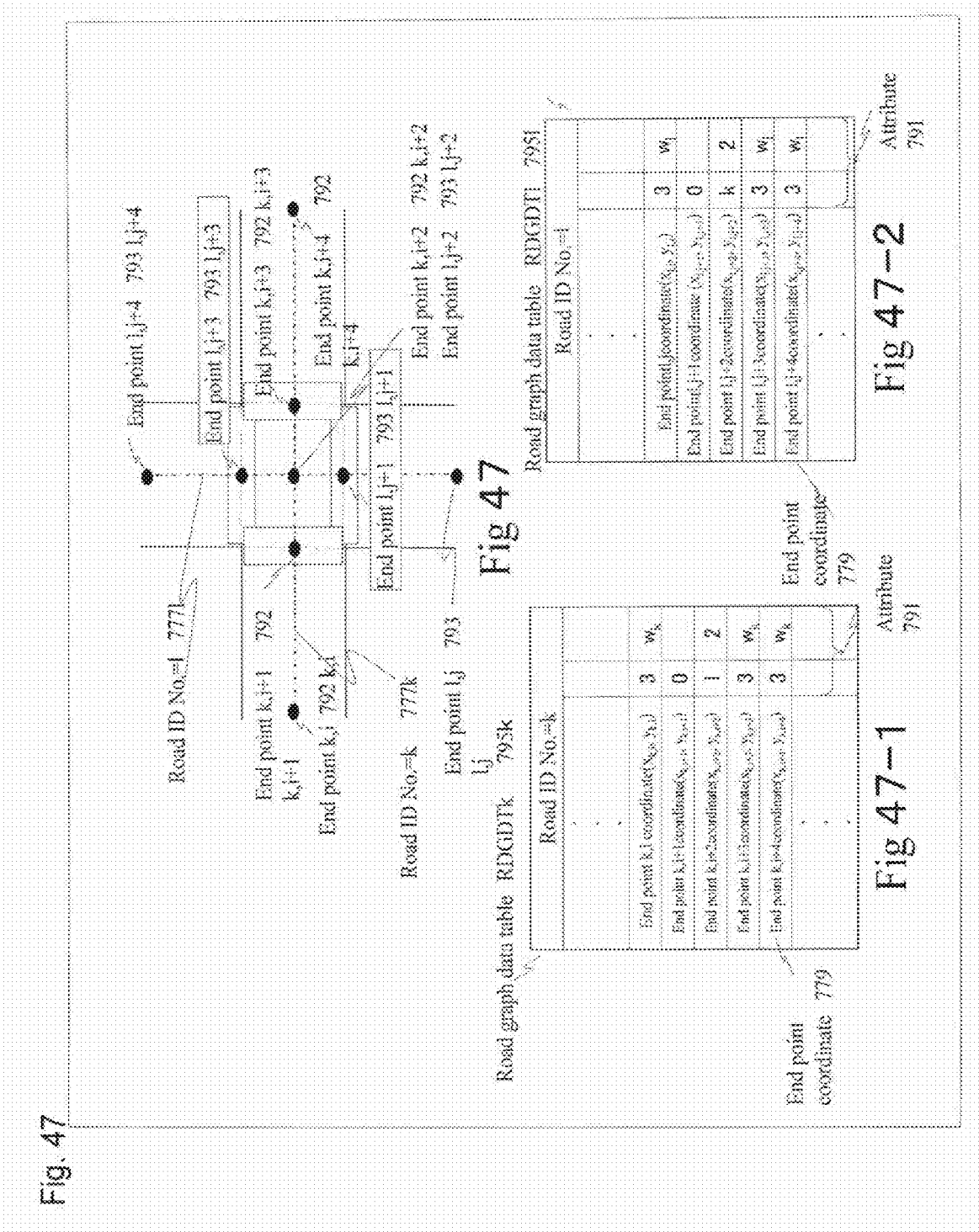
FIG. 47 is a diagram for explaining the structure of a road graph table RDGDT of the present invention.

FIG. 46 stipulates a structure of a road database for describing the structure of a road. The ground cell index table CLLRDINXT can search a relative record address for showing the graph part of a road graph data table which includes a road ID No. and a road graph table corresponding to the road ID No. from an index (i, j) of a meshed latitude longitude. A road graph address table RDGRADRT specifies a start address within the road graph data table RDGDT corresponding to a road ID No. This is because the size of an end point and side of the road graph data table RDGDT are different depending on the road ID NO. The road graph data table RDGDT describes the structure of a road as a graph. A first record is the road ID No., and the second record is the number of total end points. It is repeated until the range of a road specified by a road ID No. is used up which describes the attributes of an end point and side up to an end point sequentially from a starting point. Attributes have the following three types.

Type 1 attribute, which is an attribute related to sides up to the next end point and a projection plane code and b road width are sub-attributes.
  a projection plane code:
    0 no projection plane on either side
    1 a projection plane exists on only the forward direction left side
    2 a projection plane exists on only the forward direction right side
    3 a projection plane exists on the forward direction both sides
  b road width, which shows the distance from a center line graph of both ends of the road.
Type 2 attribute, which is data related to a road connection at an end point and the following a, b are sub-attributes.
  a Connection destination road ID No.
  b Relative record address of a connection point in the road graph data table RDGDT corresponding to a connection destination road ID No. This data is used for judging whether the connection of a road is an intersection point, branch point or confluence point.
Type 3 attribute, which shows the completion of a road at an end point.

Below, a construction method of a road graph data table corresponding to a case which actually exists is explained. An orthogonal intersection point description method is shown n FIG. 41. Road ID No.=k 777k and road ID No. 1 (L) 777l intersect at end points, ki+2 79k, i+2 and end point i, j+2 793i, j+2 which are at the center of an intersection point. 2 subscripts are used to express an end point, the first subscript expressing a road ID No., the second subscript showing the order of an end point within the same road ID No. Furthermore, this end point separately names the same end point on both roads. The structure description of the road ID No.=k 777k is explained based on the road graph data table RDGDTk 795k in FIG. 41-1 and FIG. 47. Starting from the road ID No. k 777k from the left end point k, i 792k, i, has a projection plane (attribute code=3) on both sides up to the next end point k, i+1 792k, i+1, and the road width is wk (end point k, i). The projection plane on both sides disappears on entering the intersection point at end point k, i+1 792k, i+1 (attribute code=0), and the road width is not defined and specified as a blank (end point k, i+1). Intersecting with road ID No. 1 (L) at end point k, i+2 792k, i+2 (attribute code=l (L)), attribute 2 shows that a record address of road ID No.=l (L) 777l intersects at 2 end points (end point k, i+2). As a result of going through an intersection point at end point k, i+3 792k, i+3, both side have a projection plane (attribute code=3), and road width becomes $w_k$ (end point k, i+3). Furthermore, after end point k, i+4 792k, i+4, the structure description of the road 1D No.=l (L) 777l is explained based on the road graph data table RDGDTI (L) 795l in FIG. 41-2 and FIG. 47. Starting from road ID No.=l 777l from bottom end point l, j 793l, j, a projection plane on both sides continues until the next end point l, l+1 793l, j+1 (attribute code=3) and road width becomes $w_l$ (end point l, j). The projection plane on both sides disappears on entering the intersection point at end point l, j+1 793l, j+1 (attribute code=0), and the road width is not defined and specified as a blank (end point l, j+1). Intersecting with road ID No.=k 777k at end point l, j+2 793l, j+2 (attribute code=k), attribute 2 shows that a record address of road ID No.=k 777k intersects at 2 end points (end point l, j+2). As a result of going through an intersection point at end point i, j+3 793l, j+3, both side have a projection plane (attribute code=3), and road width becomes $w_l$ (end point l, j+3). The process continues after end point l, j+4 793i, j+4.

Figure 48:
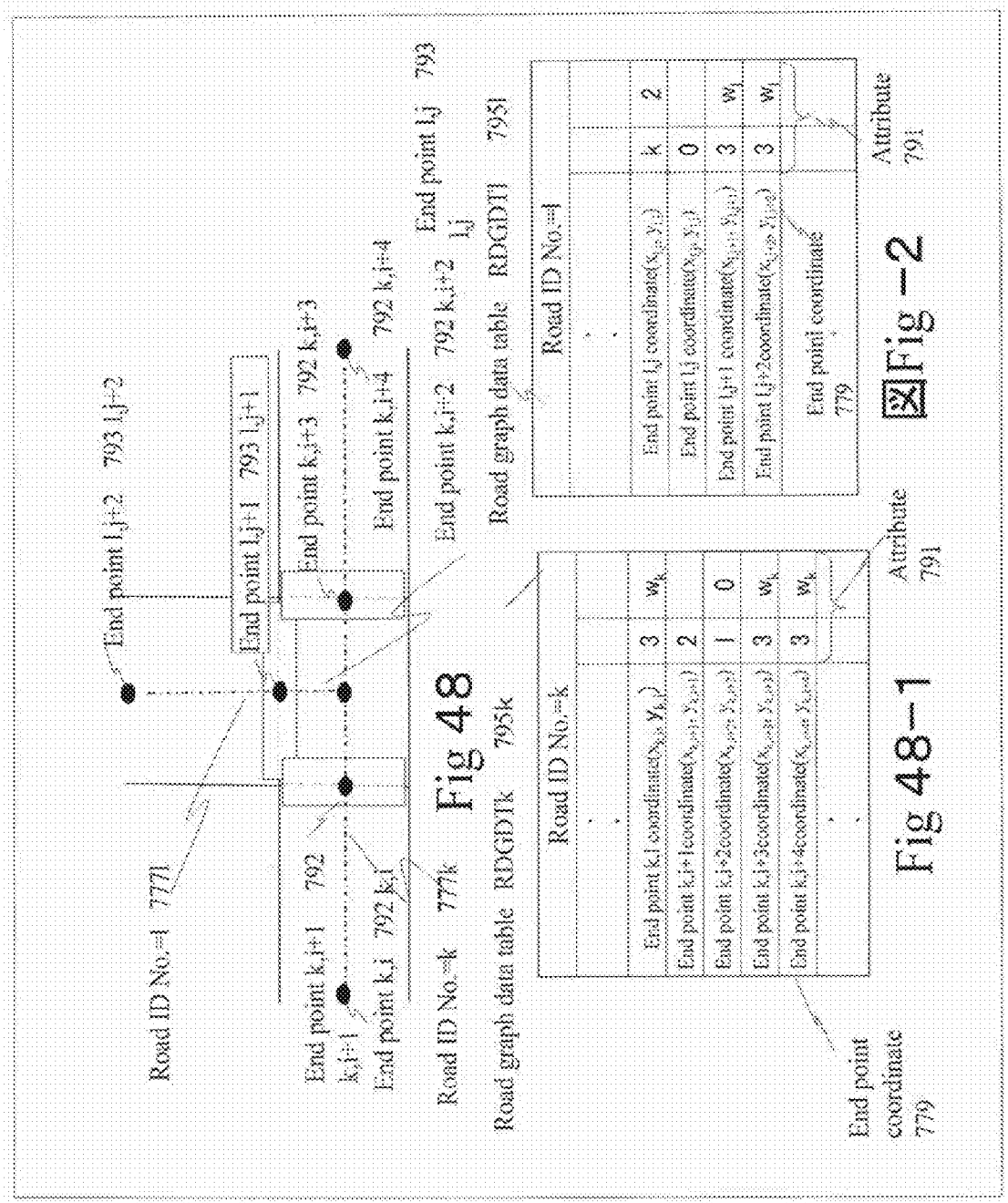
FIG. 48 is a diagram which shows a structural example of a road graph data table RDGBT of the present invention.

FIG. 48 shows a method of describing a junction of three roads. Road ID No.=1 (L) 777l branches from road ID No. k 777k at end point k, i+2 792k, i+2 and end point l, j 793l, j at the center of the three road junction. The structure description of the road ID No.=k 777k is explained based on the road graph data table RDGDTk (795k) in FIG. 48-1 and FIG. 48. Starting from the road ID No. k 777k from the left end end point k, i 792k, i, has a projection plane (attribute code=3) on both sides continues to the next end point k, i+1 792k, i+1, and road width $w_k$ (end point k, l). The projection plane becomes only on the right side on entering the three road junction at end point k, i+1 792k, i+1 (attribute code=2), and road width is $w_k$ (end point k, i+1). Branching with road ID No.=l (L) 777l at end point k, i+2 792k, i+2, (attribute code=l (L)) the attribute 0 shows that a record address of the road ID No.=l (L) 777l branches at an end point 0, that is, a start point. As a result of going through a three road junction at end point k, i+3 793l, i+3, both sides have a projection plane (attribute code=3), and road width becomes $w_k$ (end point k, i+3). The process continues after end point k, i+4 793k, i+4. A structure description of the road ID No.=l (L) 777l is explained based on the road graph data table RDGDTI (L) 7951 in FIG. 48-2 and FIG. 48. Starting from the road ID No.=l (L) 777l from the three road junction l, j 793l, j branches from road ID No.=k 777k, (attribute code=k), and attribute 2 shows that a record address of the road ID No.=k 777k branches at an end point 2 (end point l, j), the projection plane on both sides disappears within the three road junction up to the next end point l, j+1 793l, j+1 (attribute code=0), and the road width is not defined and specified as a blank (end point l, j). A projection plane exists on both side as a result of a three road junction appearing at end point l, j+1 793l, j+1(attribute code=3), and road width become $w_l$ (end point l, j+1). The process continues after end point l, j+2 793l, j+2.

Figure 49:
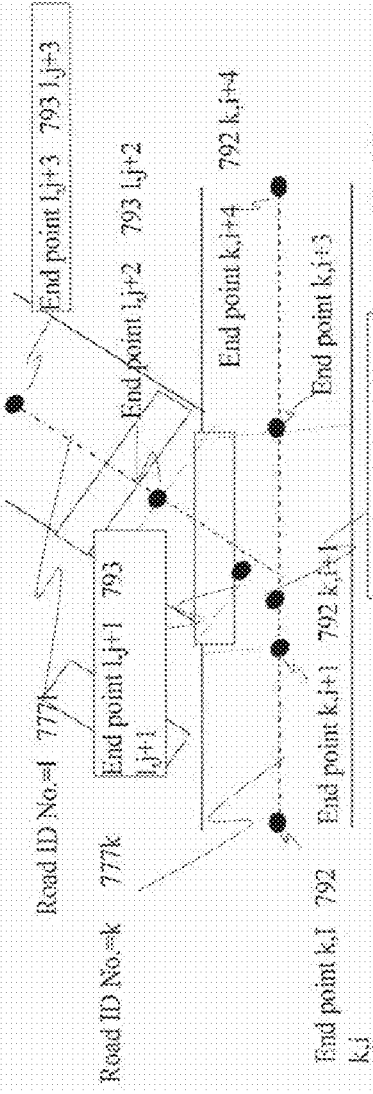
FIG. 49 is a diagram which shows a structural example of a road graph data table RDGBT of the present invention.

FIG. 49 shows a method of describing a branch road. Road ID No.=1 (L) 777l branches from road ID No. k 777k at end point k, i+2 792k, i+2 and end point l, j 793l, j at the center of the branch road. The structure description of the road ID No.=k 777k is explained based on the road graph data table RDGDTk 795k in FIG. 49-1 and FIG. 49.

Starting from the road ID No. k 777k from the left end end point k, i 792k, l, a projection plane (attribute code=3) on both sides continues up to the next end point k, i+1 792k, i+1, and road width is $w_k$ (end point k, i). The projection plane becomes only on the right side on entering the three road junction at end point k, i+1 792k, i+1 (attribute code=2), and road width is $w_k$ (end point k, i+1). Branching with road ID No.=l (L) 777l at end point k, i+2 792k, i+2, (attribute code=l (L)) the attribute 0 shows that a record address of the road ID No.=l (L) 777l branches at an end point 0, that is, a start point. As a result of going through a branch road at end point k, i+3

793*l*, i+3, both sides have a projection plane (attribute code=3), and road width becomes $w_k$ (end point k, i+3). The process continues after end point k, i+4 793*k*, i+4. A structure description of the road ID No.=l (L) 777*l* is based on the road graph data table RDGDTI (L) 7951 in FIG. 49-2 and FIG. 49. Starting from the road ID No.=l (L) 777*l* from the branch road end point l, j 793*l, j* branches from road ID No.=k 777*k*, (attribute code=k), and attribute 2 shows that a record address of the road ID No.=k 777*k* branches at an end point 2 (end point l, j), the projection plane on both sides disappears within the branch road up to the next end point l, j+1 793*l*, j+1 (attribute code=0), and the road width is not defined and specified as a graph (end point l, j). A projection plane exists on the left side at end point l, j+1 793*l*, j+1 (attribute code=1), and road width becomes $w_l$ (end point l, j+1). A projection plane exists on both sides after going through a branch road at end point l, j+2 793*l*, j+2 (attribute code=3), and road width becomes $w_l$ (end point l, j+2). The process continues after end point l, j+3 793*l*, j+3.

Figure 50:
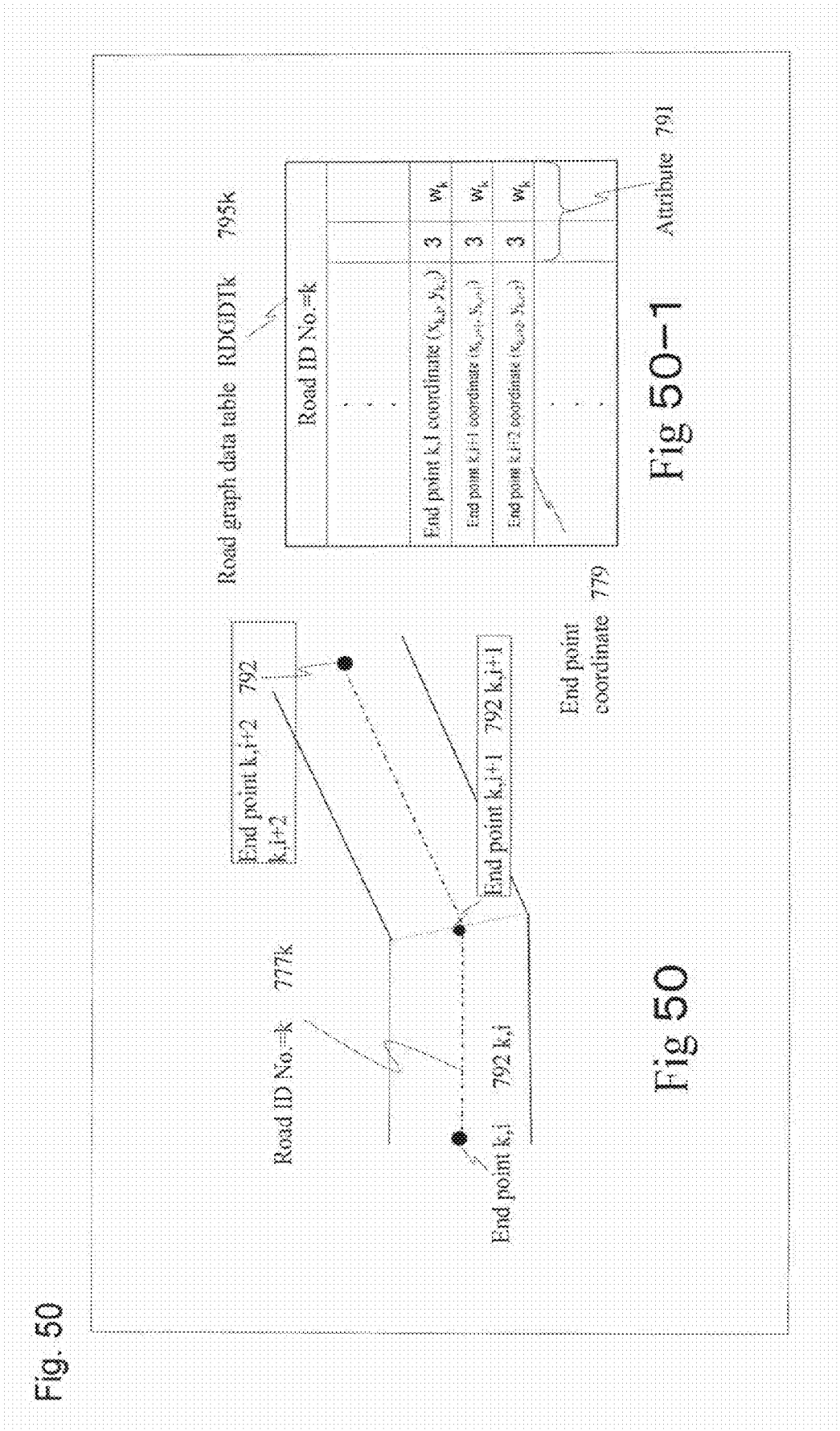
FIG. 50 is a diagram which shows a structural example of a road graph data table RDGBT of the present invention.

FIG. 50 shows a method of describing a veering road. The structure description of the road ID No.=k 777*k* is explained based on the road graph data table RDGDTk 795*k* in FIG. 50-1 and FIG. 50. Starting from the road ID No. k 777*k* from the left end point k, i 792*k, i*, a projection plane (attribute code=3) on both sides continues up to the next end point k, i+1 792*k*, i+1, and road width becomes $w_k$ (end point k, i). The direction is changed at end point k, i 792*k, l*, however, the projection plane is being as it is (attribute code=3), and the road width is $w_k$ (end point k, i+1). The process continues after end point k, i+2 792*k*, i+2.

Figure 51:
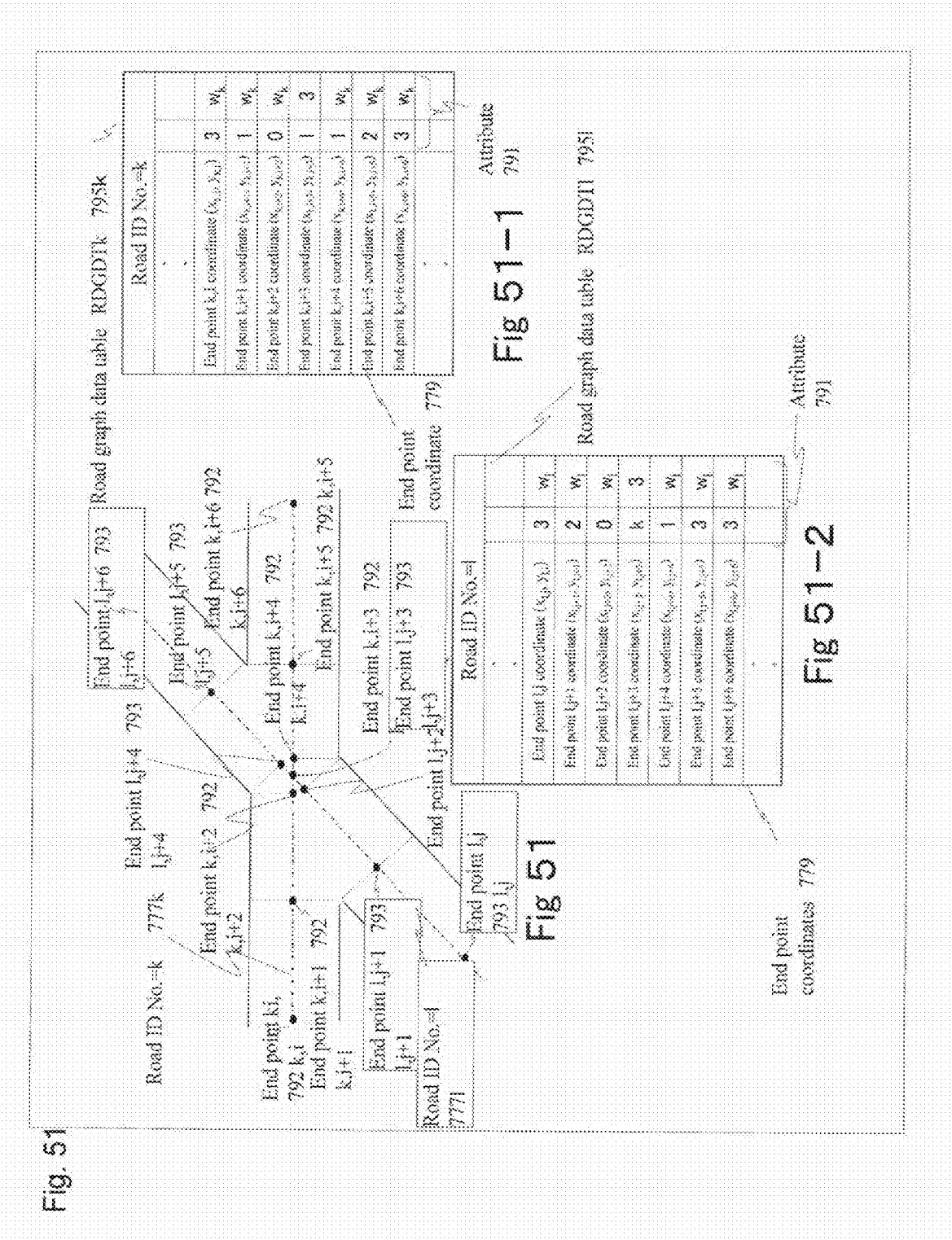
FIG. 51 is a diagram which shows a structural example of a road graph data table RDGBT of the present invention.

FIG. 51 shows a method of describing a non-orthogonal intersection point. Road ID No.=k 777*k* and road ID No.=l (L) intersect at the end point k, i+3 792*k*, i+3 and end point l, j+3 793*l*, j+3 at the center of the intersection. The structure description of the road ID No.=k 777*k* is based on with the road graph data table RDGDTk 795*k* in FIG. 51-1 and FIG. 51. Starting from the road ID No. k 777*k* from the left end point k, i 792*k, i*, has a projection plane (attribute code=3) on both sides continues up to the next end point k, i+1 792*k*, i+1, and the road width is $w_k$ (end point k, i). The projection plane becomes only on the left side on entering the intersection at end point k, i+1 792*k*, i+1 (attribute code=1), and road width is $w_k$ (end point k, i+1). The projection plane on both sides disappears within at the end point k, i+2 792*k*, i+2 (attribute code=0), and the road width is specified as a blank (end point k, i+2). Intersecting with road 1D No.=l (L) 777*l* at end point k, i+3 792*k,* i+3, (attribute code=l (L)) the attribute 3 shows that a record address of the road ID No.=l (L) 777*l* intersects at an end point 3 (end point k, i+3). A projection plane appears on the right side at end point k, i+3 792*k*, i+3 (attribute code=3), and the road width becomes $w_k$ (end point k, l+4). As a result of going through an intersection at end point k, i+5 793*l*, i+5, both sides have a projection plane (attribute code=3), and the road width becomes $w_k$ (end point k, i+5). The process continues after end point k, l+6 793*k*, i+6. A structure description of the road ID No.=l (L) 777*l* is explained based on the road graph data table RDGDTI (L) 7951 in FIG. 51-2 and FIG. 51. Starting from the road ID No.=l (L) 777*l* from left side end point l, j 793*l, j*, a projection plane on both side continues up to the next end point l, j+1 793*l*, j+1 (attribute code=3), and the road width is $w_l$ (end point l, j). On entering the intersection at end point l, j+1 793*l*, j+1 the projection plane on the left side disappears (attribute code=2), and the road width becomes $w_l$. The projection plane on both sides disappears at end point l, j+3 793*l*, j+3 (attribute code=0), and the road width is not defined and specified as a blank (end point l, j+3). Intersecting with road ID No.=k 777*k* at end point l, j+3 793*l*, j+3 (attribute code=k), attribute 3 shows that a record address of the road ID No.=k 777*k* intersects at an end point 2 (end point l, j+3). A projection plane appears on the right side at end point l, j+4 7941, j+4 (attribute code=1), and road width becomes $w_k$ (end point l, j+4). As a result of going through an intersection at end point l, j+5 793*l*, j+5, both sides have a projection plane (attribute code=3), and the road width becomes wl (end point l, j+5). The process continues after end point l, j+6 793*l*, j+6.

Figure 52:
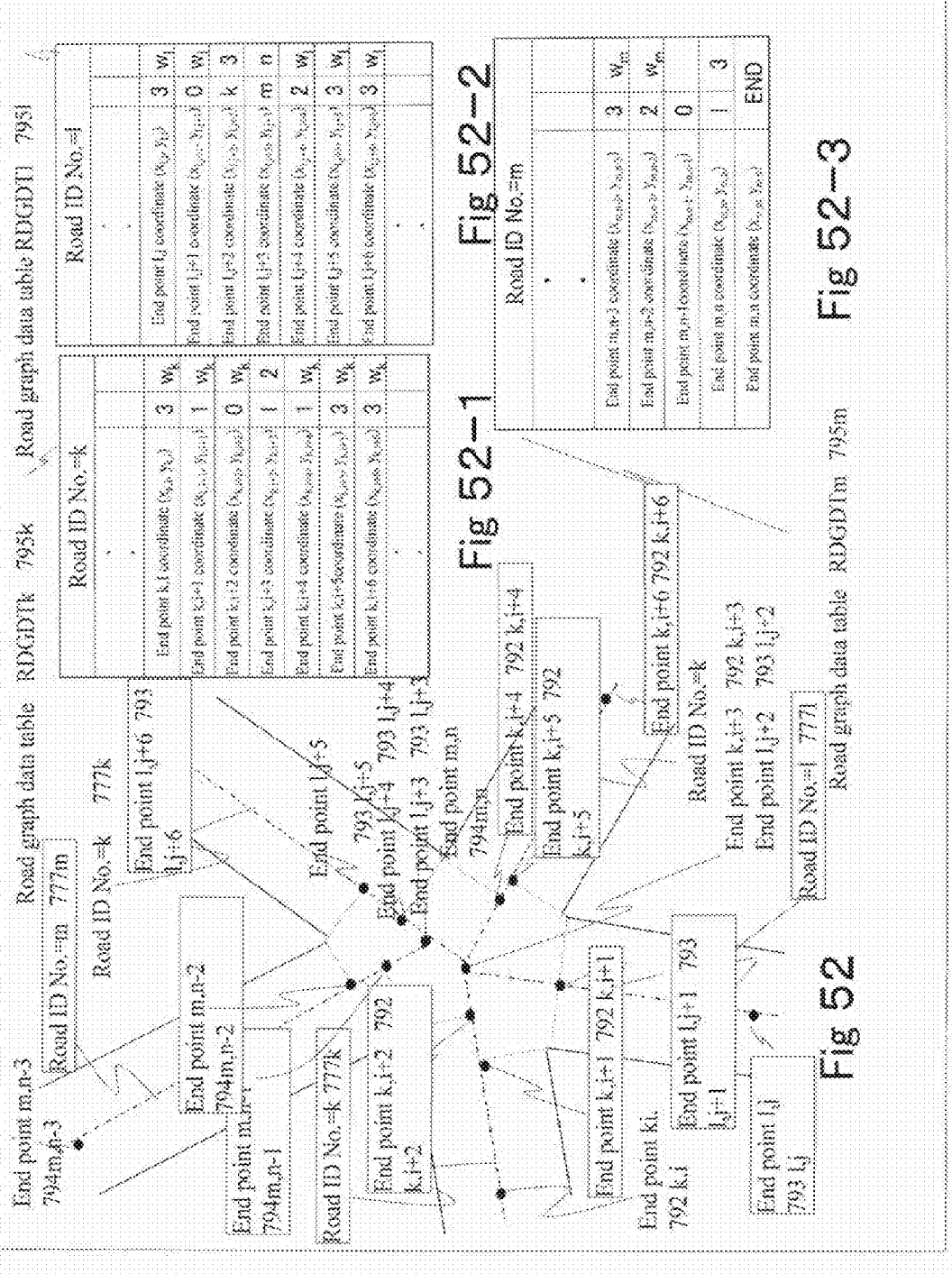
FIG. 52 is a diagram which shows a structural example of a road graph data table RDGBT of the present invention.

FIG. 52 shows a method of describing a congruence road. Road ID No.=k 777*k* and road ID No.=l (L) intersect at the end point k, i+3 792*k*, i+3 and end point l, j+2 793*l*, j+2 at the center of the intersection. Road ID No.=m 777*m* converges with road ID No.=l (L) at end point l, j+3 793*l*, j+3. A structure description of the road ID No.=k 777*k* is explained based on the road graph data table RDGDTk 795*k* in FIG. 52-1 and FIG. 52. Starting the road ID No. k 777*k* from the left end point k, i 792*k, i*, a projection plane (attribute code=3) on both sides continues up to the next end point k, j+1 792*k*, j+1, and road width is $w_k$ (end point k, I). The projection plane becomes only on the left side on entering the intersection at end point k, i+1 792*k*, i+1 (attribute code=3), and the road width is $w_k$ (end point k, i+1). The projection plane on both sides disappears at the end point k, i+2 792*k*, i+2 (attribute code=0), and the road width is specified by a blank (end point k, i+2). Intersecting with road ID No.=l (L) 777*l* at end point k, i+3 792*k*, i+3, (attribute code=l (L)) attribute 2 shows that a record address of the road ID No.=l (L) 777*l* intersects at an end point 2 (end point k, i+3). A projection plane appears on the left side at end point k, i+4 792*k*, i+4 (attribute code=1), and road width becomes $w_k$ (end point k, i+4). As a result of going through an intersection at end point k, i+5 793*l*, i+5, both sides have a projection plane (attribute code=3), and the road width becomes $w_k$ (end point k, i+5). The process continues after end point k, i+6 793*k*, i+6. The structure description of the road ID No.=l (L) 777*l* is explained based on the road graph data table RDGDTI (L) 7951 in FIG. 52-2 and FIG. 52. Starting the road ID No.=l (L) 777*l* from bottom end point l, j 793*l, j*, a projection plane on both sides continues up to the next end point l, j+1 793*l*, j+1 (attribute code=3), and the road width becomes $w_l$ (end point l, j). On entering the intersection at end point l, j+1 793*l*, j+1 the projection plane on both sides disappears (attribute code=0), and the road width is specified as a blank. Intersecting with road ID No.=k 777*k* at end point l, j+2 793*l*, j+2 (attribute code=k) attribute 3 shows that a record address of the road ID No.=k 777*k* intersects at an end point 3 (end point l, j+2). Converging with road ID No.=m 777*m* at end point l, j+3 793*l*, j+3 (attribute code=m) attribute n shows that a record address of the road ID No.=m 777*m* converges at an end point n (end point l, j+3). A projection plane appears on the right side at end point l, j+4 794*l,* j+4 (attribute code=2), and the road width becomes $w_l$ (end point l, j+4). As a result of going through an intersection at end point l, j+5 793*l*, j+5, both sides have a projection plane (attribute code=3), and road width becomes $w_l$ (end point l, j+5). The process continues after end point l, j+6 793*l*, j+6. A structure description of the road ID No.=m 777*m* is explained based on the road graph data table RDGDTm 795*m* in FIG. 52-3 and FIG. 52. The road ID No.=m 777*m* finishes at end point m, n 793*m* of the confluence road, converges with road ID No.=l 777*l* (attribute code=1), and attribute 3 shows that a record address of the road ID No.=l 777*l* converges at an end point 3 (end point m, n), the projection plane on both sides disappears within the branch rode from the previous end point m, n−1 793*m*, n−1 (attribute code=0), and the road width is not defined and specified as a blank (end point m, n−1). A projection plane becomes only on the right side from the previous end point m, n−2 793*m*, n−2 (attribute code=2), and the road width becomes w$_m$ (end point m, n−2). A projection plane appears on both sides from the previous end point m, n−3 793*m*, n−3 (attribute code=3), and the road width becomes w$_m$ (end point m, n−3).

Figure 53:
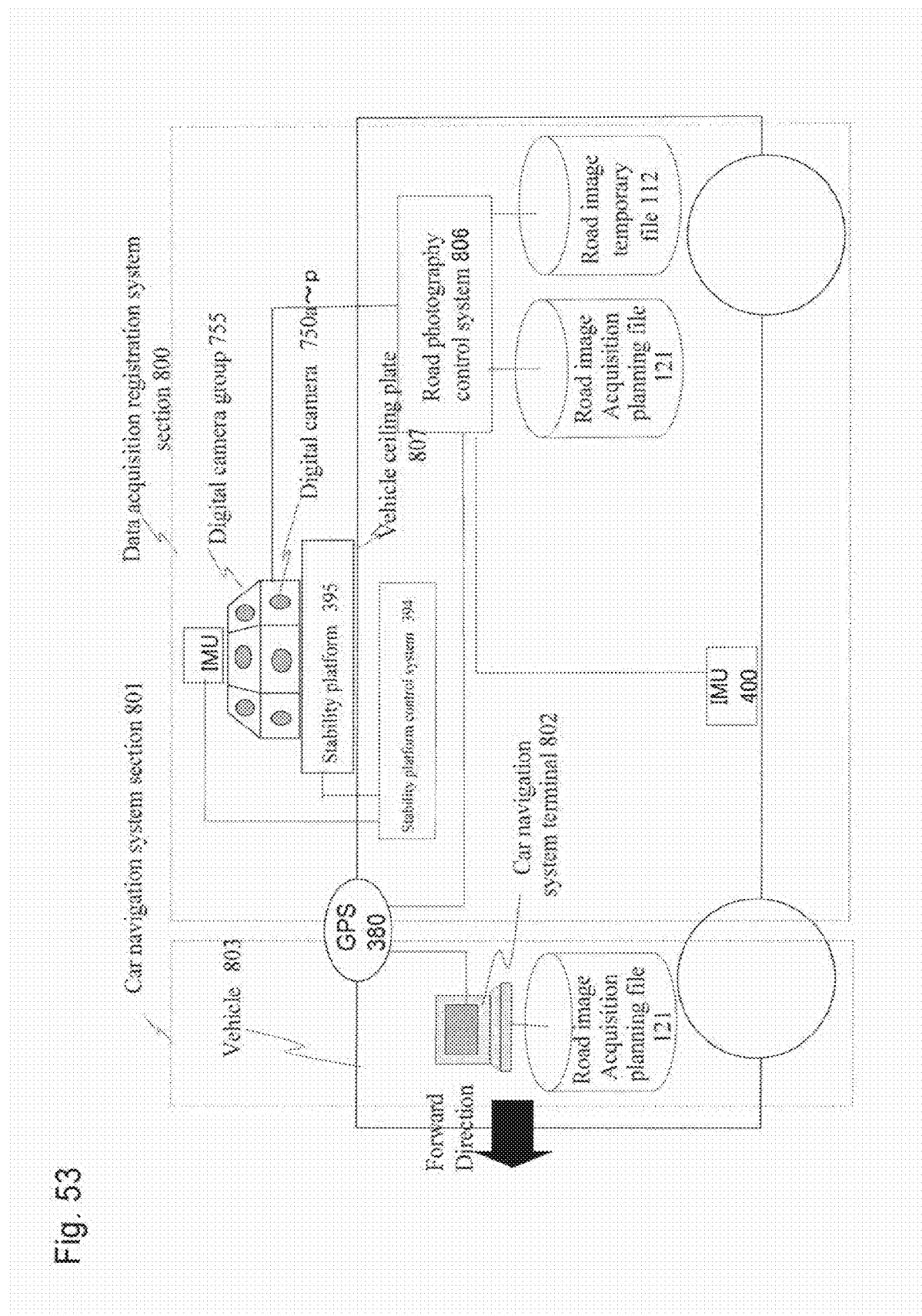
FIG. 53 is a diagram which shows a structural example of the road image acquisition system of the present invention.

FIG. 53 shows an example of a structure of the road image acquisition system 110, which is formed by a car navigation system section 801 and a data acquisition registration section 800. The car navigation system section 801 is a device for guiding a vehicle 803 along a movement route 765 to photography points 766 stipulated in FIG. 42(*b*), and vehicle location data is periodically obtained by GPS380. The function of car navigation system section 801 is to guide a vehicle using the display screen example of the car navigation system section of the road image acquisition system in FIG. 56 according to the content of the road image acquisition planning file 111 in FIG. 55. The car navigation system itself is already publicly known and so it is possible to use a device which does not have novelty. It is preferred to efficiently guide a vehicle to the photography points 766 in order to realize a goal of the present invention. First, which part of a city road which is to be acquired is determined before travelling. The photographic range is determined on a map, and a travel plan is decided. The photography points 766 must be set uniformly and densely along a road or passageway in order to achieve the goal of the present invention. A specified photography route 825 is set based on this result. Road ID No. shown in the road image acquisition planning file in FIG. 55 are allocated to each road, photography points 766 are allocated, the start coordinate and end coordinate or each road ID No. the number of photography points between these coordinates and each photography point coordinates are set by latitude and longitude. In this way, the road image acquisition planning file in FIG. 55 is constructed. A graphic user interface related to the construction of a road image acquisition planning file can use a publicly known device as a map data system.

Figure 54:
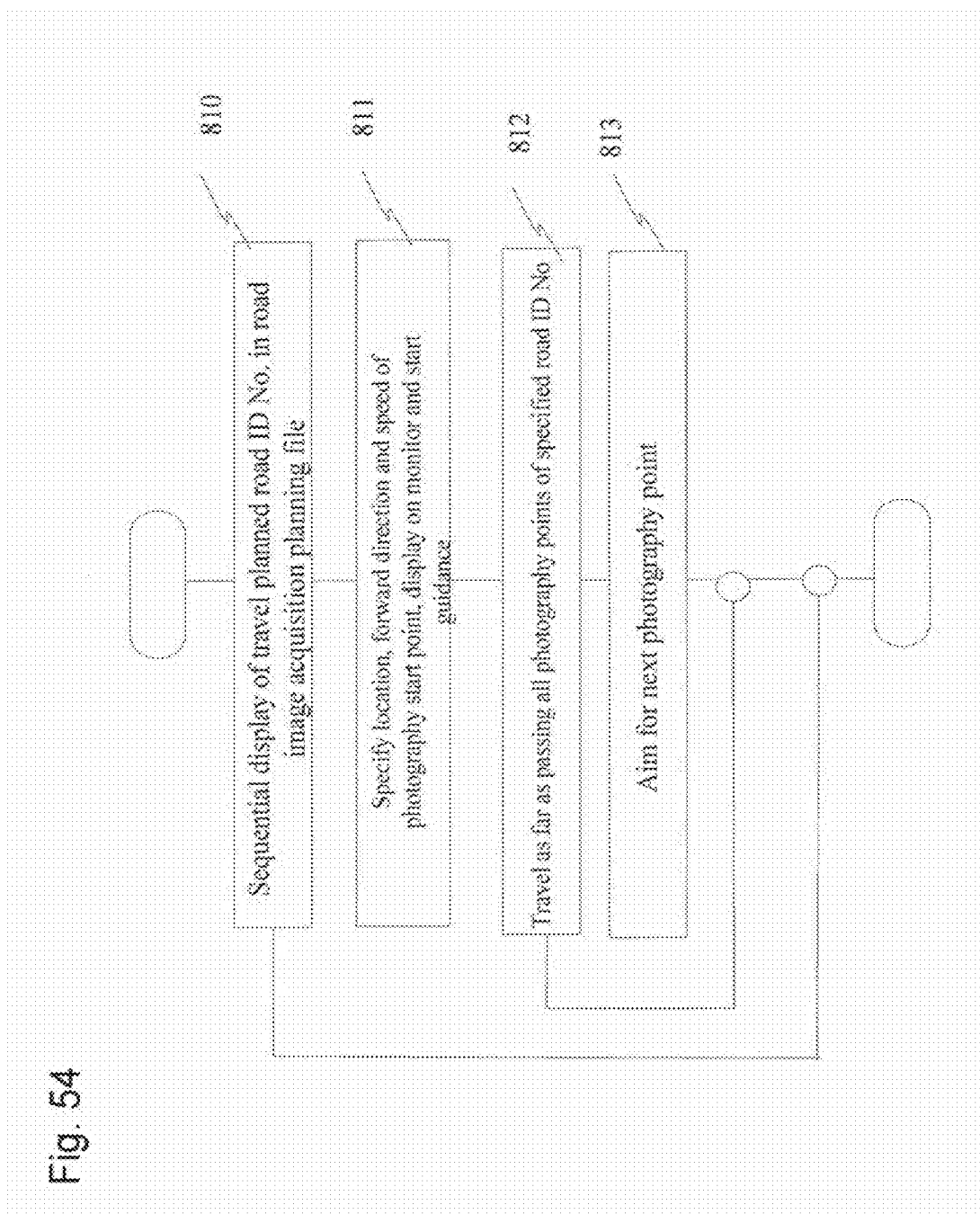
FIG. 54 is a diagram which shows a process flow of a car navigation system section of the road image acquisition system of the present invention.
Figure 56:
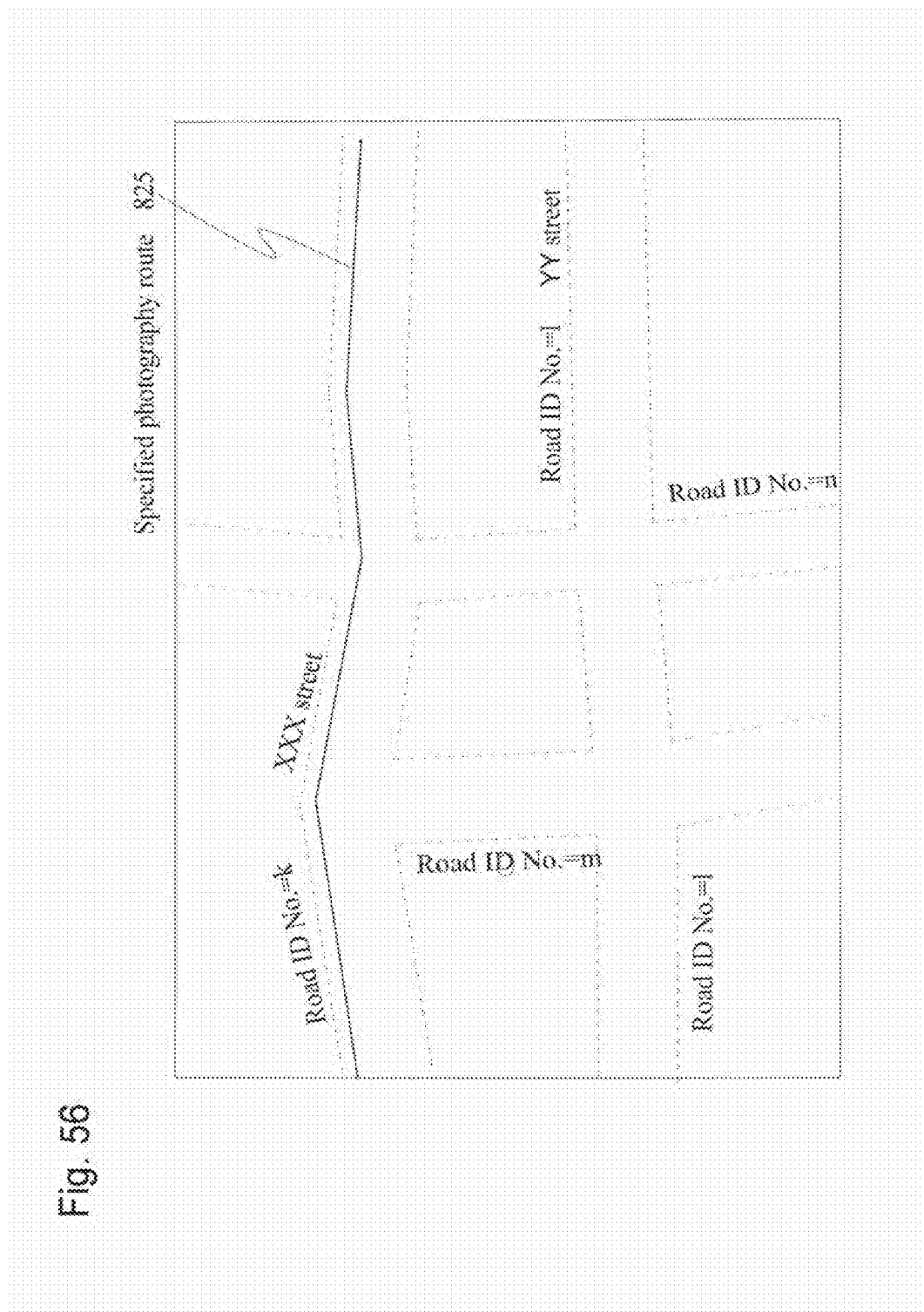
FIG. 56 is a diagram which shows an example of a display screen of the car navigation system in the road image acquisition system of the present invention.

The function of the car navigation system section 801 is shown by a process flow of the car navigation system section of the road image acquisition system described in FIG. 54. In process block 810, the display in FIG. 56 is performed in order until all the photography is completed for planned photography roads from among the road ID No. registered in the road acquisition planning file. Because a start coordinate is included in a specified road ID No., in process block 811, the location of a travel start point, forward direction, speed are specified in order to start this road ID No., the contents of FIG. 56 are displayed on a monitor and guidance is performed. In order to perform photography, it is desirable that conditions stipulated by process block 811 satisfy a fixed error range, for example, a location error with an accuracy from 1 m to 5 m or less. In the case where such conditions are not satisfied, the travel route may be reset. Each photography point from a photograph point coordinate to a final photography point in a description of the road image acquisition planning file of a road ID No. selected in process block 810 are guided to in order by process block 812 and process block 813.

IMU 400 which observes the orientation of vehicle 803, road photography control system 806 which includes a program for controlling the digital camera 750 and processing photography data, road image one dimensional file 112 which is formed by a memory device such as a large capacity disk device which records each type of data including image data, and the road image acquisition planning file 121 which records photography points for issuing photography commands to the digital camera 750 are included in the data acquisition system part 800.

Figure 57:
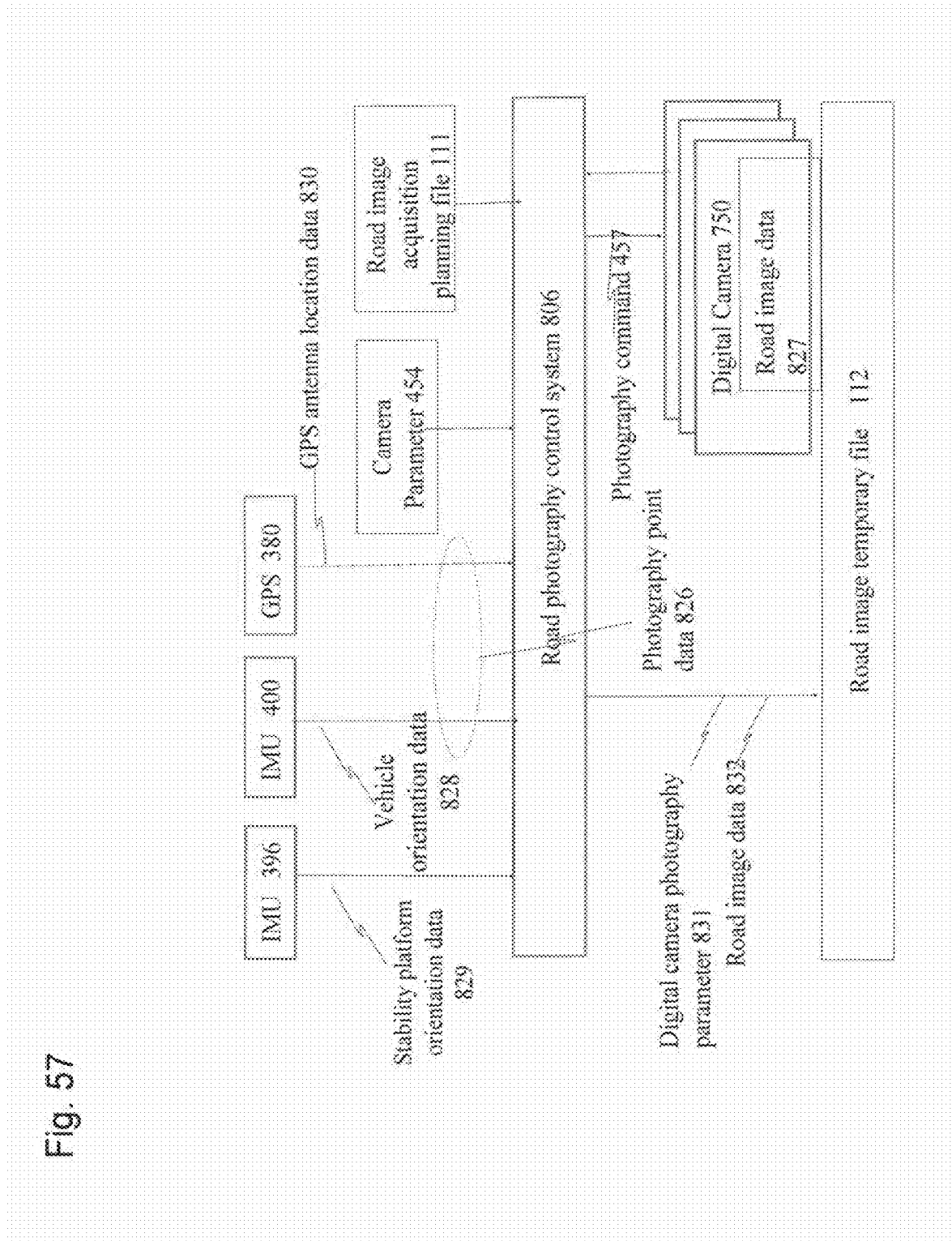
FIG. 57 is a diagram which shows a data flow of a data acquisition registration system section in the road image acquisition system of the present invention.
Figure 58:
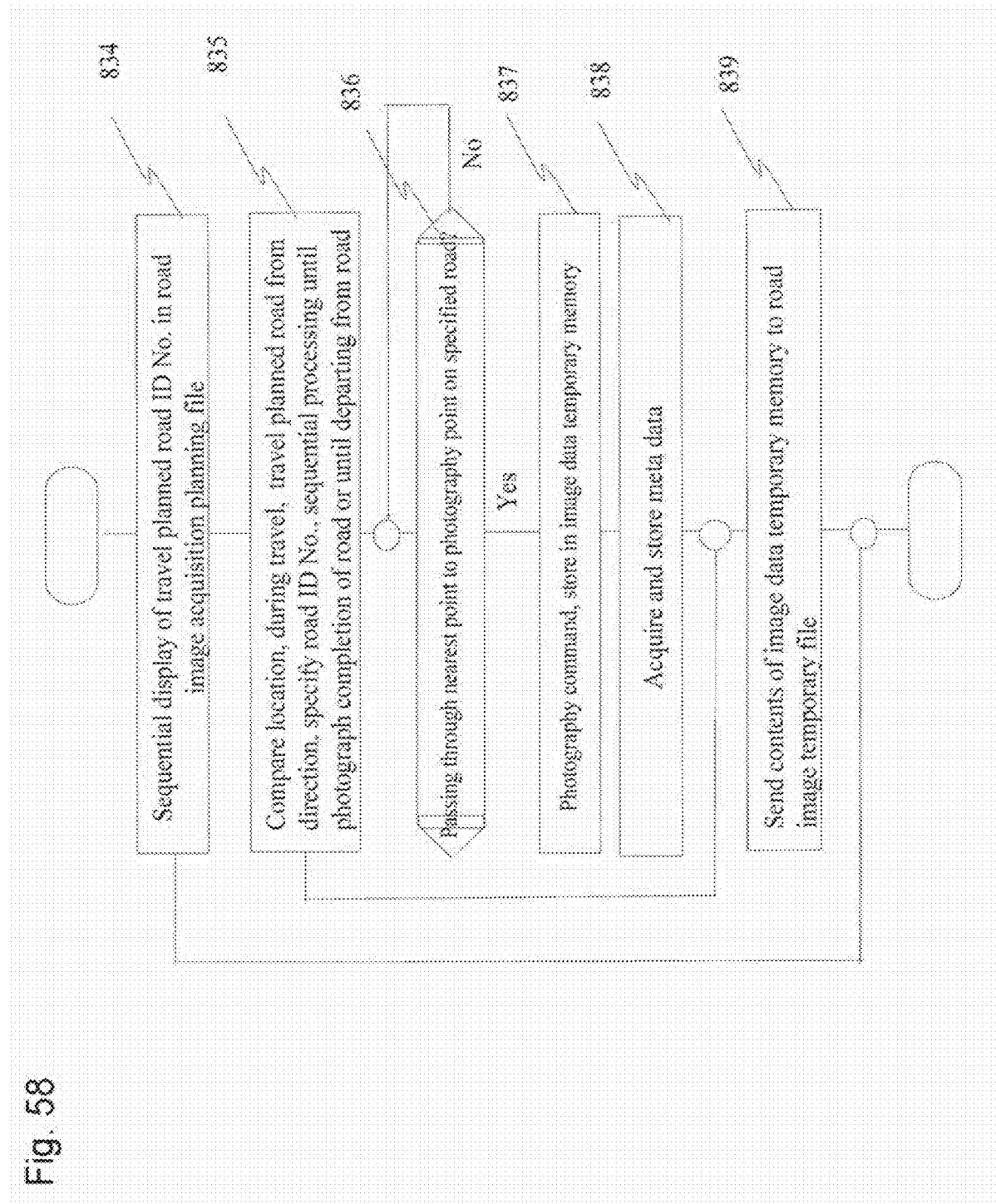
FIG. 58 is a diagram which shows a data flow of a data acquisition registration system section in the road image acquisition system of the present invention.
Figure 59:
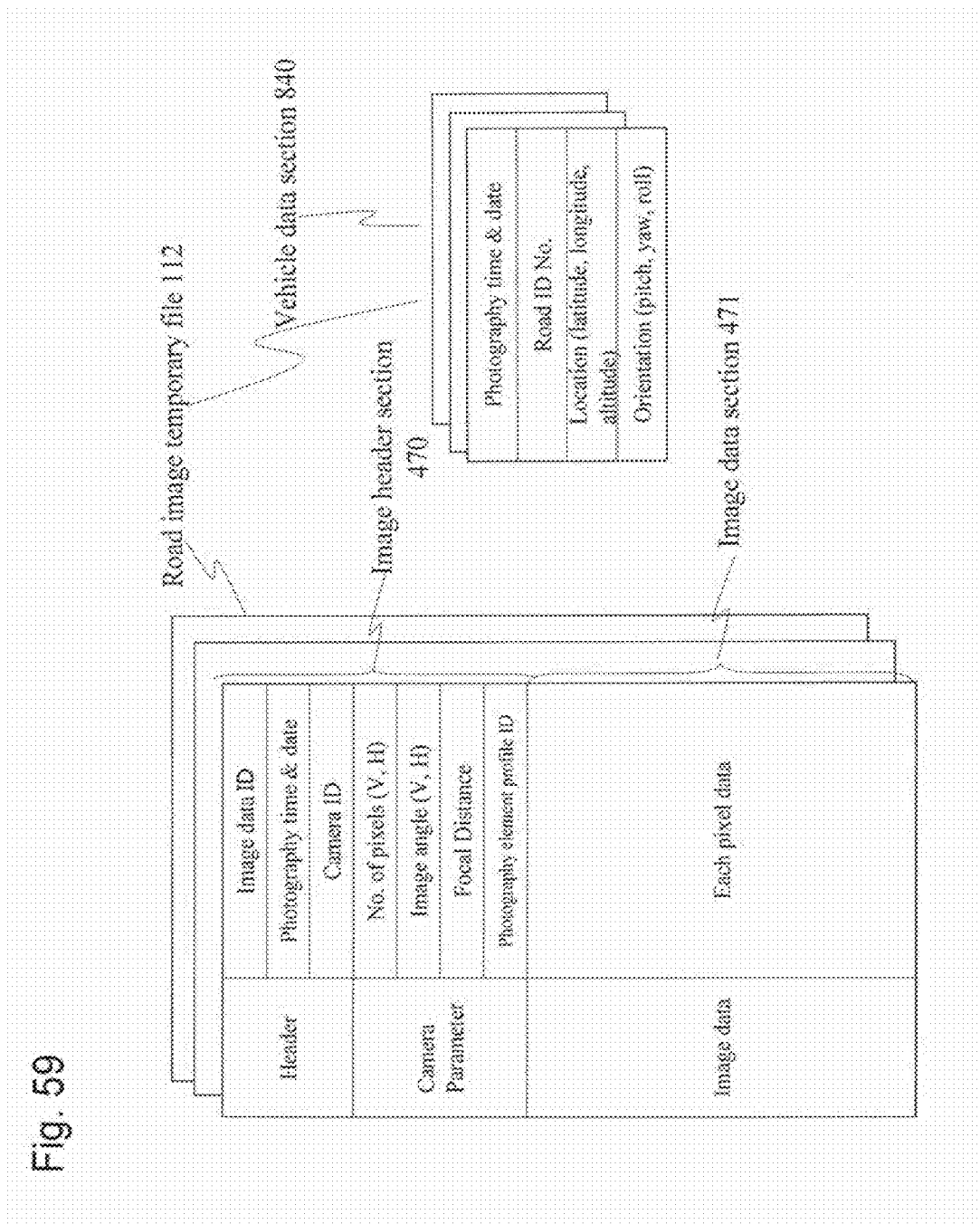
FIG. 59 is a diagram which shows the structure of a primary file of a road image of the present invention.

FIG. 57 shows the flow of data between structural instruments of the data acquisition registration system part 800 in FIG. 53. FIG. 58 explains a process flow of a road photography control system 806. The road photography control system 806 is formed by a CPU. The road photography control system 806 periodically imports orientation data 450 of the stability platform device 395 from the IMU 396. When the stability platform device 395 is operating normally, a fixed orientation with respect to inertia space is usually maintained without relying on the orientation of the vehicle 803. The IMU 400 which is fixed to the vehicle 803 periodically sends orientation data 928 of the vehicle, and the GPS 380 periodically sends location data 830 of the GPS antenna location to the road photography control system 806. A process of the road photography control system 808 is explained in detail in FIG. 58. The contents of the road image acquisition planning file 111, the obtained location data 380 of the GPS antenna and the orientation data 828 of the vehicle are verified in order, a road ID No. is specified, it is judged whether a photography of this road ID No. is complete or a near point of the completion point of the road ID No. specified in process block 836 is being passed through in order up to a departing from a route, when a photography command 457 is sent to all the digital camera which form a digital camera group at the nearest timing to a photography point within a photography allowable range, a vehicle data section 840 within the primary road image acquisition file shown in FIG. 59 is simultaneously written by process block 838. Digital camera 750 can hold 32 GB of internal memory at the time of the present invention. As a result, it is possible to store photographed image data 827 at least until one road ID No. is completed. The vehicle 803 completes one road ID No., and road image data 827 within the digital camera 750 is sent by the process block 839 to the primary road image file 112 formed by a memory device such as a large capacity disk device installed in the vehicle, image data stored within the digital camera 750 is deleted.

An example of a structure of the primary road image file 112 is described in FIG. 59. An image header part 470 and image data part 471 are prepared for each image. A camera ID of a header part is a number for identifying each digital camera 750*a~i* which form the digital camera group 755. The image data ID is an identification number so that images can be mutually identified, photography date and time corresponds to the vehicle data section 840, and are used for assessing the optical axis direction of each digital camera 750*a~i* in the road image database generation registration process 130. The image data part 471 does not perform any particular process at this stage. In addition, because camera parameters of the image header part 470 are fixed during travel, the same setting values are programmed.

Figure 60:
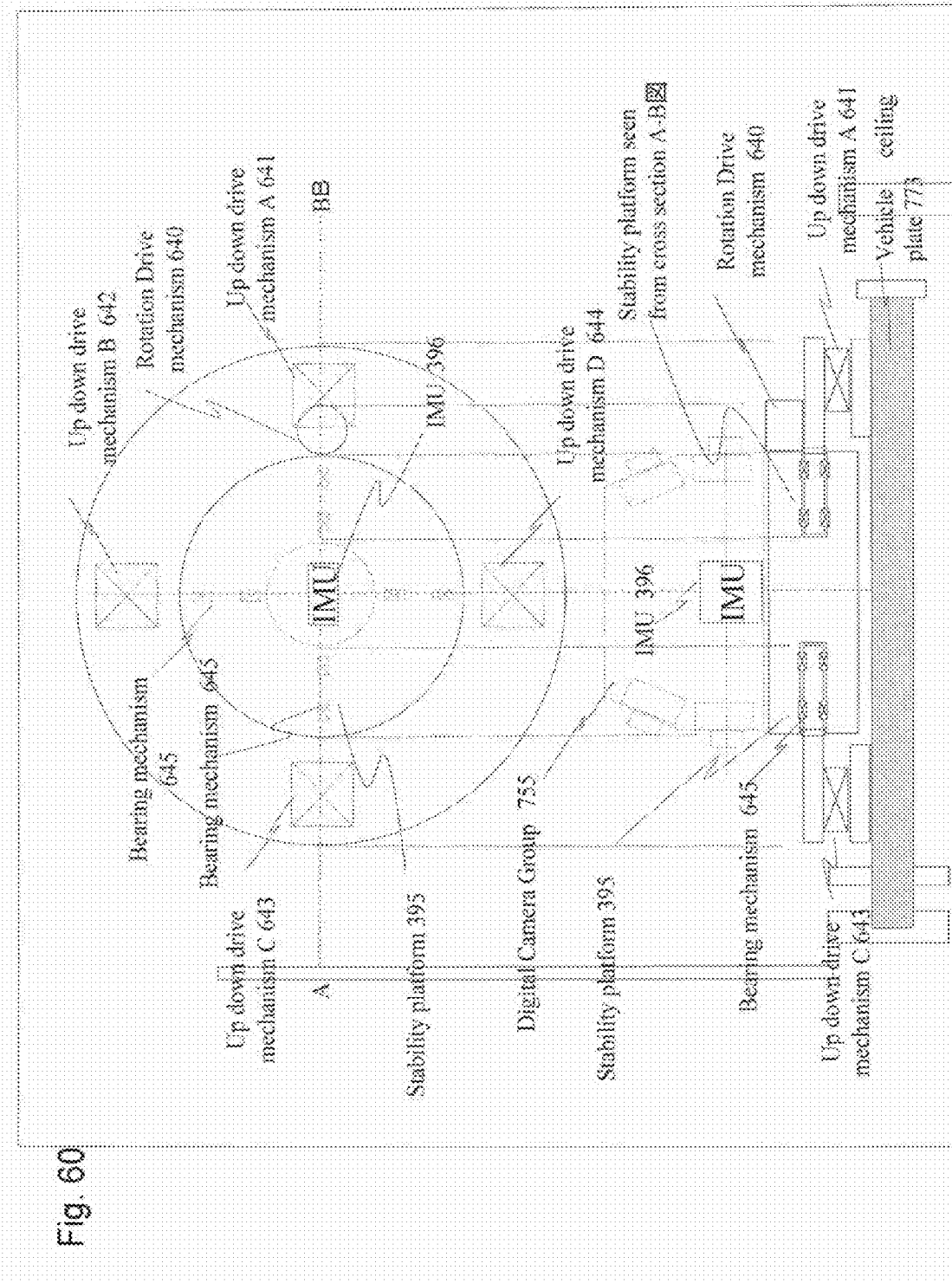
FIG. 60 is a diagram which shows a structural example of a vehicle installed stability platform of the present invention.
Figure 61:
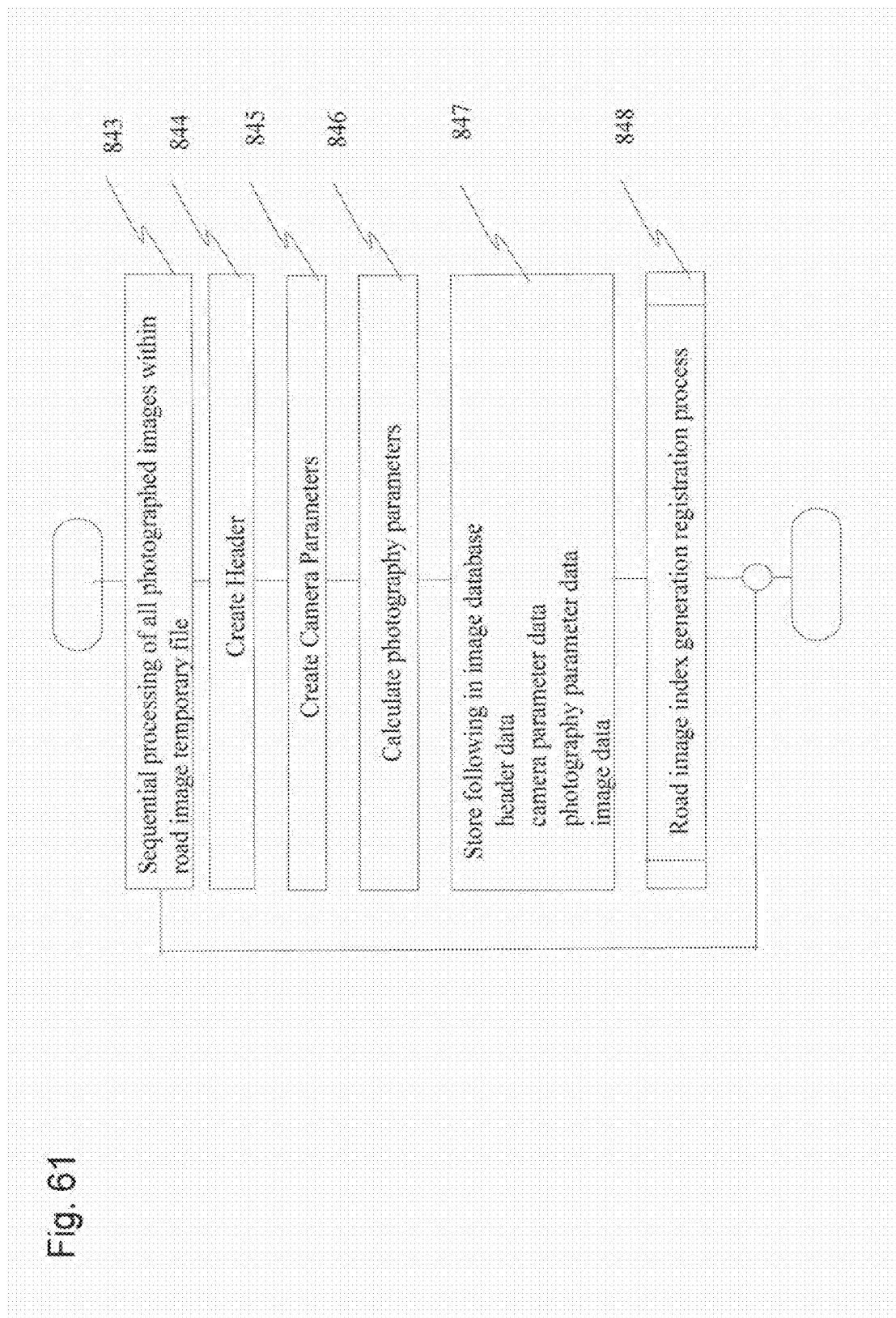
FIG. 61 is a diagram which shows a process flow of a road image database generation registration system of the present invention.

A simplest example of a structure of a stability platform device 395 for installing in a vehicle is shown in FIG. 60. The stability platform device 395 has the same structure as the stability platform device 395 for installing in an aircraft in FIG. 30. In the case of a vehicle, the stability platform device 395 is fixed to a vehicle roof plate, and the digital camera group 755 for a vehicle is set on the stability platform device 395.

The road image database generation registration system 130 and the road image database 150 are explained in detail using FIG. 61 to FIG. 69. Due to a relationship of searching a road image database from an image projection plane, a sight line and a view point, firstly, the structural relationship between the structure of the image projection plane and road graph database 151 must be defined. Image projection plane is explained using the direction of a road graph and direction of a sight line vector in FIG. 65. The road image, which is taken, of the entire circumference along a passageway on a road is projected onto a projection plane of a boundary line of the road, and a morphing process is performed depending on the relationship between a sight line and a view point. At this time, video in a forward direction or forward opposite direction, because a road is long and narrow, a very long road boundary surface is required in order to project an image which is sometimes difficult to realize.

Figure 65:
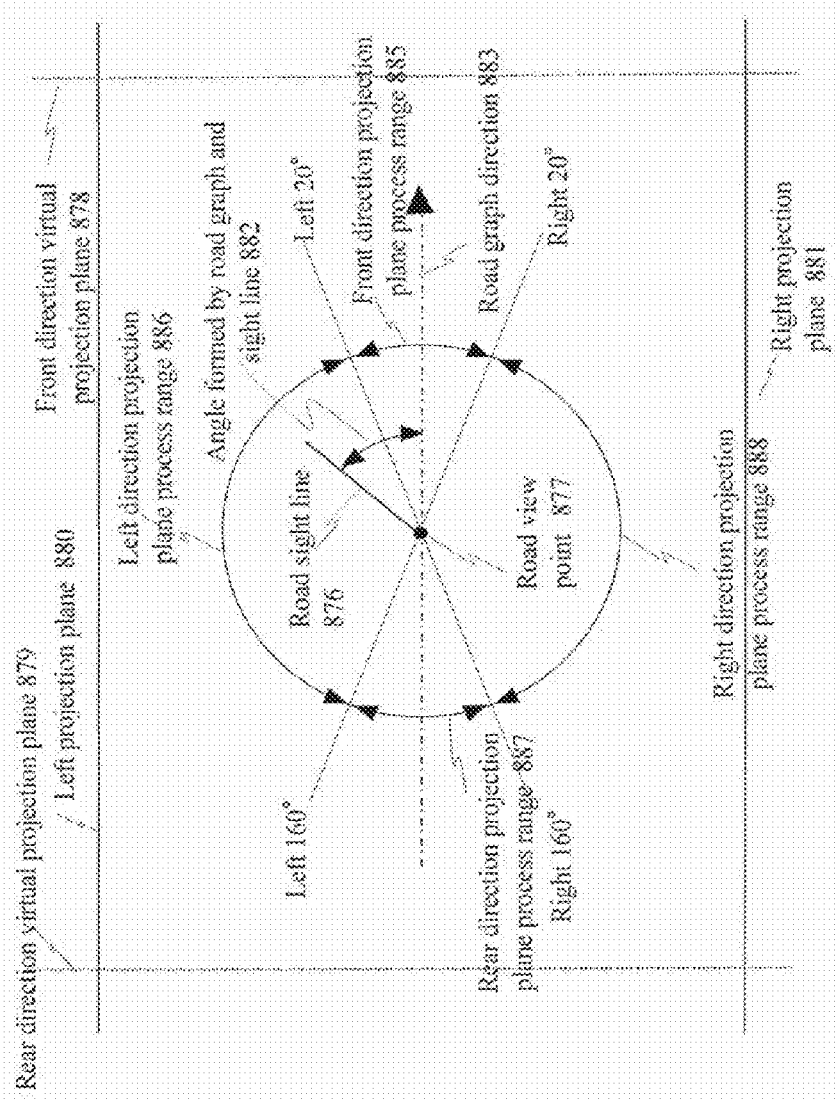
FIG. 65 is a diagram for explaining an image generation process in a road graph direction and eye vector direction in the present invention.

In order to solve this problem, for video in a forward direction or forward opposite direction or a direction close to these, an actual image is not projected onto a road left right boundary line but a front direction virtual projection plane 878 and rear direction virtual projection plane 879 as is shown by the dotted line in FIG. 65 are arranged and an actual image is projected here. Furthermore, the location of front direction virtual projection plane 878 and rear direction virtual projection plane 879 moves according to the road view point. In the example shown in FIG. 65, if the forward direction of a road, that is, an angle 882 formed by a road graph and a sight line is in a range of 20 degrees of left and right, then the front direction virtual projection plane 878 is used, the rear image photographed in the road image acquisition system 110 is used, and if an angle 882 formed by a road graph and a sight line is in a range from 160 degrees to 180 degrees of left and right, the rear direction virtual projection plane 879 is used, and the rear image photographed in the road image acquisition system 110 is used. If the angle 882 formed by a road graph and a sight line is in a range from left side 20 degrees to 160 degrees, then a left projection plane 880 is used, and a left oblique front direction, left, left rear direction image with respect to the forward direction photographed by the road image acquisition system 10 is used, and if the angle 882 formed by a road graph and a sight line is in a range from right side 20 degrees to 160 degrees, then a right projection plane 881 is used, and a right oblique front direction, right, right rear direction image with respect to the forward direction photographed by the road image acquisition system 10 is used.

Here, an example of switching a projection plane, where an angle 882 which is formed by a road graph and a sight line is front direction left right 20 degrees, rear direction left right 160 degrees is explained so far, however, it is also possible to vary the angle according to actual reality, increase the angle according to the realty of the actual place, and below the angle is set at 20 degrees as a concrete example. Below, the road image database generation registration system 130, the road image database 150, and the road three dimensional video generation system 170 are constructed according to the method of the projection plane explained above.

Figure 66:
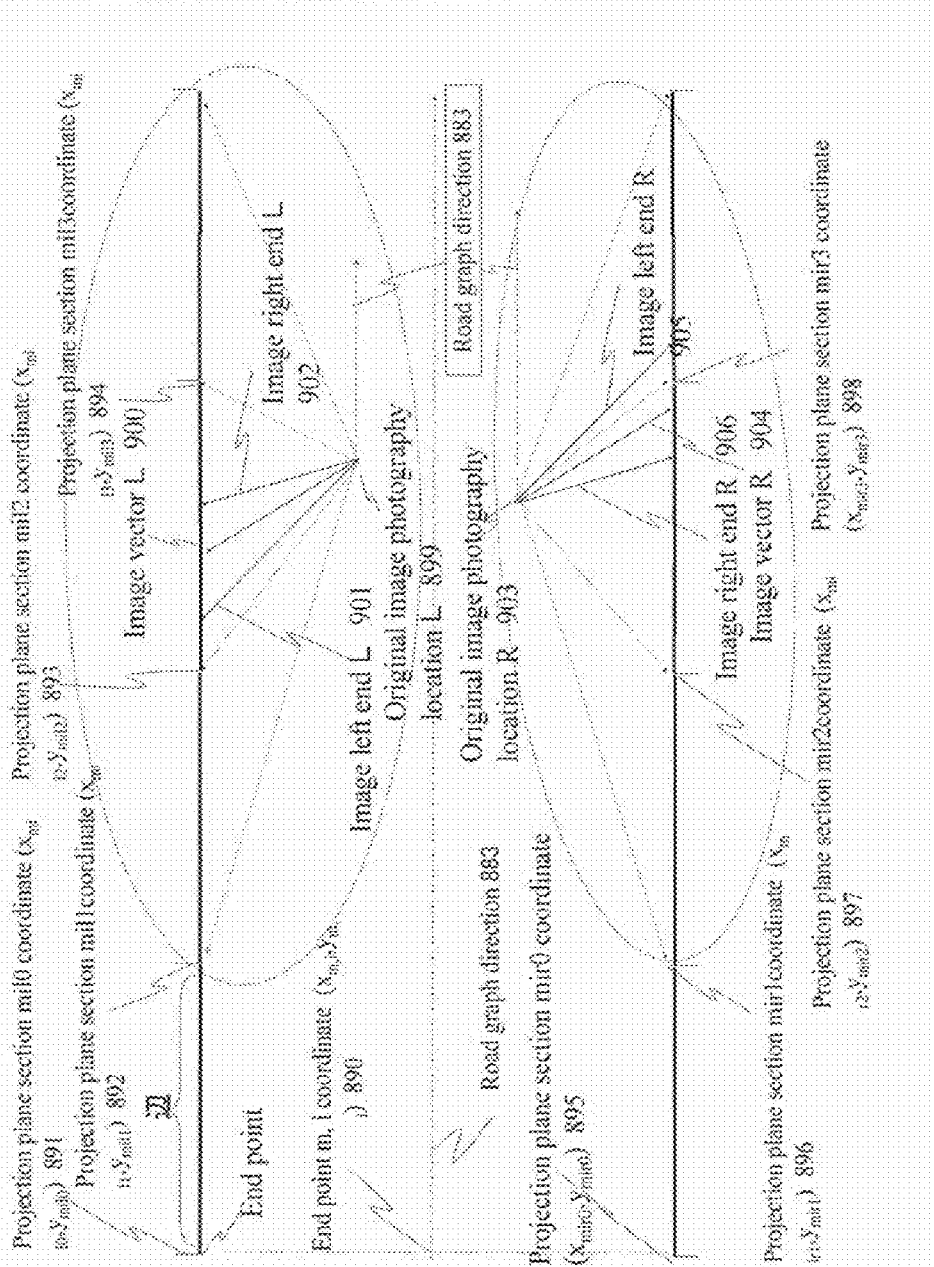
FIG. 66 is a diagram for explaining a process in the case where an eye direction faces a projection plane in the road image database generation registration system and road three dimensional visual data generation system in the present invention.
Figure 67:
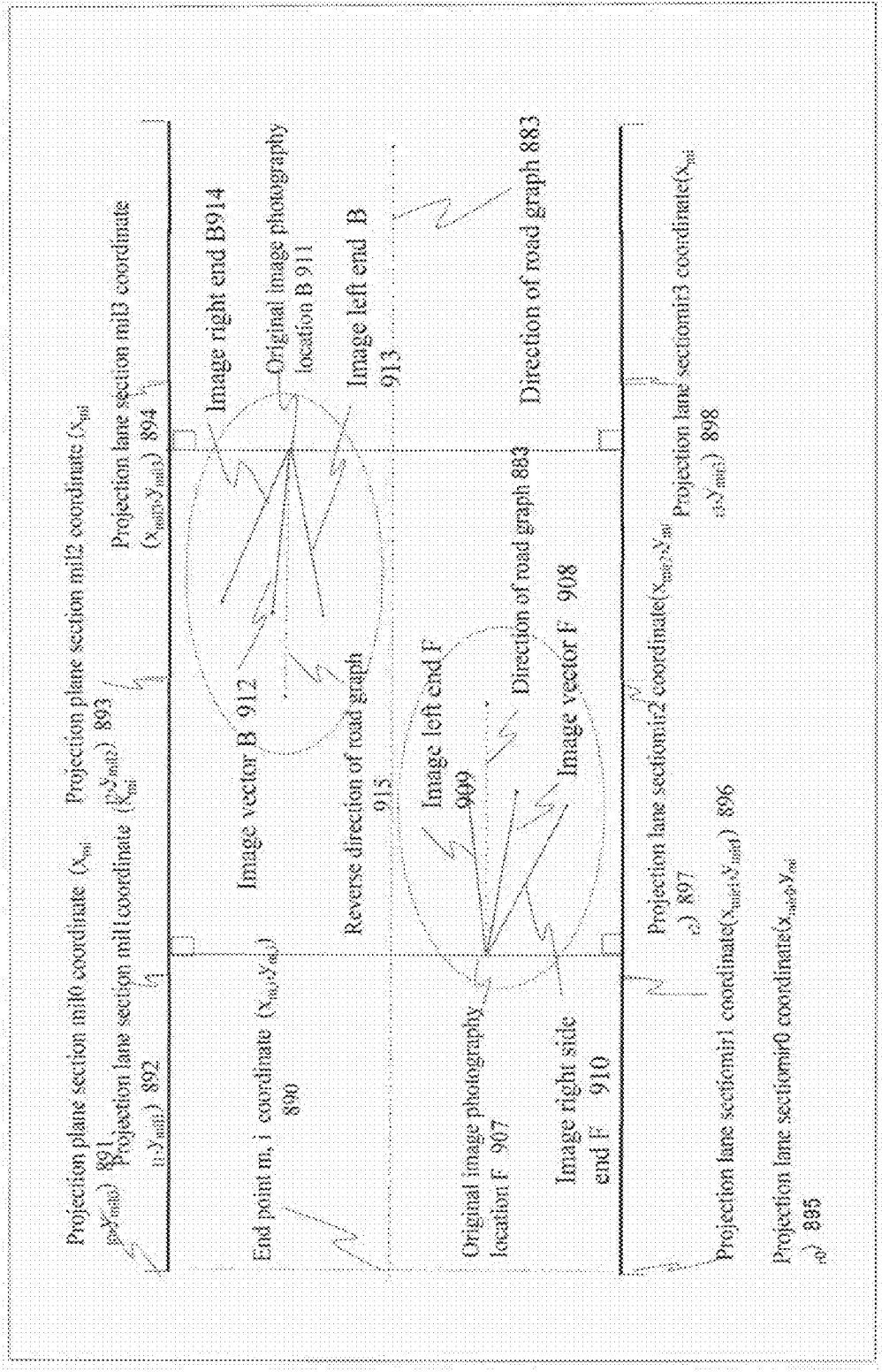
FIG. 67 is a diagram for explaining a process in the case where an eye direction is almost parallel to a projection plane in the road image database generation registration system and road three dimensional visual data generation system in the present invention.

Next, the structure of an image projection plane is explained using FIG. 66. When a view point and sight line are decided, the road three dimensional video generation system of the present invention searches for the most suitable original image and morphing is performed according to a disparity. As a result, an actual image with few disparities with respect to the provided view point and sight line must exist and must be able to be rapidly searched. In order to specify an arbitrary point of a road ID No., an end point row is expressed as [end point m, i coordinate $(x_{mi}, y_{mi})$] with respect to the $n^{th}$ end point from the front of a graph and a location on a section of a side which continues from this, however, this section is decided by the shape the road which is too long for the definition of a projection plane. As a result, a left right projection plane is defined as [projection plane section] corresponding to the left side and right side and its side with respect to a road graph direction as a projection plane section as is described in FIG. 66, and divided into a graph formed by ends and sides. With respect to a left side projection plane section of a road graph direction 883 corresponding to an end point m, i coordinate $(x_{mi}, y_{mi})$ 890

$0^{th}$ end point is defined as projection plane section mil0 coordinate $(x_{mil0}, y_{mil0})$, $1^{st}$ end point is defined as projection plane section mil1 coordinate $(x_{mil2}, y_{mil2})$, $2^{nd}$ end point is defined as projection plane section mil2 coordinate $(x_{mil2}, y_{mil2})$, $3^{rd}$ end point is defined as projection plane section mil3 coordinate $(x_{mil3}, y_{mil3})$, and similarly named and defined. The subscript 1 shows a left side. Similarly, With respect to a right side projection plane section of a road graph direction 883

$0^{th}$ end point is defined as projection plane section mir0 coordinate $(x_{mir0}, y_{mir0})$, $1^{st}$ end point is defined as projection plane section mir1 coordinate $(x_{mir1}, y_{mir1})$, $2^{nd}$ end point is defined as projection plane section mir2 coordinate $(x_{mir2}, y_{mir2})$, $3^{rd}$ end point is defined as projection plane section mir3 coordinate $(x_{mir3}, y_{mir3})$, and similarly named and defined so on. The subscript r shows a right side. Each projection plane section is expressed by a side of a road graph continuing from the end point coordinates described above.

Next, when the latitude longitude of a start point is specified as an original image, an index system is constructed for searching by a search means procedure, which is described below, for searching an image photographed by the road image acquisition system 110. In FIG. 66, latitude longitude->road ID No.->end point coordinate->projection plane section coordinate and sightline direction->original image, a digital camera group 755 exists at an original image photography location R903, one digital camera 750 among these photographs an image of an image vector R904, which is a normalized vector, which expresses a camera optical axis, the image vector 904 and the image right side R906 intersect with projection plane section mir2 coordinate $(x_{mir2}, y_{mir2})$ 897, and the image left side coordinate R905 intersects with projection plane section $_{mir2}$ coordinate $(x_{mir2}, y_{mir2})$ 897. Because the usage method of a projection plane in FIG. 65 is different due to an angle formed by the image vector and the road graph direction 883, an original image is linked with a projection plane and registered by the principle described below.

(1) 0 degrees≤angle formed by an image vector with respect to the road graph direction 883 left≤20 degrees projection plane section where a foot of a perpendicular line exists to projection plane section of a view point on a left side of a road graph direction 883 projection plane section where a foot of a perpendicular line exists to projection plane section of a view point on a right side of a road graph direction 883

(2) left 20 degrees≤angle formed by an image vector with respect to road graph direction 883 left≤160 degrees projection plane section where an original image intersects on the left side of a road graph direction 883

(3) left 160 degrees≤angle formed by an image vector with respect to road graph direction 883 left≤180 degrees projection plane section where a foot of a perpendicular line exists to projection plane section of a view point on a left side of a road graph direction 883 projection plane section where a foot of a perpendicular line exists to projection plane section of a view point on a right side of a road graph direction 883

(4) 0 degrees≤angle formed by an image vector with respect to road graph direction 883 right≤20 degrees projection plane section where a foot of a perpendicular line exists to projection plane section of a view point on a right side of a road graph direction 883 projection plane section where a foot of a perpendicular line exists to projection plane section of a view point on a left side of a road graph direction 883

(5) right 20 degrees≤angle formed by an image vector with respect to road graph direction 883 right≤160 degrees projection plane section where an original image intersects on the left side of a road graph direction 883

(6) right 160 degrees≤angle formed by an image vector with respect to road graph direction 883 right≤180 degrees projection plane section where a foot of a perpendicular line exists to projection plane section of a view point on a left side of a road graph direction 883 projection plane section where a foot of a perpendicular line exists to projection plane section of a view point on a right side of a road graph direction 883

That is, since (1) (3) (4) (6) are original images with respect to a front rear direction of a road graph direction 883, they are registered in both left right side projection plane sections.

Following the principle described above, an image vector R904 from an original image photography location R903 in FIG. 66 corresponds to (5) described above, the original image is linked to projection plane section $_{mir2}$ coordinate $(x_{mir2}, y_{mir2})$ 897 and registered. The image vector L900 from an original image photography location L899 in FIG. 66 corresponds to (2) described above, the original image is linked to projection plane section mil2 coordinate $(x_{mil2}, y_{mil2})$ 893 and registered. In addition, the image vector F908 from an original image photography location F907 in FIG. 67 corresponds to (4) described above, the original image is linked to projection plane section $_{mir1}$ coordinate $(x_{mir1}, y_{mir1})$ 896, and projection plane section $_{mil1}$ $(x_{mil1}, y_{mil1})$ 892 and registered. The image vector B912 from an original image photography location B911 in FIG. 67 corresponds to (3) described above, the original image is linked to projection plane section coordinate $_{mil2}$ $(x_{mil2}, y_{mil2})$ 893, and projection plane section $_{mir2}$ $(x_{mir2}, y_{mir2})$ 907 and registered.

Figure 68:
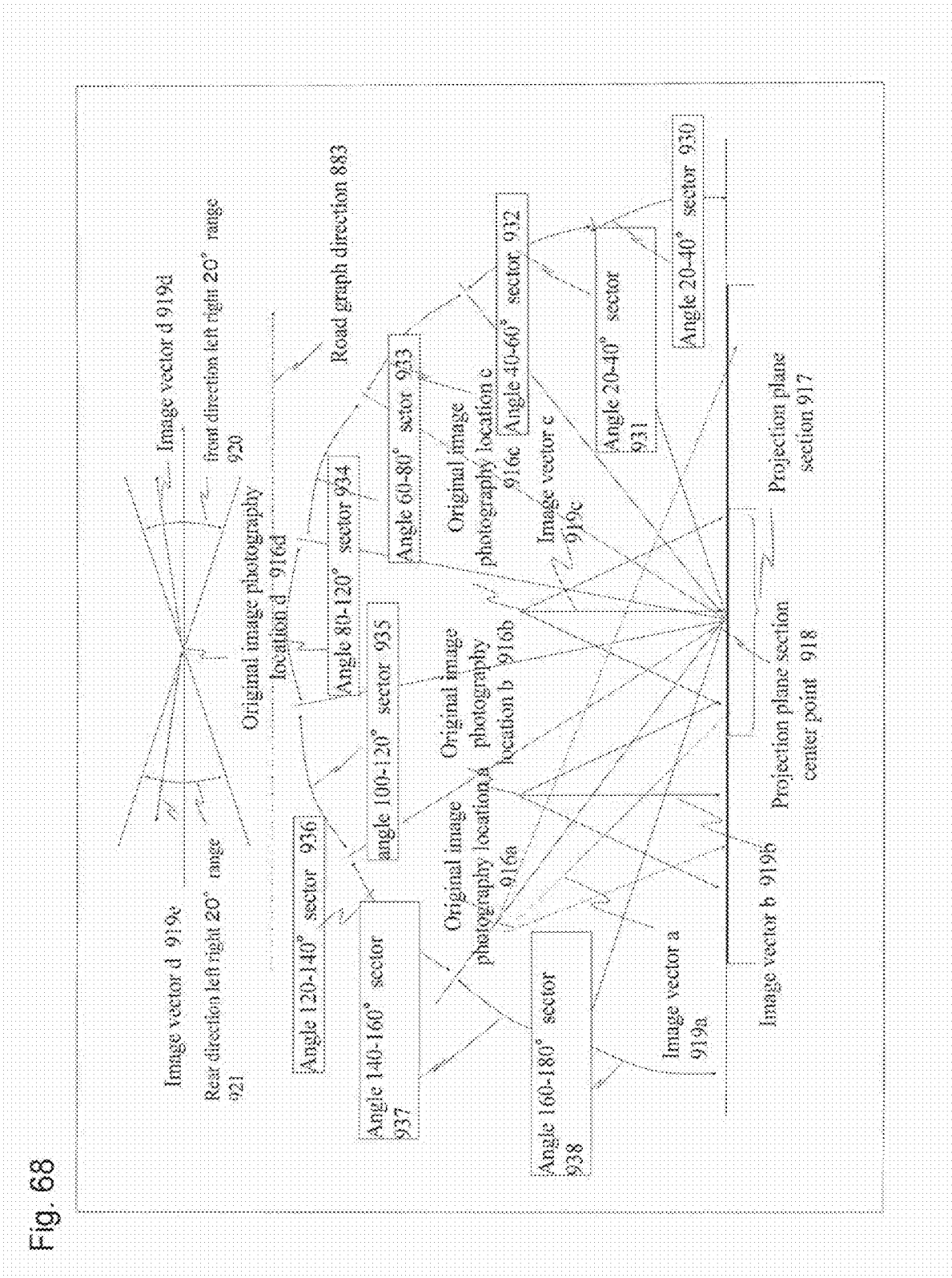
FIG. 68 is a diagram which shows the relationship between a projection plane and an original image photographic optical axis in the road image database generation registration system and road three dimensional visual data generation system of the present invention.
Figure 69:
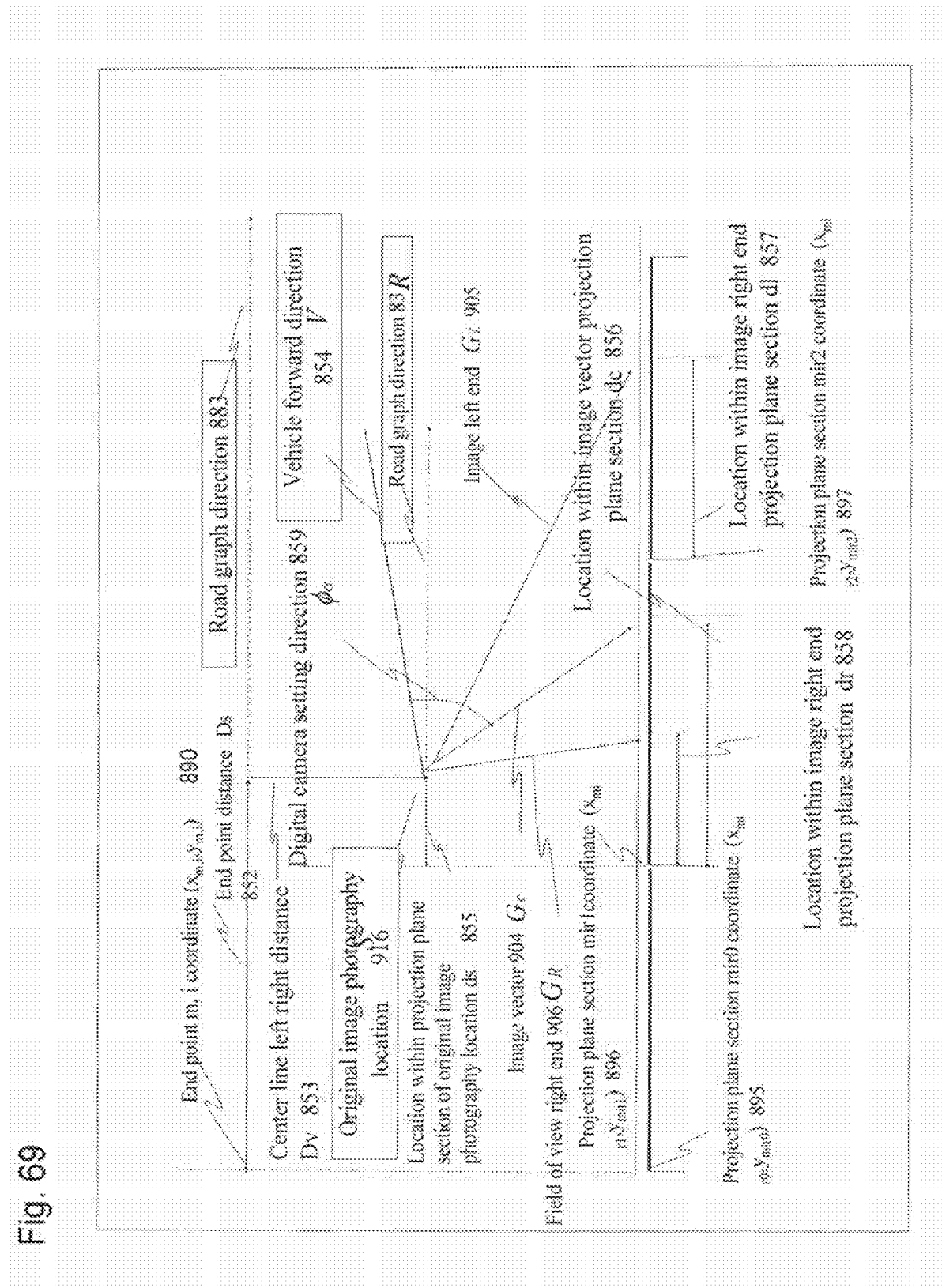
FIG. 69 is a diagram which shows a calculation method of photographic parameters of the road image database of the present invention.

Next, a method of sectioning using an angle formed by an image vector and road graph direction 993 in the case where an original image is registered in a projection plane section is explained using FIG. 68. An image which is linked to a projection plane section 917 and registered is further sectioned depending on what type of sight line vector the projection plane section 917 is estimated with. That is, with respect to an image in which the projection plane section 917 enters, the vision is sectioned according to which sector from 931 to 937 is located on a line which links the original image location and the projection plane section center point 918. An original image photography location a 916a is sectioned into an angle 140-160 degree section 937 and an original image photography location c 916c is sectioned into an angle 80-120 degree section 934. An image vector d 919d which exists in a range of a forward direction left right 20 degrees of an angle formed by an image vector and a road graph direction 883 sections an original image into an angle 20-40 degree section 930 because a foot of a perpendicular line from the original image photography location d 916d exists in the projection plane section 917. An image vector e (919e) which exists in a range 921 of a rear direction left right 20 degree of an angle formed by an image vector and a road graph direction 883 sections an original image into an angle 160-180 degree section 938 because a foot of a perpendicular line from the original image photography location d 916d exists in the projection plane section 917. The location relationship of a plurality of original images seen from human sight line location of an arbitrary plane which faces a passageway along the arbitrary passageway of the city is shown in FIG. 68, and the projection plane section 917 is estimated and photographed by each image vector b (919b) and image vector c (919c) from an original image photography location b (916b) and an original image photography location c (916c). An angle (solid angle) which estimates the original image photography location b (916b) and an original image photography location c (916c) from an arbitrary point on the projection plane section 917 is at most 50 degree in FIG. 68, and an original image of a three dimensional visual data is prepared by an angle which estimates for each solid angle of an angle at most 50 degree (semi-apex angle 25 degrees) from an arbitrary point along the passageway. A solid angle is calculated using $2\pi(1-\cos\theta)$ with respect to a semi-apex angle θ in steradians, becoming 0.59 steradians and this is the upper limit of the solid angle.

So far, the projection plane and the image index method with respect to a road have been explained. The structure of a specific road image index mechanism is explained in FIG. 64. The road graph database RDGDT 790 explained in FIG. 46 is extended so that a projection plane original image index table address 873 is added next after an attribute column, further sectioned into projection plane sections for a road original image projection for every end point and side which form the road graph database RDGDT 790m. That is, a relative record address of the road ID No. m is linked to an address PJINXTADR mi of a projection plane original image index table PJINXT871 with respect to an end point a projection plane section which belongs to the end point mi is divided into a left side (left wall) and right side (right wall) of the road graph direction 993 corresponding to the relative record address 874 in order from a start point. The number of cells is the number of projection plane sections that belong to the end point mi. An expression of a projection plane section is shown by its starting coordinate with respect to each projection plane section. A projection plane original image index table address 875 PJADRTADR exists in the projection plane original image index table PJINXT 871 with respect to each projection plane section of left right walls, and is linked to a projection plane original image index table PJADRT 872 corresponding to FIG. 68. A road original image corresponding to a projection plane section is sectioned according to a sight line angle which estimates a projection plane section, the number of original images included in each section is described as road image data 869 and the original images are described as road image data address 870. In this way, a high speed search mechanism is completed.

Figure 62:
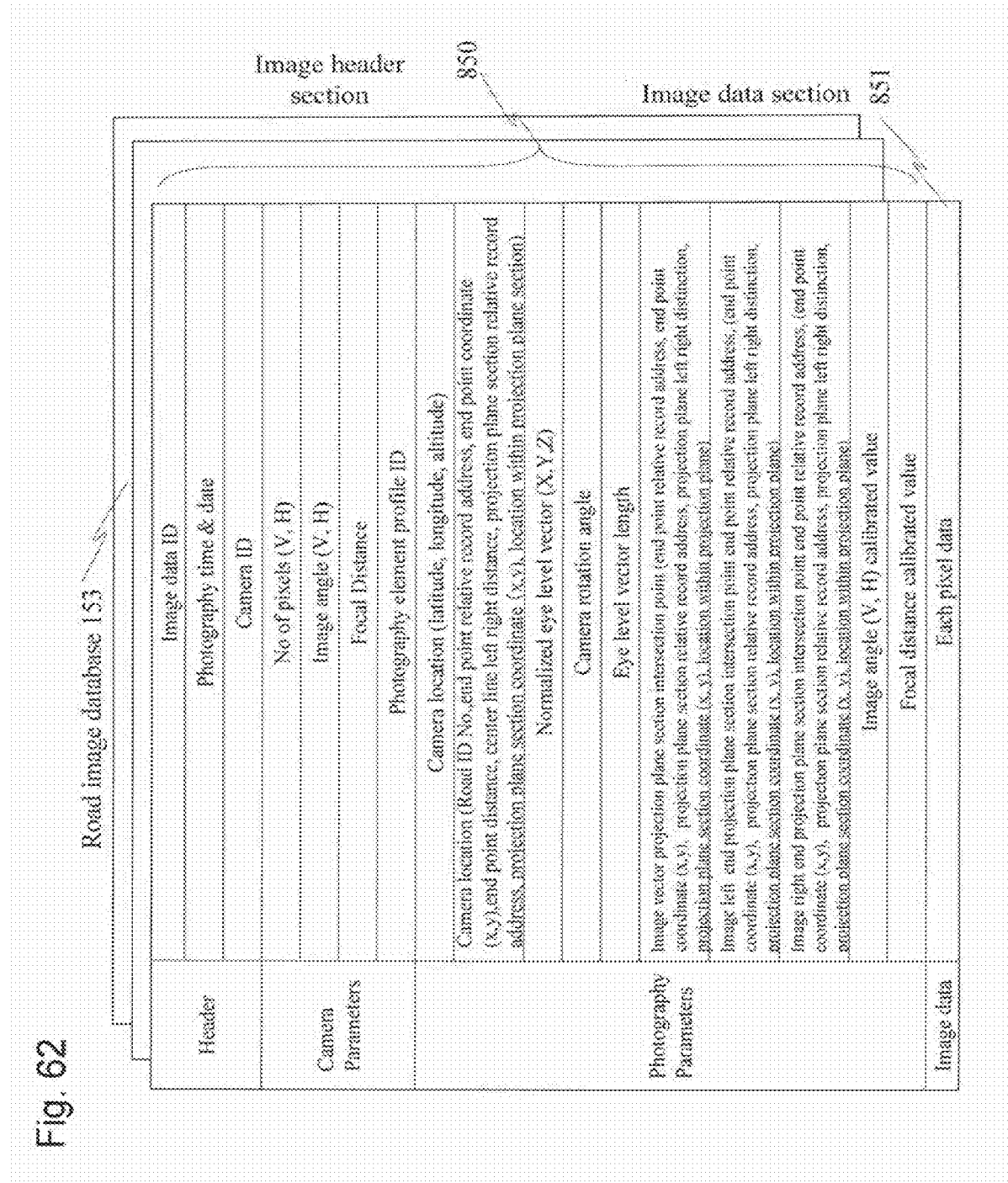
FIG. 62 is a diagram which shows a structure of the road image database of the present invention.
Figure 63:
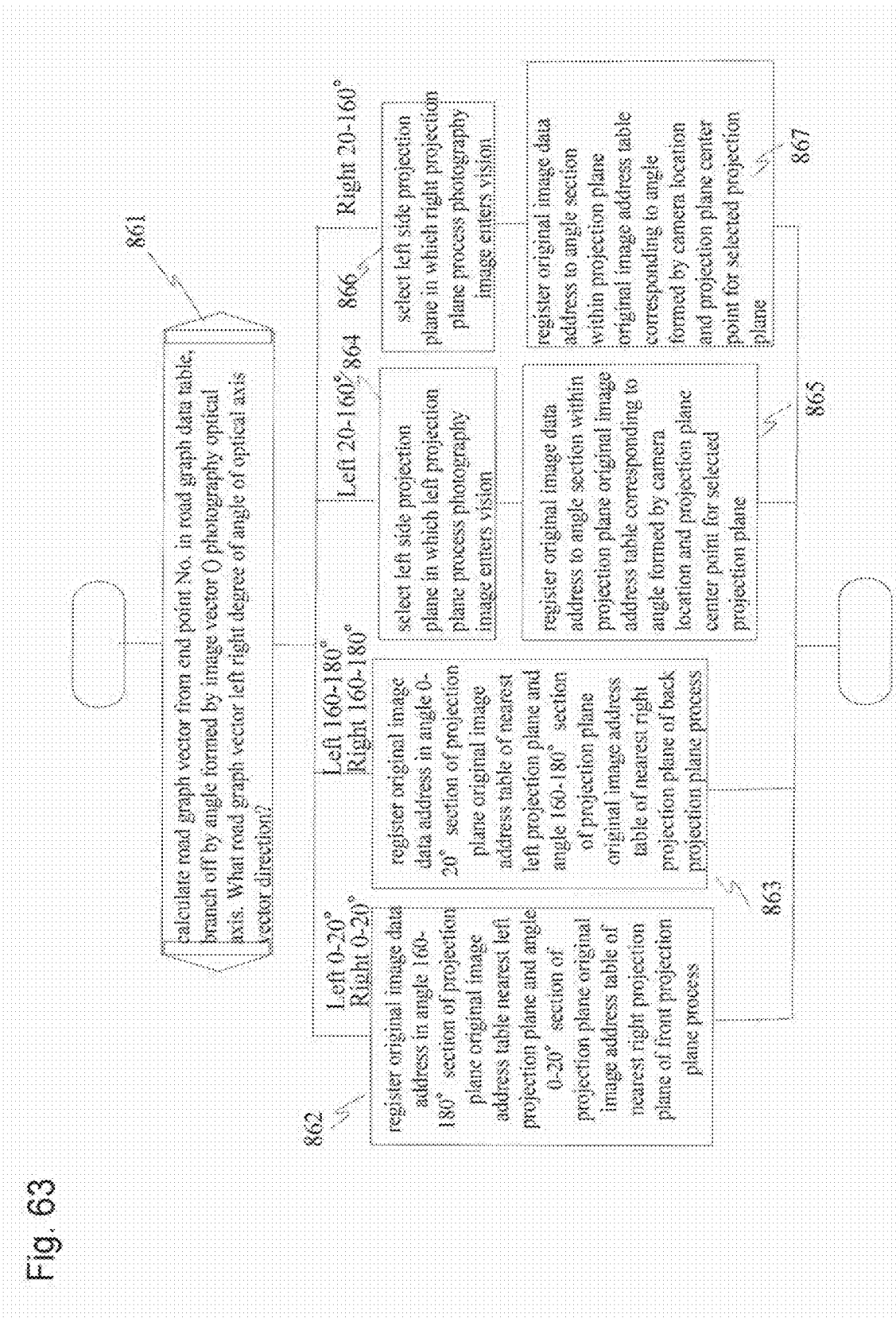
FIG. 63 is a diagram which a process flow of road image index generation in an image database generation registration system of the present invention.

Latitude longitude->road ID No.->end point coordinate->projection plane section coordinate Projection plane section coordinate and sight line direction->original image Next, the structure of the road image database 153 is explained according to FIG. 62. The road image database 153 must be formed by consistency between a road image index mechanism 152 and a road graph database 151 based on the data acquired in the primary road image file 112. The road image database 153 in FIG. 62 generates and registers according to the process follow of the road image database generation registration system in FIG. 61. In the process block 843, all images are processed in order in the road image one dimensional file 112 accumulated during one day's travel by the road image acquisition system 110 after photography is complete. In the process block 844, a header of an image header part 850 in the road image database is created in FIG. 62, however, a header of the image header part 470 of the primary road image file 112 in FIG. 59 is copied as it is. Usually, the camera parameters of the image header part 470 of the primary road image file 112 for the process block 845 may also be copied as it is. In the process block 846, photography parameters of the image header part 850 are calculated for each image. This process is explained below.

Camera location is stipulated by latitude, longitude and altitude, however, when location measurement via a general vehicle GPS380 is performed by a DGPS an accurate location may be obtained of the ground surface as it is. Because there are errors when location measurement via a general vehicle GPS380 is performed by a GPS, after travelling, coordinate correction data from a DGPS station which measures at the same time as when travelling may be obtained and correction performed according to the photography date and time. The case of the road image acquisition system 110 is different to the case of the aerial image because a road is travelled along only in two dimension and the distance between a photography point and the photography object is close compared to an image angle and therefore photography parameters may be calculated approximate to plane geometry. A camera location of a second record (road ID No. end point relative record address, end point coordinate (x,y), end point distance, center line left right distance) is searched from the ground cell road index table CLLRDINXT785 in FIG. 46 if a road ID No. is not identified, a road graph address table RDGRADRT788 and a road graph data table RDGDT790 are searched from a road ID No. relative record address and a road ID No. is immediately identified up to the road ID No. end point relative record address, end point coordinates (x,y).

A Road graph direction (vector) R883 is calculated by normalizing $(x_{m,i+1}-x_{m,i}, y_{m,i+1}-y_{m,i})$, and a vehicle forward direction (vector) V853 is a normalized vector obtained from a vehicle data part 840 of a primary road image file. A setting direction with respect to the vehicle forward direction of an arbitrary digital camera α is expressed by a rotation matrix with respect to a (vector) V, and given a digital camera setting direction $\phi_a$ 859, this numerical value is decided when the structure of the digital camera group 755 is decided. An end point distance Ds 852 with respect to an original image photography location S916 is calculated by:

$$D_s = R \cdot (S - X_{mi})$$ [equation 36]

$$X_{mi} = \begin{pmatrix} x_{m,i} \\ y_{m,i} \end{pmatrix}$$

A center line left right distance Dv 853 is calculated by:

$$D_V = \|S - D_s R\|$$ [equation 37]

and whether it is on the left or right side of the road graph is determined by a positive or negative of:

$$R \times (S - X_{mi})$$ [equation 38]

A point where an image vector 904 from the original image photography location S916 intersects on a projection plane with respect to an arbitrary scalar a, n:

$$X_{mir0} + nR = S + aG_c$$ [equation 39]

$$G_c = \phi_a V$$

$$X_{mir0} = \begin{pmatrix} x_{mir0} \\ y_{mir0} \end{pmatrix}$$

where $$R = \begin{pmatrix} R_x \\ R_y \end{pmatrix}$$

$$S = \begin{pmatrix} S_x \\ S_y \end{pmatrix}$$

$$G_c = \begin{pmatrix} G_{c_x} \\ G_{c_y} \end{pmatrix}$$

and by solving this, we obtain:

$$n = \frac{(S_x G_{cy} - S_y G_{cx}) - (x_{mir0} G_{cy} - y_{mir0} G_{cx})}{R_x G_{cy} - R_y G_{cx}}$$ [equation 40]

The length of a projection plane section usually is the same, however, because the coordinates are a projection plane section are stipulated, a total projection plane length from projection plane section mir0 coordinates (xm i r0, ym i r0) 895 up to arbitrary projection plane section miri coordinates (xm i ri, ym i ri) is identified. A projection plane section relative address and image vector projection plane section internal location dc 856 are calculated by a simple deduction from n described above. Similarly, it is possible to calculate an image left end projection plane section internal location dl 857 and image right end projection plane section internal location dr 858.

Figure 64:
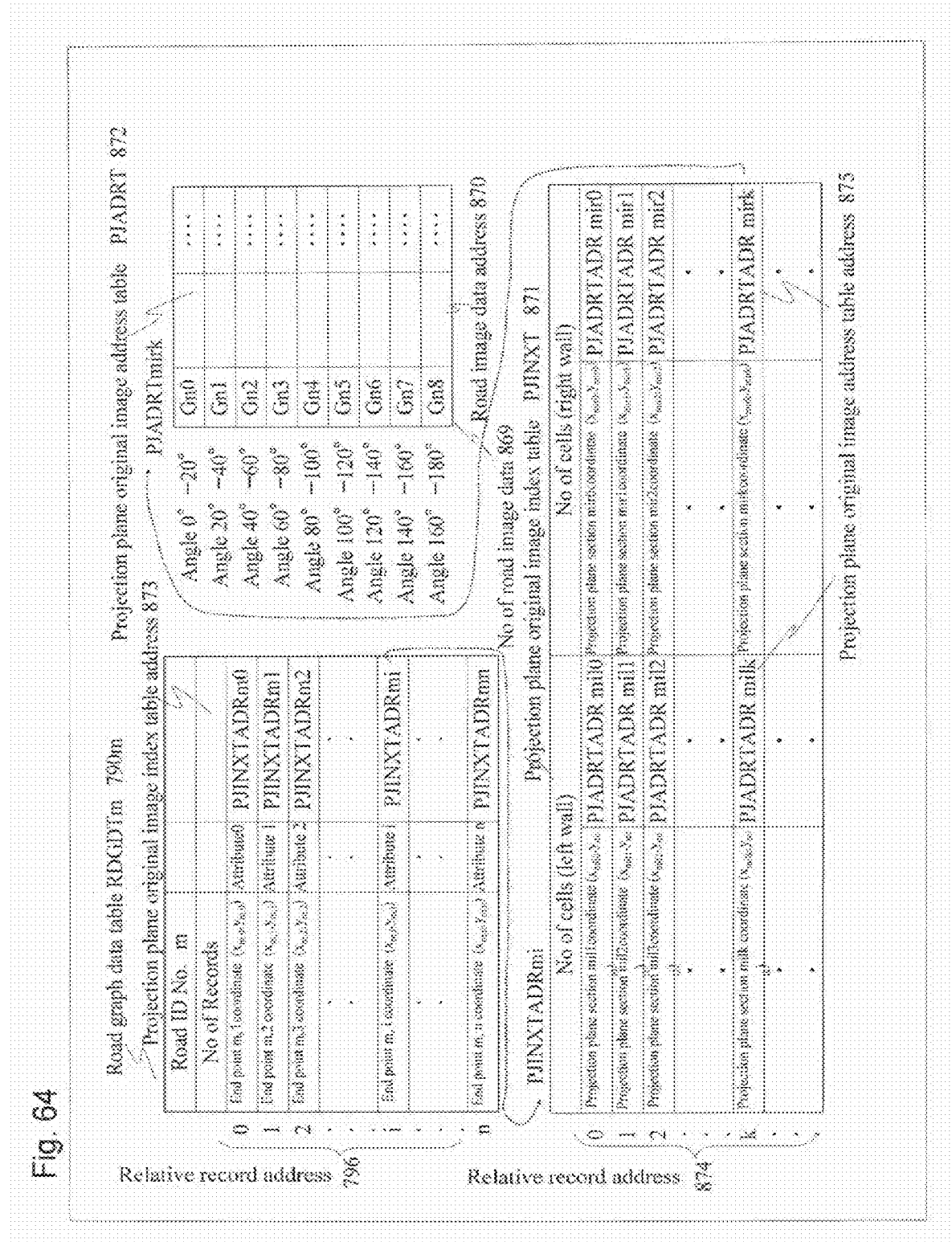
FIG. 64 is a diagram which shows the structure of a road image index mechanism of the present invention.

Next, a result calculated from the process block 847 and the process block 844 is stored in the image data part 851 of the road image database 153 shown in FIG. 62. In the last process block 848 of the road image database generation registration system in FIG. 61, a road image index mechanism shown in FIG. 64 is generated for generating video using road image data registered by the process block 847. The contents of the block 848 are described in the road image index generation process flow of the road image database generation registration system 130 in FIG. 63. The contents of this process are based on the road image index mechanism described in detail in the explanation from FIG. 64 to FIG. 68, however, a road graph direction is calculated from an end point within the road graph data table in process block 861, and branches off by an angle formed with an image (photography optical axis). When an image vector direction is from left side 0 degree to 20 degrees and from right side 0 degree to 20 degrees with respect to a road graph direction, in process block 862, an original image data address is registered at an angle 160 degrees to 180 degrees section part of a projection plane original image address table of the nearest left projection plane and an angle 0 degree to 20 degrees section part of a projection plane original image address table of the nearest right projection plane as a front direction projection plane process. When an image vector direction is from left side 160 degrees to 180 degrees and from right side 160 degrees to 180 degrees with respect to a road graph direction, an original image data address is registered at an angle 0 degree to 20 degrees section part of a projection plane original image address table of the nearest left projection plane and an angle 160-180 degrees section part of a projection plane original image address table of the nearest right projection plane as a rear direction projection plane process in the process block 863. When an image vector direction is from left side 20 degrees to 160 degrees with respect to a road graph direction, a left side projection plane where a photography image enters vision is selected as a left projection plane process in process block 864, and an original image data address is registered at this angle part within a projection plane original image address table corresponding to an angle formed by a camera location and projection plane middle point based on the projection plane selected in process block 865. When an image vector direction is from right side 20 degrees to 160 degrees with respect to a road graph direction, a left side projection plane where a photography image enters vision is selected as a right projection plane process in process block 866, and an original image data address is registered at this angle part within a projection plane original image address table corresponding to an angle formed by a camera location and projection plane middle point based on the projection plane selected in process block 867.

Figure 74:
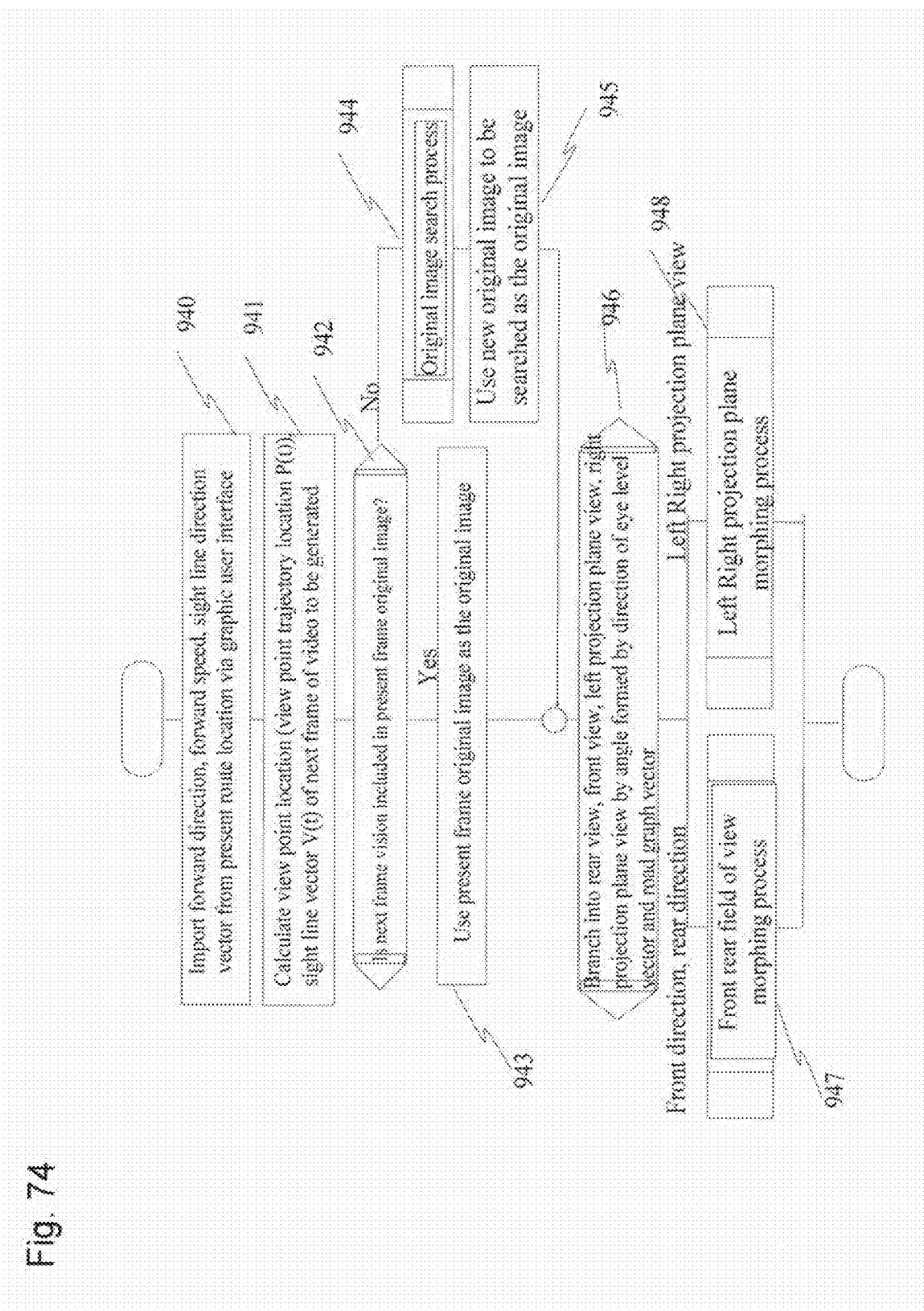
FIG. 74 is a diagram which shows a process flow in the road three dimensional visual data generation system of the present invention.

Next, a road video generation process system in the city landscape three dimensional video amusement system is explained. Generation of road video by selecting an original image which is closest to a view point and a sight line, a disparity with respect to an image projection plane is calculated and morphing is performed according to a model in FIG. 65. In principle, this is the same as an algorithm in the aerial three dimensional video generation system 160. However, in this case, because it is at human sight line, the sight line moves in a horizontally and a perpendicular line axis does not tilt. As a result, morphing is processed in two dimensions. The entire process is shown in FIG. 74.

Figure 70:
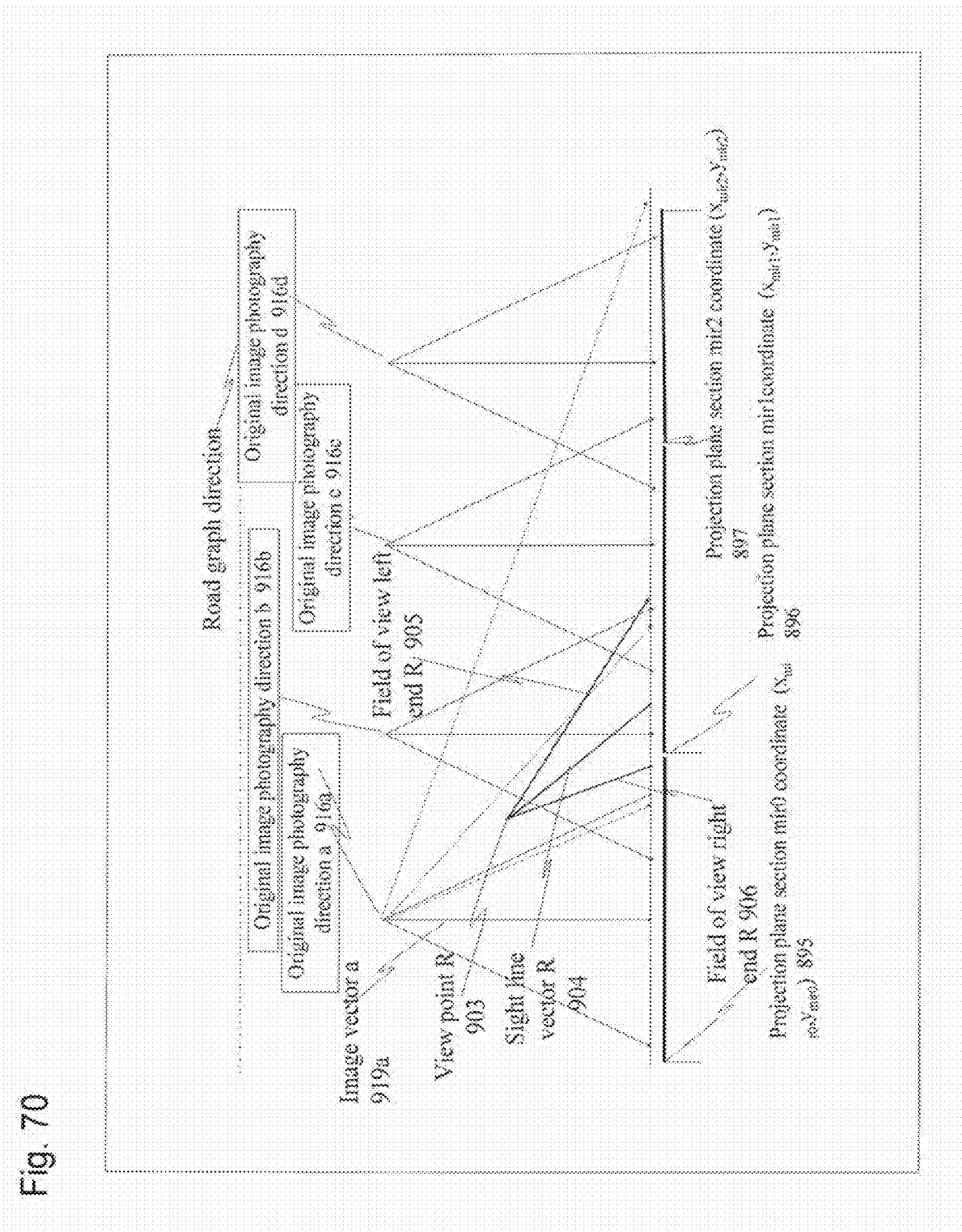
FIG. 70 is a diagram for explaining the selection of an original image in the road three dimensional visual data generation system of the present invention.

In the process block 940, a movement direction, a movement speed, location and a sight line direction vector, which should be calculated as the next video frame (next frame), are imported by the graphic user interface system 180. In the process block 941, a view point location, a sight line vector, a ground surface object point coordinates of the next frame are calculated based on these values. It is judged in the process block 942 whether vision in the next frame is within a range included in an original image of the present frame by comparing with photography parameters of an original image of the road image database. In the case where it is not included, it is necessary to recalculate the most suitable original image and move to process block 944. In the case where it is included, settings for continuing to use an original image of the present frame are performed in process block 943. Referring to the example in FIG. 70, a view point 8903 shows that a right front view image photographed at the original image photography location a 916a can become a right side projection plane original image.

Figure 75:
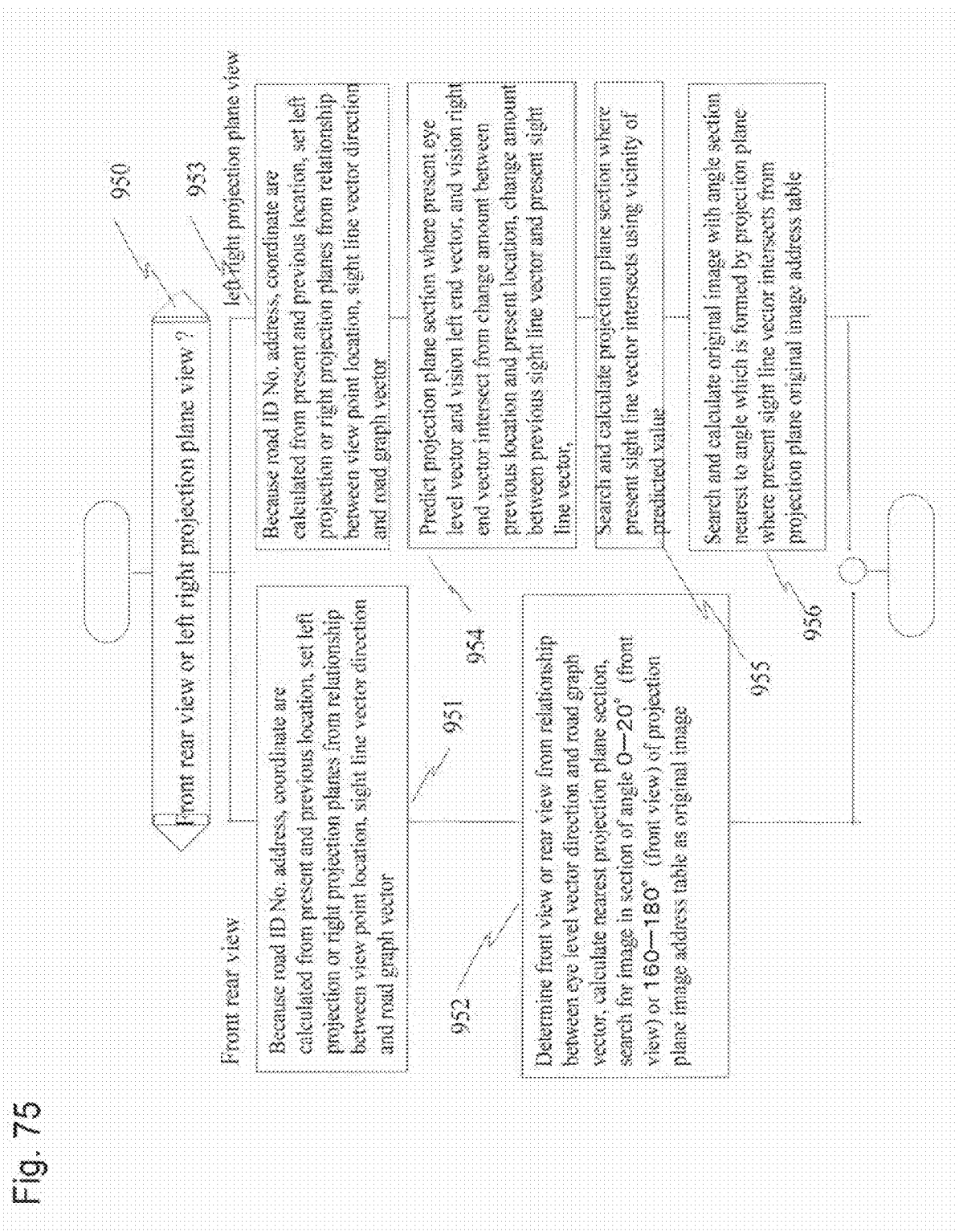
FIG. 75 is a diagram which shows a process flow of an original image search in a process of the road three dimensional visual data generation system of the present invention.
Figure 76:
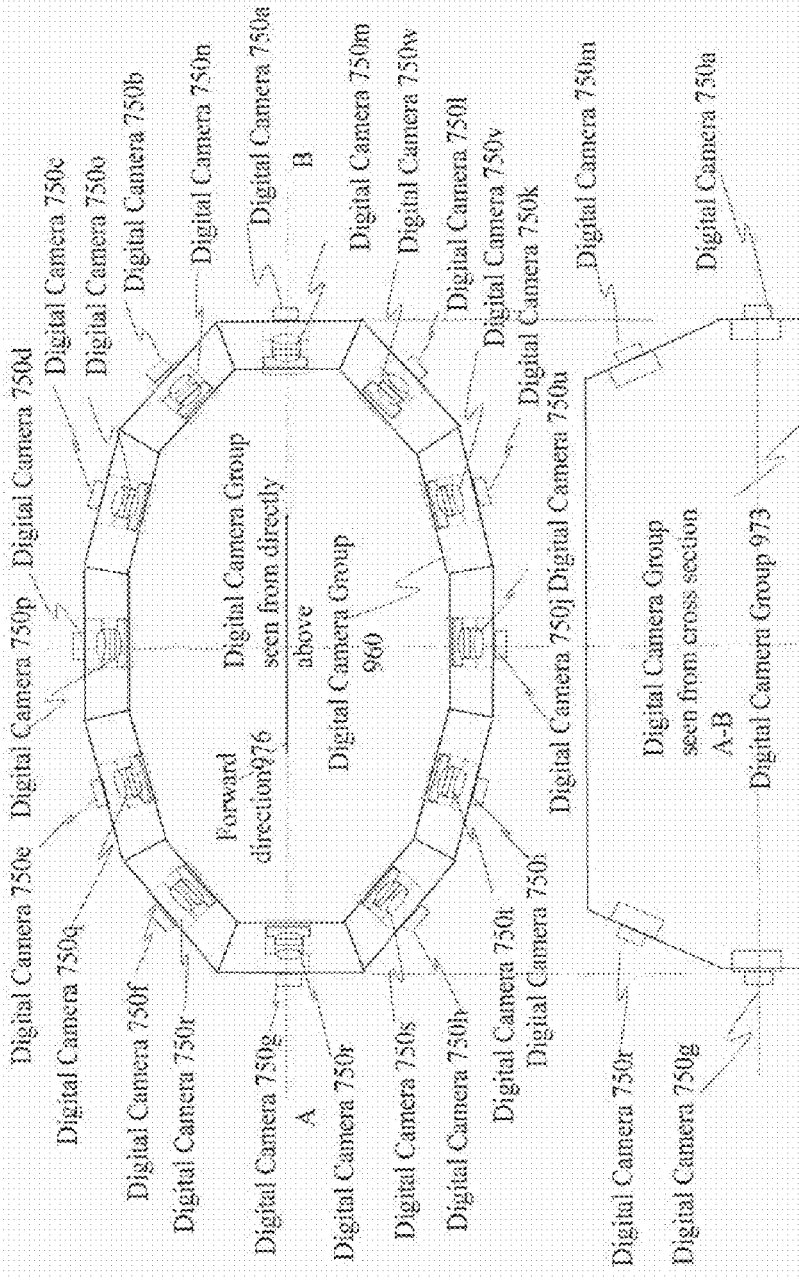
FIG. 76 is a diagram which shows another structural example of the vehicle installed digital camera group of the present invention.

The process contents of the process block 944 are shown in more detail in FIG. 65 and the process flow of the original image search in the process of the road three dimensional video generation system in FIG. 75. FIG. 75 is explained below while referring to FIG. 65. In the process block 950 a judgment is made whether to generate an image at a front and rear virtual projection plane or generate an image at a left right virtual projection plane along a road using an angle 882 formed by a road graph and a sight line according to a section in FIG. 65. In the case where a left right projection plane view is selected, because a road ID No. end point address and coordinates are calculated from the previous location and present location in process block 953, a left projection plane or a right projection plane is decided from the relationship between a view point location, a sight line vector direction and a road graph vector according to the reference in FIG. 65.

Furthermore, in the process block 954, a projection plane section where the present sight line vector and a vision left end vector, a vision right end vector intersect is predicted by the amount of change between the previous location and the present location and the amount of change between the previous sight line vector and the present sight line vector. Usually a projection section of a present frame is continued to be used or an adjacent projection section is used. In the process block 955 a projection plane section in which the present sight line vector intersects is calculated by searching near a predicted value. In the process block 956, an original image address of an angle section closest to an angle formed by a projection plane section which intersects with the present sight line vector is searched from a projection plane original image address table PJADRT by the search mechanism in FIG. 64 according to the section in FIG. 68, and calculated. In process block 950, in the case where it is judged to generate an image at a front and rear virtual projection plane by the judgment in FIG. 65, because a road ID No. end point address and coordinates are calculated from the previous location and present location in the process block 951, a left projection plane or a right projection plane is decided from the relationship between a view point location, a sight line vector direction and a road graph vector. In this case of a front rear view, a left right projection plane is not used as a projection plane, however, this judgment is performed because of linking to a left right projection plane by an original image photography location and registering. In the process block 952, a judgment with regards to a front view or a rear view is made from the relationship between a sight line vector direction and a road graph vector according to a section in FIG. 65, the nearest projection plane section is calculated, and an image in a section with an angle of 0-20 degrees (front view) or an angle of 160-180 degrees (front view) of the projection plane original image address tale is searched as an original image. Returning to process block 945 in FIG. 74, the searched new original image is used as an original image.

Figure 71:
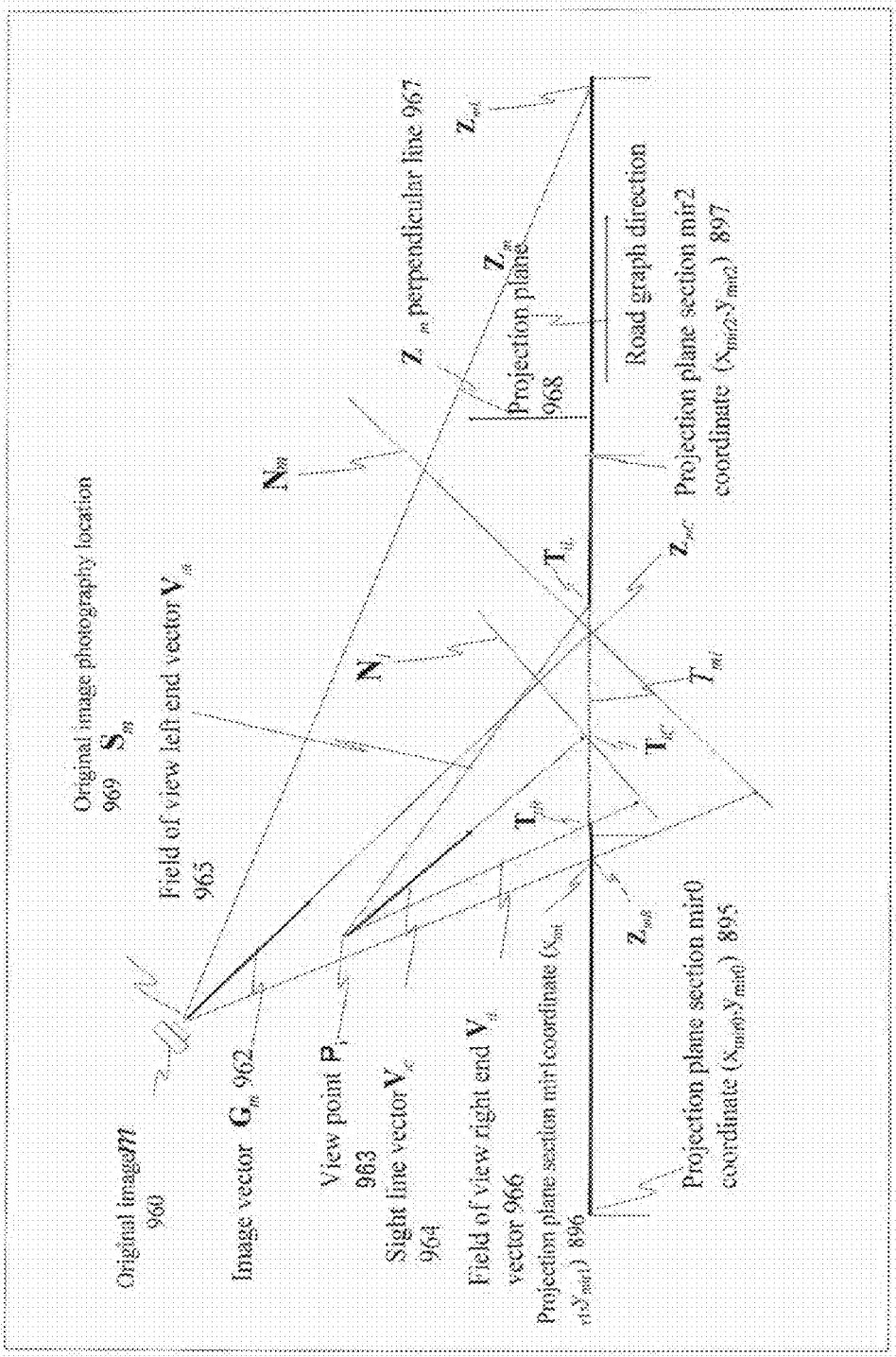
FIG. 71 is a diagram which shows a method of morphing a projection plane in the road three dimensional visual data generation system of the present invention.
Figure 72:
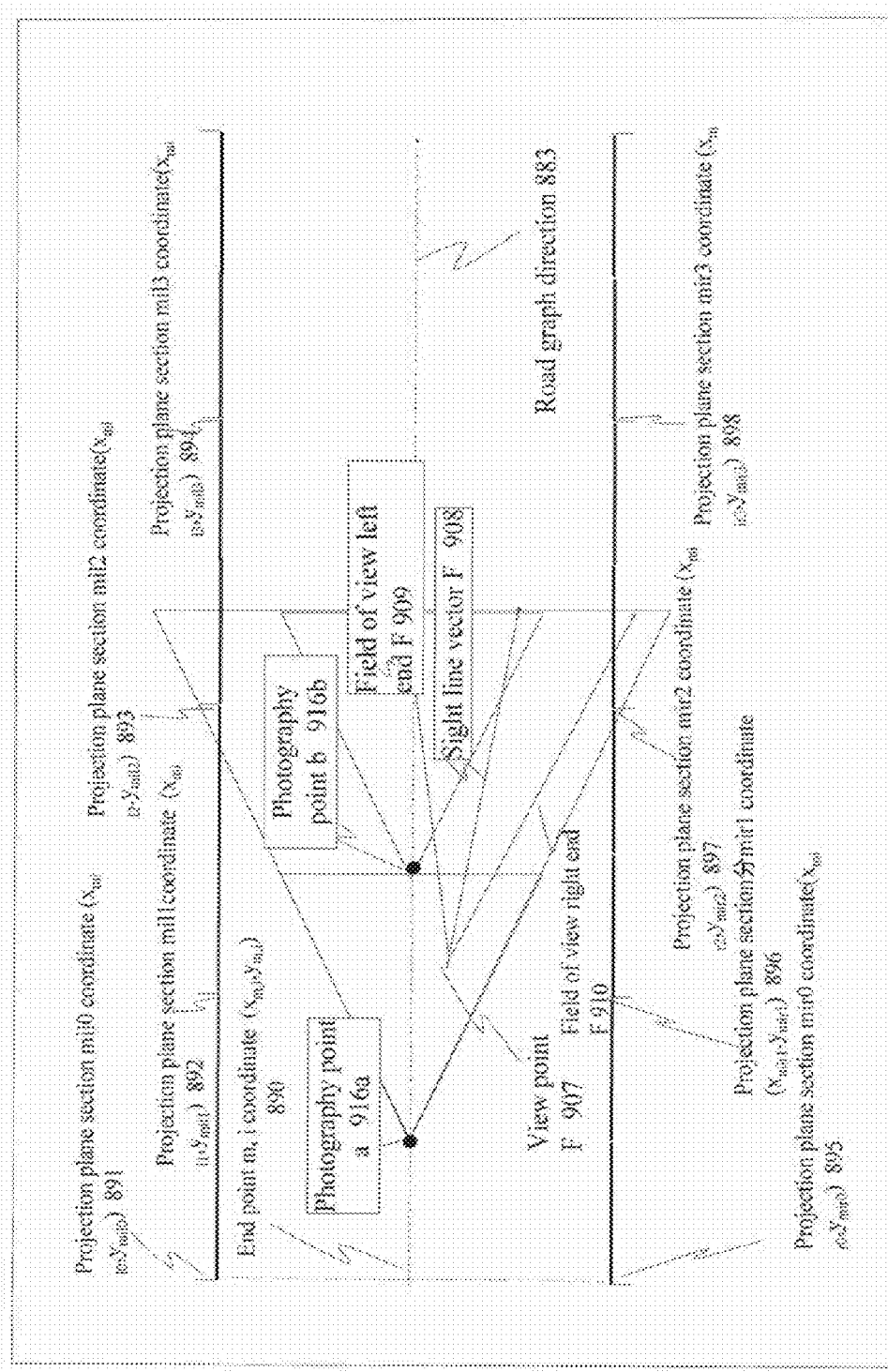
FIG. 72 is a diagram which shows a method of morphing a field of view almost parallel to a projection plane in the road three dimensional visual data generation system of the present invention.

In the process block 946, branching off from the reference in FIG. 6, a left right projection plane morphing process in process block 948 or a front rear field of view morphing process in process block 947 is performed. The contents of the left right projection plane morphing process in process block 948 are explained in the following text and equations while referring to FIG. 70 and FIG. 71. When an original image photography location $S_m$ 671, an image vector $G_m$ 673 (norm=1) and a projection plane are decided with respect to an original image m, the image vector $G_m$ 673 and an intersection point $Z_{mC}$ of a projection plane, and image left end, right end and intersection of a projection plane $Z_{mL}$ $Z_{mR}$ are decided. A vector $Z_m$ which expresses a projection plane is the same normalized vector as the road graph direction R883. A perpendicular line $Z_m$ is given as $n_m$ (normalized). $Z_{mC}$ is a point where the image vector $G_m$ 673 intersects with the projection plane $Z_m$, however, passing through $Z_{mC}$, a plane perpendicular to the image vector $G_m$ is called $N_m$. $N_m$ is an image (vision) photographed by the original image photography location view point $S_m$ 671. A conversion (plane) $Z_m$-->(plane) $N_m$ exists and this is called $\phi_A$. This is a photography action of the original image m. When a view point coordinate Pi, a sight line vector Vi (norm=1) and a projection plane $Z_m$ (common) are decided with respect to a view point Pi, similarly $T_{iC}$ and $T_{iL}$, $T_{iR}$ are decided. Passing through $T_{iC}$, a plane perpendicular to the sight line vector Vi is called $N_i$. (plane) $T_{mi}$ means forming part of $Z_m$ is formed by a vision from view point Pi among projection planes $Z_m$. A vision (plane) $N_i$ of the view point Pi and (plane) $T_{mi}$ are uniquely decided if the view point coordinate Pi, the sight line vector Vi and the vision angle θi are decided. A map of the plane $T_{mi}$ to the plane $N_m$ is decided if $S_m$, $G_m$ and a image angle θm of the original image m are decided. Morphing is complete when each image pixel corresponding to θi of $N_i$ is correlated with a pixel corresponding to θm of $N_m$ by the correspondence of (plane) $N_i$->(plane)$T_{mi}$->(plane) $N_m$. Generally, an arbitrary point X on the plane $Z_m$ is expressed by $$X = aR + Z_{mC} \qquad \text{[equation 41]}$$

using a road graph direction (vector) R883. Here, when $$n_m \cdot R = 0, \qquad \text{[equation 42]}$$

which is a perpendicular line condition, is substituted $$n_m \cdot X = n_m \cdot Z_{mC} \qquad \text{[equation 43]}$$

is obtained. Here, · expresses a vector inner product. Because $T_{iC}$ satisfies:

$$X = P_i + c V_{iC} \qquad \text{[equation 44]}$$

substituting to this and since $$n_m \cdot (P_i + c V_{iC}) = n_m \cdot Z_{mC} \qquad \text{[equation 45]}$$

a field of view center line $V_{iC}$ and an intersection point $T_{iC}$ of the projection plane $Z_m$ becomes $$c = \frac{n_m \cdot Z_{mc} - n_m \cdot P_i}{n_m \cdot V_{iC}} \qquad \text{[equation 46]}$$

and the coordinates at the projection plane $Z_m$ of the image center point of view point Pi is calculated by:

$$X = P_i + \frac{n_m \cdot Z_{mc} - n_m \cdot P_i}{n_m \cdot V_{iC}} V_{iC} = T_{iC} \qquad \text{[equation 47]}$$

Similarly, assuming view left end, a right end normalized sight line vector of the view point Pi is given as $V_{iL}$, $V_{iR}$, it is possible to calculate coordinates using these and the intersection point $T_{iL}$ of the projection plane $Z_m$, the projection plane $Z_m$ of $T_{iR}$. An arbitrary point X on the plane $Z_m$ is expressed by:

$$X = aR + Z_{mC} \qquad \text{[equation 48]}$$

and (equation 44) is established with respect to the left right end normalized sight line vectors $V_{iL}$ and $V_{iR}$ instead of $V_{iC}$ from:

$$n_m \cdot R = 0, \qquad \text{[equation 49]}$$

which is a perpendicular line condition. (k=L, R) From $$n_m \cdot (c V_{ik} + P_i) = n_m \cdot Z_{mC} \qquad \text{[equation 50]}$$

we obtain $$c = \frac{n_m \cdot Z_{mc} - n_m \cdot P_i}{n_m \cdot V_{ik}} \qquad \text{[equation 51]}$$

and the coordinates at the projection plane $Z_m$ of the left right end projection plane $Z_m$ of an image of a view point Pi are calculated by:

$$X = P_i + \frac{n_m \cdot Z_{mc} - n_m \cdot P_i}{n_m \cdot V_{ik}} V_{ik} = T_{ik} \qquad \text{[equation 52]}$$

By correlating coordinates on this plane $Z_m$ with coordinates on the plane $N_m$ it is possible to know which point on plane $Z_m$ which is the original image should be reflected on the image of the view point Pi. The center of an image of the view point Pi on $Z_m$ and the coordinates of the left right end points $T_{iC}$, $T_{iL}$, $T_{iR}$, (together given as $T_{ik}$, k=L, R, C) correspond to $Q_{iC}$, $Q_{iL}$, $Q_{iR}$ (together given as $Q_{ik}$, k=L, R, C) on (plane) $N_m$. When a horizontal line of an image on $N_m$ surface is given as N, an arbitrary point Y on $N_m$ surface is expressed as:

$$Y = Q_{ik} = aN + Z_{mC} \qquad \text{[equation 53]}$$

with respect to an arbitrary constant a. Because an image vector $G_m$ is perpendicular to N, we obtain $$G_m \cdot N = 0 \qquad \text{[equation 54]}$$

and because $Q_{ik}$ and $T_{ik}$ are on the same line seen from the image photography location $S_m$ $$Q_{ik} = d(T_{ik} - S_m) + S_m \qquad \text{[equation 55]}$$

and therefore we obtain $$d(T_{ik} - S_m) + S_m = aN_H + bN_V + Z_{mC} \qquad \text{[equation 56]}$$

and taking an inner product with $G_m$, we obtain $$d = \frac{Z_{mc} \cdot G_m - S_m \cdot G_m}{(T_{ik} - S_m) \cdot G_m} \qquad \text{[equation 57]}$$

and therefore we obtain $$Q_{ik} = \frac{Z_{mc} \cdot G_m - S_m \cdot G_m}{(T_{ik} - S_m) \cdot G_m}(T_{ik} - S_m) + S_m \qquad \text{[equation 58]}$$

Because $T_{ik}$ is already calculated in:

$$T_{ik} = P_i + \frac{n_m \cdot Z_{mc} - n_m \cdot P_i}{n_m \cdot V_{ik}} V_{ik} \qquad \text{[equation 59]}$$

here, correspondence with an image of an original image m of the field of view of the view point Pi is complete Next, a conversion which maps $G_m$ to y axis is calculated. When rotating around z axis as $$\|G_m\| = 1$$

$$G_m = (V_{Ax}, V_{Ay}, 0) \qquad \text{[equation 60]}$$

$N_m$ is placed on x axis. The rotation around the z axis is given by:

$$\begin{pmatrix} \frac{V_{Ax}}{\sqrt{V_{Ax}^2 + V_{Ay}^2}} & \frac{V_{Ay}}{\sqrt{V_{Ax}^2 + V_{Ay}^2}} & 0 \\ -\frac{V_{Ay}}{\sqrt{V_{Ax}^2 + V_{Ay}^2}} & \frac{V_{Ax}}{\sqrt{V_{Ax}^2 + V_{Ay}^2}} & 0 \\ 0 & 0 & 1 \end{pmatrix} \qquad \text{[equation 61]}$$

Figure 73:
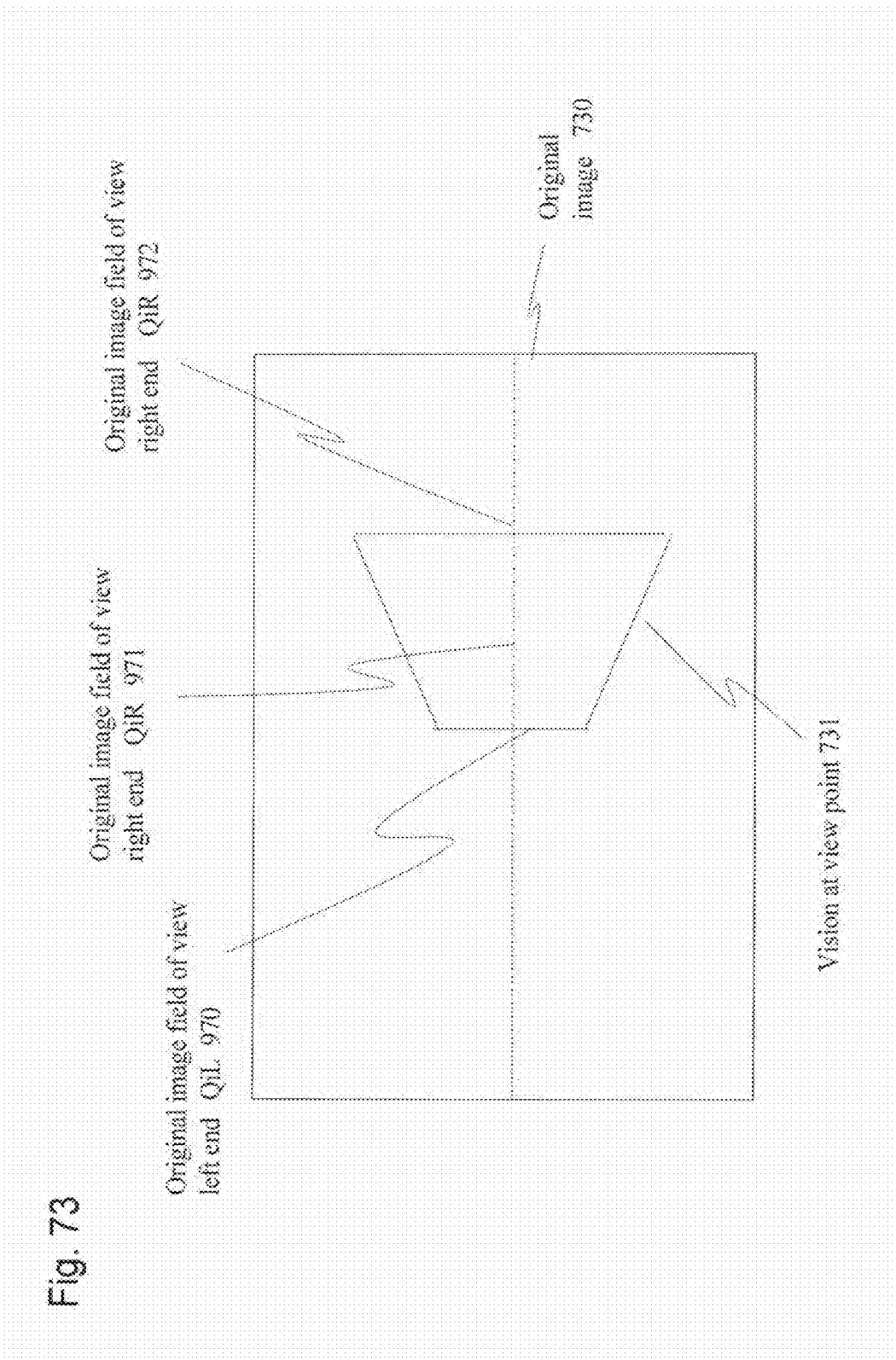
FIG. 73 is a diagram which shows a process flow in the road three dimensional visual data generation system of the present invention.

If a conversion is made to shift $G_m$ to z axis with respect to intersection point $Q_{ik}$ (k=L, R, C) of plane $N_m$, $Q_{ik}$ (k=L, R, C) is converted to a point on x axis. This corresponds to a location on an image of the original image m, that is, morphing. Because the above is two dimensional morphing, the correspondence on a horizontal line in FIG. 73 is calculated in pixel units. The correspondence in the original image 730 of the vision 731 at a view point is shown on a horizontal line. A perpendicular direction is symmetrical up and down and an enlargement reduction ration is the same ratio as the on the horizontal line. Furthermore, if the movement of sight line is not limited to within a horizontal surface, then a three dimensional morphing process may be used in aerial three dimensional video generation. Furthermore, in a front rear field of view morphing process in the process block 947 in FIG. 74, a field of view of the view point F907 is generated by the same algorithm as explained in process block 948 by a two dimensional morphing from an original image at the photography point a 916a. The explanation related to the road three dimensional video generation of the city landscape three dimensional video generation amusement system of the present invention is complete.

Another structural example of the digital camera group 973 for installing in a vehicle is shown in FIG. 73. In the city landscape three dimensional video generation of the present invention, the distance between a photography object and the digital camera group becomes shorter due to a city road structure and there is a tendency for disparity between adjacent original images to become larger. As a result, the smoothness of the generated video sometimes deteriorates. In order to solve this problem, it is possible to collect original images more suitable for three dimensional video generation by halving an angle pitch of a digital camera in a side direction with respect to a forward direction 976 and adopting a wide angle lens over the entire digital camera.

Figure 77:
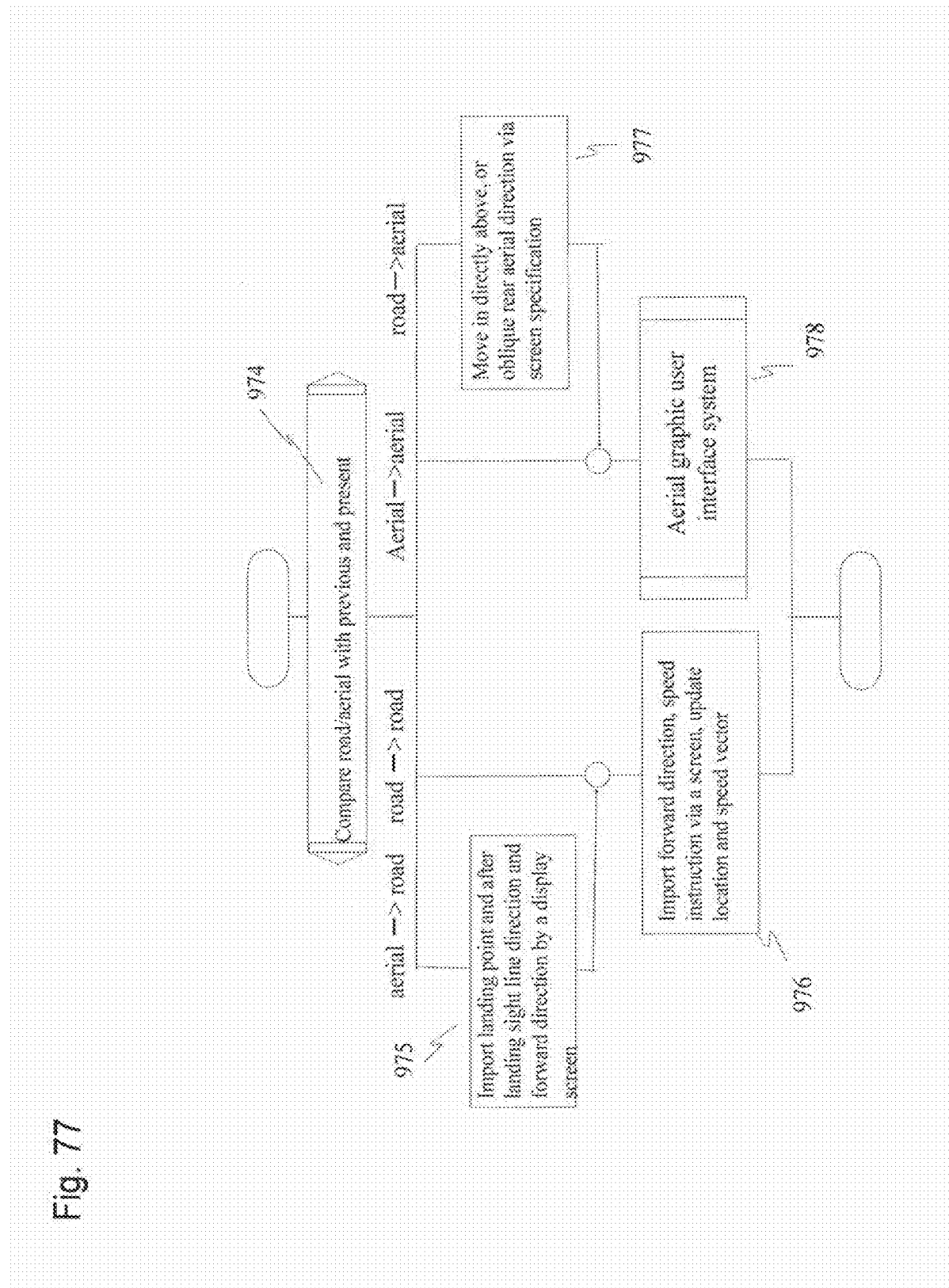
FIG. 77 is a diagram which shows a process flow of a graphic user interface system of the present invention.
Figure 78:
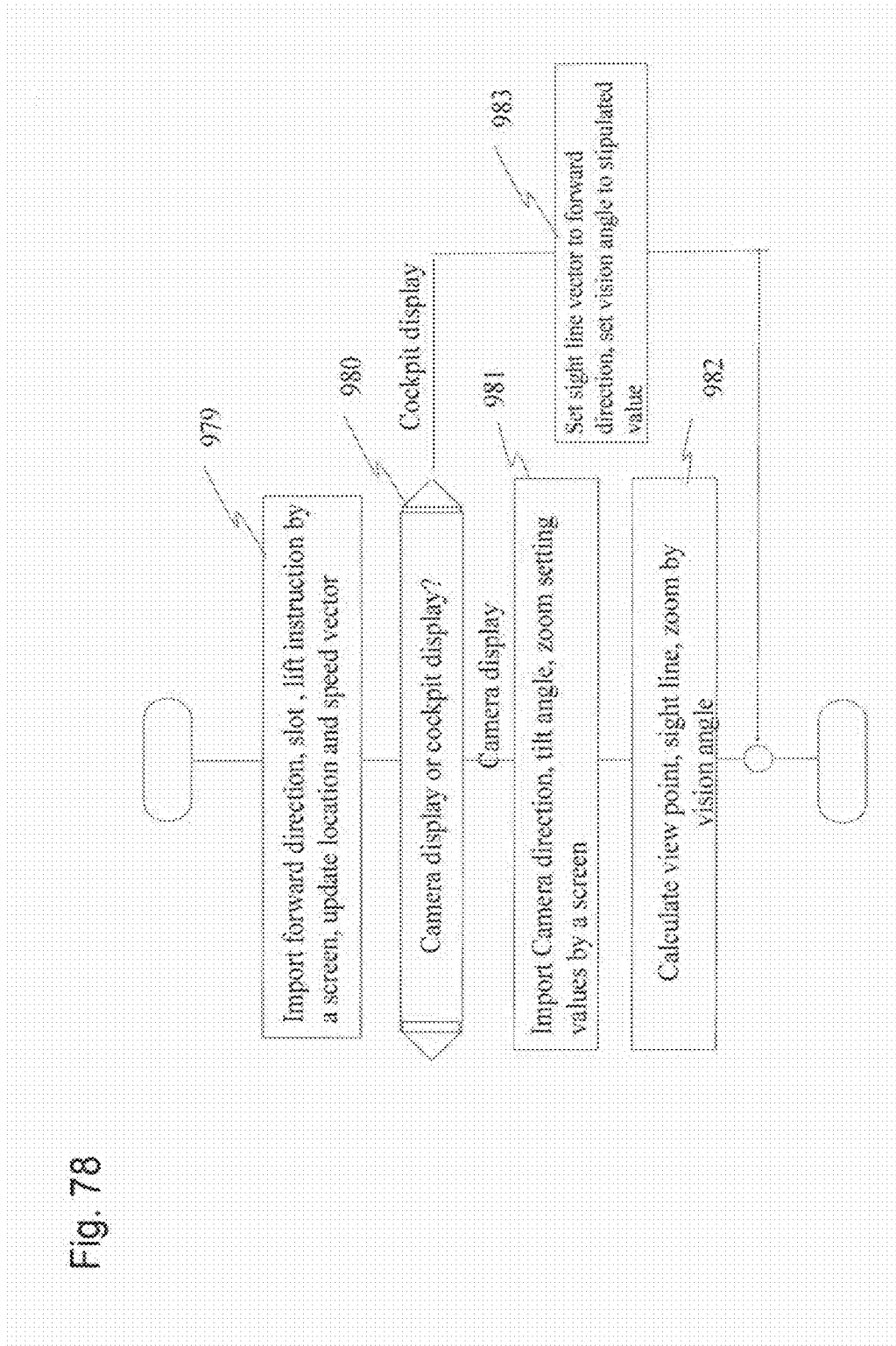
FIG. 78 is a diagram which shows a process flow of an aerial graphic user interface system in a process of the graphic user interface system of the present invention.

Next, the graphic user interface system 180 of the city landscape three dimensional video generation amusement system is explained using FIG. 77. FIG. 77 shows the entire structure of the graphic user interface system 180. The graphic user interface system 180 is formed by a process block in FIG. 77 and FIG. 78 and a monitor display and input function in FIG. 79, FIG. 80 and FIG. 81. The city landscape three dimensional video generation amusement system of the present invention is characterized by being able to freely switch between the aerial simulated flight and the road travel, and a judgment is made in process block 974 whether to switch from aerial to ground or from ground to aerial. In the case where landing on the ground from the air is selected, a landing point and forward direction after landing are read in process block 975. In the case where a landing button is pressed for a short time in the aerial three dimensional video graphic user interface in FIG. 79, there is a method of landing on ground at a specified oblique angle such as an oblique down 45 degree angle in a forward direction, and close to a directly below ground point according to the time pressed in the case where the button is pressed for a long time. It is common sense that an sight line direction at S ground maintains the direction during flight. The process shifts to process block 974 together with the case where there is no change in the road simulation from the previous time, forward direction, speed instruction is read from the screen FIG. 80 which is the ground graphic user interface, and location and speed vector are updated and transmitted to the three dimensional video generation system 170. In the case where it is judged to switch from the road three dimensional video generation to the aerial three dimensional video generation in the block 974, the process shifts to process block 977. Switching from the ground to the air is sometimes due to the jumping button in FIG. 80 being pressed, and in the case where the length of time it is pressed is short, a forward direction oblique rear fixed angle, for example 45 degrees and a fixed altitude of 100 m for example in the air, and the longer the button is pressed the more forward in the air.

Next, the process shifts to the aerial graphic user interface system of the process block 978 together with the case of aerial three dimensional video generation from the previous time. These contents are further described in FIG. 78. In process block 979, a forward direction, a slot, and a lift instruction are read from the screen using the aerial graphic user interface in FIG. 79, and the location and the speed vector are updated. In the aerial three dimensional video generation, not only is it possible to display a cockpit in the three dimensional video display 990 but it is also possible to switch to a camera display by a selection using a function button 1001. This is because the aerial three dimensional video generation system 160 is compatible with freely reading a start location trajectory and a sight line vector trajectory. In the case where a cockpit display is selected in process block 980, the process moves to process block 983, a sight line vector is set to forward direction, a vision angle is set to a stipulated value and data is transmitted to the aerial three dimensional video generation system 160. In the case where it is judged that a camera is selected in process block 980, camera direction, tilt angle and zoom setting values are read by the aerial graphic interface in FIG. 79, a view point, a sight line and vision angle using zoom are calculated in process block 982 and data is transmitted to the aerial three dimensional video generation system 160.

Figure 79:
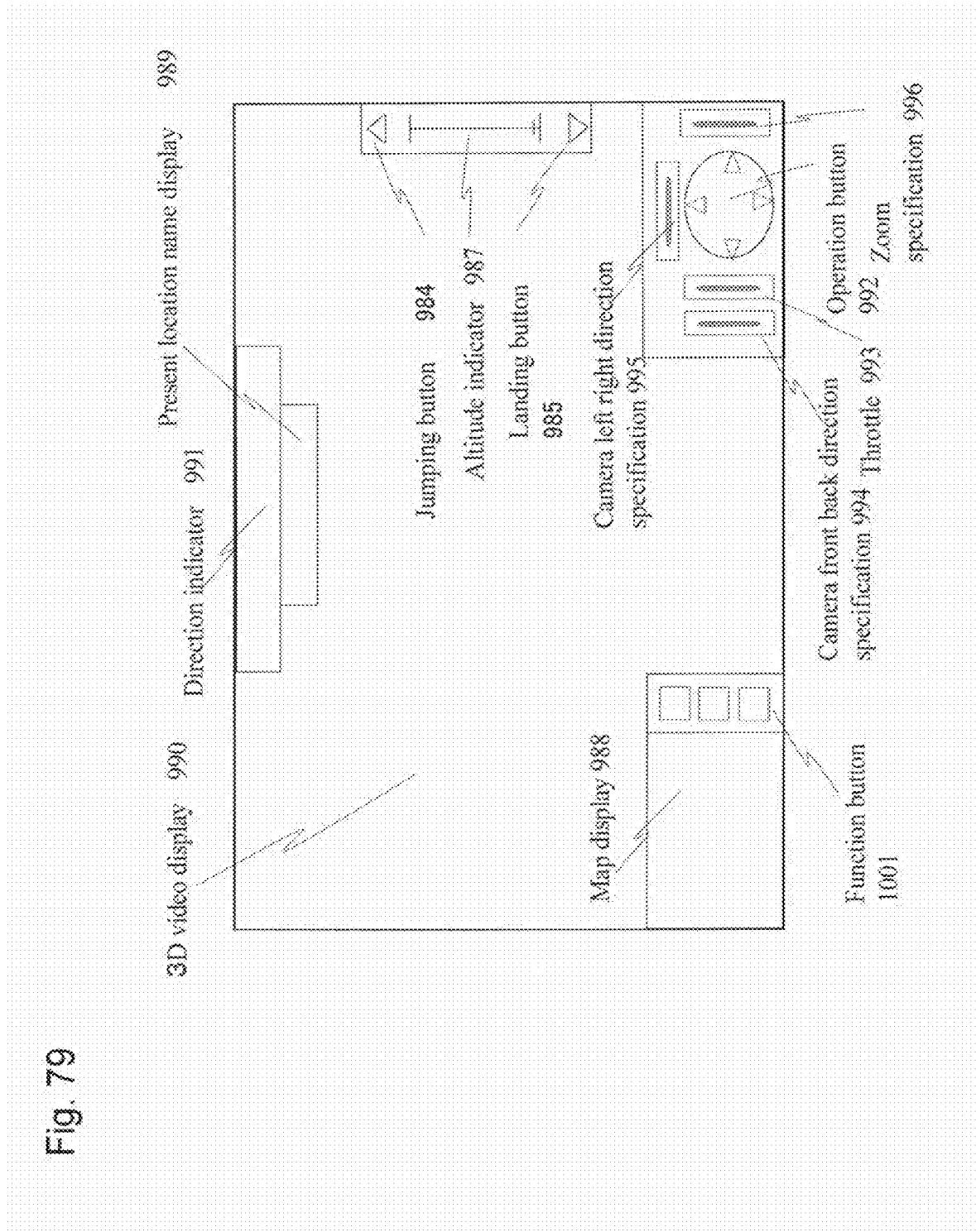
FIG. 79 is a diagram which shows a display example of an aerial graphic user interface system in a process of the graphic user interface system of the present invention.
Figure 80:
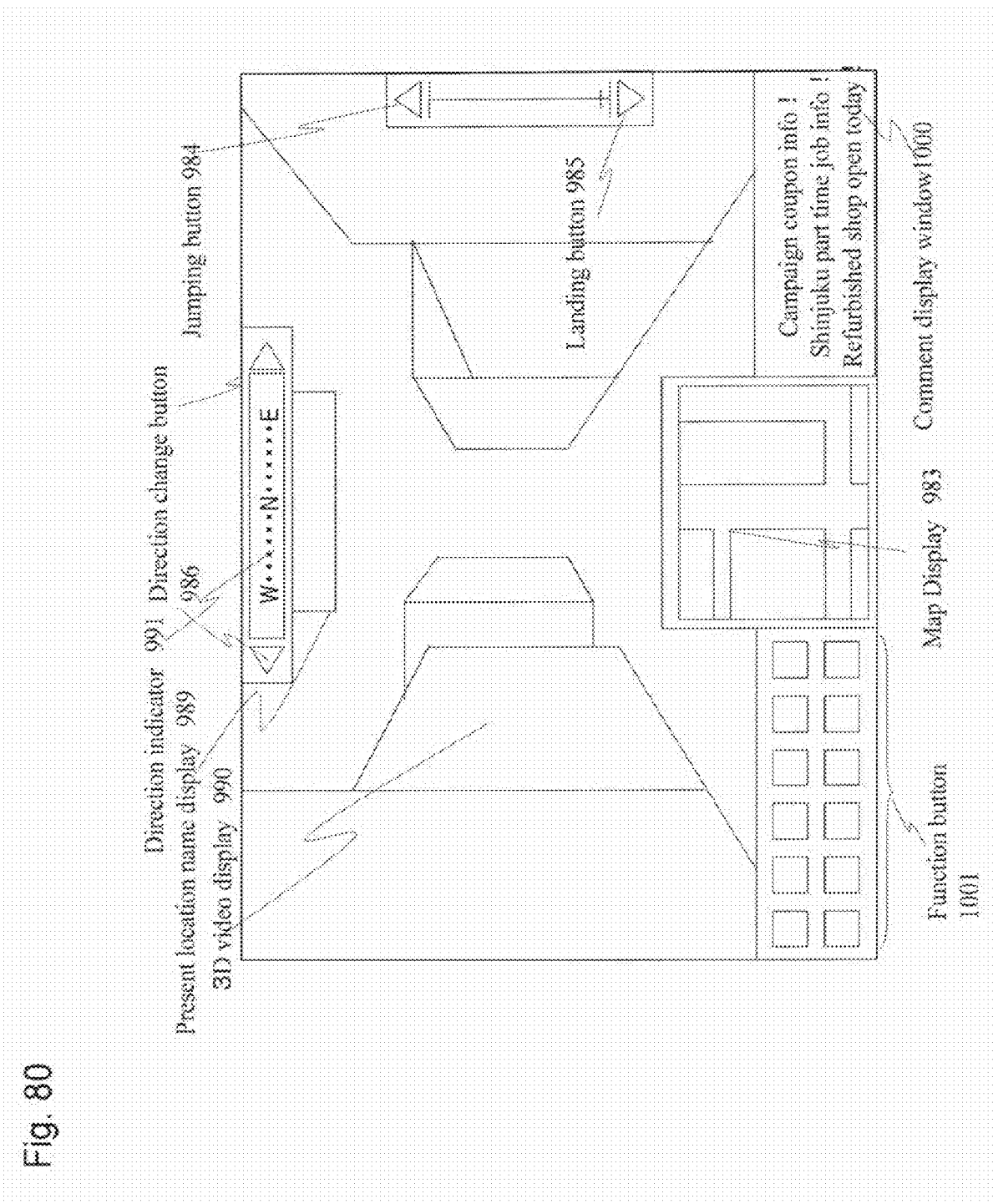
FIG. 80 is a diagram which shows a display example of a road graphic user interface system in a process of the graphic user interface system of the present invention.
Figure 81:
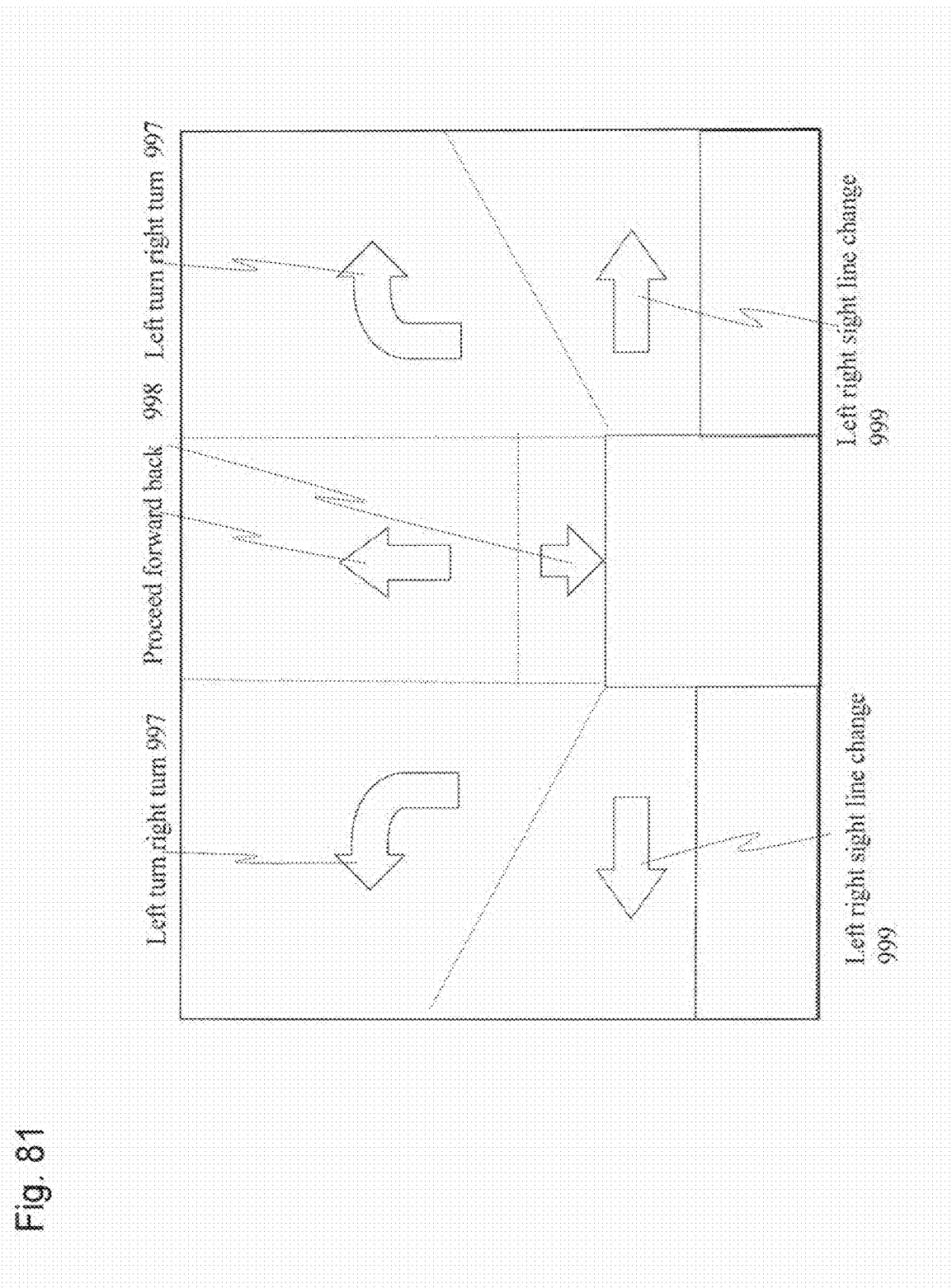
FIG. 81 is a diagram which shows a direction control cursor function of a road graphic user interface system in a process of the graphic user interface system of the present invention.

The parts not explained until now are explained below using FIG. 79, FIG. 80 and FIG. 81. The direction indicator 991 in FIG. 79 shows the flight direction and altitude indicator shows flight altitude. The map display 988 displays the present flight location on a map. This function is publicly used as GIS. FIG. 79 is a video display of the road three dimensional video generation and displays an urban area at human sight line. The function button 1001 can add functions in preparation for subsequent days, and can be used to arrange map display 993 on a center road and improve a guide function. Comment display window 1000 can display adverts depending on an area. FIG. 81 is another method of a forward direction and a sight line specification of the road three dimensional video generation, a screen is divided into regions in advance, and because the meaning of an operation input can be changed by the location of a cursor on the screen by a mouse or a joystick, and changed to move forward or backwards in the direction of an arrow in the case where a forward or rear 998 place is specified, turn left or right in the direction of an arrow in the case where a left turn right turn 997 place is selected, or change the sight line in a left direction or right direction in the direction of an arrow in the case where a left right sight line change 999 place is specified.

Furthermore, the screen described above is displayed for specifying a plurality of locations arranged in order on the view point route and a direction heading to a sight line photography region in each of the plurality of locations, and interaction is possible by operating an input device such as a mouse or a joystick. In addition, it is possible to set a view point direction at a location on a view point route while setting a view point route using an input device such as mouse or joystick in advance or after setting an sight line route. In this case, an input device or a device driver of an input device is an example of a route view point setting device. Alternatively, a view point direction may be set first then a view point route may be set. Alternatively, it is possible to use a program which calculates the location on the view point route and an sight line direction at this location. In this case, a processing device which executes a program is an example of a route view point setting device.

In addition, it is possible to use a helicopter or a simulated flying machine as well as an aircraft as the flying object.

The aerial survey photography system of the present invention can be used industrially as a control device of a camera and a video data processing device installed in an aircraft. Furthermore, the three dimensional video generation and amusement system of the present invention can be used industrially on a wide range of fields such as landscape simulation of city spaces, video guidance, situation comprehension and observation, advertising, trade activities and amusement infrastructure, as well as disaster prevention and security maintenance where a certain region can be densely photographed in advance without limiting to a specific object and a specific object can be observed from various view points and directions at the time of video display.

What is claimed is:

1. A method for outputting information comprising:
   photographing in a plurality of directions at each of a plurality of photographic locations a photographic region with a photographing device, obtaining a plurality of image data of the photographic region and storing in a memory, the plurality of image data of the photographic region at each of the plurality of photographic locations, the photographic region being divided into a plurality of sub-regions;
   correlating and storing in the memory photographic location data and photographic direction data at the time when the plurality of image data is obtained with each of the plurality of image data when storing each of the plurality of image data in the memory;
   specifying a photographed sub-region when the image data is obtained, by referencing the photographic location data and the photographic direction data correlated with image data stored in the memory;
   correlating and storing in a database the image data, the photographic location data and photographic direction data with the specified sub-region;
   specifying a plurality of locations arranged in order on a perspective route set above the photographic region and a direction of sight line towards the photographic region at each of the plurality of locations;
   referencing the photographic location data correlated with the sub-region stored in the database and reading out in order image data with searching the image data including the sub-region, the sub-region being located in the direction of sight line at each of the plurality of locations on the perspective route; and
   outputting the image data read out in order;
   wherein the photographic device includes a plurality of cameras pointing in a plurality of directions, the plurality of cameras simultaneously photograph at each of the plurality of photographic locations and the plurality of image data is obtained; and
   for each sub-region of the plurality of sub-regions, if a sub-region is photographed a plurality of times when seeing a plurality of photographic locations from an arbitrary geographical point in the sub-region, then an adjacent photographic location is included in a three dimensional angular range of 0.004 steradians or more and 0.54 steradians or less.

2. The method for outputting information according to claim 1, wherein video image data, which is generated, is video data connected by morphing the image data read out, when outputting.

3. The method for outputting information according to claim 1, wherein the perspective route and the direction of sight line are each given as P(t) and V(t) respectively as a function of time t, a trajectory T(t) of a point at which a direct line in a direction of V(t) from P(t) and a photographic sub-region intersect is calculated, and determining a sub-region which includes a location of T(t) at each time t as the sub-region located in the sight line direction in each of the plurality of locations on the perspective route.

4. The method for outputting information according to claim 1, wherein the photographic device is installed in a flying object, and the plurality of cameras photograph in a directions facing the ground including a vertical direction from the flying object.

5. The method for outputting information according to claim 1, wherein the flying object is an aircraft equipped with a user interface which displays a flight route which passes through the plurality of photograph locations.

6. The method for outputting information according to claim 1, wherein photographing is performed by the photographic device while the flying object is flying at an altitude of 200 m or more and 2500 m or less from the ground.

7. The method for outputting information according to claim 1, wherein photographing is performed by the photographic device while flying the flying object below the clouds in cloudy weather.

8. The method for outputting information according to claim 1, wherein when storing the image data in the database, dividing the image data into a plurality of sub image data in a horizontal direction within the image data, creating a histogram of the brightness of pixels for each of the plurality of sub image data, and image processing the image data so that characteristics of the plurality of created histograms become the same.

9. The method for outputting information according to claim 1, wherein the photographic device is installed on a vehicle which moves on the ground, and the plurality of cameras are pointing in the plurality of directions including a back, a forth, and side to side directions of the vehicle.

10. The method for outputting information according to claim 3, wherein image data is selected in which a photographic direction which shows photographic direction data correlated with image data is either the same or has the smallest difference with V(t) where the plurality of image data which includes a sub-region including a location of T(t) at time t exists.

11. The method for outputting information according to claim 3, wherein a sub-region is determined in which the distance between photographic location represented by location data which shows photographic direction data correlated with image data and T(t) is the smallest where a plurality of image data which includes a sub-region including a location of T (t) at time t exists.

12. The method for outputting information according to claim 3, wherein a sub-region is determined in which an obstacle doesn't exist between P(t) and T(t) where a plurality of image data which includes a sub-region including a location of T(t) at time t exists.

13. The method for outputting information according to claim 9, wherein the plurality of cameras are pointing in the plurality of directions further including an upper oblique direction.

14. The method for outputting information according to claim 9, wherein the vehicle is equipped with an inclination sensor which detects an inclination direction of the vehicle, and the image data is corrected using a detection result of the inclination sensor.

15. The method for outputting information according to claim 9, wherein the vehicle is equipped with a user interface which displays a movement route which passes through the plurality of photographic locations, and it is possible to control a movement direction and a movement speed of the vehicle by an operation of the user interface.

16. The method for outputting information according to claim 9, wherein it is possible to control a direction of the plurality of cameras by an operation of a user interface.

17. An image data outputting system comprising:
a database which stores a plurality of image data obtained by photographing in a plurality of directions at each of a plurality of photographic locations a photographic region with a photographing device, the photographic region being divided into a plurality of sub-regions, the database correlating and storing photographic location data and photographic direction data at the time when the plurality of image data is obtained with each of the plurality of the image data;
a perspective route specifying device which specifies a plurality of locations arranged in order on a perspective route above the photographic region, and specifies a sight line direction pointing at the photographic region at each of the plurality of locations; and
an image search engine which searches and outputs image data in order, the image search engine searching image data in a direction specified by locations on the perspective route specified by the perspective route specifying device by referencing the photographic location data correlated with a sub-region stored in the database and reading out in order image data, which is stored in the database;
wherein the photographic device includes a plurality of cameras pointing in a plurality of directions, the plurality of cameras simultaneously photograph at each of the plurality of photographic locations and a plurality of image data is obtained; and
for each sub-region of the plurality of sub-regions, if a sub-region is photographed a plurality of times when seeing plurality of photographic locations from an arbitrary geographical point in the sub-region, then an adjacent photographic location is included in a three dimensional angular range of 0.004 steradians or more and 0.54 steradians or less.

18. The image data outputting system according to claim 17, wherein the photographic device photographs images of a square region of the photographic region, and the database correlates location data of the photographic region corresponding to four corners of image which the image data represents, distance data up to where an optical axis of the photographic device intersects with the photographic region, and angular data which shows that a frame of the image is rotating around the optical axis with respect to a horizontal surface and stores the location data, the distance data, and the angular data.

19. The image data outputting system according to claim 17, wherein the database stores an index which correlates the image data with an angle of direction, angle of elevation and a distance when viewing a photographic location at a representative point within a sub-region in which stored image data is photographed by the photographic device, and the image search engine performs a search using the index.

* * * * *